United States Patent
Kumakura et al.

(10) Patent No.: US 11,506,425 B2
(45) Date of Patent: *Nov. 22, 2022

(54) REFRIGERATION CYCLE APPARATUS

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Mitsushi Itano, Osaka (JP); Daisuke Karube, Osaka (JP); Yuuki Yotsumoto, Osaka (JP); Kazuhiro Takahashi, Osaka (JP); Tatsuya Takakuwa, Osaka (JP); Yuzo Komatsu, Osaka (JP); Shun Ohkubo, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,003

(22) Filed: Jun. 25, 2020

(65) Prior Publication Data

US 2020/0326102 A1 Oct. 15, 2020

Related U.S. Application Data

(63) Continuation-in-part of application No. 16/955,465, filed as application No. PCT/JP2018/045290 on Dec. 10, 2018.

(30) Foreign Application Priority Data

Dec. 18, 2017 (JP) .................. 2017-242183
Dec. 18, 2017 (JP) .................. 2017-242185
(Continued)

(51) Int. Cl.
*F25B 9/00* (2006.01)
*C09K 5/04* (2006.01)
*F25B 1/00* (2006.01)

(52) U.S. Cl.
CPC .............. *F25B 9/006* (2013.01); *C09K 5/045* (2013.01); *F25B 1/00* (2013.01); *C09K 2205/126* (2013.01)

(58) Field of Classification Search
CPC ........... F25B 13/00; F25B 21/00; F25B 1/00; F25B 9/006; F25B 39/00; F25B 29/00;
(Continued)

(56) References Cited

U.S. PATENT DOCUMENTS 5,185,092 A 2/1993 Fukuda et al.
5,344,069 A 9/1994 Narikiyo
(Continued)

FOREIGN PATENT DOCUMENTS

AU 2001284508 3/2002
CN 1288132 3/2001
(Continued)

OTHER PUBLICATIONS

International Search Report dated Mar. 19, 2019 in International Application No. PCT/JP2018/046531.
(Continued)

*Primary Examiner* — Kun Kai Ma
(74) *Attorney, Agent, or Firm* — Wenderoth, Lind & Ponack, L.L.P.

(57) ABSTRACT

An air conditioning unit capable of performing a refrigeration cycle using a small-GWP refrigerant is provided. A refrigeration cycle apparatus (1, 1a to 1m) includes a refrigerant circuit (10) including a compressor (21), a condenser (23, 31, 36), a decompressing section (24, 44, 45, 33, 38), and an evaporator (31, 36, 23), and a refrigerant containing
(Continued)

at least 1,2-difluoroethylene enclosed in the refrigerant circuit (10).

30 Claims, 38 Drawing Sheets

(30) Foreign Application Priority Data

| Dec. 18, 2017 | (JP) | JP2017-242186 |
|---|---|---|
| Dec. 18, 2017 | (JP) | JP2017-242187 |
| Oct. 5, 2018 | (WO) | PCT/JP2018/037483 |
| Oct. 17, 2018 | (WO) | PCT/JP2018/038746 |
| Oct. 17, 2018 | (WO) | PCT/JP2018/038747 |
| Oct. 17, 2018 | (WO) | PCT/JP2018/038748 |
| Oct. 17, 2018 | (WO) | PCT/JP2018/038749 |

(58) Field of Classification Search
  CPC ............ F25B 41/40; F25B 41/00; F25B 2600/2513; F25B 2400/121; C09K 2205/128; C09K 2205/43; C09K 2205/106; C09K 2205/122; C09K 2205/24; C09K 2205/126; C09K 2205/22
  See application file for complete search history.

(56) References Cited

U.S. PATENT DOCUMENTS

| 5,851,968 | A | 12/1998 | Schnur |
|---|---|---|---|
| 6,591,631 | B1 | 7/2003 | Taira |
| 6,667,285 | B1 | 12/2003 | Kawahara et al. |
| 8,358,040 | B2 | 1/2013 | Komuro et al. |
| 10,131,827 | B2 | 11/2018 | Fukushima et al. |
| 10,883,745 | B2 | 1/2021 | Higashiiue et al. |
| 2002/0140309 | A1 | 10/2002 | Yanashima et al. |
| 2002/0193262 | A1 | 12/2002 | Kaimai et al. |
| 2004/0011062 | A1 | 1/2004 | Taira |
| 2006/0000224 | A1 | 1/2006 | Matsuoka |
| 2007/0209373 | A1 | 9/2007 | Taira et al. |
| 2008/0184723 | A1 | 8/2008 | Sato et al. |
| 2008/0184731 | A1 | 8/2008 | Sienel et al. |
| 2008/0188173 | A1 | 8/2008 | Chen et al. |
| 2009/0260382 | A1 | 10/2009 | Takeichi et al. |
| 2010/0067264 | A1 | 3/2010 | Ohashi et al. |
| 2010/0082162 | A1 | 4/2010 | Mundy et al. |
| 2010/0122545 | A1 | 5/2010 | Minor et al. |
| 2011/0108756 | A1 | 5/2011 | Tsuchiya et al. |
| 2011/0167848 | A1 | 7/2011 | Wakashima et al. |
| 2012/0260679 | A1 | 10/2012 | Huerta-Ochoa |
| 2014/0070132 | A1 | 3/2014 | Fukushima |
| 2014/0077123 | A1 | 3/2014 | Fukushima |
| 2014/0291411 | A1 | 10/2014 | Tamaki et al. |
| 2014/0314606 | A1 | 10/2014 | Maeyama et al. |
| 2014/0373569 | A1 | 12/2014 | Tsuboe et al. |
| 2015/0001981 | A1 | 1/2015 | Hattori et al. |
| 2015/0075203 | A1 | 3/2015 | Mochizuki et al. |
| 2015/0096321 | A1 | 4/2015 | Kawano et al. |
| 2015/0143841 | A1* | 5/2015 | Kawano ............ F25B 1/005 62/498 |
| 2015/0256038 | A1 | 9/2015 | Nigo et al. |
| 2015/0362199 | A1 | 12/2015 | Yumoto et al. |
| 2015/0376486 | A1 | 12/2015 | Hashimoto et al. |
| 2016/0018135 | A1 | 1/2016 | Yuzawa et al. |
| 2016/0047579 | A1 | 2/2016 | Yan et al. |
| 2016/0075927 | A1 | 3/2016 | Fukushima |
| 2016/0131378 | A1 | 5/2016 | Hinokuma et al. |
| 2016/0276886 | A1 | 9/2016 | Baba et al. |
| 2016/0333241 | A1 | 11/2016 | Fukushima et al. |
| 2016/0333243 | A1 | 11/2016 | Fukushima et al. |
| 2016/0340565 | A1 | 11/2016 | Tasaka et al. |
| 2016/0348933 | A1 | 12/2016 | Takeuchi et al. |
| 2016/0355719 | A1 | 12/2016 | Fukushima et al. |
| 2017/0002245 | A1 | 1/2017 | Fukushima |
| 2017/0058172 | A1 | 3/2017 | Fukushima et al. |
| 2017/0058173 | A1 | 3/2017 | Fukushima |
| 2017/0058174 | A1 | 3/2017 | Fukushima et al. |
| 2017/0121581 | A1 | 5/2017 | Horiike et al. |
| 2017/0138642 | A1* | 5/2017 | Ueno ............ F04B 39/00 |
| 2017/0166831 | A1 | 6/2017 | Matsumoto |
| 2017/0248328 | A1 | 8/2017 | Eskew et al. |
| 2017/0328586 | A1 | 11/2017 | Maeyama |
| 2017/0336085 | A1 | 11/2017 | Yasuo et al. |
| 2017/0338707 | A1 | 11/2017 | Shono et al. |
| 2018/0051198 | A1* | 2/2018 | Okamoto ............ C09K 5/044 |
| 2018/0094844 | A1 | 4/2018 | Suzuki |
| 2018/0138763 | A1 | 5/2018 | Nakamura et al. |
| 2018/0156217 | A1 | 6/2018 | Sakima et al. |
| 2018/0156511 | A1 | 6/2018 | Chikami et al. |
| 2018/0254676 | A1 | 9/2018 | Nigo et al. |
| 2018/0299175 | A1 | 10/2018 | Hayamizu et al. |
| 2018/0320942 | A1 | 11/2018 | Hayamizu et al. |
| 2018/0331436 | A1 | 11/2018 | Hayamizu et al. |
| 2018/0358861 | A1 | 12/2018 | Hayamizu et al. |
| 2019/0063773 | A1 | 2/2019 | Nagahashi et al. |
| 2019/0068015 | A1 | 2/2019 | Yabe et al. |
| 2019/0309963 | A1 | 10/2019 | Zaki et al. |
| 2020/0079985 | A1 | 3/2020 | Okamoto et al. |
| 2020/0321816 | A1 | 10/2020 | Watanabe |
| 2020/0325375 | A1 | 10/2020 | Kumakura et al. |
| 2020/0325376 | A1 | 10/2020 | Kumakura et al. |
| 2020/0325377 | A1 | 10/2020 | Kumakura et al. |
| 2020/0326100 | A1 | 10/2020 | Ukibune et al. |
| 2020/0326101 | A1 | 10/2020 | Itano et al. |
| 2020/0326102 | A1 | 10/2020 | Kumakura et al. |
| 2020/0326103 | A1 | 10/2020 | Kumakura et al. |
| 2020/0326105 | A1 | 10/2020 | Kumakura et al. |
| 2020/0326109 | A1 | 10/2020 | Kumakura et al. |
| 2020/0326110 | A1 | 10/2020 | Asano et al. |
| 2020/0332164 | A1 | 10/2020 | Itano et al. |
| 2020/0332166 | A1 | 10/2020 | Kumakura et al. |
| 2020/0333041 | A1 | 10/2020 | Itano et al. |
| 2020/0333054 | A1 | 10/2020 | Asano et al. |
| 2020/0347283 | A1 | 11/2020 | Itano et al. |
| 2020/0363085 | A1 | 11/2020 | Itano et al. |
| 2020/0363105 | A1 | 11/2020 | Kumakura et al. |
| 2020/0363106 | A1 | 11/2020 | Itano et al. |
| 2020/0363112 | A1 | 11/2020 | Ohtsuka et al. |
| 2020/0369934 | A1 | 11/2020 | Itano et al. |
| 2020/0385620 | A1 | 12/2020 | Itano et al. |
| 2020/0385621 | A1 | 12/2020 | Itano et al. |
| 2020/0385622 | A1 | 12/2020 | Itano et al. |
| 2020/0392387 | A1 | 12/2020 | Ohtsuka et al. |
| 2020/0392388 | A1 | 12/2020 | Itano et al. |
| 2020/0393178 | A1 | 12/2020 | Kumakura et al. |
| 2021/0018191 | A1 | 1/2021 | Itano et al. |
| 2021/0135520 | A1 | 5/2021 | Shimokawa et al. |
| 2021/0189209 | A1 | 6/2021 | Yotdumoto et al. |
| 2021/0222040 | A1 | 7/2021 | Fukushima et al. |
| 2021/0355359 | A1 | 11/2021 | Ohkubo et al. |

FOREIGN PATENT DOCUMENTS

| CN | 1447491 | 10/2003 |
|---|---|---|
| CN | 1455855 | 11/2003 |
| CN | 1723373 | 1/2006 |
| CN | 1987264 | 6/2007 |
| CN | 101235815 | 8/2008 |
| CN | 101441012 | 5/2009 |
| CN | 102401519 | 4/2012 |
| CN | 103562338 | 2/2014 |
| CN | 203704143 | 7/2014 |
| CN | 103975204 | 8/2014 |
| CN | 104094069 | 10/2014 |
| CN | 104456760 | 3/2015 |
| CN | 104578493 | 4/2015 |
| CN | 204534884 | 8/2015 |
| CN | 104903661 | 9/2015 |
| CN | 104937350 | 9/2015 |
| CN | 204648544 | 9/2015 |
| CN | 105102905 | 11/2015 |
| CN | 204943959 | 1/2016 |
| CN | 205261858 | 5/2016 |
| CN | 106029821 | 10/2016 |

(56) References Cited

FOREIGN PATENT DOCUMENTS

| | | |
|---|---|---|
| CN | 106030222 | 10/2016 |
| CN | 106062159 | 10/2016 |
| CN | 106085363 | 11/2016 |
| CN | 106103992 | 11/2016 |
| CN | 106133110 | 11/2016 |
| CN | 106414653 | 2/2017 |
| CN | 106414654 | 2/2017 |
| CN | 106415152 | 2/2017 |
| CN | 106574802 | 4/2017 |
| CN | 106661477 | 5/2017 |
| CN | 106839496 | 6/2017 |
| CN | 107110570 | 8/2017 |
| CN | 107112830 | 8/2017 |
| CN | 107429957 | 12/2017 |
| CN | 107614980 | 1/2018 |
| CN | 107925285 | 4/2018 |
| CN | 108139112 | 6/2018 |
| CN | 108431414 | 8/2018 |
| CN | 108469126 | 8/2018 |
| EP | 1 231 255 | 8/2002 |
| EP | 1 246 348 | 10/2002 |
| EP | 1 326 057 | 7/2003 |
| EP | 1 632 732 | 3/2006 |
| EP | 1 953 388 | 8/2008 |
| EP | 2 423 609 | 2/2012 |
| EP | 2 620 736 | 7/2013 |
| EP | 2 711 405 | 3/2014 |
| EP | 2 789 933 | 10/2014 |
| EP | 2 840 335 | 2/2015 |
| EP | 2 853 826 | 4/2015 |
| EP | 2 918 953 | 9/2015 |
| EP | 2 952 828 | 12/2015 |
| EP | 2 980 508 | 2/2016 |
| EP | 3 012 555 | 4/2016 |
| EP | 3 012 557 | 4/2016 |
| EP | 3 070 417 | 9/2016 |
| EP | 3 101 082 | 12/2016 |
| EP | 3 109 302 | 12/2016 |
| EP | 3 115 716 | 1/2017 |
| EP | 3 121 242 | 1/2017 |
| EP | 3 128 259 | 2/2017 |
| EP | 3 147 595 | 3/2017 |
| EP | 3 153 559 | 4/2017 |
| EP | 3 153 561 | 4/2017 |
| EP | 3 170 881 | 5/2017 |
| EP | 3 222 934 | 9/2017 |
| EP | 3 249 309 | 11/2017 |
| EP | 3 299 731 | 3/2018 |
| EP | 3 358 272 | 8/2018 |
| EP | 3 358 278 | 8/2018 |
| EP | 3 399 189 | 11/2018 |
| GB | 2530915 | 4/2016 |
| JP | 51-90115 | 7/1976 |
| JP | 52-13025 | 4/1977 |
| JP | 57-198968 | 12/1982 |
| JP | 59-39790 | 3/1984 |
| JP | 62-69066 | 3/1987 |
| JP | 63-69066 | 3/1987 |
| JP | 2-4163 | 1/1990 |
| JP | 5-264070 | 10/1993 |
| JP | 5-272823 | 10/1993 |
| JP | 7-19627 | 1/1995 |
| JP | 7-190571 | 7/1995 |
| JP | 8-200273 | 8/1996 |
| JP | 10-46170 | 2/1998 |
| JP | 10-300292 | 11/1998 |
| JP | 10-309050 | 11/1998 |
| JP | 10-318564 | 12/1998 |
| JP | 11-206001 | 7/1999 |
| JP | 11-256358 | 9/1999 |
| JP | 2000-161805 | 6/2000 |
| JP | 2000-220877 | 8/2000 |
| JP | 2000-234767 | 8/2000 |
| JP | 2000-304302 | 11/2000 |
| JP | 2001-82755 | 3/2001 |
| JP | 2001-139972 | 5/2001 |
| JP | 2002-54888 | 2/2002 |
| JP | 2002-89978 | 3/2002 |
| JP | 2002-257366 | 9/2002 |
| JP | 2002-272043 | 9/2002 |
| JP | 2002-318028 | 10/2002 |
| JP | 2003-18776 | 1/2003 |
| JP | 2003-83614 | 3/2003 |
| JP | 2003-174794 | 6/2003 |
| JP | 2004-28035 | 1/2004 |
| JP | 2004-132647 | 4/2004 |
| JP | 2004-215406 | 7/2004 |
| JP | 2004-251535 | 9/2004 |
| JP | 2004-361036 | 12/2004 |
| JP | 2005-61711 | 3/2005 |
| JP | 2005-241045 | 9/2005 |
| JP | 2005-288502 | 10/2005 |
| JP | 2006-162197 | 6/2006 |
| JP | 2006-211824 | 8/2006 |
| JP | 2006-313027 | 11/2006 |
| JP | 2008-39305 | 2/2008 |
| JP | 2008-54488 | 3/2008 |
| JP | 2008-190377 | 8/2008 |
| JP | 2008-245384 | 10/2008 |
| JP | 2008-286422 | 11/2008 |
| JP | 2009-63216 | 3/2009 |
| JP | 2009-92274 | 4/2009 |
| JP | 2009-121654 | 6/2009 |
| JP | 2009-150620 | 7/2009 |
| JP | 2009-299975 | 12/2009 |
| JP | 2010-28985 | 2/2010 |
| JP | 2010-103346 | 5/2010 |
| JP | 2010-119190 | 5/2010 |
| JP | 2010-164222 | 7/2010 |
| JP | 2010-230242 | 10/2010 |
| JP | 2011-4449 | 1/2011 |
| JP | 2011-43304 | 3/2011 |
| JP | 2011-52884 | 3/2011 |
| JP | 2011-94841 | 5/2011 |
| JP | 2011-135638 | 7/2011 |
| JP | 2011-202738 | 10/2011 |
| JP | 2011-252636 | 12/2011 |
| JP | 2012-42169 | 3/2012 |
| JP | 2012-112617 | 6/2012 |
| JP | 2012-132637 | 7/2012 |
| JP | 2012-151969 | 8/2012 |
| JP | 2013-124848 | 6/2013 |
| JP | 2013-126281 | 6/2013 |
| JP | 2013-139990 | 7/2013 |
| JP | 2013-155892 | 8/2013 |
| JP | 2013-155921 | 8/2013 |
| JP | 2013-172615 | 9/2013 |
| JP | 2013-200090 | 10/2013 |
| JP | 2013-221671 | 10/2013 |
| JP | 2014-70840 | 4/2014 |
| JP | 2014-75971 | 4/2014 |
| JP | 2014-89004 | 5/2014 |
| JP | 2014-129543 | 7/2014 |
| JP | 2014-152999 | 8/2014 |
| JP | 2014-167381 | 9/2014 |
| JP | 2015-23721 | 2/2015 |
| JP | 2015-55455 | 3/2015 |
| JP | 2015-78789 | 4/2015 |
| JP | 2015-82875 | 4/2015 |
| JP | 2015-111012 | 6/2015 |
| JP | 2015-114082 | 6/2015 |
| JP | 2015-145765 | 8/2015 |
| JP | 2015-158282 | 9/2015 |
| JP | 2015-218909 | 12/2015 |
| JP | 2015-218912 | 12/2015 |
| JP | 2015-229767 | 12/2015 |
| JP | 2016-1062 | 1/2016 |
| JP | 2016-11423 | 1/2016 |
| JP | 2016-56340 | 4/2016 |
| JP | 2016-125808 | 7/2016 |
| JP | 2016-133256 | 7/2016 |
| JP | 2016-172869 | 9/2016 |
| JP | 2016-174461 | 9/2016 |
| JP | 2017-36861 | 2/2017 |

(56) References Cited

FOREIGN PATENT DOCUMENTS

| | | | |
|---|---|---|---|
| JP | 2017-46430 | 3/2017 | |
| JP | 2017-53285 | 3/2017 | |
| JP | 2017-67373 | 4/2017 | |
| JP | 2017-67428 | 4/2017 | |
| JP | 2017-122549 | 7/2017 | |
| JP | 2017-145975 | 8/2017 | |
| JP | 2017-192190 | 10/2017 | |
| JP | 2018-25377 | 2/2018 | |
| KR | 2001-0029975 | 4/2001 | |
| KR | 2003-0028838 | 4/2003 | |
| KR | 10-0939609 | 10/2003 | |
| KR | 10-2004-0075737 | 8/2004 | |
| KR | 10-2005-0044931 | 5/2005 | |
| KR | 10-2017-0034887 | 3/2017 | |
| RU | 2013 156 380 | 6/2015 | |
| TW | 20030103482 | 2/2003 | |
| WO | 01/36571 | 5/2001 | |
| WO | 02/23100 | 3/2002 | |
| WO | 2009/069679 | 6/2009 | |
| WO | 2009/093345 | 7/2009 | |
| WO | 2012/157764 | 11/2012 | |
| WO | 2012/157765 | 11/2012 | |
| WO | WO-2012157765 A1 * | 11/2012 | ............. C09K 5/045 |
| WO | 2013/084301 | 6/2013 | |
| WO | 2013/146103 | 10/2013 | |
| WO | 2013/146208 | 10/2013 | |
| WO | 2013/151043 | 10/2013 | |
| WO | 2014/045400 | 3/2014 | |
| WO | 2014/118945 | 8/2014 | |
| WO | 2014/119149 | 8/2014 | |
| WO | 2014/156190 | 10/2014 | |
| WO | 2014/203353 | 12/2014 | |
| WO | 2014/203354 | 12/2014 | |
| WO | 2015/071967 | 5/2015 | |
| WO | 2015/115252 | 8/2015 | |
| WO | 2015/125763 | 8/2015 | |
| WO | 2015/125884 | 8/2015 | |
| WO | 2015/136981 | 9/2015 | |
| WO | 2015/140827 | 9/2015 | |
| WO | 2015/141678 | 9/2015 | |
| WO | 2015/186557 | 12/2015 | |
| WO | 2015/186670 | 12/2015 | |
| WO | 2016/009884 | 1/2016 | |
| WO | 2016/017460 | 2/2016 | |
| WO | 2016/103711 | 6/2016 | |
| WO | 2016/104418 | 6/2016 | |
| WO | 2016/117443 | 7/2016 | |
| WO | 2016/157538 | 10/2016 | |
| WO | 2016/182030 | 11/2016 | |
| WO | 2016/190232 | 12/2016 | |
| WO | 2017/038489 | 3/2017 | |
| WO | 2017/056789 | 4/2017 | |
| WO | 2017/057004 | 4/2017 | |
| WO | 2017/115636 | 7/2017 | |
| WO | 2017/122517 | 7/2017 | |
| WO | 2017/195248 | 11/2017 | |
| WO | 2019/123782 | 6/2019 | |
| WO | 2019/123804 | 6/2019 | |
| WO | 2019/123805 | 6/2019 | |
| WO | 2019/123806 | 6/2019 | |
| WO | 2019/123807 | 6/2019 | |
| WO | 2019/124400 | 6/2019 | |
| WO | 2019/124401 | 6/2019 | |
| WO | 2019/124402 | 6/2019 | |
| WO | 2019/124403 | 6/2019 | |
| WO | 2019/124404 | 6/2019 | |

OTHER PUBLICATIONS

International Preliminary Report on Patentability dated Jun. 23, 2020 in International Application No. PCT/JP2018/046531.
International Preliminary Report on Patentability dated Jun. 23, 2020 in International Application No. PCT/JP2018/045978.
International Search Report dated Mar. 19, 2019 in International Application No. PCT/JP2018/045978.
International Preliminary Report on Patentability dated Jun. 23, 2020 in International Application No. PCT/JP2018/046532.
International Search Report dated Feb. 12, 2019 in International Application No. PCT/JP2018/046532.
International Preliminary Report on Patentability dated Jun. 23, 2020 in International Application No. PCT/JP2018/042027.
International Search Report dated Feb. 12, 2019 in International Application No. PCT/JP2018/042027.
International Preliminary Report on Patentability dated Jun. 23, 2020 in International Application No. PCT/JP2018/042032.
International Search Report dated Feb. 19, 2019 in International Application No. PCT/JP2018/042032.
International Preliminary Report on Patentability dated Jun. 23, 2020 in International Application No. PCT/JP2018/046666.
International Search Report dated Apr. 2, 2019 in International Application No. PCT/JP2018/046666.
International Preliminary Report on Patentability dated Jun. 23, 2020 in International Application No. PCT/JP2018/045336.
International Search Report dated Feb. 19, 2019 in International Application No. PCT/JP2018/045336.
International Preliminary Report on Patentability dated Jun. 23, 2020 in International Application No. PCT/JP2018/045557.
International SearchReport dated Mar. 12, 2019 in International Application No. PCT/JP2018/045557.
International Preliminary Report on Patentability dated Jun. 23, 2020 in International Application No. PCT/JP2018/046426.
International Search Report dated Feb. 19, 2019 in International Application No. PCT/JP2018/046426.
International Preliminary Report on Patentability dated Jun. 23, 2020 in International Application No. PCT/JP2018/046427.
International Search Report dated Feb. 19, 2019 in International Application No. PCT/JP2018/046427.
International Preliminary Report on Patentability dated Jun. 23, 2020 in International Application No. PCT/JP2018/046428.
International Search Report dated Mar. 19, 2019 in International Application No. PCT/JP2018/046428.
International Preliminary Report on Patentability dated Jun. 23, 2020 in International Application No. PCT/JP2018/046581.
International Search Report dated Mar. 5, 2019 in International Application No. PCT/JP2018/046581.
International Preliminary Report on Patentability dated Jun. 23, 2020 in International Application No. PCT/JP2018/046630.
International Search Report dated Mar. 5, 2019 in International Application No. PCT/JP2018/046630.
International Preliminary Report on Patentability dated Jun. 23, 2020 in International Application No. PCT/JP2018/046582.
International Search Report dated Mar. 5, 2019 in International Application No. PCT/JP2018/046582.
International Preliminary Report on Patentability dated Jun. 23, 2020 in International Application No. PCT/JP2018/046631.
International Search Report dated Mar. 5, 2019 in International Application No. PCT/JP2018/046631.
International Preliminary Report on Patentability dated Jun. 23, 2020 in International Application No. PCT/JP2018/046627.
International Search Report dated Mar. 19, 2019 in International Application No. PCT/JP2018/046627.
International Preliminary Report on Patentability dated Jun. 23, 2020 in International Application No. PCT/JP2018/046628.
International Search Report dated Mar. 19, 2019 in International Application No. PCT/JP2018/046628.
International Preliminary Report on Patentability dated Jun. 23, 2020 in International Application No. PCT/JP2018/045979.
International Search Report dated Mar. 12, 2019 in International Application No. PCT/JP2018/045979.
International Preliminary Report on Patentability dated Jun. 23, 2020 in International Application No. PCT/JP2018/046434.
International Search Report dated Feb. 19, 2019 in International Application No. PCT/JP2018/046434.
International Preliminary Report on Patentability dated Jun. 23, 2020 in International Application No. PCT/JP2018/045290.
International Search Report dated Jan. 22, 2019 in International Application No. PCT/JP2018/045290.

(56) References Cited

OTHER PUBLICATIONS

International Preliminary Report on Patentability dated Jun. 23, 2020 in International Application No. PCT/JP2018/045288.
International Search Report dated Jan. 22, 2019 in International Application No. PCT/JP2018/045288.
International Preliminary Report on Patentability dated Jun. 23, 2020 in International Application No. PCT/JP2018/045289.
International Search Report dated Jan. 22, 2019 in International Application No. PCT/JP2018/045289.
International Preliminary Report on Patentability dated Jun. 23, 2020 in International Application No. PCT/JP2018/046639.
International Preliminary Report on Patentability dated Jun. 23, 2020 in International Application No. PCT/JP2018/046642.
International Preliminary Report on Patentability dated Jun. 23, 2020 in International Application No. PCT/JP2018/038746.
International Preliminary Report on Patentability dated Jun. 23, 2020 in International Application No. PCT/JP2018/046643.
International Preliminary Report on Patentability dated Jun. 23, 2020 in International Application No. PCT/JP2018/038748.
International Preliminary Report on Patentability dated Jun. 23, 2020 in International Application No. PCT/JP2018/046640.
International Preliminary Report on Patentability dated Jun. 23, 2020 in International Application No. PCT/JP2018/046644.
International Preliminary Report on Patentability dated Jun. 23, 2020 in International Application No. PCT/JP2018/038749.
International Preliminary Report on Patentability dated Jun. 23, 2020 in International Application No. PCT/JP2018/037483.
International Search Report dated Feb. 19, 2019 in International Application No. PCT/JP2018/045335.
International Preliminary Report on Patentability dated Jun. 23, 2020 in International Application No. PCT/JP2018/045335.
International Search Report dated Feb. 19, 2019 in International Application No. PCT/JP2018/046435.
International Preliminary Report on Patentability dated Jun. 23, 2020 in International Application No. PCT/JP2018/046435.
International Search Report dated Mar. 19, 2019 in International (PCT) Application No. PCT/JP2018/046530.
International Preliminary Report on Patentability dated Jun. 23, 2020 in International Application No. PCT/JP2018/046530.
International Search Report dated Feb. 12, 2019 in International (PCT) Application No. PCT/JP2018/046533.
International Preliminary Report on Patentability dated Jun. 23, 2020 in International Application No. PCT/JP2018/046533.
Hirahara et al., "Latest trend of alternative refrigerant: LCCP-analogy for HFO-1234yf Air Conditioners using a Simulation with R134a Properties", Refrigeration, Jan. 15, 2010, vol. 85, No. 987, pp. 15-20, with partial translation.
International Preliminary Report on Patentability dated Jun. 23, 2020 in International Application No. PCT/JP2018/038747.
International Search Report dated Mar. 12, 2019 in International (PCT) Application No. PCT/JP2018/046639.
International Search Report dated Mar. 12, 2019 in International (PCT) Application No. PCT/JP2018/046642.
International Search Report dated Dec. 18, 2018 in International (PCT) Application No. PCT/JP2018/038746.
International Search Report dated Mar. 19, 2019 in International (PCT) Application No. PCT/JP2018/046643.
International Search Report dated Dec. 18, 2018 in International (PCT) Application No. PCT/JP2018/038748.
International Search Report dated Mar. 12, 2019 in International (PCT) Application No. PCT/JP2018/046640.
International Search Report dated Mar. 19, 2019 in International (PCT) Application No. PCT/JP2018/046644.
International Search Report dated Dec. 18, 2018 in International (PCT) Application No. PCT/JP2018/038749.
International Search Report dated Dec. 18, 2018 in International (PCT) Application No. PCT/JP2018/037483.
International Search Report dated Dec. 18, 2018 in International (PCT) Application No. PCT/JP2018/038747.
Summary, Collection of Papers of the 2nd Symposium on New Technologies of Refrigeration and Air Conditioning, 2nd Edition, Ding Guoliang, Ed., published by Shanghai Jiaotong University Press, 2003, with Concise Explanation.

\* cited by examiner

REFRIGERATION CYCLE APPARATUS

TECHNICAL FIELD

The present disclosure relates to a refrigeration cycle apparatus.

BACKGROUND ART

Conventionally, heat cycle systems such as air conditioning apparatuses use in many cases R410A as a refrigerant. R410A is a two-component mixed refrigerant of difluoromethane ($CH_2F2$; HFC-32 or R32) and pentafluoroethane ($C_2HF_5$; HFC-125 or R125), and is a pseudo-azeotropic composition.

However, R410A has a global warming potential (GWP) of 2088. In recent years, R32 which is a refrigerant having a lower GWP is being more used as a result of growing concern about global warming.

Due to this, for example, PTL 1 (International Publication No. 2015/141678) suggests various low-GWP mixed refrigerants alternative to R410A.

SUMMARY OF THE INVENTION

Technical Problem

However, a specific refrigerant circuit that can use such a small-GWP refrigerant has not been studied at all.

The content of the present disclosure aims at the above-described point and an object of the present disclosure is to provide an air conditioning unit capable of performing a refrigeration cycle using a small-GWP refrigerant.

Solution to Problem

A refrigeration cycle apparatus according to a first aspect includes a refrigerant circuit and a refrigerant. The refrigerant circuit includes a compressor, a condenser, a decompressing section, and an evaporator. The refrigerant contains at least 1,2-difluoroethylene. The refrigerant is enclosed in the refrigerant circuit.

Since the refrigeration cycle apparatus can perform a refrigeration cycle using the refrigerant containing 1,2-difluoroethylene in the refrigerant circuit including the compressor, the condenser, the decompressing section, and the evaporator, the refrigeration cycle apparatus can perform a refrigeration cycle using a small-GWP refrigerant.

A refrigeration cycle apparatus according to a second aspect is the refrigeration cycle apparatus according to the first aspect, in which the refrigerant circuit further includes a low-pressure receiver. The low-pressure receiver is provided midway in a refrigerant flow path extending from the evaporator toward a suction side of the compressor.

The refrigeration cycle apparatus can perform a refrigeration cycle while the low-pressure receiver stores an excessive refrigerant in the refrigerant circuit.

A refrigeration cycle apparatus according to a third aspect is the refrigeration cycle apparatus according to the first aspect or the second aspect, in which the refrigerant circuit further includes a high-pressure receiver. The high-pressure receiver is provided midway in a refrigerant flow path extending from the condenser toward the evaporator.

The refrigeration cycle apparatus can perform a refrigeration cycle while the high-pressure receiver stores an excessive refrigerant in the refrigerant circuit.

A refrigeration cycle apparatus according to a fourth aspect is the refrigeration cycle apparatus according to any one of the first aspect to the third aspect, in which the refrigerant circuit further includes a first decompressing section, a second decompressing section, and an intermediate-pressure receiver. The first decompressing section, the second decompressing section, and the intermediate-pressure receiver are provided midway in a refrigerant flow path extending from the condenser toward the evaporator. The intermediate-pressure receiver is provided between the first decompressing section and the second decompressing section in the refrigerant flow path extending from the condenser toward the evaporator.

The refrigeration cycle apparatus can perform a refrigeration cycle while the intermediate-pressure receiver stores an excessive refrigerant in the refrigerant circuit.

A refrigeration cycle apparatus according to a fifth aspect is the refrigeration cycle apparatus according to any one of the first aspect to the fourth aspect, in which the refrigeration cycle apparatus further includes a control unit. The refrigerant circuit further includes a first decompressing section and a second decompressing section. The first decompressing section and the second decompressing section are provided midway in a refrigerant flow path extending from the condenser toward the evaporator. The control unit adjusts both a degree of decompression of a refrigerant passing through the first decompressing section and a degree of decompression of a refrigerant passing through the second decompressing section.

The refrigeration cycle apparatus, by controlling the respective degrees of decompression of the first decompressing section and the second decompressing section provided midway in the refrigerant flow path extending from the condenser toward the evaporator, can decrease the concentration of the refrigerant located between the first decompressing section and the second decompressing section provided midway in the refrigerant flow path extending from the condenser toward the evaporator. Thus, the refrigerant enclosed in the refrigerant circuit is likely present more in the condenser and/or the evaporator, thereby improving the capacity.

A refrigeration cycle apparatus according to a sixth aspect is the refrigeration cycle apparatus according to any one of the first aspect to the fifth aspect, in which the refrigerant circuit further includes a refrigerant heat exchanging section. The refrigerant heat exchanging section causes a refrigerant flowing from the condenser toward the evaporator and a refrigerant flowing from the evaporator toward the compressor to exchange heat with each other.

With the refrigeration cycle apparatus, in the refrigerant heat exchanging section, the refrigerant flowing from the evaporator toward the compressor is heated with the refrigerant flowing from the condenser toward the evaporator. Thus, liquid compression by the compressor can be controlled.

A refrigeration cycle apparatus according to a seventh aspect is the refrigeration cycle apparatus according to any of the first through sixth aspects, wherein the refrigerant comprises trans-1,2-difluoroethylene (FO-1132(E)), trifluoroethylene (HFO-1123), and 2,3,3,3-tetrafluoro-1-propene (R1234yf).

The refrigeration cycle apparatus can perform a refrigeration cycle using a refrigerant having properties including a sufficiently small GWP, and a refrigeration capacity (possibly referred to as cooling capacity or capacity) and a coefficient of performance (COP) equivalent to those of R410A.

A refrigeration cycle apparatus according to an eighth aspect is the refrigeration cycle apparatus according to the seventh aspect, wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segments BD, CO, and OA);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

A refrigeration cycle apparatus according to a ninth aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments IA, BD, and CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

A refrigeration cycle apparatus according to a tenth aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, BD, and CG are straight lines.

A refrigeration cycle apparatus according to an eleventh aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:
point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segments BD and CJ);
the line segment PL is represented by coordinates (x, $-0.1135x^2+12.112x-280.43$, $0.1135x^2-13.112x+380.43$)
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments JP, LM, BD, and CG are straight lines.

A refrigeration cycle apparatus according to a twelfth aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments (excluding the points on the line segment BF);
the line segment PL is represented by coordinates (x, $-0.1135x^2+12.112x-280.43$, $0.1135x^2-13.112x+380.43$),
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TP is represented by coordinates (x, $0.00672x^2-0.7607x+63.525$, $-0.00672x^2-0.2393x+36.475$), and
the line segments LM and BF are straight lines.

A refrigeration cycle apparatus according to a thirteenth aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:
point P (55.8, 42.0, 2.2),
point L (63.1, 31.9, 5.0),
point Q (62.8, 29.6, 7.6), and
point R (49.8, 42.3, 7.9),
or on the above line segments;
the line segment PL is represented by coordinates (x, $-0.1135x^2+12.112x-280.43$, $0.1135x^2-13.112x+380.43$),
the line segment RP is represented by coordinates (x, $0.00672x^2-0.7607x+63.525$, $-0.00672x^2-0.2393x+36.475$), and
the line segments LQ and QR are straight lines.

A refrigeration cycle apparatus according to a fourteenth aspect is the refrigeration cycle apparatus according to the seventh aspect, wherein
when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:
point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments,
the line segment MA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$),
the line segment TS is represented by coordinates (x, $-0.0017x^2-0.7869x+70.888$, $-0.0017x^2-0.2131x+29.112$), and
the line segments SM and BF are straight lines.

A refrigeration cycle apparatus according to a fifteenth aspect is the refrigeration cycle apparatus according to any of the first through sixth aspects, wherein
the refrigerant comprises trans-1,2-difluoroethylene (HFO-1132(E)) and trifluoroethylene (HFO-1123) in a total amount of 99.5 mass % or more based on the entire refrigerant, and the refrigerant comprises 62.0 mass % to 72.0 mass % of HFO-1132(E) based on the entire refrigerant.

The refrigeration cycle apparatus can perform a refrigeration cycle using a refrigerant having properties including a sufficiently small GWP, a coefficient of performance (COP) and a refrigeration capacity (possibly referred to as cooling capacity or capacity) equivalent to those of R410A, and being classified with lower flammability (class 2L) according to the standard of the American Society of Heating, Refrigerating and Air-Conditioning Engineers (ASHRAE).

A refrigeration cycle apparatus according to a sixteenth aspect is the refrigeration cycle apparatus according to any of the first through sixth aspects, wherein
the refrigerant comprises HFO-1132(E) and HFO-1123 in a total amount of 99.5 mass % or more based on the entire refrigerant, and
the refrigerant comprises 45.1 mass % to 47.1 mass % of HFO-1132(E) based on the entire refrigerant.

The refrigeration cycle apparatus can perform a refrigeration cycle using a refrigerant having properties including a sufficiently small GWP, a coefficient of performance (COP) and a refrigeration capacity (possibly referred to as cooling capacity or capacity) equivalent to those of R410A, and being classified with lower flammability (class 2L) according to the standard of the American Society of Heating, Refrigerating and Air-Conditioning Engineers (ASHRAE).

A refrigeration cycle apparatus according to a seventeenth aspect is the refrigeration cycle apparatus according to any of the first through sixth aspects, wherein
the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein
when the mass % of HFO-1132(E), HFO-1123, R1234yf, and R32 based on their sum in the refrigerant is respectively represented by x, y, z, and a,
if $0<a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:
point G ($0.026a^2-1.7478a+72.0$, $-0.026a^2+0.7478a+28.0$, 0.0),
point I ($0.026a^2-1.7478a+72.0$, 0.0, $-0.026a^2+0.7478a+28.0$),
point A ($0.0134a^2-1.9681a+68.6$, 0.0, $-0.0134a^2+0.9681a+31.4$),
point B (0.0, $0.0144a^2-1.6377a+58.7$, $-0.0144a^2+0.6377a+41.3$), point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines GI, AB, and D'C (excluding point G, point I, point A, point B, point D', and point C);

if $11.1<a\leq18.2$, coordinates (x,y,z) in the ternary composition diagram are within the range of a figure surrounded by straight lines GI, IA, AB, BW, and WG that connect the following 5 points:
point G ($0.02a^2-1.6013a+71.105$, $-0.02a^2+0.6013a+28.895$, 0.0),
point I ($0.02a^2-1.6013a+71.105$, 0.0, $-0.02a^2+0.6013a+28.895$),
point A ($0.0112a^2-1.9337a+68.484$, 0.0, $-0.0112a^2+0.9337a+31.516$),
point B (0.0, $0.0075a^2-1.5156a+58.199$, $-0.0075a^2+0.5156a+41.801$), and
point W (0.0, $100.0-a$, 0.0),
or on the straight lines GI and AB (excluding point G, point I, point A, point B, and point W);

if $18.2<a\leq26.7$, coordinates (x,y,z) in the ternary composition diagram are within the range of a figure surrounded by straight lines GI, IA, AB, BW, and WG that connect the following 5 points:
point G ($0.0135a^2-1.4068a+69.727$, $-0.0135a^2+0.4068a+30.273$, 0.0),
point I ($0.0135a^2-1.4068a+69.727$, 0.0, $-0.0135a^2+0.4068a+30.273$),
point A ($0.0107a^2-1.9142a+68.305$, 0.0, $-0.0107a^2+0.9142a+31.695$),
point B (0.0, $0.009a^2-1.6045a+59.318$, $-0.009a^2+0.6045a+40.682$), and
point W (0.0, $100.0-a$, 0.0),
or on the straight lines GI and AB (excluding point G, point I, point A, point B, and point W);

if $26.7<a\leq36.7$, coordinates (x,y,z) in the ternary composition diagram are within the range of a figure surrounded by straight lines GI, IA, AB, BW, and WG that connect the following 5 points:
point G ($0.0111a^2-1.3152a+68.986$, $-0.0111a^2+0.3152a+31.014$, 0.0),
point I ($0.0111a^2-1.3152a+68.986$, 0.0, $-0.0111a^2+0.3152a+31.014$),
point A ($0.0103a^2-1.9225a+68.793$, 0.0, $-0.0103a^2+0.9225a+31.207$),
point B (0.0, $0.0046a^2-1.41a+57.286$, $-0.0046a^2+0.41a+42.714$), and
point W (0.0, $100.0-a$, 0.0),
or on the straight lines GI and AB (excluding point G, point I, point A, point B, and point W); and if $36.7<a\leq46.7$, coordinates (x,y,z) in the ternary composition diagram are within the range of a figure surrounded by straight lines GI, IA, AB, BW, and WG that connect the following 5 points:
point G ($0.0061a^2-0.9918a+63.902$, $-0.0061a^2-0.0082a+36.098$, 0.0),
point I ($0.0061a^2-0.9918a+63.902$, 0.0, $-0.0061a^2-0.0082a+36.098$),
point A ($0.0085a^2-1.8102a+67.1$, 0.0, $-0.0085a^2+0.8102a+32.9$),
point B (0.0, $0.0012a^2-1.1659a+52.95$, $-0.0012a^2+0.1659a+47.05$), and
point W (0.0, $100.0-a$, 0.0),
or on the straight lines GI and AB (excluding point G, point I, point A, point B, and point W).

The refrigeration cycle apparatus can perform a refrigeration cycle using a refrigerant having properties including a sufficiently small GWP, and a refrigeration capacity (possibly referred to as cooling capacity or capacity) and a coefficient of performance (COP) equivalent to those of R410A.

A refrigeration cycle apparatus according to an eighteenth aspect is the refrigeration cycle apparatus according to any of the first through sixth aspects, wherein
the refrigerant comprises trans-1,2-difluoroethylene (HFO-1132(E)), trifluoroethylene (HFO-1123), 2,3,3,3-tetrafluoro-1-propene (R1234yf), and difluoromethane (R32), wherein
when the mass % of HFO-1132(E), HFO-1123, R1234yf, and R32 based on their sum in the refrigerant is respectively represented by x, y, z, and a, if $0<a\leq11.1$, coordinates (x,y,z) in a ternary composition diagram in which the sum of HFO-1132(E), HFO-1123, and R1234yf is $(100-a)$ mass % are within the range of a figure surrounded by straight lines JK', K'B, BD', D'C, and CJ that connect the following 5 points:
point J ($0.0049a^2-0.9645a+47.1$, $-0.0049a^2-0.0355a+52.9$, 0.0),
point K' ($0.0514a^2-2.4353a+61.7$, $-0.0323a^2+0.4122a+5.9$, $-0.0191a^2+1.0231a+32.4$),
point B (0.0, $0.0144a^2-1.6377a+58.7$, $-0.0144a^2+0.6377a+41.3$),
point D' (0.0, $0.0224a^2+0.968a+75.4$, $-0.0224a^2-1.968a+24.6$), and
point C ($-0.2304a^2-0.4062a+32.9$, $0.2304a^2-0.5938a+67.1$, 0.0),
or on the straight lines JK', K'B, and D'C (excluding point J, point B, point D', and point C);

if $11.1<a\leq18.2$, coordinates (x,y,z) in the ternary composition diagram are within the range of a figure surrounded by straight lines JK', K'B, BW, and WJ that connect the following 4 points:
point J ($0.0243a^2-1.4161a+49.725$, $-0.0243a^2+0.4161a+50.275$, 0.0),
point K' ($0.0341a^2-2.1977a+61.187$, $-0.0236a^2+0.34a+5.636$, $-0.0105a^2+0.8577a+33.177$),
point B (0.0, $0.0075a^2-1.5156a+58.199$, $-0.0075a^2+0.5156a+41.801$), and
point W (0.0, $100.0-a$, 0.0),
or on the straight lines JK'∝ and K'B (excluding point J, point B, and point W);

if $18.2<a\leq26.7$, coordinates (x,y,z) in the ternary composition diagram are within the range of a figure surrounded by straight lines JK', K'B, BW, and WJ that connect the following 4 points:
point J ($0.0246a^2-1.4476a+50.184$, $-0.0246a^2+0.4476a+49.816$, 0.0),
point K' ($0.0196a^2-1.7863a+58.515$, $-0.0079a^2-0.1136a+8.702$, $-0.0117a^2+0.8999a+32.783$),
point B (0.0, $0.009a^2-1.6045a+59.318$, $-0.009a^2+0.6045a+40.682$), and
point W (0.0, $100.0-a$, 0.0),
or on the straight lines JK' and K'B (excluding point J, point B, and point W);

if $26.7<a\leq36.7$, coordinates (x,y,z) in the ternary composition diagram are within the range of a figure surrounded by straight lines JK', K'A, AB, BW, and WJ that connect the following 5 points:
point J ($0.0183a^2-1.1399a+46.493$, $-0.0183a^2+0.1399a+53.507$, 0.0),
point K' ($-0.0051a^2+0.0929a+25.95$, 0.0, $0.0051a^2-1.0929a+74.05$), point A $(0.0103a^2-1.9225a+68.793, 0.0, -0.0103a^2+0.9225a+31.207)$,
point B $(0.0, 0.0046a^2-1.41a+57.286, -0.0046a^2+0.41a+42.714)$, and
point W $(0.0, 100.0-a, 0.0)$,
or on the straight lines JK', K'A, and AB (excluding point J, point B, and point W); and
if $36.7<a\leq46.7$, coordinates (x,y,z) in the ternary composition diagram are within the range of a figure surrounded by straight lines JK', K'A, AB, BW, and WJ that connect the following 5 points:
point J $(-0.0134a^2+1.0956a+7.13, 0.0134a^2-2.0956a+92.87, 0.0)$,
point K'$(-1.892a+29.443, 0.0, 0.892a+70.557)$,
point A $(0.0085a^2-1.8102a+67.1, 0.0, -0.0085a^2+0.8102a+32.9)$,
point B $(0.0, 0.0012a^2-1.1659a+52.95, -0.0012a^2+0.1659a+47.05)$, and
point W $(0.0, 100.0-a, 0.0)$,
or on the straight lines JK', K'A, and AB (excluding point J, point B, and point W).

The refrigeration cycle apparatus can perform a refrigeration cycle using a refrigerant having properties including a sufficiently small GWP, and a refrigeration capacity (possibly referred to as cooling capacity or capacity) and a coefficient of performance (COP) equivalent to those of R410A.

A refrigeration cycle apparatus according to a nineteenth aspect is the refrigeration cycle apparatus according to any of the first through sixth aspects, wherein
the refrigerant comprises trans-1,2-difluoroethylene (HFO-1132(E)), difluoromethane(R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI;
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.

The refrigeration cycle apparatus can perform a refrigeration cycle using a refrigerant having properties including a sufficiently small GWP, a refrigeration capacity (possibly referred to as cooling capacity or capacity) equivalent to that of R410A, and being classified with lower flammability (class 2L) according to the standard of the American Society of Heating, Refrigerating and Air-Conditioning Engineers (ASHRAE).

A refrigeration cycle apparatus according to a twentieth aspect is the refrigeration cycle apparatus according to any of the first through sixth aspects, wherein
the refrigerant comprises HFO-1132(E), R32, and R1234yf, wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.

The refrigeration cycle apparatus can perform a refrigeration cycle using a refrigerant having properties including a sufficiently small GWP, a refrigeration capacity (possibly referred to as cooling capacity or capacity) equivalent to that of R410A, and being classified with lower flammability (class 2L) according to the standard of the American Society of Heating, Refrigerating and Air-Conditioning Engineers (ASHRAE).

A refrigeration cycle apparatus according to a twenty first aspect is the refrigeration cycle apparatus according to any of the first through sixth aspects, wherein
the refrigerant comprises HFO-1132(E), R32, and R1234yf, wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

The refrigeration cycle apparatus can perform a refrigeration cycle using a refrigerant having properties including a sufficiently small GWP, a refrigeration capacity (possibly referred to as cooling capacity or capacity) equivalent to that of R410A, and being classified with lower flammability (class 2L) according to the standard of the American Society of Heating, Refrigerating and Air-Conditioning Engineers (ASHRAE).

A refrigeration cycle apparatus according to a twenty second aspect is the refrigeration cycle apparatus according to any of the first through sixth aspects, wherein
the refrigerant comprises HFO-1132(E), R32, and R1234yf, wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line.

The refrigeration cycle apparatus can perform a refrigeration cycle using a refrigerant having properties including a sufficiently small GWP, a refrigeration capacity (possibly referred to as cooling capacity or capacity) equivalent to that of R410A, and being classified with lower flammability (class 2L) according to the standard of the American Society of Heating, Refrigerating and Air-Conditioning Engineers (ASHRAE).

A refrigeration cycle apparatus according to a twenty third aspect is the refrigeration cycle apparatus according to any of the first through sixth aspects, wherein
the refrigerant comprises HFO-1132(E), R32, and R1234yf, wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line.

The refrigeration cycle apparatus can perform a refrigeration cycle using a refrigerant having properties including a sufficiently small GWP, a refrigeration capacity (possibly referred to as cooling capacity or capacity) equivalent to that of R410A, and being classified with lower flammability (class 2L) according to the standard of the American Society of Heating, Refrigerating and Air-Conditioning Engineers (ASHRAE).

A refrigeration cycle apparatus according to a twenty fourth aspect is the refrigeration cycle apparatus according to any of the first through sixth aspects, wherein
the refrigerant comprises trans-1,2-difluoroethylene (HFO-1132(E)), trifluoroethylene (HFO-1123), and difluoromethane (R32),
wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);
the line segment IK is represented by coordinates $(0.025z^2-1.7429z+72.00, -0.025z^2+0.7429z+28.0, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments KB' and GI are straight lines.

The refrigeration cycle apparatus can perform a refrigeration cycle using a refrigerant having properties including a sufficiently small GWP, and a coefficient of performance (COP) equivalent to that of R410A.

A refrigeration cycle apparatus according to a twenty fifth aspect is the refrigeration cycle apparatus according to any of the first through sixth aspects, wherein
the refrigerant comprises HFO-1132(E), HFO-1123, and R32, wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments IJ, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);
the line segment IJ is represented by coordinates $(0.025z^2-1.7429z+72.0, -0.025z^2+0.7429z+28.0, z)$,
the line segment RG is represented by coordinates $(-0.0491z^2-1.1544z+38.5, 0.0491z^2+0.1544z+61.5, z)$, and
the line segments JR and GI are straight lines.

The refrigeration cycle apparatus can perform a refrigeration cycle using a refrigerant having properties including a sufficiently small GWP, and a coefficient of performance (COP) equivalent to that of R410A.

A refrigeration cycle apparatus according to a twenty sixth aspect is the refrigeration cycle apparatus according to any of the first through sixth aspects, wherein
the refrigerant comprises HFO-1132(E), HFO-1123, and R32, wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4), point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);
the line segment MP is represented by coordinates $(0.0083z^2-0.984z+47.1, -0.0083z^2-0.016z+52.9, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments PB' and GM are straight lines.

The refrigeration cycle apparatus can perform a refrigeration cycle using a refrigerant having properties including a sufficiently small GWP, and a coefficient of performance (COP) equivalent to that of R410A.

A refrigeration cycle apparatus according to a twenty seventh aspect is the refrigeration cycle apparatus according to any of the first through sixth aspects, wherein
the refrigerant comprises HFO-1132(E), HFO-1123, and R32, wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$, and
the line segments JR and GI are straight lines.

The refrigeration cycle apparatus can perform a refrigeration cycle using a refrigerant having properties including a sufficiently small GWP, and a coefficient of performance (COP) equivalent to that of R410A.

A refrigeration cycle apparatus according to a twenty eighth aspect is the refrigeration cycle apparatus according to any of the first through sixth aspects, wherein
the refrigerant comprises HFO-1132(E), HFO-1123, and R32, wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line.

The refrigeration cycle apparatus can perform a refrigeration cycle using a refrigerant having properties including a sufficiently small GWP, and a coefficient of performance (COP) equivalent to that of R410A.

A refrigeration cycle apparatus according to a twenty ninth aspect is the refrigeration cycle apparatus according to any of the first through sixth aspects, wherein
the refrigerant comprises HFO-1132(E), HFO-1123, and R32, wherein
when the mass % of HFO-1132(E), HFO-1123, and R32 based on their sum in the refrigerant is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines.

The refrigeration cycle apparatus can perform a refrigeration cycle using a refrigerant having properties including a sufficiently small GWP, and a coefficient of performance (COP) equivalent to that of R410A.

Figure 1:
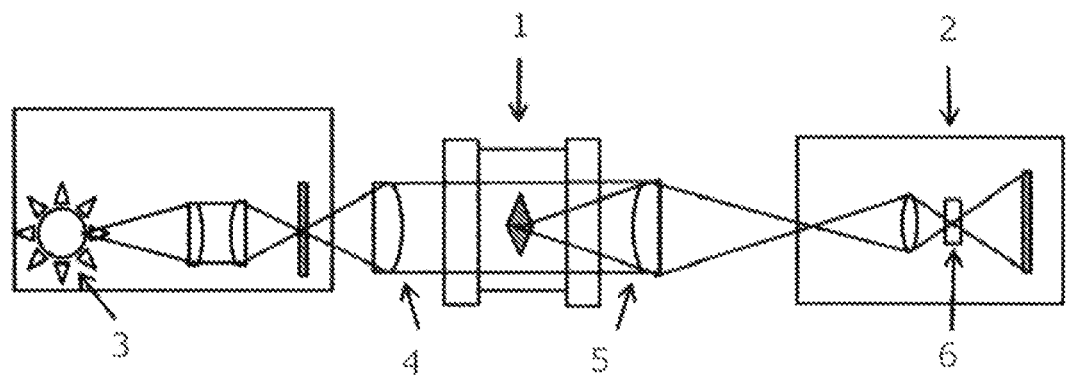
FIG. 1 is a schematic view of an instrument used for a flammability test.
Figure 2:
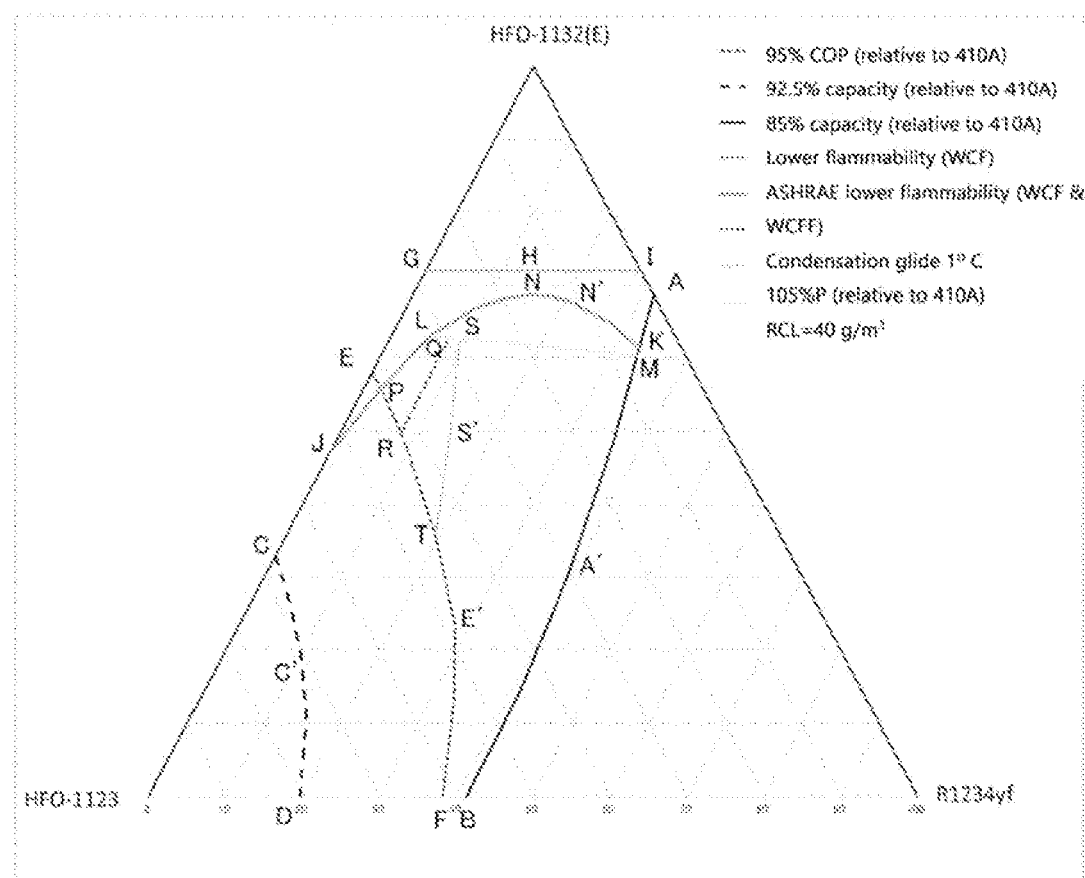
FIG. 2 is a diagram showing points A to T and line segments that connect these points in a ternary composition diagram in which the sum of HFO-1132(E), HFO-1123, and R1234yf is 100 mass %.

DESCRIPTION OF EMBODIMENTS (1) Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013. Further, in the present specification, a refrigerant having "ASHRAE lower flammability" means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to classified as be "Class 2L."

In the present specification, a refrigerant having an "RCL of x % or more" means that the refrigerant has a refrigerant concentration limit (RCL), calculated in accordance with the US ANSI/ASHRAE Standard 34-2013, of x % or more. RCL refers to a concentration limit in the air in consideration of safety factors. RCL is an index for reducing the risk of acute toxicity, suffocation, and flammability in a closed space where humans are present. RCL is determined in accordance with the ASHRAE Standard. More specifically, RCL is the lowest concentration among the acute toxicity exposure limit (ATEL), the oxygen deprivation limit (ODL), and the flammable concentration limit (FCL), which are respectively calculated in accordance with sections 7.1.1, 7.1.2, and 7.1.3 of the ASHRAE Standard.

In the present specification, temperature glide refers to an absolute value of the difference between the initial temperature and the end temperature in the phase change process of a composition containing the refrigerant of the present disclosure in the heat exchanger of a refrigerant system.

(2) Refrigerant (2-1) Refrigerant Component

Any one of various refrigerants such as refrigerant A, refrigerant B, refrigerant C, refrigerant D, and refrigerant E, details of these refrigerant are to be mentioned later, can be used as the refrigerant.

(2-2) Use of Refrigerant

The refrigerant according to the present disclosure can be preferably used as a working fluid in a refrigerating machine.

The composition according to the present disclosure is suitable for use as an alternative refrigerant for HFC refrigerant such as R410A, R407C and R404 etc, or HCFC refrigerant such as R22 etc.

(3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, and more preferably 0 to 0.1 mass %.

(3-1) Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

(3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. Preferably, a compound that cannot be an impurity inevitably mixed in the refrigerant of the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a fluorocarbon, a hydrochlorocarbon, a fluorocarbon, or a fluoroether.

The following compounds are preferable as the tracer.
FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFVC-134 (1,1,2,2-tetrafluoroethane, $CHF_2CHF_2$)
HFC-143a (1,1,1-trifluoroethane, $CF_3CH_3$)
HFC-143 (1,1,2-trifluoroethane, $CHF_2CH_2F$)
HFC-152a (1,1-difluoroethane, $CHF_2CH_3$)
HFVC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2{=}CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The tracer compound may be present in the refrigerant composition at a total concentration of about 10 parts per million (ppm) to about 1000 ppm. Preferably, the tracer compound is present in the refrigerant composition at a total concentration of about 30 ppm to about 500 ppm, and most preferably, the tracer compound is present at a total concentration of about 50 ppm to about 300 ppm.

(3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

(3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

(3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

(4) Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

(4-1) Refrigeration Oil

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil.

The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(5) Various Refrigerants

Hereinafter, the refrigerants A to E, which are the refrigerants used in the present embodiment, will be described in detail.

In addition, each description of the following refrigerant A, refrigerant B, refrigerant C, refrigerant D, and refrigerant E is each independent. The alphabet which shows a point or a line segment, the number of an Examples, and the number of a comparative examples are all independent of each other among the refrigerant A, the refrigerant B, the refrigerant C, the refrigerant D, and the refrigerant E. For example, the first embodiment of the refrigerant A and the first embodiment of the refrigerant B are different embodiment from each other.

(5-1) Refrigerant A The refrigerant A according to the present disclosure is a mixed refrigerant comprising trans-1,2-difluoroethylene (HFO-1132(E)), trifluoroethylene (HFO-1123), and 2,3,3,3-tetrafluoro-1-propene (R1234yf).

The refrigerant A according to the present disclosure has various properties that are desirable as an R410A-alternative refrigerant, i.e., a refrigerating capacity and a coefficient of performance that are equivalent to those of R410A, and a sufficiently low GWP.

The refrigerant A according to the present disclosure is a composition comprising HFO-1132(E) and R1234yf, and optionally further comprising HFO-1123, and may further satisfy the following requirements. This refrigerant also has various properties desirable as an alternative refrigerant for R410A; i.e., it has a refrigerating capacity and a coefficient of performance that are equivalent to those of R410A, and a sufficiently low GWP.

Requirements

Preferable refrigerant A is as follows:

When the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line CO);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$,
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments BD, CO, and OA are straight lines.

When the requirements above are satisfied, the refrigerant according to the present disclosure has a refrigerating capacity ratio of 85% or more relative to that of R410A, and a COP of 92.5% or more relative to that of R410A.

When the mass % of HFO-1132(E), HFO-1123, and R1234yf, based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within a figure surrounded by line segments GI, IA, AA', A'B, BD, DC', C'C, and CG that connect the following 8 points:
point G (72.0, 28.0, 0.0),
point I (72.0, 0.0, 28.0),
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CG);
the line segment AA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$),
the line segment DC' is represented by coordinates (x, $0.0082x^2-0.6671x+80.4$, $-0.0082x^2-0.3329x+19.6$),
the line segment C'C is represented by coordinates (x, $0.0067x^2-0.6034x+79.729$, $-0.0067x^2-0.3966x+20.271$), and
the line segments GI, IA, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant A has a WCF lower flammability according to the ASHRAE Standard (the WCF composition has a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PN, NK, KA', A'B, BD, DC', C'C, and CJ that connect the following 9 points:
point J (47.1, 52.9, 0.0),
point P (55.8, 42.0, 2.2),
point N (68.6, 16.3, 15.1),
point K (61.3, 5.4, 33.3),
point A' (30.6, 30.0, 39.4),
point B (0.0, 58.7, 41.3),
point D (0.0, 80.4, 19.6),
point C' (19.5, 70.5, 10.0), and
point C (32.9, 67.1, 0.0),
or on the above line segments (excluding the points on the line segment CJ);
the line segment PN is represented by coordinates (x, $-0.1135x^2+12.112x-280.43$, $0.1135x^2-13.112x+380.43$),
the line segment NK is represented by coordinates (x, $0.2421x^2-29.955x+931.91$, $-0.2421x^2+28.955x-831.91$),
the line segment KA' is represented by coordinates (x, $0.0016x^2-0.9473x+57.497$, $-0.0016x^2-0.0527x+42.503$),
the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, BD, and CG are straight lines.

When the requirements above are satisfied, the refrigerant A according to the present disclosure has a refrigerating capacity ratio of 85% or more relative to that of R410A, and a COP of 92.5% or more relative to that of R410A; furthermore, the refrigerant exhibits a lower flammability (Class 2L) according to the ASHRAE Standard (the WCF composition and the WCFF composition have a burning velocity of 10 cm/s or less).

When the mass % of HFO-1132(E), HFO-1123, and R1234yf based on their sum in the refrigerant according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments JP, PL, LM, MA', A'B, BD, DC', C'C, and CJ that connect the following 9 points:

point J (47.1, 52.9, 0.0),
point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point D (0.0, 80.4, 19.6),
point C' (19.5, 70.5, 10.0), and
point (32.9, 67.1, 0.0),
or on the above line segments (excluding the points on the line segment CJ);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment DC' is represented by coordinates (x, $0.0082x^2-0.6671x+80.4$, $-0.0082x^2-0.3329x+19.6$), the line segment C'C is represented by coordinates (x, $0.0067x^2-0.6034x+79.729$, $-0.0067x^2-0.3966x+20.271$), and the line segments JP, LM, BD, and CG are straight lines.

When the requirements above are satisfied, the refrigerant according to the present disclosure has a refrigerating capacity ratio of 85% or more relative to that of R410A, and a COP of 92.5% or more relative to that of R410A; furthermore, the refrigerant has an RCL of 40 g/m³ or more.

When the mass % of HFO-1132(E), HFO-1123, and R1234yf based on their sum in the refrigerant A according to the present disclosure is respectively represented by x, y, and z, the refrigerant is preferably a refrigerant wherein coordinates (x,y,z) in a ternary composition diagram in which the sum of HFO-1132(E), HFO-1123, and R1234yf is 100 mass % are within the range of a figure surrounded by line segments PL, LM, MA', A'B, BF, FT, and TP that connect the following 7 points:

point P (55.8, 42.0, 2.2),
point L (63.1, 31.9, 5.0),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3), or on the above line segments (excluding the points on the line segment BF);

the line segment PL is represented by coordinates (x, $-0.1135x^2+12.112x-280.43$, $0.1135x^2-13.112x+380.43$), the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TP is represented by coordinates (x, $0.00672x^2-0.7607x+63.525$, $-0.00672x^2-0.2393x+36.475$), and the line segments LM and BF are straight lines.

When the requirements above are satisfied, the refrigerant according to the present disclosure has a refrigerating capacity ratio of 85% or more relative to that of R410A, and a COP of 95% or more relative to that of R410A; furthermore, the refrigerant has an RCL of 40 g/m³ or more.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments PL, LQ, QR, and RP that connect the following 4 points:

point P (55.8, 42.0, 2.2),
point L (63.1, 31.9, 5.0),
point Q (62.8, 29.6, 7.6), and
point R (49.8, 42.3, 7.9),
or on the above line segments;

the line segment PL is represented by coordinates (x, $-0.1135x^2+12.112x-280.43$, $0.1135x^2-13.112x+380.43$), the line segment RP is represented by coordinates (x, $0.00672x^2-0.7607x+63.525$, $-0.00672x^2-0.2393x+36.475$), and the line segments LQ and QR are straight lines.

When the requirements above are satisfied, the refrigerant according to the present disclosure has a COP of 95% or more relative to that of R410A, and an RCL of 40 g/m³ or more, furthermore, the refrigerant has a condensation temperature glide of 1° C. or less.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments SM, MA', A'B, BF, FT, and TS that connect the following 6 points:

point S (62.6, 28.3, 9.1),
point M (60.3, 6.2, 33.5),
point A' (30.6, 30.0, 39.4),
point B (0.0, 58.7, 41.3),
point F (0.0, 61.8, 38.2), and
point T (35.8, 44.9, 19.3),
or on the above line segments, the line segment MA' is represented by coordinates (x, $0.0016x^2-0.9473x+57.497$, $-0.0016x^2-0.0527x+42.503$), the line segment A'B is represented by coordinates (x, $0.0029x^2-1.0268x+58.7$, $-0.0029x^2+0.0268x+41.3$), the line segment FT is represented by coordinates (x, $0.0078x^2-0.7501x+61.8$, $-0.0078x^2-0.2499x+38.2$), the line segment TS is represented by coordinates (x, $-0.0017x^2-0.7869x+70.888$, $-0.0017x^2-0.2131x+29.112$), and the line segments SM and BF are straight lines.

When the requirements above are satisfied, the refrigerant according to the present disclosure has a refrigerating capacity ratio of 85% or more relative to that of R410A, a COP of 95% or more relative to that of R410A, and an RCL of 40 g/m$^3$ or more furthermore, the refrigerant has a discharge pressure of 105% or more relative to that of R410A.

The refrigerant A according to the present disclosure is preferably a refrigerant wherein when the mass % of HFO-1132(E), HFO-1123, and R1234yf based on their sum in the refrigerant is respectively represented by x, y, and z, coordinates (x,y,z) in a ternary composition diagram in which the sum of HFO-1132(E), HFO-1123, and R1234yf is 100 mass % are within the range of a figure surrounded by line segments Od, dg, gh, and hO that connect the following 4 points:
point d (87.6, 0.0, 12.4),
point g (18.2, 55.1, 26.7),
point h (56.7, 43.3, 0.0), and
point o (100.0, 0.0, 0.0),
or on the line segments Od, dg, gh, and hO (excluding the points O and h);

the line segment dg is represented by coordinates $(0.0047y^2-1.5177y+87.598$, y, $-0.0047y^2+0.5177y+12.402)$, the line segment gh is represented by coordinates $(-0.0134z^2-1.0825z+56.692$, $0.0134z^2+0.0825z+43.308$, z), and the line segments hO and Od are straight lines.

When the requirements above are satisfied, the refrigerant according to the present disclosure has a refrigerating capacity ratio of 92.5% or more relative to that of R410A, and a COP ratio of 92.5% or more relative to that of R410A.

The refrigerant A according to the present disclosure is preferably a refrigerant wherein when the mass % of HFO-1132(E), HFO-1123, and R1234yf, based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments lg, gh, hi, and il that connect the following 4 points:
point l (72.5, 10.2, 17.3),
point g (18.2, 55.1, 26.7),
point h (56.7, 43.3, 0.0), and
point i (72.5, 27.5, 0.0) or on the line segments lg, gh, and il (excluding the points h and i);

the line segment lg is represented by coordinates $(0.0047y^2-1.5177y+87.598$, y, $-0.0047y^2+0.5177y+12.402)$, the line gh is represented by coordinates $(-0.0134z^2-1.0825z+56.692, 0.0134z^2+0.0825z+43.308, z)$, and the line segments hi and il are straight lines.

When the requirements above are satisfied, the refrigerant according to the present disclosure has a refrigerating capacity ratio of 92.5% or more relative to that of R410A, and a COP ratio of 92.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Od, de, ef, and fO that connect the following 4 points:
point d (87.6, 0.0, 12.4),
point e (31.1, 42.9, 26.0),
point f (65.5, 34.5, 0.0), and
point O (100.0, 0.0, 0.0),
or on the line segments Od, de, and ef (excluding the points O and f);

the line segment de is represented by coordinates $(0.0047y^2-1.5177y+87.598$, y, $-0.0047y^2+0.5177y+12.402)$, the line segment ef is represented by coordinates $(-0.0064z^2-1.1565z+65.501$, $0.0064z^2+0.1565z+34.499$, z), and the line segments fO and Od are straight lines.

When the requirements above are satisfied, the refrigerant according to the present disclosure has a refrigerating capacity ratio of 93.5% or more relative to that of R410A, and a COP ratio of 93.5% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments le, ef, fi, and il that connect the following 4 points:
point l (72.5, 10.2, 17.3),
point e (31.1, 42.9, 26.0),
point f (65.5, 34.5, 0.0), and
point i (72.5, 27.5, 0.0),
or on the line segments le, ef, and il (excluding the points f and i);

the line segment le is represented by coordinates $(0.0047y^2-1.5177y+87.598$, y, $-0.0047y^2+0.5177y+12.402)$, the line segment ef is represented by coordinates $(-0.0134z^2-1.0825z+56.692$, $0.0134z^2+0.0825z+43.308$, z), and the line segments fi and il are straight lines.

When the requirements above are satisfied, the refrigerant according to the present disclosure has a refrigerating capacity ratio of 93.5% or more relative to that of R410A, and a COP ratio of 93.5% or more relative to that of R410A; furthermore, the refrigerant has a lower flammability (Class 2L) according to the ASHRAE Standard.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments Oa, ab, bc, and cO that connect the following 4 points:
point a (93.4, 0.0, 6.6),
point b (55.6, 26.6, 17.8),
point c (77.6, 22.4, 0.0), and
point O (100.0, 0.0, 0.0),
or on the line segments Oa, ab, and bc (excluding the points O and c);

the line segment ab is represented by coordinates $(0.0052y^2-1.5588y+93.385, y, -0.0052y^2+0.5588y+6.615)$, the line segment be is represented by coordinates $(-0.0032z^2-1.1791z+77.593, 0.0032z^2+0.1791z+22.407, z)$, and the line segments cO and Oa are straight lines.

When the requirements above are satisfied, the refrigerant according to the present disclosure has a refrigerating capacity ratio of 95% or more relative to that of R410A, and a COP ratio of 95% or more relative to that of R410A.

The refrigerant A according to the present disclosure is preferably a refrigerant wherein when the mass % of HFO-1132(E), HFO-1123, and R1234yf based on their sum is respectively represented by x, y, and z, coordinates (x,y,z) in a ternary composition diagram in which the sum of HFO-1132(E), HFO-1123, and R1234yf is 100 mass % are within the range of a figure surrounded by line segments kb, bj, and jk that connect the following 3 points:

point k (72.5, 14.1, 13.4),
point b (55.6, 26.6, 17.8), and
point j (72.5, 23.2, 4.3),
or on the line segments kb, bj, and jk;

the line segment kb is represented by coordinates $(0.0052y^2-1.5588y+93.385, y, \text{ and } -0.0052y^2+0.5588y+6.615)$, the line segment bj is represented by coordinates $(-0.0032z^2-1.1791z+77.593, 0.0032z^2+0.1791z+22.407, z)$, and the line segment jk is a straight line.

When the requirements above are satisfied, the refrigerant according to the present disclosure has a refrigerating capacity ratio of 95% or more relative to that of R410A, and a COP ratio of 95% or more relative to that of R410A; furthermore, the refrigerant has a lower flammability (Class 2L) according to the ASHRAE Standard.

The refrigerant according to the present disclosure may further comprise other additional refrigerants in addition to HFO-1132(E), HFO-1123, and R1234yf, as long as the above properties and effects are not impaired. In this respect, the refrigerant according to the present disclosure preferably comprises HFO-1132(E), HFO-1123, and R1234yf in a total amount of 99.5 mass % or more, more preferably 99.75 mass % or more, and still more preferably 99.9 mass % or more, based on the entire refrigerant.

The refrigerant according to the present disclosure may comprise HFO-1132(E), HFO-1123, and R1234yf in a total amount of 99.5 mass % or more, 99.75 mass % or more, or 99.9 mass % or more, based on the entire refrigerant.

Additional refrigerants are not particularly limited and can be widely selected.

The mixed refrigerant may contain one additional refrigerant, or two or more additional refrigerants.

(Examples of Refrigerant A)

The present disclosure is described in more detail below with reference to Examples of refrigerant A. However, refrigerant A is not limited to the Examples.

The GWP of R1234yf and a composition consisting of a mixed refrigerant R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of R410A and compositions each comprising a mixture of HFO-1132(E), HFO-1123, and R1234yf was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Further, the RCL of the mixture was calculated with the LFL of HFO-1132(E) being 4.7 vol. %, the LFL of HFO-1123 being 10 vol. %, and the LFL of R1234yf being 6.2 vol. %, in accordance with the ASHRAE Standard 34-2013.

Evaporating temperature: 5° C.
Condensation temperature: 45° C.
Degree of superheating: 5 K
Degree of subcooling: 5 K
Compressor efficiency: 70%

Tables 1 to 34 show these values together with the GWP of each mixed refrigerant.

TABLE 1

| Item | Unit | Comp. Ex. 1 | Comp. Ex. 2 O | Comp. Ex. 3 A | Example 1 | Example 2 A' | Example 3 | Comp. Ex. 4 B |
|---|---|---|---|---|---|---|---|---|
| HFO-1132(E) | mass % | R410A | 100.0 | 68.6 | 49.0 | 30.6 | 14.1 | 0.0 |
| HFO-1123 | mass % | | 0.0 | 0.0 | 14.9 | 30.0 | 44.8 | 58.7 |
| R1234yf | mass % | | 0.0 | 31.4 | 36.1 | 39.4 | 41.1 | 41.3 |
| GWP | — | 2088 | 1 | 2 | 2 | 2 | 2 | 2 |
| COP ratio | % (relative to 410A) | 100 | 99.7 | 100.0 | 98.6 | 97.3 | 96.3 | 95.5 |
| Refrigerating capacity ratio | % (relative to 410A) | 100 | 98.3 | 85.0 | 85.0 | 85.0 | 85.0 | 85.0 |
| Condensation glide | ° C. | | 0.1 | 0.00 | 1.98 | 3.36 | 4.46 | 5.15 | 5.35 |
| Discharge pressure | % (relative to 410A) | 100.0 | 99.3 | 87.1 | 88.9 | 90.6 | 92.1 | 93.2 |
| RCL | g/m$^3$ | — | 30.7 | 37.5 | 44.0 | 52.7 | 64.0 | 78.6 |

TABLE 2

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| HFO-1132(E) | mass % | 32.9 | 26.6 | 19.5 | 10.9 | 0.0 | 58.0 | 23.4 | 0.0 |
| HFO-1123 | mass % | 67.1 | 68.4 | 70.5 | 74.1 | 80.4 | 42.0 | 48.5 | 61.8 |
| R1234yf | mass % | 0.0 | 5.0 | 10.0 | 15.0 | 19.6 | 0.0 | 28.1 | 38.2 |

TABLE 2-continued

| Item | Unit | Comp. Ex. 5 C | Example 4 | Example 5 C' | Example 6 | Comp. Ex. 6 D | Comp. Ex. 7 E | Example 7 E' | Comp. Ex. 8 F |
|---|---|---|---|---|---|---|---|---|---|
| GWP | — | 1 | 1 | 1 | 1 | 2 | 1 | 2 | 2 |
| COP ratio | % (relative to 410A) | 92.5 | 92.5 | 92.5 | 92.5 | 92.5 | 95.0 | 95.0 | 95.0 |
| Refrigerating capacity ratio | % (relative to 410A) | 107.4 | 105.2 | 102.9 | 100.5 | 97.9 | 105.0 | 92.5 | 86.9 |
| Condensation glide | ° C. | 0.16 | 0.52 | 0.94 | 1.42 | 1.90 | 0.42 | 3.16 | 4.80 |
| Discharge pressure | % (relative to 410A) | 119.5 | 117.4 | 115.3 | 113.0 | 115.9 | 112.7 | 101.0 | 95.8 |
| RCL | g/m³ | 53.5 | 57.1 | 62.0 | 69.1 | 81.3 | 41.9 | 46.3 | 79.0 |

TABLE 3

| Item | Unit | Comp. Ex. 9 J | Example 8 P | Example 9 L | Example 10 N | Example 11 N' | Example 12 K |
|---|---|---|---|---|---|---|---|
| HFO-1132(E) | mass % | 47.1 | 55.8 | 63.1 | 68.6 | 65.0 | 61.3 |
| HFO-1123 | mass % | 52.9 | 42.0 | 31.9 | 16.3 | 7.7 | 5.4 |
| R1234yf | mass % | 0.0 | 2.2 | 5.0 | 15.1 | 27.3 | 33.3 |
| GWP | — | 1 | 1 | 1 | 1 | 2 | 2 |
| COP ratio | % (relative to 410A) | 93.8 | 95.0 | 96.1 | 97.9 | 99.1 | 99.5 |
| Refrigerating capacity ratio | % (relative to 410A) | 106.2 | 104.1 | 101.6 | 95.0 | 88.2 | 85.0 |
| Condensation glide | ° C. | 0.31 | 0.57 | 0.81 | 1.41 | 2.11 | 2.51 |
| Discharge pressure | % (relative to 410A) | 115.8 | 111.9 | 107.8 | 99.0 | 91.2 | 87.7 |
| RCL | g/m³ | 46.2 | 42.6 | 40.0 | 38.0 | 38.7 | 39.7 |

TABLE 4

| Item | Unit | Example 13 L | Example 14 M | Example 15 Q | Example 16 R | Example 17 S | Example 18 S' | Example 19 T |
|---|---|---|---|---|---|---|---|---|
| HFO-1132(E) | mass % | 63.1 | 60.3 | 62.8 | 49.8 | 62.6 | 50.0 | 35.8 |
| HFO-1123 | mass % | 31.9 | 6.2 | 29.6 | 42.3 | 28.3 | 35.8 | 44.9 |
| R1234yf | mass % | 5.0 | 33.5 | 7.6 | 7.9 | 9.1 | 14.2 | 19.3 |
| GWP | — | 1 | 2 | 1 | 1 | 1 | 1 | 2 |
| COP ratio | % (relative to 410A) | 96.1 | 99.4 | 96.4 | 95.0 | 96.6 | 95.8 | 95.0 |
| Refrigerating capacity ratio | % (relative to 410A) | 101.6 | 85.0 | 100.2 | 101.7 | 99.4 | 98.1 | 96.7 |
| Condensation glide | ° C. | 0.81 | 2.58 | 1.00 | 1.00 | 1.10 | 1.55 | 2.07 |
| Discharge pressure | % (relative to 410A) | 107.8 | 87.9 | 106.0 | 109.6 | 105.0 | 105.0 | 105.0 |
| RCL | g/m³ | 40.0 | 40.0 | 40.0 | 44.8 | 40.0 | 44.4 | 50.8 |

TABLE 5

| Item | Unit | Comp. Ex. 10 G | Example 20 H | Example 21 I |
|---|---|---|---|---|
| HFO-1132(E) | mass % | 72.0 | 72.0 | 72.0 |
| HFO-1123 | mass % | 28.0 | 14.0 | 0.0 |
| R1234yf | mass % | 0.0 | 14.0 | 28.0 |
| GWP | — | 1 | 1 | 2 |
| COP ratio | % (relative to 410A) | 96.6 | 98.2 | 99.9 |
| Refrigerating capacity ratio | % (relative to 410A) | 103.1 | 95.1 | 86.6 |
| Condensation glide | ° C. | 0.46 | 1.27 | 1.71 |
| Discharge pressure | % (relative to 410A) | 108.4 | 98.7 | 88.6 |
| RCL | g/m³ | 37.4 | 37.0 | 36.6 |

TABLE 6

| Item | Unit | Comp. Ex. 11 | Comp. Ex. 12 | Example 22 | Example 23 | Example 24 | Example 25 | Example 26 | Comp. Ex. 13 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R1234yf | mass % | 5.0 | 5.0 | 5.0 | 5.0 | 5.0 | 5.0 | 5.0 | 5.0 |
| GWP | — | 1 | 1 | 1 | 1 | 1 | 1 | 1 | 1 |
| COP ratio | % (relative to 410A) | 91.4 | 92.0 | 92.8 | 93.7 | 94.7 | 95.8 | 96.9 | 98.0 |
| Refrigerating capacity ratio | % (relative to 410A) | 105.7 | 105.5 | 105.0 | 104.3 | 103.3 | 102.0 | 100.6 | 99.1 |
| Condensation glide | °C. | 0.40 | 0.46 | 0.55 | 0.66 | 0.75 | 0.80 | 0.79 | 0.67 |
| Discharge pressure | % (relative to 410A) | 120.1 | 118.7 | 116.7 | 114.3 | 111.6 | 108.7 | 105.6 | 102.5 |
| RCL | g/m³ | 71.0 | 61.9 | 54.9 | 49.3 | 44.8 | 41.0 | 37.8 | 35.1 |

TABLE 7

| Item | Unit | Comp. Ex. 14 | Example 27 | Example 28 | Example 29 | Example 30 | Example 31 | Example 32 | Comp. Ex. 15 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 80.0 | 70.0 | 60.0 | 50.0 | 40.0 | 30.0 | 20.0 | 10.0 |
| R1234yf | mass % | 10.0 | 10.0 | 10.0 | 10.0 | 10.0 | 10.0 | 10.0 | 10.0 |
| GWP | — | 1 | 1 | 1 | 1 | 1 | 1 | 1 | 1 |
| COP ratio | % (relative to 410A) | 91.9 | 92.5 | 93.3 | 94.3 | 95.3 | 96.4 | 97.5 | 98.6 |
| Refrigerating capacity ratio | % (relative to 410A) | 103.2 | 102.9 | 102.4 | 101.5 | 100.5 | 99.2 | 97.8 | 96.2 |
| Condensation glide | °C. | 0.87 | 0.94 | 1.03 | 1.12 | 1.18 | 1.18 | 1.09 | 0.88 |
| Discharge pressure | % (relative to 410A) | 116.7 | 115.2 | 113.2 | 110.8 | 108.1 | 105.2 | 102.1 | 99.0 |
| RCL | g/m³ | 70.5 | 61.6 | 54.6 | 49.1 | 44.6 | 40.8 | 37.7 | 35.0 |

TABLE 8

| Item | Unit | Comp. Ex. 16 | Example 33 | Example 34 | Example 35 | Example 36 | Example 37 | Example 38 | Comp. Ex. 17 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 75.0 | 65.0 | 55.0 | 45.0 | 35.0 | 25.0 | 15.0 | 5.0 |
| R1234yf | mass % | 15.0 | 15.0 | 15.0 | 15.0 | 15.0 | 15.0 | 15.0 | 15.0 |
| GWP | — | 1 | 1 | 1 | 1 | 1 | 1 | 1 | 1 |
| COP ratio | % (relative to 410A) | 92.4 | 93.1 | 93.9 | 94.8 | 95.9 | 97.0 | 98.1 | 99.2 |
| Refrigerating capacity ratio | % (relative to 410A) | 100.5 | 100.2 | 99.6 | 98.7 | 97.7 | 96.4 | 94.9 | 93.2 |
| Condensation glide | °C. | 1.41 | 1.49 | 1.56 | 1.62 | 1.63 | 1.55 | 1.37 | 1.05 |
| Discharge pressure | % (relative to 410A) | 113.1 | 111.6 | 109.6 | 107.2 | 104.5 | 101.6 | 98.6 | 95.5 |
| RCL | g/m³ | 70.0 | 61.2 | 54.4 | 48.9 | 44.4 | 40.7 | 37.5 | 34.8 |

TABLE 9

| Item | Unit | Example 39 | Example 40 | Example 41 | Example 42 | Example 43 | Example 44 | Example 45 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 70.0 | 60.0 | 50.0 | 40.0 | 30.0 | 20.0 | 10.0 |
| R1234yf | mass % | 20.0 | 20.0 | 20.0 | 20.0 | 20.0 | 20.0 | 20.0 |
| GWP | — | 2 | 2 | 2 | 2 | 2 | 2 | 2 |
| COP ratio | % (relative to 410A) | 93.0 | 93.7 | 94.5 | 95.5 | 96.5 | 97.6 | 98.7 |
| Refrigerating capacity ratio | % (relative to 410A) | 97.7 | 97.4 | 96.8 | 95.9 | 94.7 | 93.4 | 91.9 |
| Condensation glide | °C. | 2.03 | 2.09 | 2.13 | 2.14 | 2.07 | 1.91 | 1.61 |

TABLE 9-continued

| Item | Unit | Example 39 | Example 40 | Example 41 | Example 42 | Example 43 | Example 44 | Example 45 |
|---|---|---|---|---|---|---|---|---|
| Discharge pressure | % (relative to 410A) | 109.4 | 107.9 | 105.9 | 103.5 | 100.8 | 98.0 | 95.0 |
| RCL | g/m$^3$ | 69.6 | 60.9 | 54.1 | 48.7 | 44.2 | 40.5 | 37.4 |

TABLE 10

| Item | Unit | Example 46 | Example 47 | Example 48 | Example 49 | Example 50 | Example 51 | Example 52 |
|---|---|---|---|---|---|---|---|---|
| HFO-1132(E) | mass % | 10.0 | 20.0 | 30.0 | 40.0 | 50.0 | 60.0 | 70.0 |
| HFO-1123 | mass % | 65.0 | 55.0 | 45.0 | 35.0 | 25.0 | 15.0 | 5.0 |
| R1234yf | mass % | 25.0 | 25.0 | 25.0 | 25.0 | 25.0 | 25.0 | 25.0 |
| GWP | — | 2 | 2 | 2 | 2 | 2 | 2 | 2 |
| COP ratio | % (relative to 410A) | 93.6 | 94.3 | 95.2 | 96.1 | 97.2 | 98.2 | 99.3 |
| Refrigerating capacity ratio | % (relative to 410A) | 94.8 | 94.5 | 93.8 | 92.9 | 91.8 | 90.4 | 88.8 |
| Condensation glide | °C. | 2.71 | 2.74 | 2.73 | 2.66 | 2.50 | 2.22 | 1.78 |
| Discharge pressure | % (relative to 410A) | 105.5 | 104.0 | 102.1 | 99.7 | 97.1 | 94.3 | 91.4 |
| RCL | g/m$^3$ | 69.1 | 60.5 | 53.8 | 48.4 | 44.0 | 40.4 | 37.3 |

TABLE 11

| Item | Unit | Example 53 | Example 54 | Example 55 | Example 56 | Example 57 | Example 58 |
|---|---|---|---|---|---|---|---|
| HFO-1132(E) | mass % | 10.0 | 20.0 | 30.0 | 40.0 | 50.0 | 60.0 |
| HFO-1123 | mass % | 60.0 | 50.0 | 40.0 | 30.0 | 20.0 | 10.0 |
| R1234yf | mass % | 30.0 | 30.0 | 30.0 | 30.0 | 30.0 | 30.0 |
| GWP | — | 2 | 2 | 2 | 2 | 2 | 2 |
| COP ratio | % (relative to 410A) | 94.3 | 95.0 | 95.9 | 96.8 | 97.8 | 98.9 |
| Refrigerating capacity ratio | % (relative to 410A) | 91.9 | 91.5 | 90.8 | 89.9 | 88.7 | 87.3 |
| Condensation glide | °C. | 3.46 | 3.43 | 3.35 | 3.18 | 2.90 | 2.47 |
| Discharge pressure | % (relative to 410A) | 101.6 | 100.1 | 98.2 | 95.9 | 93.3 | 90.6 |
| RCL | g/m$^3$ | 68.7 | 60.2 | 53.5 | 48.2 | 43.9 | 40.2 |

TABLE 12

| Item | Unit | Example 59 | Example 60 | Example 61 | Example 62 | Example 63 | Comp. Ex. 18 |
|---|---|---|---|---|---|---|---|
| HFO-1132(E) | mass % | 10.0 | 20.0 | 30.0 | 40.0 | 50.0 | 60.0 |
| HFO-1123 | mass % | 55.0 | 45.0 | 35.0 | 25.0 | 15.0 | 5.0 |
| R1234yf | mass % | 35.0 | 35.0 | 35.0 | 35.0 | 35.0 | 35.0 |
| GWP | — | 2 | 2 | 2 | 2 | 2 | 2 |
| COP ratio | % (relative to 410A) | 95.0 | 95.8 | 96.6 | 97.5 | 98.5 | 99.6 |
| Refrigerating capacity ratio | % (relative to 410A) | 88.9 | 88.5 | 87.8 | 86.8 | 85.6 | 84.1 |
| Condensation glide | °C. | 4.24 | 4.15 | 3.96 | 3.67 | 3.24 | 2.64 |
| Discharge pressure | % (relative to 410A) | 97.6 | 96.1 | 94.2 | 92.0 | 89.5 | 86.8 |
| RCL | g/m$^3$ | 68.2 | 59.8 | 53.2 | 48.0 | 43.7 | 40.1 |

TABLE 13

| Item | Unit | Example 64 | Example 65 | Comp. Ex. 19 | Comp. Ex. 20 | Comp. Ex. 21 |
|---|---|---|---|---|---|---|
| HFO-1132(E) | mass % | 10.0 | 20.0 | 30.0 | 40.0 | 50.0 |
| HFO-1123 | mass % | 50.0 | 40.0 | 30.0 | 20.0 | 10.0 |

TABLE 13-continued

| Item | Unit | Example 64 | Example 65 | Comp. Ex. 19 | Comp. Ex. 20 | Comp. Ex. 21 |
|---|---|---|---|---|---|---|
| R1234yf | mass % | 40.0 | 40.0 | 40.0 | 40.0 | 40.0 |
| GWP | — | 2 | 2 | 2 | 2 | 2 |
| COP ratio | % (relative to 410A) | 95.9 | 96.6 | 97.4 | 98.3 | 99.2 |
| Refrigerating capacity ratio | % (relative to 410A) | 85.8 | 85.4 | 84.7 | 83.6 | 82.4 |
| Condensation glide | °C. | 5.05 | 4.85 | 4.55 | 4.10 | 3.50 |
| Discharge pressure | % (relative to 410A) | 93.5 | 92.1 | 90.3 | 88.1 | 85.6 |
| RCL | g/m$^3$ | 67.8 | 59.5 | 53.0 | 47.8 | 43.5 |

TABLE 14

| Item | Unit | Example 66 | Example 67 | Example 68 | Example 69 | Example 70 | Example 71 | Example 72 | Example 73 |
|---|---|---|---|---|---|---|---|---|---|
| HFO-1132(E) | mass % | 54.0 | 56.0 | 58.0 | 62.0 | 52.0 | 54.0 | 56.0 | 58.0 |
| HFO-1123 | mass % | 41.0 | 39.0 | 37.0 | 33.0 | 41.0 | 39.0 | 37.0 | 35.0 |
| R1234yf | mass % | 5.0 | 5.0 | 5.0 | 5.0 | 7.0 | 7.0 | 7.0 | 7.0 |
| GWP | — | 1 | 1 | 1 | 1 | 1 | 1 | 1 | 1 |
| COP ratio | % (relative to 410A) | 95.1 | 95.3 | 95.6 | 96.0 | 95.1 | 95.4 | 95.6 | 95.8 |
| Refrigerating capacity ratio | % (relative to 410A) | 102.8 | 102.6 | 102.3 | 101.8 | 101.9 | 101.7 | 101.5 | 101.2 |
| Condensation glide | °C. | 0.78 | 0.79 | 0.80 | 0.81 | 0.93 | 0.94 | 0.95 | 0.95 |
| Discharge pressure | % (relative to 410A) | 110.5 | 109.9 | 109.3 | 108.1 | 109.7 | 109.1 | 108.5 | 107.9 |
| RCL | g/m$^3$ | 43.2 | 42.4 | 41.7 | 40.3 | 43.9 | 43.1 | 42.4 | 41.6 |

TABLE 15

| Item | Unit | Example 74 | Example 75 | Example 76 | Example 77 | Example 78 | Example 79 | Example 80 | Example 81 |
|---|---|---|---|---|---|---|---|---|---|
| HFO-1132(E) | mass % | 60.0 | 62.0 | 61.0 | 58.0 | 60.0 | 62.0 | 52.0 | 54.0 |
| HFO-1123 | mass % | 33.0 | 31.0 | 29.0 | 30.0 | 28.0 | 26.0 | 34.0 | 32.0 |
| R1234yf | mass % | 7.0 | 7.0 | 10.0 | 12.0 | 12.0 | 12.0 | 14.0 | 14.0 |
| GWP | — | 1 | 1 | 1 | 1 | 1 | 1 | 1 | 1 |
| COP ratio | % (relative to 410A) | 96.0 | 96.2 | 96.5 | 96.4 | 96.6 | 96.8 | 96.0 | 96.2 |
| Refrigerating capacity ratio | % (relative to 410A) | 100.9 | 100.7 | 99.1 | 98.4 | 98.1 | 97.8 | 98.0 | 97.7 |
| Condensation glide | °C. | 0.95 | 0.95 | 1.18 | 1.34 | 1.33 | 1.32 | 1.53 | 1.53 |
| Discharge pressure | % (relative to 410A) | 107.3 | 106.7 | 104.9 | 104.4 | 103.8 | 103.2 | 104.7 | 104.1 |
| RCL | g/m$^3$ | 40.9 | 40.3 | 40.5 | 41.5 | 40.8 | 40.1 | 43.6 | 42.9 |

TABLE 16

| Item | Unit | Example 82 | Example 83 | Example 84 | Example 85 | Example 86 | Example 87 | Example 88 | Example 89 |
|---|---|---|---|---|---|---|---|---|---|
| HFO-1132(E) | mass % | 56.0 | 58.0 | 60.0 | 48.0 | 50.0 | 52.0 | 54.0 | 56.0 |
| HFO-1123 | mass % | 30.0 | 28.0 | 26.0 | 36.0 | 34.0 | 32.0 | 30.0 | 28.0 |
| R1234yf | mass % | 14.0 | 14.0 | 14.0 | 16.0 | 16.0 | 16.0 | 16.0 | 16.0 |
| GWP | — | 1 | 1 | 1 | 1 | 1 | 1 | 1 | 1 |
| COP ratio | % (relative to 410A) | 96.4 | 96.6 | 96.9 | 95.8 | 96.0 | 96.2 | 96.4 | 96.7 |
| Refrigerating capacity ratio | % (relative to 410A) | 97.5 | 97.2 | 96.9 | 97.3 | 97.1 | 96.8 | 96.6 | 96.3 |
| Condensation glide | °C. | 1.51 | 1.50 | 1.48 | 1.72 | 1.72 | 1.71 | 1.69 | 1.67 |
| Discharge pressure | % (relative to 410A) | 103.5 | 102.9 | 102.3 | 104.3 | 103.8 | 103.2 | 102.7 | 102.1 |
| RCL | g/m$^3$ | 42.1 | 41.4 | 40.7 | 45.2 | 44.4 | 43.6 | 42.8 | 42.1 |

TABLE 17

| Item | Unit | Example 90 | Example 91 | Example 92 | Example 93 | Example 94 | Example 95 | Example 96 | Example 97 |
|---|---|---|---|---|---|---|---|---|---|
| HFO-1132(E) | mass % | 58.0 | 60.0 | 42.0 | 44.0 | 46.0 | 48.0 | 50.0 | 52.0 |
| HFO-1123 | mass % | 26.0 | 24.0 | 40.0 | 38.0 | 36.0 | 34.0 | 32.0 | 30.0 |
| R1234yf | mass % | 16.0 | 16.0 | 18.0 | 18.0 | 18.0 | 18.0 | 18.0 | 18.0 |
| GWP | — | 1 | 1 | 2 | 2 | 2 | 2 | 2 | 2 |
| COP ratio | % (relative to 410A) | 96.9 | 97.1 | 95.4 | 95.6 | 95.8 | 96.0 | 96.3 | 96.5 |
| Refrigerating capacity ratio | % (relative to 410A) | 96.1 | 95.8 | 96.8 | 96.6 | 96.4 | 96.2 | 95.9 | 95.7 |
| Condensation glide | °C. | 1.65 | 1.63 | 1.93 | 1.92 | 1.92 | 1.91 | 1.89 | 1.88 |
| Discharge pressure | % (relative to 410A) | 101.5 | 100.9 | 104.5 | 103.9 | 103.4 | 102.9 | 102.3 | 101.8 |
| RCL | g/m³ | 41.4 | 40.7 | 47.8 | 46.9 | 46.0 | 45.1 | 44.3 | 43.5 |

TABLE 18

| Item | Unit | Example 98 | Example 99 | Example 100 | Example 101 | Example 102 | Example 103 | Example 104 | Example 105 |
|---|---|---|---|---|---|---|---|---|---|
| HFO-1132(E) | mass % | 54.0 | 56.0 | 58.0 | 60.0 | 36.0 | 38.0 | 42.0 | 44.0 |
| HFO-1123 | mass % | 28.0 | 26.0 | 24.0 | 22.0 | 44.0 | 42.0 | 38.0 | 36.0 |
| R1234yf | mass % | 18.0 | 18.0 | 18.0 | 18.0 | 20.0 | 20.0 | 20.0 | 20.0 |
| GWP | — | 2 | 2 | 2 | 2 | 2 | 2 | 2 | 2 |
| COP ratio | % (relative to 410A) | 96.7 | 96.9 | 97.1 | 97.3 | 95.1 | 95.3 | 95.7 | 95.9 |
| Refrigerating capacity ratio | % (relative to 410A) | 95.4 | 95.2 | 94.9 | 94.6 | 96.3 | 96.1 | 95.7 | 95.4 |
| Condensation glide | °C. | 1.86 | 1.83 | 1.80 | 1.77 | 2.14 | 2.14 | 2.13 | 2.12 |
| Discharge pressure | % (relative to 410A) | 101.2 | 100.6 | 100.0 | 99.5 | 104.5 | 104.0 | 103.0 | 102.5 |
| RCL | g/m³ | 42.7 | 42.0 | 41.3 | 40.6 | 50.7 | 49.7 | 47.7 | 46.8 |

TABLE 19

| Item | Unit | Example 106 | Example 107 | Example 108 | Example 109 | Example 110 | Example 111 | Example 112 | Example 113 |
|---|---|---|---|---|---|---|---|---|---|
| HFO-1132(E) | mass % | 46.0 | 48.0 | 52.0 | 54.0 | 56.0 | 58.0 | 34.0 | 36.0 |
| HFO-1123 | mass % | 34.0 | 32.0 | 28.0 | 26.0 | 24.0 | 22.0 | 44.0 | 42.0 |
| R1234yf | mass % | 20.0 | 20.0 | 20.0 | 20.0 | 20.0 | 20.0 | 22.0 | 22.0 |
| GWP | — | 2 | 2 | 2 | 2 | 2 | 2 | 2 | 2 |
| COP ratio | % (relative to 410A) | 96.1 | 96.3 | 96.7 | 96.9 | 97.2 | 97.4 | 95.1 | 95.3 |
| Refrigerating capacity ratio | % (relative to 410A) | 95.2 | 95.0 | 94.5 | 94.2 | 94.0 | 93.7 | 95.3 | 95.1 |
| Condensation glide | °C. | 2.11 | 2.09 | 2.05 | 2.02 | 1.99 | 1.95 | 2.37 | 2.36 |
| Discharge pressure | % (relative to 410A) | 101.9 | 101.4 | 100.3 | 99.7 | 99.2 | 98.6 | 103.4 | 103.0 |
| RCL | g/m³ | 45.9 | 45.0 | 43.4 | 42.7 | 41.9 | 41.2 | 51.7 | 50.6 |

TABLE 20

| Item | Unit | Example 114 | Example 115 | Example 116 | Example 117 | Example 118 | Example 119 | Example 120 | Example 121 |
|---|---|---|---|---|---|---|---|---|---|
| HFO-1132(E) | mass % | 38.0 | 40.0 | 42.0 | 44.0 | 46.0 | 48.0 | 50.0 | 52.0 |
| HFO-1123 | mass % | 40.0 | 38.0 | 36.0 | 34.0 | 32.0 | 30.0 | 28.0 | 26.0 |
| R1234yf | mass % | 22.0 | 22.0 | 22.0 | 22.0 | 22.0 | 22.0 | 22.0 | 22.0 |
| GWP | — | 2 | 2 | 2 | 2 | 2 | 2 | 2 | 2 |
| COP ratio | % (relative to 410A) | 95.5 | 95.7 | 95.9 | 96.1 | 96.4 | 96.6 | 96.8 | 97.0 |
| Refrigerating capacity ratio | % (relative to 410A) | 94.9 | 94.7 | 94.5 | 94.3 | 94.0 | 93.8 | 93.6 | 93.3 |
| Condensation glide | °C. | 2.36 | 2.35 | 2.33 | 2.32 | 2.30 | 2.27 | 2.25 | 2.21 |

TABLE 20-continued

| Item | Unit | Example 114 | Example 115 | Example 116 | Example 117 | Example 118 | Example 119 | Example 120 | Example 121 |
|---|---|---|---|---|---|---|---|---|---|
| Discharge pressure | % (relative to 410A) | 102.5 | 102.0 | 101.5 | 101.0 | 100.4 | 99.9 | 99.4 | 98.8 |
| RCL | g/m³ | 49.6 | 48.6 | 47.6 | 46.7 | 45.8 | 45.0 | 44.1 | 43.4 |

TABLE 21

| Item | Unit | Example 122 | Example 123 | Example 124 | Example 125 | Example 126 | Example 127 | Example 128 | Example 129 |
|---|---|---|---|---|---|---|---|---|---|
| HFO-1132(E) | mass % | 54.0 | 56.0 | 58.0 | 60.0 | 32.0 | 34.0 | 36.0 | 38.0 |
| HFO-1123 | mass % | 24.0 | 22.0 | 20.0 | 18.0 | 44.0 | 42.0 | 40.0 | 38.0 |
| R1234yf | mass % | 22.0 | 22.0 | 22.0 | 22.0 | 24.0 | 24.0 | 24.0 | 24.0 |
| GWP | — | 2 | 2 | 2 | 2 | 2 | 2 | 2 | 2 |
| COP ratio | % (relative to 410A) | 97.2 | 97.4 | 97.6 | 97.9 | 95.2 | 95.4 | 95.6 | 95.8 |
| Refrigerating capacity ratio | % (relative to 410A) | 93.0 | 92.8 | 92.5 | 92.2 | 94.3 | 94.1 | 93.9 | 93.7 |
| Condensation glide | ° C. | 2.18 | 2.14 | 2.09 | 2.04 | 2.61 | 2.60 | 2.59 | 2.58 |
| Discharge pressure | % (relative to 410A) | 98.2 | 97.7 | 97.1 | 96.5 | 102.4 | 101.9 | 101.5 | 101.0 |
| RCL | g/m³ | 42.6 | 41.9 | 41.2 | 40.5 | 52.7 | 51.6 | 50.5 | 49.5 |

TABLE 22

| Item | Unit | Example 130 | Example 131 | Example 132 | Example 133 | Example 134 | Example 135 | Example 136 | Example 137 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 36.0 | 34.0 | 32.0 | 30.0 | 28.0 | 26.0 | 24.0 | 22.0 |
| R1234yf | mass % | 24.0 | 24.0 | 24.0 | 24.0 | 24.0 | 24.0 | 24.0 | 24.0 |
| GWP | — | 2 | 2 | 2 | 2 | 2 | 2 | 2 | 2 |
| COP ratio | % (relative to 410A) | 96.0 | 96.2 | 96.4 | 96.6 | 96.8 | 97.0 | 97.2 | 97.5 |
| Refrigerating capacity ratio | % (relative to 410A) | 93.5 | 93.3 | 93.1 | 92.8 | 92.6 | 92.4 | 92.1 | 91.8 |
| Condensation glide | ° C. | 2.56 | 2.54 | 2.51 | 2.49 | 2.45 | 2.42 | 2.38 | 2.33 |
| Discharge pressure | % (relative to 410A) | 100.5 | 100.0 | 99.5 | 98.9 | 98.4 | 97.9 | 97.3 | 96.8 |
| RCL | g/m³ | 48.5 | 47.5 | 46.6 | 45.7 | 44.9 | 44.1 | 43.3 | 42.5 |

TABLE 23

| Item | Unit | Example 138 | Example 139 | Example 140 | Example 141 | Example 142 | Example 143 | Example 144 | Example 145 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 20.0 | 18.0 | 16.0 | 44.0 | 42.0 | 40.0 | 38.0 | 36.0 |
| R1234yf | mass % | 24.0 | 24.0 | 24.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 97.7 | 97.9 | 98.1 | 95.3 | 95.5 | 95.7 | 95.9 | 96.1 |
| Refrigerating capacity ratio | % (relative to 410A) | 91.6 | 91.3 | 91.0 | 93.2 | 93.1 | 92.9 | 92.7 | 92.5 |
| Condensation glide | ° C. | 2.28 | 2.22 | 2.16 | 2.86 | 2.85 | 2.83 | 2.81 | 2.79 |
| Discharge pressure | % (relative to 410A) | 96.2 | 95.6 | 95.1 | 101.3 | 100.8 | 100.4 | 99.9 | 99.4 |
| RCL | g/m³ | 41.8 | 41.1 | 40.4 | 53.7 | 52.6 | 51.5 | 50.4 | 49.4 |

TABLE 24

| Item | Unit | Example 146 | Example 147 | Example 148 | Example 149 | Example 150 | Example 151 | Example 152 | Example 153 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 34.0 | 32.0 | 30.0 | 28.0 | 26.0 | 24.0 | 22.0 | 20.0 |

TABLE 24-continued

| Item | Unit | Example 146 | Example 147 | Example 148 | Example 149 | Example 150 | Example 151 | Example 152 | Example 153 |
|---|---|---|---|---|---|---|---|---|---|
| R1234yf | mass % | 26.0 | 26.0 | 26.0 | 26.0 | 26.0 | 26.0 | 26.0 | 26.0 |
| GWP | — | 2 | 2 | 2 | 2 | 2 | 2 | 2 | 2 |
| COP ratio | % (relative to 410A) | 96.3 | 96.5 | 96.7 | 96.9 | 97.1 | 97.3 | 97.5 | 97.7 |
| Refrigerating capacity ratio | % (relative to 410A) | 92.3 | 92.1 | 91.9 | 91.6 | 91.4 | 91.2 | 90.9 | 90.6 |
| Condensation glide | °C. | 2.77 | 2.74 | 2.71 | 2.67 | 2.63 | 2.59 | 2.53 | 2.48 |
| Discharge pressure | % (relative to 410A) | 99.0 | 98.5 | 97.9 | 97.4 | 96.9 | 96.4 | 95.8 | 95.3 |
| RCL | g/m$^3$ | 48.4 | 47.4 | 46.5 | 45.7 | 44.8 | 44.0 | 43.2 | 42.5 |

TABLE 25

| Item | Unit | Example 154 | Example 155 | Example 156 | Example 157 | Example 158 | Example 159 | Example 160 | Example 161 |
|---|---|---|---|---|---|---|---|---|---|
| HFO-1132(E) | mass % | 56.0 | 58.0 | 60.0 | 30.0 | 32.0 | 34.0 | 36.0 | 38.0 |
| HFO-1123 | mass % | 18.0 | 16.0 | 14.0 | 42.0 | 40.0 | 38.0 | 36.0 | 34.0 |
| R1234yf | mass % | 26.0 | 26.0 | 26.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 97.9 | 98.2 | 98.4 | 95.6 | 95.8 | 96.0 | 96.2 | 96.3 |
| Refrigerating capacity ratio | % (relative to 410A) | 90.3 | 90.1 | 89.8 | 92.1 | 91.9 | 91.7 | 91.5 | 91.3 |
| Condensation glide | °C. | 2.42 | 2.35 | 2.27 | 3.10 | 3.09 | 3.06 | 3.04 | 3.01 |
| Discharge pressure | % (relative to 410A) | 94.7 | 94.1 | 93.6 | 99.7 | 99.3 | 98.8 | 98.4 | 97.9 |
| RCL | g/m$^3$ | 41.7 | 41.0 | 40.3 | 53.6 | 52.5 | 51.4 | 50.3 | 49.3 |

TABLE 26

| Item | Unit | Example 162 | Example 163 | Example 164 | Example 165 | Example 166 | Example 167 | Example 168 | Example 169 |
|---|---|---|---|---|---|---|---|---|---|
| HFO-1132(E) | mass % | 40.0 | 42.0 | 44.0 | 46.0 | 48.0 | 50.0 | 52.0 | 54.0 |
| HFO-1123 | mass % | 32.0 | 30.0 | 28.0 | 26.0 | 24.0 | 22.0 | 20.0 | 18.0 |
| R1234yf | mass % | 28.0 | 28.0 | 28.0 | 28.0 | 28.0 | 28.0 | 28.0 | 28.0 |
| GWP | — | 2 | 2 | 2 | 2 | 2 | 2 | 2 | 2 |
| COP ratio | % (relative to 410A) | 96.5 | 96.7 | 96.9 | 97.2 | 97.4 | 97.6 | 97.8 | 98.0 |
| Refrigerating capacity ratio | % (relative to 410A) | 91.1 | 90.9 | 90.7 | 90.4 | 90.2 | 89.9 | 89.7 | 89.4 |
| Condensation glide | °C. | 2.98 | 2.94 | 2.90 | 2.85 | 2.80 | 2.75 | 2.68 | 2.62 |
| Discharge pressure | % (relative to 410A) | 97.4 | 96.9 | 96.4 | 95.9 | 95.4 | 94.9 | 94.3 | 93.8 |
| RCL | g/m$^3$ | 48.3 | 47.4 | 46.4 | 45.6 | 44.7 | 43.9 | 43.1 | 42.4 |

TABLE 27

| Item | Unit | Example 170 | Example 171 | Example 172 | Example 173 | Example 174 | Example 175 | Example 176 | Example 177 |
|---|---|---|---|---|---|---|---|---|---|
| HFO-1132(E) | mass % | 56.0 | 58.0 | 60.0 | 32.0 | 34.0 | 36.0 | 38.0 | 42.0 |
| HFO-1123 | mass % | 16.0 | 14.0 | 12.0 | 38.0 | 36.0 | 34.0 | 32.0 | 28.0 |
| R1234yf | mass % | 28.0 | 28.0 | 28.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 98.2 | 98.4 | 98.6 | 96.1 | 96.2 | 96.4 | 96.6 | 97.0 |
| Refrigerating capacity ratio | % (relative to 410A) | 89.1 | 88.8 | 88.5 | 90.7 | 90.5 | 90.3 | 90.1 | 89.7 |
| Condensation glide | °C. | 2.54 | 2.46 | 2.38 | 3.32 | 3.30 | 3.26 | 3.22 | 3.14 |
| Discharge pressure | % (relative to 410A) | 93.2 | 92.6 | 92.1 | 97.7 | 97.3 | 96.8 | 96.4 | 95.4 |
| RCL | g/m$^3$ | 41.7 | 41.0 | 40.3 | 52.4 | 51.3 | 50.2 | 49.2 | 47.3 |

TABLE 28

| Item | Unit | Example 178 | Example 179 | Example 180 | Example 181 | Example 182 | Example 183 | Example 184 | Example 185 |
|---|---|---|---|---|---|---|---|---|---|
| HFO-1132(E) | mass % | 44.0 | 46.0 | 48.0 | 50.0 | 52.0 | 54.0 | 56.0 | 58.0 |
| HFO-1123 | mass % | 26.0 | 24.0 | 22.0 | 20.0 | 18.0 | 16.0 | 14.0 | 12.0 |
| R1234yf | mass % | 30.0 | 30.0 | 30.0 | 30.0 | 30.0 | 30.0 | 30.0 | 30.0 |
| GWP | — | 2 | 2 | 2 | 2 | 2 | 2 | 2 | 2 |
| COP ratio | % (relative to 410A) | 97.2 | 97.4 | 97.6 | 97.8 | 98.0 | 98.3 | 98.5 | 98.7 |
| Refrigerating capacity ratio | % (relative to 410A) | 89.4 | 89.2 | 89.0 | 88.7 | 88.4 | 88.2 | 87.9 | 87.6 |
| Condensation glide | ° C. | 3.08 | 3.03 | 2.97 | 2.90 | 2.83 | 2.75 | 2.66 | 2.57 |
| Discharge pressure | % (relative to 410A) | 94.9 | 94.4 | 93.9 | 93.3 | 92.8 | 92.3 | 91.7 | 91.1 |
| RCL | g/m$^3$ | 46.4 | 45.5 | 44.7 | 43.9 | 43.1 | 42.3 | 41.6 | 40.9 |

TABLE 29

| Item | Unit | Example 186 | Example 187 | Example 188 | Example 189 | Example 190 | Example 191 | Example 192 | Example 193 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 38.0 | 36.0 | 34.0 | 32.0 | 30.0 | 28.0 | 26.0 | 24.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 96.2 | 96.3 | 96.5 | 96.7 | 96.9 | 97.1 | 97.3 | 97.5 |
| Refrigerating capacity ratio | % (relative to 410A) | 89.6 | 89.5 | 89.3 | 89.1 | 88.9 | 88.7 | 88.4 | 88.2 |
| Condensation glide | ° C. | 3.60 | 3.56 | 3.52 | 3.48 | 3.43 | 3.38 | 3.33 | 3.26 |
| Discharge pressure | % (relative to 410A) | 96.6 | 96.2 | 95.7 | 95.3 | 94.8 | 94.3 | 93.9 | 93.4 |
| RCL | g/m$^3$ | 53.4 | 52.3 | 51.2 | 50.1 | 49.1 | 48.1 | 47.2 | 46.3 |

TABLE 30

| Item | Unit | Example 194 | Example 195 | Example 196 | Example 197 | Example 198 | Example 199 | Example 200 | Example 201 |
|---|---|---|---|---|---|---|---|---|---|
| HFO-1132(E) | mass % | 46.0 | 48.0 | 50.0 | 52.0 | 54.0 | 56.0 | 58.0 | 60.0 |
| HFO-1123 | mass % | 22.0 | 20.0 | 18.0 | 16.0 | 14.0 | 12.0 | 10.0 | 8.0 |
| R1234yf | mass % | 32.0 | 32.0 | 32.0 | 32.0 | 32.0 | 32.0 | 32.0 | 32.0 |
| GWP | — | 2 | 2 | 2 | 2 | 2 | 2 | 2 | 2 |
| COP ratio | % (relative to 410A) | 97.7 | 97.9 | 98.1 | 98.3 | 98.5 | 98.7 | 98.9 | 99.2 |
| Refrigerating capacity ratio | % (relative to 410A) | 88.0 | 87.7 | 87.5 | 87.2 | 86.9 | 86.6 | 86.3 | 86.0 |
| Condensation glide | ° C. | 3.20 | 3.12 | 3.04 | 2.96 | 2.87 | 2.77 | 2.66 | 2.55 |
| Discharge pressure | % (relative to 410A) | 92.8 | 92.3 | 91.8 | 91.3 | 90.7 | 90.2 | 89.6 | 89.1 |
| RCL | g/m$^3$ | 45.4 | 44.6 | 43.8 | 43.0 | 42.3 | 41.5 | 40.8 | 40.2 |

TABLE 31

| Item | Unit | Example 202 | Example 203 | Example 204 | Example 205 | Example 206 | Example 207 | Example 208 | Example 209 |
|---|---|---|---|---|---|---|---|---|---|
| HFO-1132(E) | mass % | 30.0 | 32.0 | 34.0 | 36.0 | 38.0 | 40.0 | 42.0 | 44.0 |
| HFO-1123 | mass % | 36.0 | 34.0 | 32.0 | 30.0 | 28.0 | 26.0 | 24.0 | 22.0 |
| R1234yf | mass % | 34.0 | 34.0 | 34.0 | 34.0 | 34.0 | 34.0 | 34.0 | 34.0 |
| GWP | — | 2 | 2 | 2 | 2 | 2 | 2 | 2 | 2 |
| COP ratio | % (relative to 410A) | 96.5 | 96.6 | 96.8 | 97.0 | 97.2 | 97.4 | 97.6 | 97.8 |
| Refrigerating capacity ratio | % (relative to 410A) | 88.4 | 88.2 | 88.0 | 87.8 | 87.6 | 87.4 | 87.2 | 87.0 |
| Condensation glide | ° C. | 3.84 | 3.80 | 3.75 | 3.70 | 3.64 | 3.58 | 3.51 | 3.43 |

TABLE 31-continued

| Item | Unit | Example 202 | Example 203 | Example 204 | Example 205 | Example 206 | Example 207 | Example 208 | Example 209 |
|---|---|---|---|---|---|---|---|---|---|
| Discharge pressure | % (relative to 410A) | 95.0 | 94.6 | 94.2 | 93.7 | 93.3 | 92.8 | 92.3 | 91.8 |
| RCL | g/m$^3$ | 53.3 | 52.2 | 51.1 | 50.0 | 49.0 | 48.0 | 47.1 | 46.2 |

TABLE 32

| Item | Unit | Example 210 | Example 211 | Example 212 | Example 213 | Example 214 | Example 215 | Example 216 | Example 217 |
|---|---|---|---|---|---|---|---|---|---|
| HFO-1132(E) | mass % | 46.0 | 48.0 | 50.0 | 52.0 | 54.0 | 30.0 | 32.0 | 34.0 |
| HFO-1123 | mass % | 20.0 | 18.0 | 16.0 | 14.0 | 12.0 | 34.0 | 32.0 | 30.0 |
| R1234yf | mass % | 34.0 | 34.0 | 34.0 | 34.0 | 34.0 | 36.0 | 36.0 | 36.0 |
| GWP | — | 2 | 2 | 2 | 2 | 2 | 2 | 2 | 2 |
| COP ratio | % (relative to 410A) | 98.0 | 98.2 | 98.4 | 98.6 | 98.8 | 96.8 | 96.9 | 97.1 |
| Refrigerating capacity ratio | % (relative to 410A) | 86.7 | 86.5 | 86.2 | 85.9 | 85.6 | 87.2 | 87.0 | 86.8 |
| Condensation glide | ° C. | 3.36 | 3.27 | 3.18 | 3.08 | 2.97 | 4.08 | 4.03 | 3.97 |
| Discharge pressure | % (relative to 410A) | 91.3 | 90.8 | 90.3 | 89.7 | 89.2 | 93.4 | 93.0 | 92.6 |
| RCL | g/m$^3$ | 45.3 | 44.5 | 43.7 | 42.9 | 42.2 | 53.2 | 52.1 | 51.0 |

TABLE 33

| Item | Unit | Example 218 | Example 219 | Example 220 | Example 221 | Example 222 | Example 223 | Example 224 | Example 225 |
|---|---|---|---|---|---|---|---|---|---|
| HFO-1132(E) | mass % | 36.0 | 38.0 | 40.0 | 42.0 | 44.0 | 46.0 | 30.0 | 32.0 |
| HFO-1123 | mass % | 28.0 | 26.0 | 24.0 | 22.0 | 20.0 | 18.0 | 32.0 | 30.0 |
| R1234yf | mass % | 36.0 | 36.0 | 36.0 | 36.0 | 36.0 | 36.0 | 38.0 | 38.0 |
| GWP | — | 2 | 2 | 2 | 2 | 2 | 2 | 2 | 2 |
| COP ratio | % (relative to 410A) | 97.3 | 97.5 | 97.7 | 97.9 | 98.1 | 98.3 | 97.1 | 97.2 |
| Refrigerating capacity ratio | % (relative to 410A) | 86.6 | 86.4 | 86.2 | 85.9 | 85.7 | 85.5 | 85.9 | 85.7 |
| Condensation glide | ° C. | 3.91 | 3.84 | 3.76 | 3.68 | 3.60 | 3.50 | 4.32 | 4.25 |
| Discharge pressure | % (relative to 410A) | 92.1 | 91.7 | 91.2 | 90.7 | 90.3 | 89.8 | 91.9 | 91.4 |
| RCL | g/m$^3$ | 49.9 | 48.9 | 47.9 | 47.0 | 46.1 | 45.3 | 53.1 | 52.0 |

TABLE 34

| Item | Unit | Example 226 | Example 227 |
|---|---|---|---|
| HFO-1132(E) | mass % | 34.0 | 36.0 |
| HFO-1123 | mass % | 28.0 | 26.0 |
| R1234yf | mass % | 38.0 | 38.0 |
| GWP | — | 2 | 2 |
| COP ratio | % (relative to 410A) | 97.4 | 97.6 |
| Refrigerating capacity ratio | % (relative to 410A) | 85.6 | 85.3 |
| Condensation glide | ° C. | 4.18 | 4.11 |
| Discharge pressure | % (relative to 410A) | 91.0 | 90.6 |
| RCL | g/m$^3$ | 50.9 | 49.8 |

These results indicate that under the condition that the mass % of HFO-1132(E), HFO-1123, and R1234yf based on their sum is respectively represented by x, y, and z, when coordinates (x,y,z) in a ternary composition diagram in which the sum of HFO-1132(E), HFO-1123, and R1234yf is 100 mass % are within the range of a figure surrounded by line segments AA', A'B, BD, DC', C'C, CO, and OA that connect the following 7 points:
point A (68.6, 0.0, 31.4),
point A' (30.6, 30.0, 39.4),
point B (0.0, 58.7, 41.3),
point D (0.0, 80.4, 19.6),
point C' (19.5, 70.5, 10.0),
point C (32.9, 67.1, 0.0), and
point O (100.0, 0.0, 0.0),
or on the above line segments (excluding the points on the line segment CO);
the line segment AA' is represented by coordinates (x, 0.0016x$^2$−0.9473x+57.497, −0.0016x$^2$ 0.0527x+42.503),
the line segment A'B is represented by coordinates (x, 0.0029x$^2$−1.0268x+58.7, −0.0029x$^2$+0.0268x+41.3,
the line segment DC' is represented by coordinates (x, 0.0082x$^2$−0.6671x+80.4, −0.0082x$^2$−0.3329x+19.6),
the line segment C'C is represented by coordinates (x, 0.0067x$^2$−0.6034x+79.729, −0.0067x$^2$−0.3966x+20.271), and
the line segments BD, CO, and OA are straight lines, the refrigerant has a refrigerating capacity ratio of 85% or more relative to that of R410A, and a COP of 92.5% or more relative to that of R410A.

The point on the line segment AA' was determined by obtaining an approximate curve connecting point A, Example 1, and point A' by the least square method.

The point on the line segment A'B was determined by obtaining an approximate curve connecting point A', Example 3, and point B by the least square method.

The point on the line segment DC' was determined by obtaining an approximate curve connecting point D, Example 6, and point C' by the least square method.

The point on the line segment C'C was determined by obtaining an approximate curve connecting point C', Example 4, and point C by the least square method.

Likewise, the results indicate that when coordinates (x,y,z) are within the range of a figure surrounded by line segments AA', A'B, BF, FT, TE, EO, and OA that connect the following 7 points:
point A (68.6, 0.0, 31.4),
point A' (30.6, 30.0, 39.4),
point B (0.0, 58.7, 41.3),
point F (0.0, 61.8, 38.2),
point T (35.8, 44.9, 19.3),
point E (58.0, 42.0, 0.0) and
point O (100.0, 0.0, 0.0),
or on the above line segments (excluding the points on the line EO);
the line segment AA' is represented by coordinates (x, $0.0016x^2-0.9473x+57.497$, $-0.0016x^2\ 0.0527x+42.503$),
the line segment A'B is represented by coordinates (x, $0.0029x^2-1.0268x+58.7$, $-0.0029x^2+0.0268x+41.3$),
the line segment FT is represented by coordinates (x, $0.0078x^2-0.7501x+61.8$, $-0.0078x^2-0.2499x+38.2$), and
the line segment TE is represented by coordinates (x, $0.0067x^2-0.7607x+63.525$, $-0.0067x^2\ 0.2393x+36.475$), and
the line segments BF, FO, and OA are straight lines, the refrigerant has a refrigerating capacity ratio of 85% or more relative to that of R410A, and a COP of 95% or more relative to that of R410A.

The point on the line segment FT was determined by obtaining an approximate curve connecting three points, i.e., points T, E', and F, by the least square method.

The point on the line segment TE was determined by obtaining an approximate curve connecting three points, i.e., points E, R, and T, by the least square method.

The results in Tables 1 to 34 clearly indicate that in a ternary composition diagram of the mixed refrigerant of HFO-1132(E), HFO-1123, and R1234yf in which the sum of these components is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below the line segment LM connecting point L (63.1, 31.9, 5.0) and point M (60.3, 6.2, 33.5), the refrigerant has an RCL of 40 g/m³ or more.

The results in Tables 1 to 34 clearly indicate that in a ternary composition diagram of the mixed refrigerant of HFO-1132(E), HFO-1123 and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment QR connecting point Q (62.8, 29.6, 7.6) and point R (49.8, 42.3, 7.9) or on the left side of the line segment, the refrigerant has a temperature glide of 1° C. or less.

The results in Tables 1 to 34 clearly indicate that in a ternary composition diagram of the mixed refrigerant of HFO-1132(E), HFO-1123, and R1234yf in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on the line segment ST connecting point S (62.6, 28.3, 9.1) and point T (35.8, 44.9, 19.3) or on the right side of the line segment, the refrigerant has a discharge pressure of 105% or less relative to that of 410A.

In these compositions, R1234yf contributes to reducing flammability, and suppressing deterioration of polymerization etc. Therefore, the composition preferably contains R1234yf.

Further, the burning velocity of these mixed refrigerants whose mixed formulations were adjusted to WCF concentrations was measured according to the ANSI/ASHRAE Standard 34-2013. Compositions having a burning velocity of 10 cm/s or less were determined to be classified as "Class 2L (lower flammability)." A burning velocity test was performed using the apparatus shown in FIG. 1 in the following manner. In FIG. 1, reference numeral 901 refers to a sample cell, 902 refers to a high-speed camera, 903 refers to a xenon lamp, 904 refers to a collimating lens, 905 refers to a collimating lens, and 906 refers to a ring filter. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Each WCFF concentration was obtained by using the WCF concentration as the initial concentration and performing a leak simulation using NIST Standard Reference Database REFLEAK Version 4.0.

Tables 35 and 36 show the results.

TABLE 35

| Item | | Unit | G | H | I |
|---|---|---|---|---|---|
| WCF | HFO-1132(E) | mass % | 72.0 | 72.0 | 72.0 |
| | HFO-1123 | mass % | 28.0 | 9.6 | 0.0 |
| | R1234yf | mass % | 0.0 | 18.4 | 28.0 |
| Burning velocity (WCF) | | cm/s | 10 | 10 | 10 |

TABLE 36

| Item | | Unit | J | P | L | N | N' | K |
|---|---|---|---|---|---|---|---|---|
| WCF | HFO-1132(E) | mass % | 47.1 | 55.8 | 63.1 | 68.6 | 65.0 | 61.3 |

TABLE 36-continued

| Item | | Unit | J | P | L | N | N' | K |
|---|---|---|---|---|---|---|---|---|
| | HFO-1123 | mass % | 52.9 | 42.0 | 31.9 | 16.3 | 7.7 | 5.4 |
| | R1234yf | mass % | 0.0 | 2.2 | 5.0 | 15.1 | 27.3 | 33.3 |
| Leak condition that results in WCFF | | | Storage/Shipping −40° C., 92% release, liquid phase side | Storage/Shipping −40° C., 90% release, liquid phase side | Storage/Shipping −40° C., 90% release, gas phase side | Storage/Shipping −40° C., 66% release, gas phase side | Storage/Shipping −40° C., 12% release, gas phase side | Storage/Shipping, −40° C., 0% release, gas phase side |
| WCFF | HFO-1132(E) | mass % | 72.0 | 72.0 | 72.0 | 72.0 | 72.0 | 72.0 |
| | HFO-1123 | mass % | 28.0 | 17.8 | 17.4 | 13.6 | 12.3 | 9.8 |
| | R1234yf | mass % | 0.0 | 10.2 | 10.6 | 14.4 | 15.7 | 18.2 |
| Burning velocity (WCF) | | cm/s | 8 or less | 8 or less | 8 or less | 9 | 9 | 8 or less |
| Burning velocity (WCFF) | | cm/s | 10 | 10 | 10 | 10 | 10 | 10 |

The results in Table 35 clearly indicate that when a mixed refrigerant of HFO-1132(E), HFO-1123, and R1234yf contains HFO-1132(E) in a proportion of 72.0 mass % or less based on their sum, the refrigerant can be determined to have a WCF lower flammability.

The results in Tables 36 clearly indicate that in a ternary composition diagram of a mixed refrigerant of HFO-1132(E), HFO-1123, and R1234yf in which their sum is 100 mass %, and a line segment connecting a point (0.0, 100.0, 0.0) and a point (0.0, 0.0, 100.0) is the base, when coordinates (x,y,z) are on or below the line segments JP, PN, and NK connecting the following 6 points:
point J (47.1, 52.9, 0.0),
point P (55.8, 42.0, 2.2),
point L (63.1,31.9,5.0)
point N (68.6, 16.3, 15.1)
point N' (65.0, 7.7, 27.3) and
point K (61.3, 5.4, 33.3),
the refrigerant can be determined to have a WCF lower flammability, and a WCFF lower flammability.

In the diagram, the line segment PN is represented by coordinates (x, $-0.1135x^2+12.112x-280.43$, $0.1135x^2-13.112x+380.43$), and the line segment NK is represented by coordinates (x, $0.2421x^2-29.955x+931.91$, $-0.2421x^2+28.955x-831.91$).

The point on the line segment PN was determined by obtaining an approximate curve connecting three points, i.e., points P, L, and N, by the least square method.

The point on the line segment NK was determined by obtaining an approximate curve connecting three points, i.e., points N, N', and K, by the least square method.

(5-2) Refrigerant B

The refrigerant B according to the present disclosure is a mixed refrigerant comprising trans-1,2-difluoroethylene (HFO-1132(E)) and trifluoroethylene (HFO-1123) in a total amount of 99.5 mass % or more based on the entire refrigerant, and the refrigerant comprising 62.0 mass % to 72.0 mass % or 45.1 mass % to 47.1 mass % of HFO-1132(E) based on the entire refrigerant, or a mixed refrigerant comprising HFO-1132(E) and HFO-1123 in a total amount of 99.5 mass % or more based on the entire refrigerant, and the refrigerant comprising 45.1 mass % to 47.1 mass % of HFO-1132(E) based on the entire refrigerant.

The refrigerant B according to the present disclosure has various properties that are desirable as an R410A-alternative refrigerant, i.e., (1) a coefficient of performance equivalent to that of R410A, (2) a refrigerating capacity equivalent to that of R410A, (3) a sufficiently low GWP, and (4) a lower flammability (Class 2L) according to the ASHRAE standard.

When the refrigerant B according to the present disclosure is a mixed refrigerant comprising 72.0 mass % or less of HFO-1132(E), it has WCF lower flammability. When the refrigerant B according to the present disclosure is a composition comprising 47.1% or less of HFO-1132(E), it has WCF lower flammability and WCFF lower flammability, and is determined to be "Class 2L," which is a lower flammable refrigerant according to the ASHRAE standard, and which is further easier to handle.

When the refrigerant B according to the present disclosure comprises 62.0 mass % or more of HFO-1132(E), it becomes superior with a coefficient of performance of 95% or more relative to that of R410A, the polymerization reaction of HFO-1132(E) and/or HFO-1123 is further suppressed, and the stability is further improved. When the refrigerant B according to the present disclosure comprises 45.1 mass % or more of HFO-1132(E), it becomes superior with a coefficient of performance of 93% or more relative to that of R410A, the polymerization reaction of HFO-1132(E) and/or HFO-1123 is further suppressed, and the stability is further improved.

The refrigerant B according to the present disclosure may further comprise other additional refrigerants in addition to HFO-1132(E) and HFO-1123, as long as the above properties and effects are not impaired. In this respect, the refrigerant according to the present disclosure preferably comprises HFO-1132(E) and HFO-1123 in a total amount of 99.75 mass % or more, and more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant B)

The present disclosure is described in more detail below with reference to Examples of refrigerant B. However, the refrigerant B is not limited to the Examples.

Mixed refrigerants were prepared by mixing HFO-1132 (E) and HFO-1123 at mass % based on their sum shown in Tables 37 and 38.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.
Evaporating temperature: 5° C.
Condensation temperature: 45° C.
Superheating temperature: 5 K
Subcooling temperature: 5 K
Compressor efficiency: 70%

The composition of each mixture was defined as WCF. A leak simulation was performed using NIST Standard Reference Data Base Refleak Version 4.0 under the conditions of Equipment, Storage, Shipping, Leak, and Recharge according to the ASHRAE Standard 34-2013. The most flammable fraction was defined as WCFF.

Tables 1 and 2 show GWP, COP, and refrigerating capacity, which were calculated based on these results. The COP and refrigerating capacity are ratios relative to R410A.

The coefficient of performance (COP) was determined by the following formula.

COP=(refrigerating capacity or heating capacity)/ power consumption

For the flammability, the burning velocity was measured according to the ANSI/ASHRAE Standard 34-2013. Both WCF and WCFF having a burning velocity of 10 cm/s or less were determined to be "Class 2L (lower flammability)." A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

TABLE 37

| Item | Unit | Comparative Example 1 R410A | Comparative Example 2 HFO-1132E | Comparative Example 3 | Example 1 | Example 2 | Example 3 | Example 4 | Example 5 | Comparative Example 4 |
|---|---|---|---|---|---|---|---|---|---|---|
| HFO-1132E (WCF) | mass % | — | 100 | 80 | 72 | 70 | 68 | 65 | 62 | 60 |
| HFO-1123 (WCF) | mass % | | 0 | 20 | 28 | 30 | 32 | 35 | 38 | 40 |
| GWP | — | 2088 | 1 | 1 | 1 | 1 | 1 | 1 | 1 | 1 |
| COP ratio | % (relative to R410A) | 100 | 99.7 | 97.5 | 96.6 | 96.3 | 96.1 | 95.8 | 95.4 | 95.2 |
| Refrigerating capacity ratio | % (relative to R410A) | 100 | 98.3 | 101.9 | 103.1 | 103.4 | 103.8 | 104.1 | 104.5 | 104.8 |
| Discharge pressure | Mpa | 2.73 | 2.71 | 2.89 | 2.96 | 2.98 | 3.00 | 3.02 | 3.04 | 3.06 |
| Burning velocity (WCF) | cm/sec | Non-flammable | 20 | 13 | 10 | 9 | 9 | 8 | 8 or less | 8 or less |

TABLE 38

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| HFO-1132E (WCF) | mass % | 50 | 48 | 47.1 | 46.1 | 45.1 | 43 | 40 | 25 | 0 |
| HFO-1123 (WCF) | mass % | 50 | 52 | 52.9 | 53.9 | 54.9 | 57 | 60 | 75 | 100 |
| GWP | — | 1 | 1 | 1 | 1 | 1 | 1 | 1 | 1 | 1 |
| COP ratio | % (relative to R410A) | 94.1 | 93.9 | 93.8 | 93.7 | 93.6 | 93.4 | 93.1 | 91.9 | 90.6 |
| Refrigerating capacity ratio | % (relative to R410A) | 105.9 | 106.1 | 106.2 | 106.3 | 106.4 | 106.6 | 106.9 | 107.9 | 108.0 |

TABLE 38-continued

| Item | Unit | Comparative Example 5 | Comparative Example 6 | Example 7 | Example 8 | Example 9 | Comparative Example 7 | Comparative Example 8 | Comparative Example 9 | Comparative Example 10 HFO-1123 |
|---|---|---|---|---|---|---|---|---|---|---|
| Discharge pressure | Mpa | 3.14 | 3.16 | 3.16 | 3.17 | 3.18 | 3.20 | 3.21 | 3.31 | 3.39 |
| Leakage test conditions (WCFF) | | Storage/ Shipping −40° C., 92% release, liquid phase side | Storage/ Shipping −40° C., 92% release, liquid phase side | Storage/ Shipping 40° C., 92% release, liquid phase side | Storage/ Shipping 40° C., 92% release, liquid phase side | Storage/ Shipping 40° C., 92% release, liquid phase side | Storage/ Shipping −40° C., 92% release, liquid phase side | Storage/ Shipping −40° C., 92% release, liquid phase side | Storage/ Shipping −40° C., 90% release, liquid phase side | — |
| HFO-1132E (WCFF) | mass % | 74 | 73 | 72 | 71 | 70 | 67 | 63 | 38 | — |
| HFO-1123 (WCFF) | mass % | 26 | 27 | 28 | 29 | 30 | 33 | 37 | 62 | |
| Burning velocity (WCF) | cm/sec | 8 or less | 8 or less | 8 or less | 8 or less | 8 or less | 8 or less | 8 or less | 8 or less | 5 |
| Burning velocity (WCFF) | cm/sec | 11 | 10.5 | 10.0 | 9.5 | 9.5 | 8.5 | 8 or less | 8 or less | |
| ASHRAE flammability classification | | 2 | 2 | 2L | 2L | 2L | 2L | 2L | 2L | 2L |

The compositions each comprising 62.0 mass % to 72.0 mass % of HFO-1132(E) based on the entire composition are stable while having a low GWP (GWP=1), and they ensure WCF lower flammability. Further, surprisingly, they can ensure performance equivalent to that of R410A. Moreover, compositions each comprising 45.1 mass % to 47.1 mass % of HFO-1132(E) based on the entire composition are stable while having a low GWP (GWP=1), and they ensure WCFF lower flammability. Further, surprisingly, they can ensure performance equivalent to that of R410A.

(5-3) Refrigerant C

The refrigerant C according to the present disclosure is a composition comprising trans-1,2-difluoroethylene (HFO-1132(E)), trifluoroethylene (HFO-1123), 2,3,3,3-tetrafluoro-1-propene (R1234yf), and difluoromethane (R32), and satisfies the following requirements. The refrigerant C according to the present disclosure has various properties that are desirable as an alternative refrigerant for R410A; i.e. it has a coefficient of performance and a refrigerating capacity that are equivalent to those of R410A, and a sufficiently low GWP.

Requirements

Preferable refrigerant C is as follows:

When the mass % of HFO-1132(E), HFO-1123, R1234yf, and R32 based on their sum is respectively represented by x, y, z, and a, if $0 < a \leq 11.1$, coordinates (x,y,z) in a ternary composition diagram in which the sum of HFO-1132(E), HFO-1123, and R1234yf is (100−a) mass % are within the range of a figure surrounded by straight lines GI, IA, AB, BD', D'C, and CG that connect the following 6 points:

point G $(0.026a^2 - 1.7478a + 72.0, -0.026a^2 + 0.7478a + 28.0, 0.0)$, point I $(0.026a^2 - 1.7478a + 72.0, 0.0, -0.026a^2 + 0.7478a + 28.0)$, point A $(0.0134a^2 - 1.9681a + 68.6, 0.0, -0.0134a^2 + 0.9681a + 31.4)$, point B $(0.0, 0.0144a^2 - 1.6377a + 58.7, -0.0144a^2 + 0.6377a + 41.3)$, point D' $(0.0, 0.0224a^2 + 0.968a + 75.4, -0.0224a^2 - 1.968a + 24.6)$, and point C $(-0.2304a^2 - 0.4062a + 32.9, 0.2304a^2 - 0.5938a + 67.1, 0.0)$, or on the straight lines GI, AB, and D'C (excluding point G, point I, point A, point B, point D', and point C);

if $11.1 < a \leq 18.2$, coordinates (x,y,z) in the ternary composition diagram are within the range of a figure surrounded by straight lines GI, IA, AB, BW, and WG that connect the following 5 points:

point G $(0.02a^2 - 1.6013a + 71.105, -0.02a^2 + 0.6013a + 28.895, 0.0)$, point I $(0.02a^2 - 1.6013a + 71.105, 0.0, -0.02a^2 + 0.6013a + 28.895)$, point A $(0.0112a^2 - 1.9337a + 68.484, 0.0, -0.0112a^2 + 0.9337a + 31.516)$, point B $(0.0, 0.0075a^2 - 1.5156a + 58.199, -0.0075a^2 + 0.5156a + 41.801)$ and point W $(0.0, 100.0 - a, 0.0)$, or on the straight lines GI and AB (excluding point G, point I, point A, point B, and point W);

if $18.2 < a \leq 26.7$, coordinates (x,y,z) in the ternary composition diagram are within the range of a figure surrounded by straight lines GI, IA, AB, BW, and WG that connect the following 5 points:

point G $(0.0135a^2 - 1.4068a + 69.727, -0.0135a^2 + 0.4068a + 30.273, 0.0)$, point I $(0.0135a^2 - 1.4068a + 69.727, 0.0, -0.0135a^2 + 0.4068a + 30.273)$, point A $(0.0107a^2 - 1.9142a + 68.305, 0.0, -0.0107a^2 + 0.9142a + 31.695)$, point B $(0.0, 0.009a^2 - 1.6045a + 59.318, -0.009a^2 + 0.6045a + 40.682)$ and point W $(0.0, 100.0 - a, 0.0)$, or on the straight lines GI and AB (excluding point G, point I, point A, point B, and point W);

if $26.7 < a \leq 36.7$, coordinates (x,y,z) in the ternary composition diagram are within the range of a figure surrounded by straight lines GI, IA, AB, BW, and WG that connect the following 5 points:

point G $(0.0111a^2 - 1.3152a + 68.986, -0.0111a^2 + 0.3152a + 31.014, 0.0)$, point I $(0.0111a^2 - 1.3152a + 68.986, 0.0, -0.0111a^2 + 0.3152a + 31.014)$, point A $(0.0103a^2-1.9225a+68.793, 0.0, -0.0103a^2+0.9225a+31.207)$,
point B $(0.0, 0.0046a^2-1.41a+57.286, -0.0046a^2+0.41a+42.714)$ and
point W $(0.0, 100.0-a, 0.0)$,
or on the straight lines GI and AB (excluding point G, point I, point A, point B, and point W); and if $36.7<a\leq46.7$, coordinates (x,y,z) in the ternary composition diagram are within the range of a figure surrounded by straight lines GI, IA, AB, BW, and WG that connect the following 5 points:
point G $(0.0061a^2-0.9918a+63.902, -0.0061a^2-0.0082a+36.098, 0.0)$,
point I $(0.0061a^2-0.9918a+63.902, 0.0, -0.0061a^2-0.0082a+36.098)$,
point A $(0.0085a^2-1.8102a+67.1, 0.0, -0.0085a^2+0.8102a+32.9)$,
point B $(0.0, 0.0012a^2-1.1659a+52.95, -0.0012a^2+0.1659a+47.05)$ and
point W $(0.0, 100.0-a, 0.0)$,
or on the straight lines GI and AB (excluding point G, point I, point A, point B, and point W). When the refrigerant according to the present disclosure satisfies the above requirements, it has a refrigerating capacity ratio of 85% or more relative to that of R410A, and a COP ratio of 92.5% or more relative to that of R410A, and further ensures a WCF lower flammability.

The refrigerant C according to the present disclosure is preferably a refrigerant wherein
when the mass % of HFO-1132(E), HFO-1123, and R1234yf based on their sum is respectively represented by x, y, and z,
if $0<a\leq11.1$, coordinates (x,y,z) in a ternary composition diagram in which the sum of HFO-1132(E), HFO-1123, and R1234yf is (100-a) mass % are within the range of a figure surrounded by straight lines JK', K'B, BD', D'C, and CJ that connect the following 5 points:
point J $(0.0049a^2-0.9645a+47.1, -0.0049a^2-0.0355a+52.9, 0.0)$,
point K' $(0.0514a^2-2.4353a+61.7, -0.0323a^2+0.4122a+5.9, -0.0191a^2+1.0231a+32.4)$,
point B $(0.0, 0.0144a^2-1.6377a+58.7, -0.0144a^2+0.6377a+41.3)$,
point D' $(0.0, 0.0224a^2+0.968a+75.4, -0.0224a^2-1.968a+24.6)$, and
point C $(-0.2304a^2-0.4062a+32.9, 0.2304a^2-0.5938a+67.1, 0.0)$,
or on the straight lines JK', K'B, and D'C (excluding point J, point B, point D', and point C);

if $11.1<a\leq18.2$, coordinates (x,y,z) in the ternary composition diagram are within the range of a figure surrounded by straight lines JK', K'B, BW, and WJ that connect the following 4 points:
point J $(0.0243a^2-1.4161a+49.725, -0.0243a^2+0.4161a+50.275, 0.0)$,
point K' $(0.0341a^2-2.1977a+61.187, -0.0236a^2+0.34a+5.636, -0.0105a^2+0.8577a+33.177)$,
point B $(0.0, 0.0075a^2-1.5156a+58.199, -0.0075a^2+0.5156a+41.801)$ and
point W $(0.0, 100.0-a, 0.0)$,
or on the straight lines JK' and K'B (excluding point J, point B, and point W);

if $18.2<a\leq26.7$, coordinates (x,y,z) in the ternary composition diagram are within the range of a figure surrounded by straight lines JK', K'B, BW, and WJ that connect the following 4 points:
point J $(0.0246a^2-1.4476a+50.184, -0.0246a^2+0.4476a+49.816, 0.0)$,
point K' $(0.0196a^2-1.7863a+58.515, -0.0079a^2-0.1136a+8.702, -0.0117a^2+0.8999a+32.783)$,
point B $(0.0, 0.009a^2-1.6045a+59.318, -0.009a^2+0.6045a+40.682)$ and
point W $(0.0, 100.0-a, 0.0)$,
or on the straight lines JK' and K'B (excluding point J, point B, and point W);

if $26.7<a\leq36.7$, coordinates (x,y,z) in the ternary composition diagram are within the range of a figure surrounded by straight lines JK', K'A, AB, BW, and WJ that connect the following 5 points:
point J $(0.0183a^2-1.1399a+46.493, -0.0183a^2+0.1399a+53.507, 0.0)$,
point K' $(-0.0051a^2+0.0929a+25.95, 0.0, 0.0051a^2-1.0929a+74.05)$,
point A $(0.0103a^2-1.9225a+68.793, 0.0, -0.0103a^2+0.9225a+31.207)$,
point B $(0.0, 0.0046a^2-1.41a+57.286, -0.0046a^2+0.41a+42.714)$ and
point W $(0.0, 100.0-a, 0.0)$,
or on the straight lines JK', K'A, and AB (excluding point J, point B, and point W); and if $36.7<a\leq46.7$, coordinates (x,y,z) in the ternary composition diagram are within the range of a figure surrounded by straight lines JK', K'A, AB, BW, and WJ that connect the following 5 points:
point J $(-0.0134a^2+1.0956a+7.13, 0.0134a^2-2.0956a+92.87, 0.0)$,
point K' $(-1.892a+29.443, 0.0, 0.892a+70.557)$,
point A $(0.0085a^2-1.8102a+67.1, 0.0, -0.0085a^2+0.8102a+32.9)$,
point B $(0.0, 0.0012a^2-1.1659a+52.95, -0.0012a^2+0.1659a+47.05)$ and
point W $(0.0, 100.0-a, 0.0)$,
or on the straight lines JK', K'A, and AB (excluding point J, point B, and point W). When the refrigerant according to the present disclosure satisfies the above requirements, it has a refrigerating capacity ratio of 85% or more relative to that of R410A, and a COP ratio of 92.5% or more relative to that of R410A. Additionally, the refrigerant has a WCF lower flammability and a WCFF lower flammability, and is classified as "Class 2L," which is a lower flammable refrigerant according to the ASHRAE standard.

When the refrigerant C according to the present disclosure further contains R32 in addition to HFO-1132 (E), HFO-1123, and R1234yf, the refrigerant may be a refrigerant wherein when the mass % of HFO-1132(E), HFO-1123, R1234yf, and R32 based on their sum is respectively represented by x, y, z, and a, if $0<a\leq10.0$, coordinates (x,y,z) in a ternary composition diagram in which the sum of HFO-1132(E), HFO-1123, and R1234yf is (100-a) mass % are within the range of a figure surrounded by straight lines that connect the following 4 points:
point a $(0.02a^2-2.46a+93.4, 0, -0.02a^2+2.46a+6.6)$,
point b' $(-0.008a^2-1.38a+56, 0.018a^2-0.53a+26.3, -0.01a^2+1.91a+17.7)$,
point c $(-0.016a^2+1.02a+77.6, 0.016a^2-1.02a+22.4, 0)$, and
point o $(100.0-a, 0.0, 0.0)$ or on the straight lines oa, ab', and b'c (excluding point o and point c);

if $10.0<a\leq16.5$, coordinates (x,y,z) in the ternary composition diagram are within the range of a figure surrounded by straight lines that connect the following 4 points:
point a $(0.0244a^2-2.5695a+94.056, 0, -0.0244a^2+2.5695a+5.944)$, point b' ($0.1161a^2-1.9959a+59.749$, $0.014a^2-0.3399a+24.8$, $-0.1301a^2+2.3358a+15.451$),
point c ($-0.0161a^2+1.02a+77.6$, $0.0161a^2-1.02a+22.4$, 0), and
point o ($100.0-a$, 0.0, 0.0),
or on the straight lines oa, ab', and b'c (excluding point o and point c); or
if $16.5<a\leq21.8$, coordinates (x,y,z) in the ternary composition diagram are within the range of a figure surrounded by straight lines that connect the following 4 points:
point a ($0.0161a^2-2.3535a+92.742$, 0, $-0.0161a^2+2.3535a+7.258$),
point b' ($-0.0435a^2-0.0435a+50.406$, $0.0304a^2+1.8991a-0.0661$, $0.0739a^2-1.8556a+49.6601$),
point c ($-0.0161a^2+0.9959a+77.851$, $0.0161a^2-0.9959a+22.149$, 0), and
point o ($100.0-a$, 0.0, 0.0),
or on the straight lines oa, ab', and b'c (excluding point o and point c). Note that when point b in the ternary composition diagram is defined as a point where a refrigerating capacity ratio of 95% relative to that of R410A and a COP ratio of 95% relative to that of R410A are both achieved, point b' is the intersection of straight line ab and an approximate line formed by connecting the points where the COP ratio relative to that of R410A is 95%. When the refrigerant according to the present disclosure meets the above requirements, the refrigerant has a refrigerating capacity ratio of 95% or more relative to that of R410A, and a COP ratio of 95% or more relative to that of R410A.

The refrigerant C according to the present disclosure may further comprise other additional refrigerants in addition to HFO-1132(E), HFO-1123, R1234yf, and R32 as long as the above properties and effects are not impaired. In this respect, the refrigerant according to the present disclosure preferably comprises HFO-1132(E), HFO-1123, R1234yf, and R32 in a total amount of 99.5 mass % or more, more preferably 99.75 mass % or more, and still more preferably 99.9 mass % or more, based on the entire refrigerant.

The refrigerant C according to the present disclosure may comprise HFO-1132(E), HFO-1123, R1234yf, and R32 in a total amount of 99.5 mass % or more, 99.75 mass % or more, or 99.9 mass % or more, based on the entire refrigerant.

Additional refrigerants are not particularly limited and can be widely selected.

The mixed refrigerant may contain one additional refrigerant, or two or more additional refrigerants.

(Examples of Refrigerant C)

The present disclosure is described in more detail below with reference to Examples of refrigerant C. However, the refrigerant C is not limited to the Examples.

Mixed refrigerants were prepared by mixing HFO-1132 (E), HFO-1123, R1234yf, and R32 at mass % based on their sum shown in Tables 39 to 96.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

For each of these mixed refrigerants, the COP ratio and the refrigerating capacity ratio relative to those of R410 were obtained. Calculation was conducted under the following conditions.

Evaporating temperature: 5° C.
Condensation temperature: 45° C.
Superheating temperature: 5 K
Subcooling temperature: 5 K
Compressor efficiency: 70%

Tables 39 to 96 show the resulting values together with the GWP of each mixed refrigerant. The COP and refrigerating capacity are ratios relative to R410A.

The coefficient of performance (COP) was determined by the following formula.

$$COP = (\text{refrigerating capacity or heating capacity})/\text{power consumption}$$

TABLE 39

| Item | Unit | Comp. Ex. 1 | Comp. Ex. 2 A | Comp. Ex. 3 B | Comp. Ex. 4 C | Comp. Ex. 5 D' | Comp. Ex. 6 G | Comp. Ex. 7 I | Comp. Ex. 8 J | Ex. 1 K' |
|---|---|---|---|---|---|---|---|---|---|---|
| HFO-1132(E) | Mass % | R410A | 68.6 | 0.0 | 32.9 | 0.0 | 72.0 | 72.0 | 47.1 | 61.7 |
| HFO-1123 | Mass % | | 0.0 | 58.7 | 67.1 | 75.4 | 28.0 | 0.0 | 52.9 | 5.9 |
| R1234yf | Mass % | | 31.4 | 41.3 | 0.0 | 24.6 | 0.0 | 28.0 | 0.0 | 32.4 |
| R32 | Mass % | | 0.0 | 0.0 | 0.0 | 0.0 | 0.0 | 0.0 | 0.0 | 0.0 |
| GWP | — | 2088 | 2 | 2 | 1 | 2 | 1 | 2 | 1 | 2 |
| COP ratio | % (relative to R410A) | 100 | 100.0 | 95.5 | 92.5 | 93.1 | 96.6 | 99.9 | 93.8 | 99.4 |
| Refrigerating capacity ratio | % (relative to R410A) | 100 | 85.0 | 85.0 | 107.4 | 95.0 | 103.1 | 86.6 | 106.2 | 85.5 |

TABLE 40

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| HFO-1132(E) | Mass % | 55.3 | 0.0 | 18.4 | 0.0 | 60.9 | 60.9 | 40.5 | 47.0 |
| HFO-1123 | Mass % | 0.0 | 47.8 | 74.5 | 83.4 | 32.0 | 0.0 | 52.4 | 7.2 |
| R1234yf | Mass % | 37.6 | 45.1 | 0.0 | 9.5 | 0.0 | 32.0 | 0.0 | 38.7 |
| R32 | Mass % | 7.1 | 7.1 | 7.1 | 7.1 | 7.1 | 7.1 | 7.1 | 7.1 |

TABLE 40-continued

| Item | Unit | Comp. Ex. 9 A | Comp. Ex. 10 B | Comp. Ex. 11 C | Comp. Ex. 12 D' | Comp. Ex. 13 G | Comp. Ex. 14 I | Comp. Ex. 15 J | Ex. 2 K' |
|---|---|---|---|---|---|---|---|---|---|
| GWP | — | 50 | 50 | 49 | 49 | 49 | 50 | 49 | 50 |
| COP ratio | % (relative to R410A) | 99.8 | 96.9 | 92.5 | 92.5 | 95.9 | 99.6 | 94.0 | 99.2 |
| Refrigerating capacity ratio | % (relative to R410A) | 85.0 | 85.0 | 110.5 | 106.0 | 106.5 | 87.7 | 108.9 | 85.5 |

TABLE 41

| Item | Unit | Comp. Ex. 16 A | Comp. Ex. 17 B | Comp. Ex. 18 C = D' | Comp. Ex.19 G | Comp. Ex. 20 I | Comp. Ex. 21 J | Ex. 3 K' |
|---|---|---|---|---|---|---|---|---|
| HFO-1132(E) | Mass % | 48.4 | 0.0 | 0.0 | 55.8 | 55.8 | 37.0 | 41.0 |
| HFO-1123 | Mass % | 0.0 | 42.3 | 88.9 | 33.1 | 0.0 | 51.9 | 6.5 |
| R1234yf | Mass % | 40.5 | 46.6 | 0.0 | 0.0 | 33.1 | 0.0 | 41.4 |
| R32 | Mass % | 11.1 | 11.1 | 11.1 | 11.1 | 11.1 | 11.1 | 11.1 |
| GWP | — | 77 | 77 | 76 | 76 | 77 | 76 | 77 |
| COP ratio | % (relative to R410A) | 99.8 | 97.6 | 92.5 | 95.8 | 99.5 | 94.2 | 99.3 |
| Refrigerating capacity ratio | % (relative to R410A) | 85.0 | 85.0 | 112.0 | 108.0 | 88.6 | 110.2 | 85.4 |

TABLE 42

| Item | Unit | Comp. Ex. 22 A | Comp. Ex. 23 B | Comp. Ex. 24 G | Comp. Ex. 25 I | Comp. Ex. 26 J | Ex. 4 K' |
|---|---|---|---|---|---|---|---|
| HFO-1132(E) | Mass % | 42.8 | 0.0 | 52.1 | 52.1 | 34.3 | 36.5 |
| HFO-1123 | Mass % | 0.0 | 37.8 | 33.4 | 0.0 | 51.2 | 5.6 |
| R1234yf | Mass % | 42.7 | 47.7 | 0.0 | 33.4 | 0.0 | 43.4 |
| R32 | Mass % | 14.5 | 14.5 | 14.5 | 14.5 | 14.5 | 14.5 |
| GWP | — | 100 | 100 | 99 | 100 | 99 | 100 |
| COP ratio | % (relative to R410A) | 99.9 | 98.1 | 95.8 | 99.5 | 94.4 | 99.5 |
| Refrigerating capacity ratio | % (relative to R410A) | 85.0 | 85.0 | 109.1 | 89.6 | 111.1 | 85.3 |

TABLE 43

| Item | Unit | Comp. Ex. 27 A | Comp. Ex. 28 B | Comp. Ex. 29 G | Comp. Ex. 30 I | Comp. Ex. 31 J | Ex. 5 K' |
|---|---|---|---|---|---|---|---|
| HFO-1132(E) | Mass % | 37.0 | 0.0 | 48.6 | 48.6 | 32.0 | 32.5 |
| HFO-1123 | Mass % | 0.0 | 33.1 | 33.2 | 0.0 | 49.8 | 4.0 |
| R1234yf | Mass % | 44.8 | 48.7 | 0.0 | 33.2 | 0.0 | 45.3 |
| R32 | Mass % | 18.2 | 18.2 | 18.2 | 18.2 | 18.2 | 18.2 |
| GWP | — | 125 | 125 | 124 | 125 | 124 | 125 |
| COP ratio | % (relative to R410A) | 100.0 | 98.6 | 95.9 | 99.4 | 94.7 | 99.8 |
| Refrigerating capacity ratio | % (relative to R410A) | 85.0 | 85.0 | 110.1 | 90.8 | 111.9 | 85.2 |

TABLE 44

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| HFO-1132(E) | Mass % | 31.5 | 0.0 | 45.4 | 45.4 | 30.3 | 28.8 |
| HFO-1123 | Mass % | 0.0 | 28.5 | 32.7 | 0.0 | 47.8 | 2.4 |
| R1234yf | Mass % | 46.6 | 49.6 | 0.0 | 32.7 | 0.0 | 46.9 |
| R32 | Mass % | 21.9 | 21.9 | 21.9 | 21.9 | 21.9 | 21.9 |
| GWP | — | 150 | 150 | 149 | 150 | 149 | 150 |

TABLE 44-continued

| Item | Unit | Comp. Ex. 32 A | Comp. Ex. 33 B | Comp. Ex. 34 G | Comp. Ex. 35 I | Comp. Ex. 36 J | Ex. 6 K' |
|---|---|---|---|---|---|---|---|
| COP ratio | % (relative to R410A) | 100.2 | 99.1 | 96.0 | 99.4 | 95.1 | 100.0 |
| Refrigerating capacity ratio | % (relative to R410A) | 85.0 | 85.0 | 111.0 | 92.1 | 112.6 | 85.1 |

TABLE 45

| Item | Unit | Comp. Ex. 37 A | Comp. Ex. 38 B | Comp. Ex. 39 G | Comp. Ex. 40 I | Comp. Ex. 41 J | Comp. Ex. 42 K' |
|---|---|---|---|---|---|---|---|
| HFO-1132(E) | Mass % | 24.8 | 0.0 | 41.8 | 41.8 | 29.1 | 24.8 |
| HFO-1123 | Mass % | 0.0 | 22.9 | 31.5 | 0.0 | 44.2 | 0.0 |
| R1234yf | Mass % | 48.5 | 50.4 | 0.0 | 31.5 | 0.0 | 48.5 |
| R32 | Mass % | 26.7 | 26.7 | 26.7 | 26.7 | 26.7 | 26.7 |
| GWP | — | 182 | 182 | 181 | 182 | 181 | 182 |
| COP ratio | % (relative to R410A) | 100.4 | 99.8 | 96.3 | 99.4 | 95.6 | 100.4 |
| Refrigerating capacity ratio | % (relative to R410A) | 85.0 | 85.0 | 111.9 | 93.8 | 113.2 | 85.0 |

TABLE 46

| Item | Unit | Comp. Ex. 43 A | Comp. Ex.44 B | Comp. Ex. 45 G | Comp. Ex. 46 I | Comp. Ex. 47 J | Comp. Ex. 48 K' |
|---|---|---|---|---|---|---|---|
| HFO-1132(E) | Mass % | 21.3 | 0.0 | 40.0 | 40.0 | 28.8 | 24.3 |
| HFO-1123 | Mass % | 0.0 | 19.9 | 30.7 | 0.0 | 41.9 | 0.0 |
| R1234yf | Mass % | 49.4 | 50.8 | 0.0 | 30.7 | 0.0 | 46.4 |
| R32 | Mass % | 29.3 | 29.3 | 29.3 | 29.3 | 29.3 | 29.3 |
| GWP | — | 200 | 200 | 198 | 199 | 198 | 200 |
| COP ratio | % (relative to R410A) | 100.6 | 100.1 | 96.6 | 99.5 | 96.1 | 100.4 |
| Refrigerating capacity ratio | % (relative to R410A) | 85.0 | 85.0 | 112.4 | 94.8 | 113.6 | 86.7 |

TABLE 47

| Item | Unit | Comp. Ex. 49 A | Comp. Ex. 50 B | Comp. Ex. 51 G | Comp. Ex. 52 I | Comp. Ex. 53 J | Comp. Ex. 54 K' |
|---|---|---|---|---|---|---|---|
| HFO-1132(E) | Mass % | 12.1 | 0.0 | 35.7 | 35.7 | 29.3 | 22.5 |
| HFO-1123 | Mass % | 0.0 | 11.7 | 27.6 | 0.0 | 34.0 | 0.0 |
| R1234yf | Mass % | 51.2 | 51.6 | 0.0 | 27.6 | 0.0 | 40.8 |
| R32 | Mass % | 36.7 | 36.7 | 36.7 | 36.7 | 36.7 | 36.7 |
| GWP | — | 250 | 250 | 248 | 249 | 248 | 250 |
| COP ratio | % (relative to R410A) | 101.2 | 101.0 | 96.4 | 99.6 | 97.0 | 100.4 |
| Refrigerating capacity ratio | % (relative to R410A) | 85.0 | 85.0 | 113.2 | 97.6 | 113.9 | 90.9 |

TABLE 48

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| HFO-1132(E) | Mass % | 3.8 | 0.0 | 32.0 | 32.0 | 29.4 | 21.1 |
| HFO-1123 | Mass % | 0.0 | 3.9 | 23.9 | 0.0 | 26.5 | 0.0 |
| R1234yf | Mass % | 52.1 | 52.0 | 0.0 | 23.9 | 0.0 | 34.8 |
| R32 | Mass % | 44.1 | 44.1 | 44.1 | 44.1 | 44.1 | 44.1 |
| GWP | — | 300 | 300 | 298 | 299 | 298 | 299 |
| COP ratio | % (relative to R410A) | 101.8 | 101.8 | 97.9 | 99.8 | 97.8 | 100.5 |

TABLE 48-continued

| Item | Unit | Comp. Ex. 55 A | Comp. Ex. 56 B | Comp. Ex. 57 G | Comp. Ex. 58 I | Comp. Ex. 59 J | Comp. Ex. 60 K' |
|---|---|---|---|---|---|---|---|
| Refrigerating capacity ratio | % (relative to R410A) | 85.0 | 85.0 | 113.7 | 100.4 | 113.9 | 94.9 |

TABLE 49

| Item | Unit | Comp. Ex. 61 A = B | Comp. Ex. 62 G | Comp. Ex. 63 I | Comp. Ex. 64 J | Comp. Ex. 65 K' |
|---|---|---|---|---|---|---|
| HFO-1132(E) | Mass % | 0.0 | 30.4 | 30.4 | 28.9 | 20.4 |
| HFO-1123 | Mass % | 0.0 | 21.8 | 0.0 | 23.3 | 0.0 |
| R1234yf | Mass % | 52.2 | 0.0 | 21.8 | 0.0 | 31.8 |
| R32 | Mass % | 47.8 | 47.8 | 47.8 | 47.8 | 47.8 |
| GWP | — | 325 | 323 | 324 | 323 | 324 |
| COP ratio | % (relative to R410A) | 102.1 | 98.2 | 100.0 | 98.2 | 100.6 |
| Refrigerating capacity ratio | % (relative to R410A) | 85.0 | 113.8 | 101.8 | 113.9 | 96.8 |

TABLE 50

| Item | Unit | Comp. Ex. 66 | Ex. 7 | Ex. 8 | Ex. 9 | Ex. 10 | Ex. 11 | Ex. 12 | Ex. 13 |
|---|---|---|---|---|---|---|---|---|---|
| HFO-1132(E) | Mass % | 5.0 | 10.0 | 15.0 | 20.0 | 25.0 | 30.0 | 35.0 | 40.0 |
| HFO-1123 | Mass % | 82.9 | 77.9 | 72.9 | 67.9 | 62.9 | 57.9 | 52.9 | 47.9 |
| R1234yf | Mass % | 5.0 | 5.0 | 5.0 | 5.0 | 5.0 | 5.0 | 5.0 | 5.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 92.4 | 92.6 | 92.8 | 93.1 | 93.4 | 93.7 | 94.1 | 94.5 |
| Refrigerating capacity ratio | % (relative to R410A) | 108.4 | 108.3 | 108.2 | 107.9 | 107.6 | 107.2 | 106.8 | 106.3 |

TABLE 51

| Item | Unit | Ex. 14 | Ex. 15 | Ex. 16 | Ex. 17 | Comp. Ex. 67 | Ex. 18 | Ex. 19 | Ex. 20 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 42.9 | 37.9 | 32.9 | 27.9 | 22.9 | 72.9 | 67.9 | 62.9 |
| R1234yf | Mass % | 5.0 | 5.0 | 5.0 | 5.0 | 5.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.4 | 95.9 | 96.4 | 96.9 | 93.0 | 93.3 | 93.6 |
| Refrigerating capacity ratio | % (relative to R410A) | 105.8 | 105.2 | 104.5 | 103.9 | 103.1 | 105.7 | 105.5 | 105.2 |

TABLE 52

| Item | Unit | Ex. 21 | Ex. 22 | Ex. 23 | Ex. 24 | Ex. 25 | Ex. 26 | Ex. 27 | Ex. 28 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 57.9 | 52.9 | 47.9 | 42.9 | 37.9 | 32.9 | 27.9 | 22.9 |
| R1234yf | Mass % | 10.0 | 10.0 | 10.0 | 10.0 | 10.0 | 10.0 | 10.0 | 10.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 93.9 | 94.2 | 94.6 | 95.0 | 95.5 | 96.0 | 96.4 | 96.9 |
| Refrigerating capacity ratio | % (relative to R410A) | 104.9 | 104.5 | 104.1 | 103.6 | 103.0 | 102.4 | 101.7 | 101.0 |

TABLE 53

| Item | Unit | Comp. Ex. 68 | Ex. 29 | Ex. 30 | Ex. 31 | Ex. 32 | Ex. 33 | Ex. 34 | Ex. 35 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 17.9 | 67.9 | 62.9 | 57.9 | 52.9 | 47.9 | 42.9 | 37.9 |
| R1234yf | Mass % | 10.0 | 15.0 | 15.0 | 15.0 | 15.0 | 15.0 | 15.0 | 15.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 97.4 | 93.5 | 93.8 | 94.1 | 94.4 | 94.8 | 95.2 | 95.6 |
| Refrigerating capacity ratio | % (relative to R410A) | 100.3 | 102.9 | 102.7 | 102.5 | 102.1 | 101.7 | 101.2 | 100.7 |

TABLE 54

| Item | Unit | Ex. 36 | Ex. 37 | Ex. 38 | Ex. 39 | Comp. Ex. 69 | Ex. 40 | Ex. 41 | Ex. 42 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 32.9 | 27.9 | 22.9 | 17.9 | 12.9 | 62.9 | 57.9 | 52.9 |
| R1234yf | Mass % | 15.0 | 15.0 | 15.0 | 15.0 | 15.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 96.0 | 96.5 | 97.0 | 97.5 | 98.0 | 94.0 | 94.3 | 94.6 |
| Refrigerating capacity ratio | % (relative to R410A) | 100.1 | 99.5 | 98.9 | 98.1 | 97.4 | 100.1 | 99.9 | 99.6 |

TABLE 55

| Item | Unit | Ex. 43 | Ex. 44 | Ex. 45 | Ex. 46 | Ex. 47 | Ex. 48 | Ex. 49 | Ex. 50 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 47.9 | 42.9 | 37.9 | 32.9 | 27.9 | 22.9 | 17.9 | 12.9 |
| R1234yf | Mass % | 20.0 | 20.0 | 20.0 | 20.0 | 20.0 | 20.0 | 20.0 | 20.0 |
| R32 | Mass % | 7.1 | 7.1 | 7.1 | 7.1 | 7.1 | 7.1 | 7.1 | 7.1 |
| GWP | — | 49 | 49 | 49 | 49 | 49 | 49 | 49 | 49 |
| COP ratio | % (relative to R410A) | 95.0 | 95.3 | 95.7 | 96.2 | 96.6 | 97.1 | 97.6 | 98.1 |
| Refrigerating capacity ratio | % (relative to R410A) | 99.2 | 98.8 | 98.3 | 97.8 | 97.2 | 96.6 | 95.9 | 95.2 |

TABLE 56

| Item | Unit | Comp. Ex. 70 | Ex. 51 | Ex. 52 | Ex. 53 | Ex. 54 | Ex. 55 | Ex. 56 | Ex. 57 |
|---|---|---|---|---|---|---|---|---|---|
| HFO-1132(E) | Mass % | 65.0 | 10.0 | 15.0 | 20.0 | 25.0 | 30.0 | 35.0 | 40.0 |
| HFO-1123 | Mass % | 7.9 | 57.9 | 52.9 | 47.9 | 42.9 | 37.9 | 32.9 | 27.9 |
| R1234yf | Mass % | 20.0 | 25.0 | 25.0 | 25.0 | 25.0 | 25.0 | 25.0 | 25.0 |
| R32 | Mass % | 7.1 | 7.1 | 7.1 | 7.1 | 7.1 | 7.1 | 7.1 | 7.1 |
| GWP | — | 49 | 50 | 50 | 50 | 50 | 50 | 50 | 50 |
| COP ratio | % (relative to R410A) | 98.6 | 94.6 | 94.9 | 95.2 | 95.5 | 95.9 | 96.3 | 96.8 |
| Refrigerating capacity ratio | % (relative to R410A) | 94.4 | 97.1 | 96.9 | 96.7 | 96.3 | 95.9 | 95.4 | 94.8 |

TABLE 57

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| HFO-1132(E) | Mass % | 45.0 | 50.0 | 55.0 | 60.0 | 65.0 | 10.0 | 15.0 | 20.0 |
| HFO-1123 | Mass % | 7.1 | 7.1 | 7.1 | 7.1 | 7.1 | 7.1 | 7.1 | 7.1 |
| R1234yf | Mass % | 25.0 | 25.0 | 25.0 | 25.0 | 25.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |

TABLE 57-continued

| Item | Unit | Ex. 58 | Ex. 59 | Ex. 60 | Ex. 61 | Comp. Ex. 71 | Ex. 62 | Ex. 63 | Ex. 64 |
|---|---|---|---|---|---|---|---|---|---|
| COP ratio | % (relative to R410A) | 97.2 | 97.7 | 98.2 | 98.7 | 99.2 | 95.2 | 95.5 | 95.8 |
| Refrigerating capacity ratio | % (relative to R410A) | 94.2 | 93.6 | 92.9 | 92.2 | 91.4 | 94.2 | 93.9 | 93.7 |

TABLE 58

| Item | Unit | Ex. 65 | Ex. 66 | Ex. 67 | Ex. 68 | Ex. 69 | Ex. 70 | Ex. 71 | Ex. 72 |
|---|---|---|---|---|---|---|---|---|---|
| HFO-1132(E) | Mass % | 25.0 | 30.0 | 35.0 | 40.0 | 45.0 | 50.0 | 55.0 | 60.0 |
| HFO-1123 | Mass % | 37.9 | 32.9 | 27.9 | 22.9 | 17.9 | 12.9 | 7.9 | 2.9 |
| R1234yf | Mass % | 30.0 | 30.0 | 30.0 | 30.0 | 30.0 | 30.0 | 30.0 | 30.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 96.2 | 96.6 | 97.0 | 97.4 | 97.9 | 98.3 | 98.8 | 99.3 |
| Refrigerating capacity ratio | % (relative to R410A) | 93.3 | 92.9 | 92.4 | 91.8 | 91.2 | 90.5 | 89.8 | 89.1 |

TABLE 59

| Item | Unit | Ex. 73 | Ex. 74 | Ex. 75 | Ex. 76 | Ex. 77 | Ex. 78 | Ex. 79 | Ex. 80 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 47.9 | 42.9 | 37.9 | 32.9 | 27.9 | 22.9 | 17.9 | 12.9 |
| R1234yf | Mass % | 35.0 | 35.0 | 35.0 | 35.0 | 35.0 | 35.0 | 35.0 | 35.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 95.9 | 96.2 | 96.5 | 96.9 | 97.2 | 97.7 | 98.1 | 98.5 |
| Refrigerating capacity ratio | % (relative to R410A) | 91.1 | 90.9 | 90.6 | 90.2 | 89.8 | 89.3 | 88.7 | 88.1 |

TABLE 60

| Item | Unit | Ex. 81 | Ex. 82 | Ex. 83 | Ex. 84 | Ex. 85 | Ex. 86 | Ex. 87 | Ex. 88 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 7.9 | 2.9 | 42.9 | 37.9 | 32.9 | 27.9 | 22.9 | 17.9 |
| R1234yf | Mass % | 35.0 | 35.0 | 40.0 | 40.0 | 40.0 | 40.0 | 40.0 | 40.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 99.0 | 99.4 | 96.6 | 96.9 | 97.2 | 97.6 | 98.0 | 98.4 |
| Refrigerating capacity ratio | % (relative to R410A) | 87.4 | 86.7 | 88.0 | 87.8 | 87.5 | 87.1 | 86.6 | 86.1 |

TABLE 61

| Item | Unit | Comp. Ex. 72 | Comp. Ex. 73 | Comp. Ex. 74 | Comp. Ex. 75 | Comp. Ex. 76 | Comp. Ex. 77 | Comp. Ex. 78 | Comp. Ex. 79 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 12.9 | 7.9 | 2.9 | 37.9 | 32.9 | 27.9 | 22.9 | 17.9 |
| R1234yf | Mass % | 40.0 | 40.0 | 40.0 | 45.0 | 45.0 | 45.0 | 45.0 | 45.0 |
| R32 | Mass % | 7.1 | 7.1 | 7.1 | 7.1 | 7.1 | 7.1 | 7.1 | 7.1 |
| GWP | — | 50 | 50 | 50 | 50 | 50 | 50 | 50 | 50 |
| COP ratio | % (relative to R410A) | 98.8 | 99.2 | 99.6 | 97.4 | 97.7 | 98.0 | 98.3 | 98.7 |
| Refrigerating capacity ratio | % (relative to R410A) | 85.5 | 84.9 | 84.2 | 84.9 | 84.6 | 84.3 | 83.9 | 83.5 |

TABLE 62

| Item | Unit | Comp. Ex. 80 | Comp. Ex. 81 | Comp. Ex. 82 |
|---|---|---|---|---|
| HFO-1132(E) | Mass % | 35.0 | 40.0 | 45.0 |
| HFO-1123 | Mass % | 12.9 | 7.9 | 2.9 |
| R1234yf | Mass % | 45.0 | 45.0 | 45.0 |
| R32 | Mass % | 7.1 | 7.1 | 7.1 |
| GWP | — | 50 | 50 | 50 |
| COP ratio | % (relative to R410A) | 99.1 | 99.5 | 99.9 |
| Refrigerating capacity ratio | % (relative to R410A) | 82.9 | 82.3 | 81.7 |

TABLE 63

| Item | Unit | Ex. 89 | Ex. 90 | Ex. 91 | Ex. 92 | Ex. 93 | Ex. 94 | Ex. 95 | Ex. 96 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 70.5 | 65.5 | 60.5 | 55.5 | 50.5 | 45.5 | 40.5 | 35.5 |
| R1234yf | Mass % | 5.0 | 5.0 | 5.0 | 5.0 | 5.0 | 5.0 | 5.0 | 5.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 93.7 | 93.9 | 94.1 | 94.4 | 94.7 | 95.0 | 95.4 | 95.8 |
| Refrigerating capacity ratio | % (relative to R410A) | 110.2 | 110.0 | 109.7 | 109.3 | 108.9 | 108.4 | 107.9 | 107.3 |

TABLE 64

| Item | Unit | Ex. 97 | Comp. Ex. 83 | Ex. 98 | Ex. 99 | Ex. 100 | Ex. 101 | Ex. 102 | Ex. 103 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 30.5 | 25.5 | 65.5 | 60.5 | 55.5 | 50.5 | 45.5 | 40.5 |
| R1234yf | Mass % | 5.0 | 5.0 | 10.0 | 10.0 | 10.0 | 10.0 | 10.0 | 10.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 96.2 | 96.6 | 94.2 | 94.4 | 94.6 | 94.9 | 95.2 | 95.5 |
| Refrigerating capacity ratio | % (relative to R410A) | 106.6 | 106.0 | 107.5 | 107.3 | 107.0 | 106.6 | 106.1 | 105.6 |

TABLE 65

| Item | Unit | Ex. 104 | Ex. 105 | Ex. 106 | Comp. Ex. 84 | Ex. 107 | Ex. 108 | Ex. 109 | Ex. 110 |
|---|---|---|---|---|---|---|---|---|---|
| HFO-1132(E) | Mass % | 40.0 | 45.0 | 50.0 | 55.0 | 10.0 | 15.0 | 20.0 | 25.0 |
| HFO-1123 | Mass % | 35.5 | 30.5 | 25.5 | 20.5 | 60.5 | 55.5 | 50.5 | 45.5 |
| R1234yf | Mass % | 10.0 | 10.0 | 10.0 | 10.0 | 15.0 | 15.0 | 15.0 | 15.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.9 | 96.3 | 96.7 | 97.1 | 94.6 | 94.8 | 95.1 | 95.4 |
| Refrigerating capacity ratio | % (relative to R410A) | 105.1 | 104.5 | 103.8 | 103.1 | 104.7 | 104.5 | 104.1 | 103.7 |

TABLE 66

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| HFO-1132(E) | Mass % | 30.0 | 35.0 | 40.0 | 45.0 | 50.0 | 55.0 | 10.0 | 15.0 |
| HFO-1123 | Mass % | 40.5 | 35.5 | 30.5 | 25.5 | 20.5 | 15.5 | 55.5 | 50.5 |
| R1234yf | Mass % | 15.0 | 15.0 | 15.0 | 15.0 | 15.0 | 15.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.7 | 96.0 | 96.4 | 96.8 | 97.2 | 97.6 | 95.1 | 95.3 |

TABLE 66-continued

| Item | Unit | Ex. 111 | Ex. 112 | Ex. 113 | Ex. 114 | Ex. 115 | Comp. Ex. 85 | Ex. 116 | Ex. 117 |
|---|---|---|---|---|---|---|---|---|---|
| Refrigerating capacity ratio | % (relative to R410A) | 103.3 | 102.8 | 102.2 | 101.6 | 101.0 | 100.3 | 101.8 | 101.6 |

TABLE 67

| Item | Unit | Ex. 118 | Ex. 119 | Ex. 120 | Ex. 121 | Ex. 122 | Ex. 123 | Ex. 124 | Comp. Ex. 86 |
|---|---|---|---|---|---|---|---|---|---|
| HFO-1132(E) | Mass % | 20.0 | 25.0 | 30.0 | 35.0 | 40.0 | 45.0 | 50.0 | 55.0 |
| HFO-1123 | Mass % | 45.5 | 40.5 | 35.5 | 30.5 | 25.5 | 20.5 | 15.5 | 10.5 |
| R1234yf | Mass % | 20.0 | 20.0 | 20.0 | 20.0 | 20.0 | 20.0 | 20.0 | 20.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.2 | 96.5 | 96.9 | 97.3 | 97.7 | 98.2 |
| Refrigerating capacity ratio | % (relative to R410A) | 101.2 | 100.8 | 100.4 | 99.9 | 99.3 | 98.7 | 98.0 | 97.3 |

TABLE 68

| Item | Unit | Ex. 125 | Ex. 126 | Ex. 127 | Ex. 128 | Ex. 129 | Ex. 130 | Ex. 131 | Ex. 132 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.5 | 45.5 | 40.5 | 35.5 | 30.5 | 25.5 | 20.5 | 15.5 |
| R1234yf | Mass % | 25.0 | 25.0 | 25.0 | 25.0 | 25.0 | 25.0 | 25.0 | 25.0 |
| R32 | Mass % | 14.5 | 14.5 | 14.5 | 14.5 | 14.5 | 14.5 | 14.5 | 14.5 |
| GWP | — | 99 | 99 | 99 | 99 | 99 | 99 | 99 | 99 |
| COP ratio | % (relative to R410A) | 95.6 | 95.9 | 96.1 | 96.4 | 96.7 | 97.1 | 97.5 | 97.9 |
| Refrigerating capacity ratio | % (relative to R410A) | 98.9 | 98.6 | 98.3 | 97.9 | 97.4 | 96.9 | 96.3 | 95.7 |

TABLE 69

| Item | Unit | Ex. 133 | Comp. Ex. 87 | Ex. 134 | Ex. 135 | Ex. 136 | Ex. 137 | Ex. 138 | Ex. 139 |
|---|---|---|---|---|---|---|---|---|---|
| HFO-1132(E) | Mass % | 50.0 | 55.0 | 10.0 | 15.0 | 20.0 | 25.0 | 30.0 | 35.0 |
| HFO-1123 | Mass % | 10.5 | 5.5 | 45.5 | 40.5 | 35.5 | 30.5 | 25.5 | 20.5 |
| R1234yf | Mass % | 25.0 | 25.0 | 30.0 | 30.0 | 30.0 | 30.0 | 30.0 | 30.0 |
| R32 | Mass % | 14.5 | 14.5 | 14.5 | 14.5 | 14.5 | 14.5 | 14.5 | 14.5 |
| GWP | — | 99 | 99 | 100 | 100 | 100 | 100 | 100 | 100 |
| COP ratio | % (relative to R410A) | 98.3 | 98.7 | 96.2 | 96.4 | 96.7 | 97.0 | 97.3 | 97.7 |
| Refrigerating capacity ratio | % (relative to R410A) | 95.0 | 94.3 | 95.8 | 95.6 | 95.2 | 94.8 | 94.4 | 93.8 |

TABLE 70

| Item | Unit | Ex. 140 | Ex. 141 | Ex. 142 | Ex. 143 | Ex. 144 | Ex. 145 | Ex. 146 | Ex. 147 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 15.5 | 10.5 | 5.5 | 40.5 | 35.5 | 30.5 | 25.5 | 20.5 |
| R1234yf | Mass % | 30.0 | 30.0 | 30.0 | 35.0 | 35.0 | 35.0 | 35.0 | 35.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.1 | 98.5 | 98.9 | 96.8 | 97.0 | 97.3 | 97.6 | 97.9 |
| Refrigerating capacity ratio | % (relative to R410A) | 93.3 | 92.6 | 92.0 | 92.8 | 92.5 | 92.2 | 91.8 | 91.3 |

TABLE 71

| Item | Unit | Ex. 148 | Ex. 149 | Ex. 150 | Ex. 151 | Ex. 152 | Ex. 153 | Ex. 154 | Ex. 155 |
|---|---|---|---|---|---|---|---|---|---|
| HFO-1132(E) | Mass % | 35.0 | 40.0 | 45.0 | 10.0 | 15.0 | 20.0 | 25.0 | 30.0 |
| HFO-1123 | Mass % | 15.5 | 10.5 | 5.5 | 35.5 | 30.5 | 25.5 | 20.5 | 15.5 |
| R1234yf | Mass % | 35.0 | 35.0 | 35.0 | 40.0 | 40.0 | 40.0 | 40.0 | 40.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.3 | 98.7 | 99.1 | 97.4 | 97.7 | 98.0 | 98.3 | 98.6 |
| Refrigerating capacity ratio | % (relative to R410A) | 90.8 | 90.2 | 89.6 | 89.6 | 89.4 | 89.0 | 88.6 | 88.2 |

TABLE 72

| Item | Unit | Ex. 156 | Ex. 157 | Ex. 158 | Ex. 159 | Ex. 160 | Comp. Ex. 88 | Comp. Ex. 89 | Comp. Ex. 90 |
|---|---|---|---|---|---|---|---|---|---|
| HFO-1132(E) | Mass % | 35.0 | 40.0 | 10.0 | 15.0 | 20.0 | 25.0 | 30.0 | 35.0 |
| HFO-1123 | Mass % | 10.5 | 5.5 | 30.5 | 25.5 | 20.5 | 15.5 | 10.5 | 5.5 |
| R1234yf | Mass % | 40.0 | 40.0 | 45.0 | 45.0 | 45.0 | 45.0 | 45.0 | 45.0 |
| R32 | Mass % | 14.5 | 14.5 | 14.5 | 14.5 | 14.5 | 14.5 | 14.5 | 14.5 |
| GWP | — | 100 | 100 | 100 | 100 | 100 | 100 | 100 | 100 |
| COP ratio | % (relative to R410A) | 98.9 | 99.3 | 98.1 | 98.4 | 98.7 | 98.9 | 99.3 | 99.6 |
| Refrigerating capacity ratio | % (relative to R410A) | 87.6 | 87.1 | 86.5 | 86.2 | 85.9 | 85.5 | 85.0 | 84.5 |

TABLE 73

| Item | Unit | Comp. Ex. 91 | Comp. Ex. 92 | Comp. Ex. 93 | Comp. Ex. 94 | Comp. Ex. 95 |
|---|---|---|---|---|---|---|
| HFO-1132(E) | Mass % | 10.0 | 15.0 | 20.0 | 25.0 | 30.0 |
| HFO-1123 | Mass % | 25.5 | 20.5 | 15.5 | 10.5 | 5.5 |
| R1234yf | Mass % | 50.0 | 50.0 | 50.0 | 50.0 | 50.0 |
| R32 | Mass % | 14.5 | 14.5 | 14.5 | 14.5 | 14.5 |
| GWP | — | 100 | 100 | 100 | 100 | 100 |
| COP ratio | % (relative to R410A) | 98.9 | 99.1 | 99.4 | 99.7 | 100.0 |
| Refrigerating capacity ratio | % (relative to R410A) | 83.3 | 83.0 | 82.7 | 82.2 | 81.8 |

TABLE 74

| Item | Unit | Ex. 161 | Ex. 162 | Ex. 163 | Ex. 164 | Ex. 165 | Ex. 166 | Ex. 167 | Ex. 168 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 63.1 | 58.1 | 53.1 | 48.1 | 43.1 | 38.1 | 33.1 | 28.1 |
| R1234yf | Mass % | 5.0 | 5.0 | 5.0 | 5.0 | 5.0 | 5.0 | 5.0 | 5.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 94.8 | 95.0 | 95.2 | 95.4 | 95.7 | 95.9 | 96.2 | 96.6 |
| Refrigerating capacity ratio | % (relative to R410A) | 111.5 | 111.2 | 110.9 | 110.5 | 110.0 | 109.5 | 108.9 | 108.3 |

TABLE 75

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| HFO-1132(E) | Mass % | 50.0 | 10.0 | 15.0 | 20.0 | 25.0 | 30.0 | 35.0 | 40.0 |
| HFO-1123 | Mass % | 23.1 | 58.1 | 53.1 | 48.1 | 43.1 | 38.1 | 33.1 | 28.1 |
| R1234yf | Mass % | 5.0 | 10.0 | 10.0 | 10.0 | 10.0 | 10.0 | 10.0 | 10.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 96.9 | 95.3 | 95.4 | 95.6 | 95.8 | 96.1 | 96.4 | 96.7 |

TABLE 75-continued

| Item | Unit | Comp. Ex. 96 | Ex. 169 | Ex. 170 | Ex. 171 | Ex. 172 | Ex. 173 | Ex. 174 | Ex. 175 |
|---|---|---|---|---|---|---|---|---|---|
| Refrigerating capacity ratio | % (relative to R410A) | 107.7 | 108.7 | 108.5 | 108.1 | 107.7 | 107.2 | 106.7 | 106.1 |

TABLE 76

| Item | Unit | Ex. 176 | Comp. Ex. 97 | Ex. 177 | Ex. 178 | Ex. 179 | Ex. 180 | Ex. 181 | Ex. 182 |
|---|---|---|---|---|---|---|---|---|---|
| HFO-1132(E) | Mass % | 45.0 | 50.0 | 10.0 | 15.0 | 20.0 | 25.0 | 30.0 | 35.0 |
| HFO-1123 | Mass % | 23.1 | 18.1 | 53.1 | 48.1 | 43.1 | 38.1 | 33.1 | 28.1 |
| R1234yf | Mass % | 10.0 | 10.0 | 15.0 | 15.0 | 15.0 | 15.0 | 15.0 | 15.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.0 | 97.4 | 95.7 | 95.9 | 96.1 | 96.3 | 96.6 | 96.9 |
| Refrigerating capacity ratio | % (relative to R410A) | 105.5 | 104.9 | 105.9 | 105.6 | 105.3 | 104.8 | 104.4 | 103.8 |

TABLE 77

| Item | Unit | Ex. 183 | Ex. 184 | Comp. Ex. 98 | Ex. 185 | Ex. 186 | Ex. 187 | Ex. 188 | Ex. 189 |
|---|---|---|---|---|---|---|---|---|---|
| HFO-1132(E) | Mass % | 40.0 | 45.0 | 50.0 | 10.0 | 15.0 | 20.0 | 25.0 | 30.0 |
| HFO-1123 | Mass % | 23.1 | 18.1 | 13.1 | 48.1 | 43.1 | 38.1 | 33.1 | 28.1 |
| R1234yf | Mass % | 15.0 | 15.0 | 15.0 | 20.0 | 20.0 | 20.0 | 20.0 | 20.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.2 | 97.5 | 97.9 | 96.1 | 96.3 | 96.5 | 96.8 | 97.1 |
| Refrigerating capacity ratio | % (relative to R410A) | 103.3 | 102.6 | 102.0 | 103.0 | 102.7 | 102.3 | 101.9 | 101.4 |

TABLE 78

| Item | Unit | Ex. 190 | Ex. 191 | Ex. 192 | Comp. Ex. 99 | Ex. 193 | Ex. 194 | Ex. 195 | Ex. 196 |
|---|---|---|---|---|---|---|---|---|---|
| HFO-1132(E) | Mass % | 35.0 | 40.0 | 45.0 | 50.0 | 10.0 | 15.0 | 20.0 | 25.0 |
| HFO-1123 | Mass % | 23.1 | 18.1 | 13.1 | 8.1 | 43.1 | 38.1 | 33.1 | 28.1 |
| R1234yf | Mass % | 20.0 | 20.0 | 20.0 | 20.0 | 25.0 | 25.0 | 25.0 | 25.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 149 | 149 | 149 |
| COP ratio | % (relative to R410A) | 97.4 | 97.7 | 98.0 | 98.4 | 96.6 | 96.8 | 97.0 | 97.3 |
| Refrigerating capacity ratio | % (relative to R410A) | 100.9 | 100.3 | 99.7 | 99.1 | 100.0 | 99.7 | 99.4 | 98.9 |

TABLE 79

| Item | Unit | Ex. 197 | Ex. 198 | Ex. 199 | Ex. 200 | Comp. Ex. 100 | Ex. 201 | Ex. 202 | Ex. 203 |
|---|---|---|---|---|---|---|---|---|---|
| HFO-1132(E) | Mass % | 30.0 | 35.0 | 40.0 | 45.0 | 50.0 | 10.0 | 15.0 | 20.0 |
| HFO-1123 | Mass % | 23.1 | 18.1 | 13.1 | 8.1 | 3.1 | 38.1 | 33.1 | 28.1 |
| R1234yf | Mass % | 25.0 | 25.0 | 25.0 | 25.0 | 25.0 | 30.0 | 30.0 | 30.0 |
| R32 | Mass % | 21.9 | 21.9 | 21.9 | 21.9 | 21.9 | 21.9 | 21.9 | 21.9 |
| GWP | — | 149 | 149 | 149 | 149 | 149 | 150 | 150 | 150 |
| COP ratio | % (relative to R410A) | 97.6 | 97.9 | 98.2 | 98.5 | 98.9 | 97.1 | 97.3 | 97.6 |
| Refrigerating capacity ratio | % (relative to R410A) | 98.5 | 97.9 | 97.4 | 96.8 | 96.1 | 97.0 | 96.7 | 96.3 |

TABLE 80

| Item | Unit | Ex. 204 | Ex. 205 | Ex. 206 | Ex. 207 | Ex. 208 | Ex. 209 | Ex. 210 | Ex. 211 |
|---|---|---|---|---|---|---|---|---|---|
| HFO-1132(E) | Mass % | 25.0 | 30.0 | 35.0 | 40.0 | 45.0 | 10.0 | 15.0 | 20.0 |
| HFO-1123 | Mass % | 23.1 | 18.1 | 13.1 | 8.1 | 3.1 | 33.1 | 28.1 | 23.1 |
| R1234yf | Mass % | 30.0 | 30.0 | 30.0 | 30.0 | 30.0 | 35.0 | 35.0 | 35.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 97.8 | 98.1 | 98.4 | 98.7 | 99.1 | 97.7 | 97.9 | 98.1 |
| Refrigerating capacity ratio | % (relative to R410A) | 95.9 | 95.4 | 94.9 | 94.4 | 93.8 | 93.9 | 93.6 | 93.3 |

TABLE 81

| Item | Unit | Ex. 212 | Ex. 213 | Ex. 214 | Ex. 215 | Ex. 216 | Ex. 217 | Ex. 218 | Ex. 219 |
|---|---|---|---|---|---|---|---|---|---|
| HFO-1132(E) | Mass % | 25.0 | 30.0 | 35.0 | 40.0 | 10.0 | 15.0 | 20.0 | 25.0 |
| HFO-1123 | Mass % | 18.1 | 13.1 | 8.1 | 3.1 | 28.1 | 23.1 | 18.1 | 13.1 |
| R1234yf | Mass % | 35.0 | 35.0 | 35.0 | 35.0 | 40.0 | 40.0 | 40.0 | 40.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 98.4 | 98.7 | 99.0 | 99.3 | 98.3 | 98.5 | 98.7 | 99.0 |
| Refrigerating capacity ratio | % (relative to R410A) | 92.9 | 92.4 | 91.9 | 91.3 | 90.8 | 90.5 | 90.2 | 89.7 |

TABLE 82

| Item | Unit | Ex. 220 | Ex. 221 | Ex. 222 | Ex. 223 | Ex. 224 | Ex. 225 | Ex. 226 | Comp. Ex. 101 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 8.1 | 3.1 | 23.1 | 18.1 | 13.1 | 8.1 | 3.1 | 18.1 |
| R1234yf | Mass % | 40.0 | 40.0 | 45.0 | 45.0 | 45.0 | 45.0 | 45.0 | 50.0 |
| R32 | Mass % | 21.9 | 21.9 | 21.9 | 21.9 | 21.9 | 21.9 | 21.9 | 21.9 |
| GWP | — | 150 | 150 | 150 | 150 | 150 | 150 | 150 | 150 |
| COP ratio | % (relative to R410A) | 99.3 | 99.6 | 98.9 | 99.1 | 99.3 | 99.6 | 99.9 | 99.6 |
| Refrigerating capacity ratio | % (relative to R410A) | 89.3 | 88.8 | 87.6 | 87.3 | 87.0 | 86.6 | 86.2 | 84.4 |

TABLE 83

| Item | Unit | Comp. Ex. 102 | Comp. Ex. 103 | Comp. Ex. 104 |
|---|---|---|---|---|
| HFO-1132(E) | Mass % | 15.0 | 20.0 | 25.0 |
| HFO-1123 | Mass % | 13.1 | 8.1 | 3.1 |
| R1234yf | Mass % | 50.0 | 50.0 | 50.0 |
| R32 | Mass % | 21.9 | 21.9 | 21.9 |
| GWP | — | 150 | 150 | 150 |
| COP ratio | % (relative to R410A) | 99.8 | 100.0 | 100.2 |
| Refrigerating capacity ratio | % (relative to R410A) | 84.1 | 83.8 | 83.4 |

TABLE 84

| Item | Unit | Ex. 227 | Ex. 228 | Ex. 229 | Ex. 230 | Ex. 231 | Ex. 232 | Ex. 233 | Comp. Ex. 105 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 55.7 | 50.7 | 45.7 | 40.7 | 35.7 | 30.7 | 25.7 | 20.7 |
| R1234yf | Mass % | 5.0 | 5.0 | 5.0 | 5.0 | 5.0 | 5.0 | 5.0 | 5.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 95.9 | 96.0 | 96.2 | 96.3 | 96.6 | 96.8 | 97.1 | 97.3 |
| Refrigerating capacity ratio | % (relative to R410A) | 112.2 | 111.9 | 111.6 | 111.2 | 110.7 | 110.2 | 109.6 | 109.0 |

TABLE 85

| Item | Unit | Ex. 234 | Ex. 235 | Ex. 236 | Ex. 237 | Ex. 238 | Ex. 239 | Ex. 240 | Comp. Ex. 106 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 50.7 | 45.7 | 40.7 | 35.7 | 30.7 | 25.7 | 20.7 | 15.7 |
| R1234yf | Mass % | 10.0 | 10.0 | 10.0 | 10.0 | 10.0 | 10.0 | 10.0 | 10.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.3 | 96.4 | 96.6 | 96.8 | 97.0 | 97.2 | 97.5 | 97.8 |
| Refrigerating capacity ratio | % (relative to R410A) | 109.4 | 109.2 | 108.8 | 108.4 | 107.9 | 107.4 | 106.8 | 106.2 |

TABLE 86

| Item | Unit | Ex. 241 | Ex. 242 | Ex. 243 | Ex. 244 | Ex. 245 | Ex. 246 | Ex. 247 | Comp. Ex. 107 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 45.7 | 40.7 | 35.7 | 30.7 | 25.7 | 20.7 | 15.7 | 10.7 |
| R1234yf | Mass % | 15.0 | 15.0 | 15.0 | 15.0 | 15.0 | 15.0 | 15.0 | 15.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 96.7 | 96.8 | 97.0 | 97.2 | 97.4 | 97.7 | 97.9 | 98.2 |
| Refrigerating capacity ratio | % (relative to R410A) | 106.6 | 106.3 | 106.0 | 105.5 | 105.1 | 104.5 | 104.0 | 103.4 |

TABLE 87

| Item | Unit | Ex. 248 | Ex. 249 | Ex. 250 | Ex. 251 | Ex. 252 | Ex. 253 | Ex. 254 | Comp. Ex. 108 |
|---|---|---|---|---|---|---|---|---|---|
| HFO-1132(E) | Mass % | 10.0 | 15.0 | 20.0 | 25.0 | 30.0 | 35.0 | 40.0 | 45.0 |
| HFO-1123 | Mass % | 40.7 | 35.7 | 30.7 | 25.7 | 20.7 | 15.7 | 10.7 | 5.7 |
| R1234yf | Mass % | 20.0 | 20.0 | 20.0 | 20.0 | 20.0 | 20.0 | 20.0 | 20.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.1 | 97.3 | 97.5 | 97.7 | 97.9 | 98.1 | 98.4 | 98.7 |
| Refrigerating capacity ratio | % (relative to R410A) | 103.7 | 103.4 | 103.0 | 102.6 | 102.2 | 101.6 | 101.1 | 100.5 |

TABLE 88

| Item | Unit | Ex. 255 | Ex. 256 | Ex. 257 | Ex. 258 | Ex. 259 | Ex. 260 | Ex. 261 | Ex. 262 |
|---|---|---|---|---|---|---|---|---|---|
| HFO-1132(E) | Mass % | 10.0 | 15.0 | 20.0 | 25.0 | 30.0 | 35.0 | 40.0 | 10.0 |
| HFO-1123 | Mass % | 35.7 | 30.7 | 25.7 | 20.7 | 15.7 | 10.7 | 5.7 | 30.7 |
| R1234yf | Mass % | 25.0 | 25.0 | 25.0 | 25.0 | 25.0 | 25.0 | 25.0 | 30.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 199 | 199 | 199 |
| COP ratio | % (relative to R410A) | 97.6 | 97.7 | 97.9 | 98.1 | 98.4 | 98.6 | 98.9 | 98.1 |
| Refrigerating capacity ratio | % (relative to R410A) | 100.7 | 100.4 | 100.1 | 99.7 | 99.2 | 98.7 | 98.2 | 97.7 |

TABLE 89

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| HFO-1132(E) | Mass % | 15.0 | 20.0 | 25.0 | 30.0 | 35.0 | 10.0 | 15.0 | 20.0 |
| HFO-1123 | Mass % | 25.7 | 20.7 | 15.7 | 10.7 | 5.7 | 25.7 | 20.7 | 15.7 |
| R1234yf | Mass % | 30.0 | 30.0 | 30.0 | 30.0 | 30.0 | 35.0 | 35.0 | 35.0 |
| R32 | Mass % | 29.3 | 29.3 | 29.3 | 29.3 | 29.3 | 29.3 | 29.3 | 29.3 |
| GWP | — | 199 | 199 | 199 | 199 | 199 | 200 | 200 | 200 |
| COP ratio | % (relative to R410A) | 98.2 | 98.4 | 98.6 | 98.9 | 99.1 | 98.6 | 98.7 | 98.9 |

TABLE 89-continued

| Item | Unit | Ex. 263 | Ex. 264 | Ex. 265 | Ex. 266 | Ex. 267 | Ex. 268 | Ex. 269 | Ex. 270 |
|---|---|---|---|---|---|---|---|---|---|
| Refrigerating capacity ratio | % (relative to R410A) | 97.4 | 97.1 | 96.7 | 96.2 | 95.7 | 94.7 | 94.4 | 94.0 |

TABLE 90

| Item | Unit | Ex. 271 | Ex. 272 | Ex. 273 | Ex. 274 | Ex. 275 | Ex. 276 | Ex. 277 | Ex. 278 |
|---|---|---|---|---|---|---|---|---|---|
| HFO-1132(E) | Mass % | 25.0 | 30.0 | 10.0 | 15.0 | 20.0 | 25.0 | 10.0 | 15.0 |
| HFO-1123 | Mass % | 10.7 | 5.7 | 20.7 | 15.7 | 10.7 | 5.7 | 15.7 | 10.7 |
| R1234yf | Mass % | 35.0 | 35.0 | 40.0 | 40.0 | 40.0 | 40.0 | 45.0 | 45.0 |
| R32 | Mass % | 29.3 | 29.3 | 29.3 | 29.3 | 29.3 | 29.3 | 29.3 | 29.3 |
| GWP | — | 200 | 200 | 200 | 200 | 200 | 200 | 200 | 200 |
| COP ratio | % (relative to R410A) | 99.2 | 99.4 | 99.1 | 99.3 | 99.5 | 99.7 | 99.7 | 99.8 |
| Refrigerating capacity ratio | % (relative to R410A) | 93.6 | 93.2 | 91.5 | 91.3 | 90.9 | 90.6 | 88.4 | 88.1 |

TABLE 91

| Item | Unit | Ex. 279 | Ex. 280 | Comp. Ex. 109 | Comp. Ex. 110 |
|---|---|---|---|---|---|
| HFO-1132(E) | Mass % | 20.0 | 10.0 | 15.0 | 10.0 |
| HFO-1123 | Mass % | 5.7 | 10.7 | 5.7 | 5.7 |
| R1234yf | Mass % | 45.0 | 50.0 | 50.0 | 55.0 |
| R32 | Mass % | 29.3 | 29.3 | 29.3 | 29.3 |
| GWP | — | 200 | 200 | 200 | 200 |
| COP ratio | % (relative to R410A) | 100.0 | 100.3 | 100.4 | 100.9 |
| Refrigerating capacity ratio | % (relative to R410A) | 87.8 | 85.2 | 85.0 | 82.0 |

TABLE 92

| Item | Unit | Ex. 281 | Ex. 282 | Ex. 283 | Ex. 284 | Ex. 285 | Comp. Ex. 111 | Ex. 286 | Ex. 287 |
|---|---|---|---|---|---|---|---|---|---|
| HFO-1132(E) | Mass % | 10.0 | 15.0 | 20.0 | 25.0 | 30.0 | 35.0 | 10.0 | 15.0 |
| HFO-1123 | Mass % | 40.9 | 35.9 | 30.9 | 25.9 | 20.9 | 15.9 | 35.9 | 30.9 |
| R1234yf | Mass % | 5.0 | 5.0 | 5.0 | 5.0 | 5.0 | 5.0 | 10.0 | 10.0 |
| R32 | Mass % | 44.1 | 44.1 | 44.1 | 44.1 | 44.1 | 44.1 | 44.1 | 44.1 |
| GWP | — | 298 | 298 | 298 | 298 | 298 | 298 | 299 | 299 |
| COP ratio | % (relative to R410A) | 97.8 | 97.9 | 97.9 | 98.1 | 98.2 | 98.4 | 98.2 | 98.2 |
| Refrigerating capacity ratio | % (relative to R410A) | 112.5 | 112.3 | 111.9 | 111.6 | 111.2 | 110.7 | 109.8 | 109.5 |

TABLE 93

| Item | Unit | Ex. 288 | Ex. 289 | Ex. 290 | Comp. Ex. 112 | Ex. 291 | Ex. 292 | Ex. 293 | Ex. 294 |
|---|---|---|---|---|---|---|---|---|---|
| HFO-1132(E) | Mass % | 20.0 | 25.0 | 30.0 | 35.0 | 10.0 | 15.0 | 20.0 | 25.0 |
| HFO-1123 | Mass % | 25.9 | 20.9 | 15.9 | 10.9 | 30.9 | 25.9 | 20.9 | 15.9 |
| R1234yf | Mass % | 10.0 | 10.0 | 10.0 | 10.0 | 15.0 | 15.0 | 15.0 | 15.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 98.3 | 98.5 | 98.6 | 98.8 | 98.6 | 98.6 | 98.7 | 98.9 |
| Refrigerating capacity ratio | % (relative to R410A) | 109.2 | 108.8 | 108.4 | 108.0 | 107.0 | 106.7 | 106.4 | 106.0 |

TABLE 94

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| HFO-1132(E) | Mass % | 30.0 | 35.0 | 10.0 | 15.0 | 20.0 | 25.0 | 30.0 | 10.0 |
| HFO-1123 | Mass % | 10.9 | 5.9 | 25.9 | 20.9 | 15.9 | 10.9 | 5.9 | 20.9 |

TABLE 94-continued

| Item | Unit | Ex. 295 | Comp. Ex. 113 | Ex. 296 | Ex. 297 | Ex. 298 | Ex. 299 | Ex. 300 | Ex. 301 |
|---|---|---|---|---|---|---|---|---|---|
| R1234yf | Mass % | 15.0 | 15.0 | 20.0 | 20.0 | 20.0 | 20.0 | 20.0 | 25.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.0 | 99.2 | 99.0 | 99.0 | 99.2 | 99.3 | 99.4 | 99.4 |
| Refrigerating capacity ratio | % (relative to R410A) | 105.6 | 105.2 | 104.1 | 103.9 | 103.6 | 103.2 | 102.8 | 101.2 |

TABLE 95

| Item | Unit | Ex. 302 | Ex. 303 | Ex. 304 | Ex. 305 | Ex. 306 | Ex. 307 | Ex. 308 | Ex. 309 |
|---|---|---|---|---|---|---|---|---|---|
| HFO-1132(E) | Mass % | 15.0 | 20.0 | 25.0 | 10.0 | 15.0 | 20.0 | 10.0 | 15.0 |
| HFO-1123 | Mass % | 15.9 | 10.9 | 5.9 | 15.9 | 10.9 | 5.9 | 10.9 | 5.9 |
| R1234yf | Mass % | 25.0 | 25.0 | 25.0 | 30.0 | 30.0 | 30.0 | 35.0 | 35.0 |
| R32 | Mass % | 44.1 | 44.1 | 44.1 | 44.1 | 44.1 | 44.1 | 44.1 | 44.1 |
| GWP | — | 299 | 299 | 299 | 299 | 299 | 299 | 299 | 299 |
| COP ratio | % (relative to R410A) | 99.5 | 99.6 | 99.7 | 99.8 | 99.9 | 100.0 | 100.3 | 100.4 |
| Refrigerating capacity ratio | % (relative to R410A) | 101.0 | 100.7 | 100.3 | 98.3 | 98.0 | 97.8 | 95.3 | 95.1 |

TABLE 96

| Item | Unit | Ex. 400 |
|---|---|---|
| HFO-1132(E) | Mass % | 10.0 |
| HFO-1123 | Mass % | 5.9 |
| R1234yf | Mass % | 40.0 |
| R32 | Mass % | 44.1 |
| GWP | — | 299 |
| COP ratio | % (relative to R410A) | 100.7 |
| Refrigerating capacity ratio | % (relative to R410A) | 92.3 |

The above results indicate that the refrigerating capacity ratio relative to R410A is 85% or more in the following cases:

When the mass % of HFO-1132(E), HFO-1123, R1234yf, and R32 based on their sum is respectively represented by x, y, z, and a, in a ternary composition diagram in which the sum of HFO-1132(E), HFO-1123, and R1234yf is (100-a) mass %, a straight line connecting a point (0.0, 100.0-a, 0.0) and a point (0.0, 0.0, 100.0-a) is the base, and the point (0.0, 100.0-a, 0.0) is on the left side, if 0<a≤11.1, coordinates (x,y,z) in the ternary composition diagram are on, or on the left side of, a straight line AB that connects point A $(0.0134a^2-1.9681a+68.6, 0.0, -0.0134a^2+0.9681a+31.4)$ and point B $(0.0, 0.0144a^2-1.6377a+58.7, -0.0144a^2+0.6377a+41.3)$;

if 11.1<a≤18.2, coordinates (x,y,z) in the ternary composition diagram are on, or on the left side of, a straight line AB that connects point A $(0.0112a^2-1.9337a+68.484, 0.0, -0.0112a^2+0.9337a+31.516)$ and point B $(0.0, 0.0075a^2-1.5156a+58.199, -0.0075a^2+0.5156a+41.801)$;

if 18.2a<a≤26.7, coordinates (x,y,z) in the ternary composition diagram are on, or on the left side of, a straight line AB that connects point A $(0.0107a^2-1.9142a+68.305, 0.0, -0.0107a^2+0.9142a+31.695)$ and point B $(0.0, 0.009a^2-1.6045a+59.318, -0.009a^2+0.6045a+40.682)$;

if 26.7<a≤36.7, coordinates (x,y,z) in the ternary composition diagram are on, or on the left side of, a straight line AB that connects point A $(0.0103a^2-1.9225a+68.793, 0.0, -0.0103a^2+0.9225a+31.207)$ and point B $(0.0, 0.0046a^2-1.41a+57.286, -0.0046a^2+0.41a+42.714)$; and if 36.7<a≤46.7, coordinates (x,y,z) in the ternary composition diagram are on, or on the left side of, a straight line AB that connects point A $(0.0085a^2-1.8102a+67.1, 0.0, -0.0085a^2+0.8102a+32.9)$ and point B $(0.0, 0.0012a^2-1.1659a+52.95, -0.0012a^2+0.1659a+47.05)$.

Figure 3:
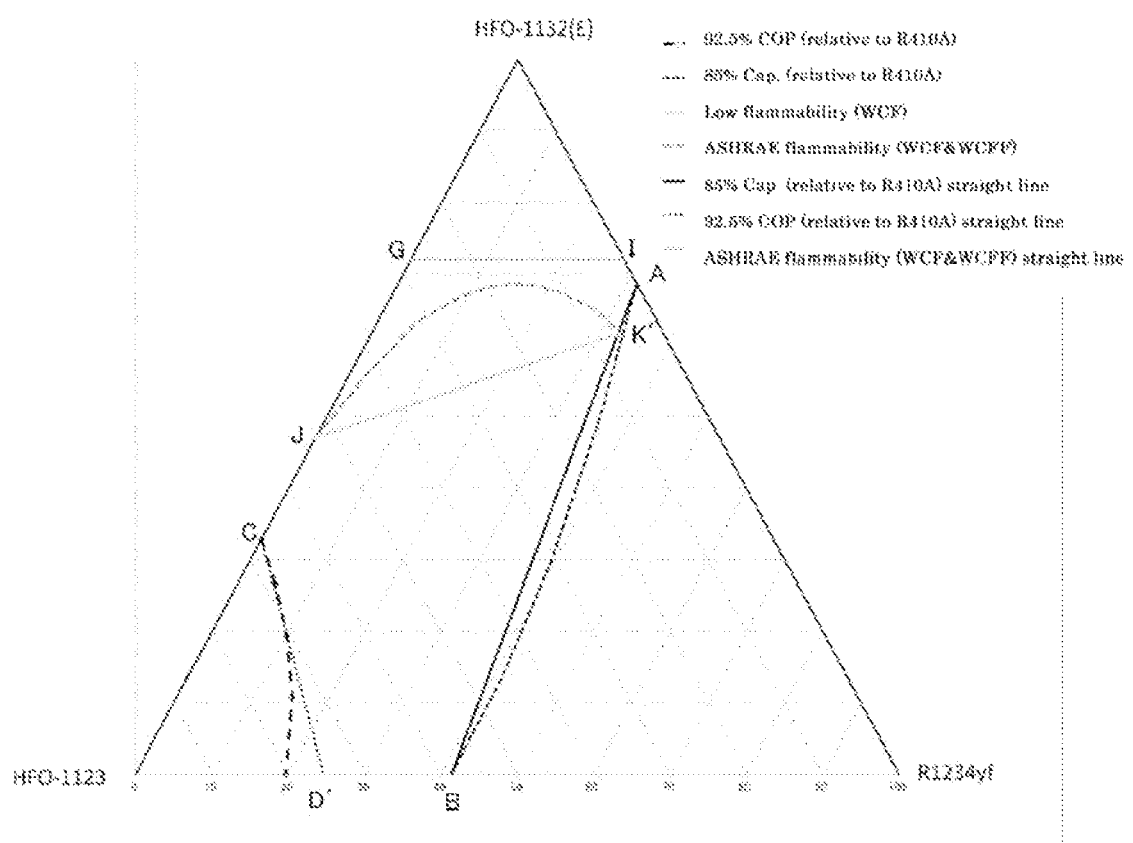
FIG. 3 is a diagram showing points A to C, D', G, I, J, and K', and line segments that connect these points to each other in a ternary composition diagram in which the sum of HFO-1132(E), HFO-1123, and R1234yf is (100–a) mass %.

Actual points having a refrigerating capacity ratio of 85% or more form a curved line that connects point A and point B in FIG. 3, and that extends toward the 1234yf side. Accordingly, when coordinates are on, or on the left side of, the straight line AB, the refrigerating capacity ratio relative to R410A is 85% or more.

Similarly, it was also found that in the ternary composition diagram, if 0<a≤11.1, when coordinates (x,y,z) are on, or on the left side of, a straight line D'C that connects point D' $(0.0, 0.0224a^2+0.968a+75.4, -0.0224a^2-1.968a+24.6)$ and point C $(-0.2304a^2-0.4062a+32.9, 0.2304a^2-0.5938a+67.1, 0.0)$; or if 11.1<a≤46.7, when coordinates are in the entire region, the COP ratio relative to that of R410A is 92.5% or more.

Figure 4:
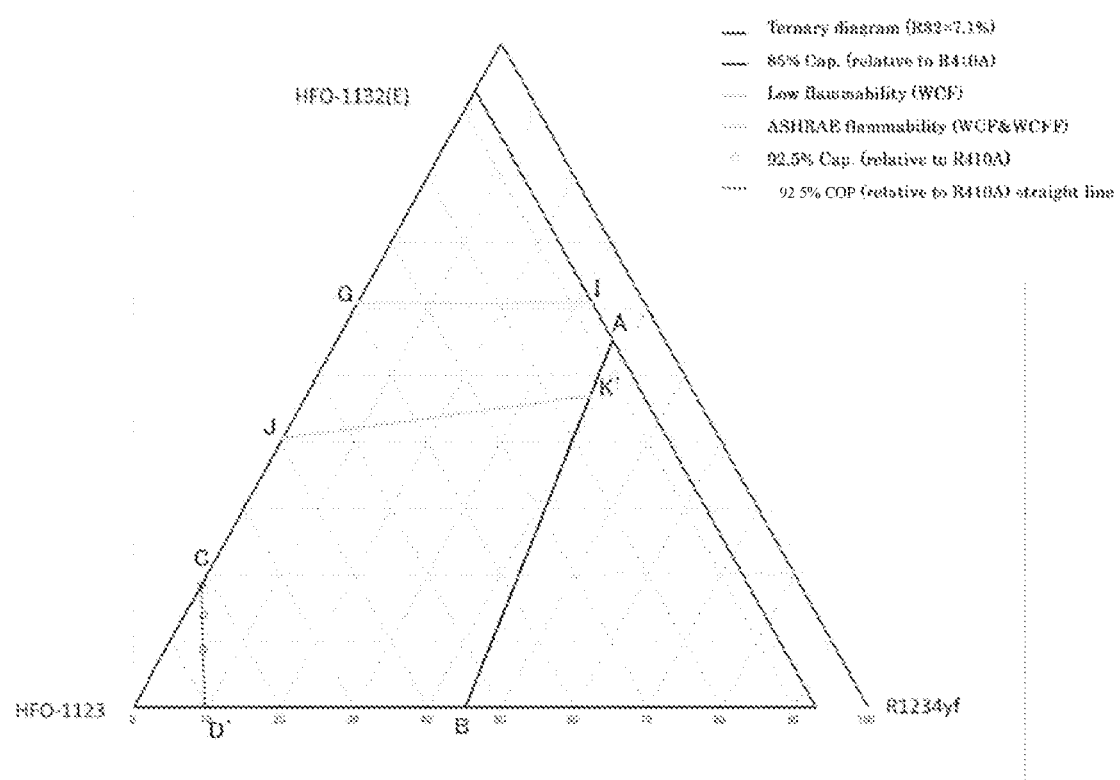
FIG. 4 is a diagram showing points A to C, D', G, I, J, and K', and line segments that connect these points to each other in a ternary composition diagram in which the sum of HFO-1132(E), HFO-1123, and R1234yf is 92.9 mass % (the content of R32 is 7.1 mass %).
Figure 5:
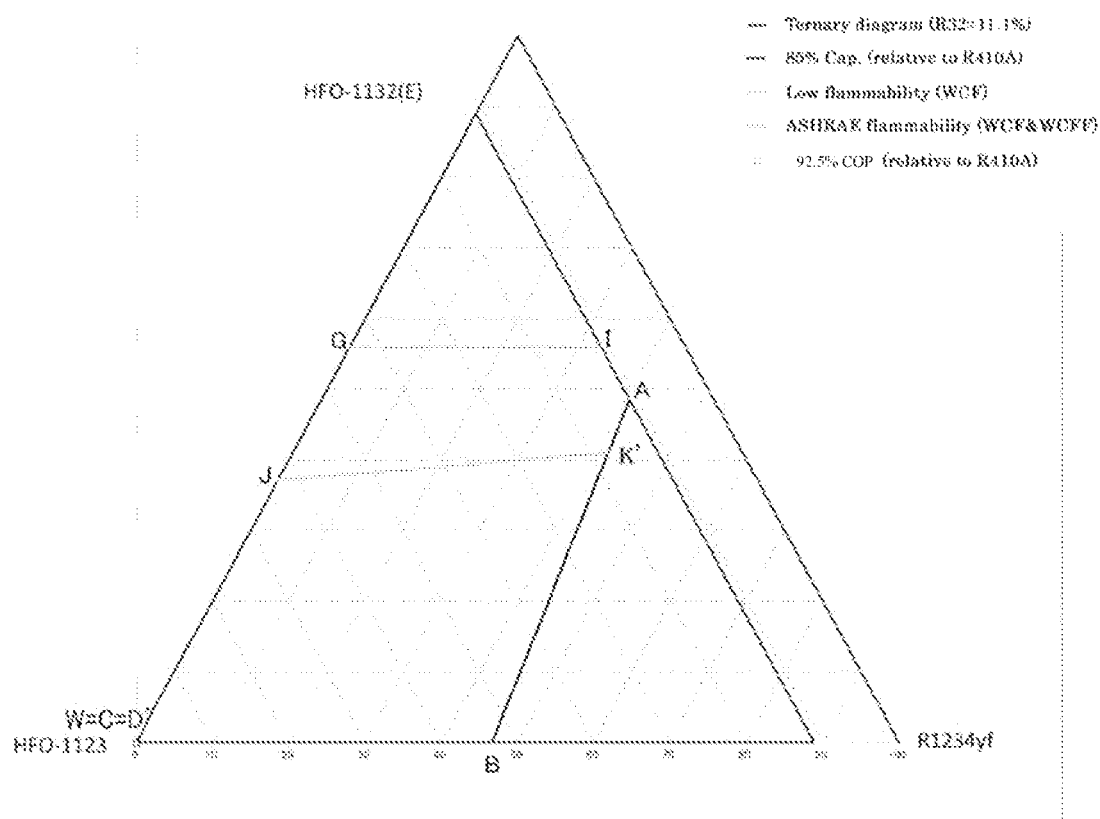
FIG. 5 is a diagram showing points A to C, D', G, I, J, K', and W, and line segments that connect these points to each other in a ternary composition diagram in which the sum of HFO-1132(E), HFO-1123, and R1234yf is 88.9 mass % (the content of R32 is 11.1 mass %).
Figure 6:
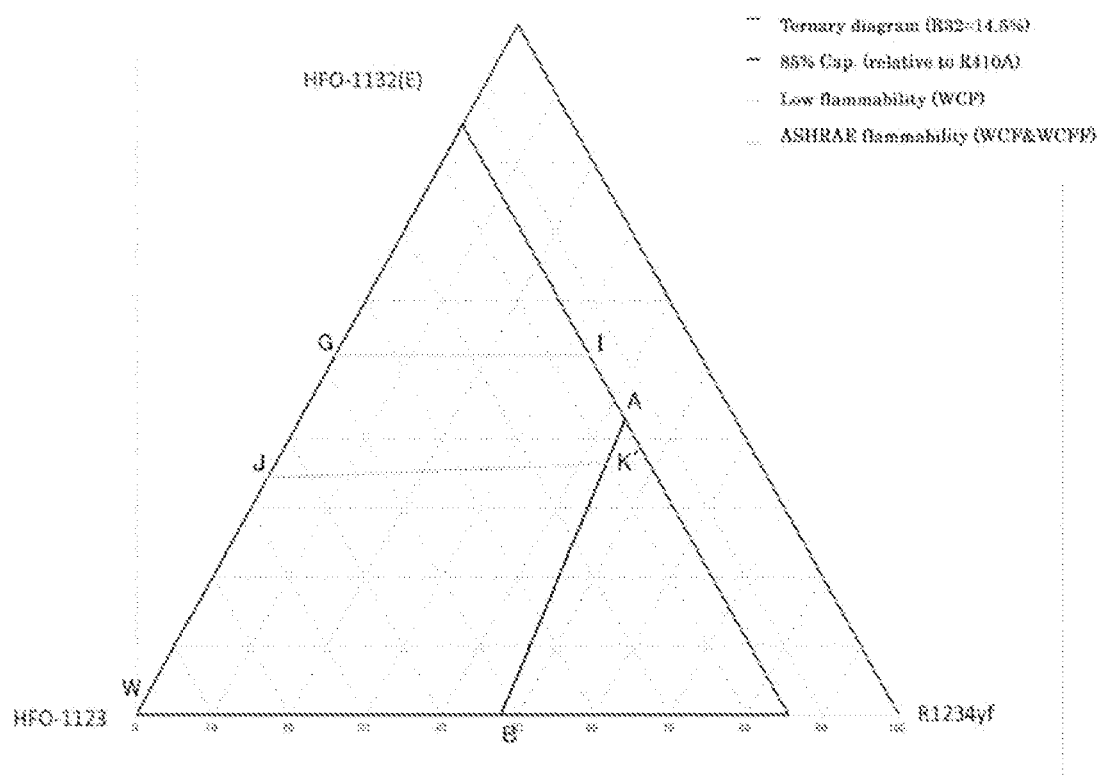
FIG. 6 is a diagram showing points A, B, G, I, J, K', and W, and line segments that connect these points to each other in a ternary composition diagram in which the sum of HFO-1132(E), HFO-1123, and R1234yf is 85.5 mass % (the content of R32 is 14.5 mass %).
Figure 7:
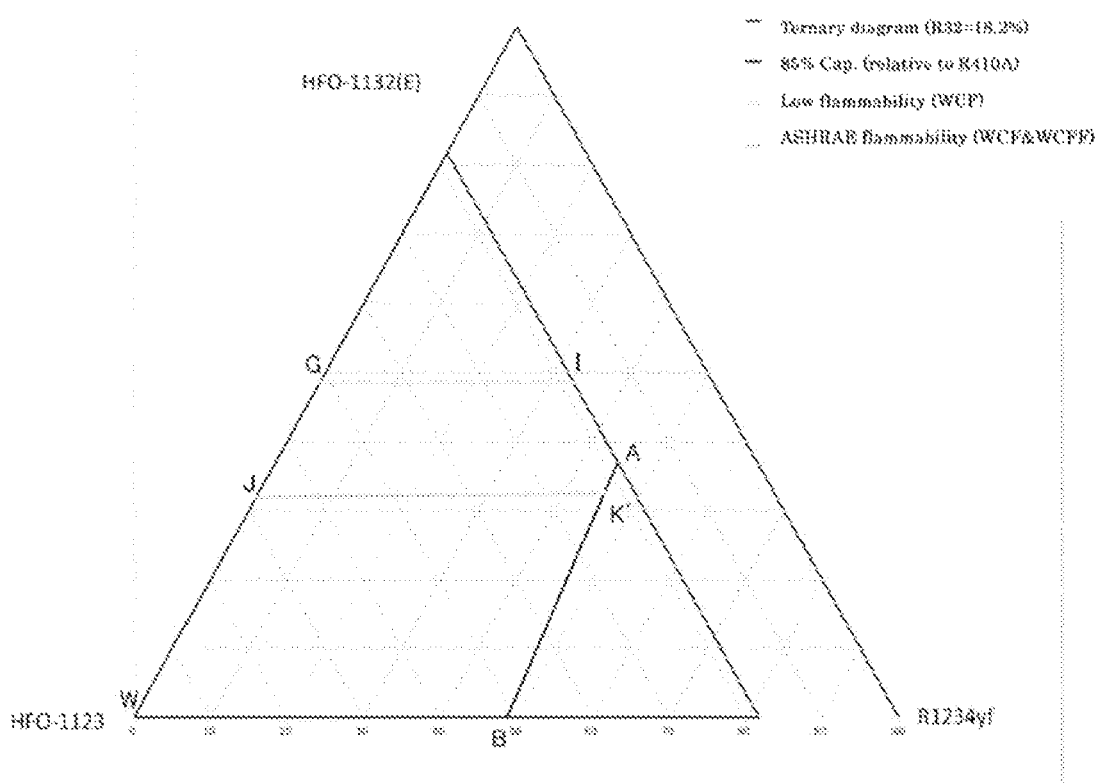
FIG. 7 is a diagram showing points A, B, G, I, J, K', and W, and line segments that connect these points to each other in a ternary composition diagram in which the sum of HFO-1132(E), HFO-1123, and R1234yf is 81.8 mass % (the content of R32 is 18.2 mass %).
Figure 8:
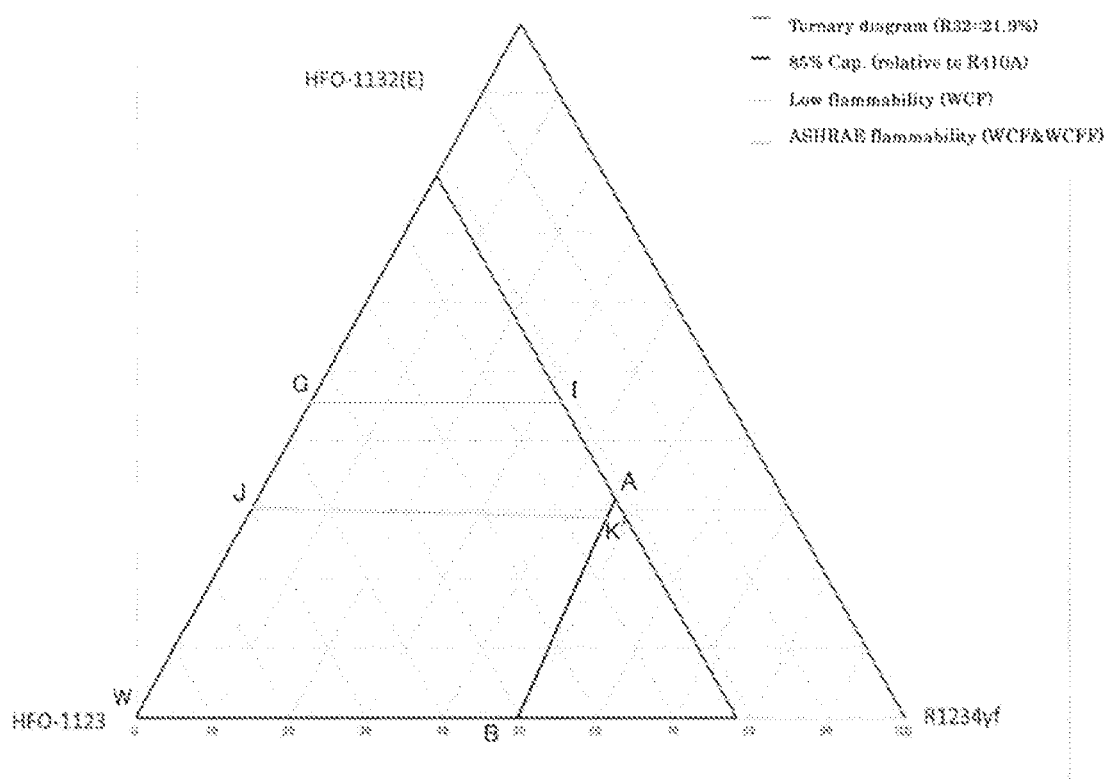
FIG. 8 is a diagram showing points A, B, G, I, J, K', and W, and line segments that connect these points to each other in a ternary composition diagram in which the sum of HFO-1132(E), HFO-1123, and R1234yf is 78.1 mass % (the content of R32 is 21.9 mass %).
Figure 9:
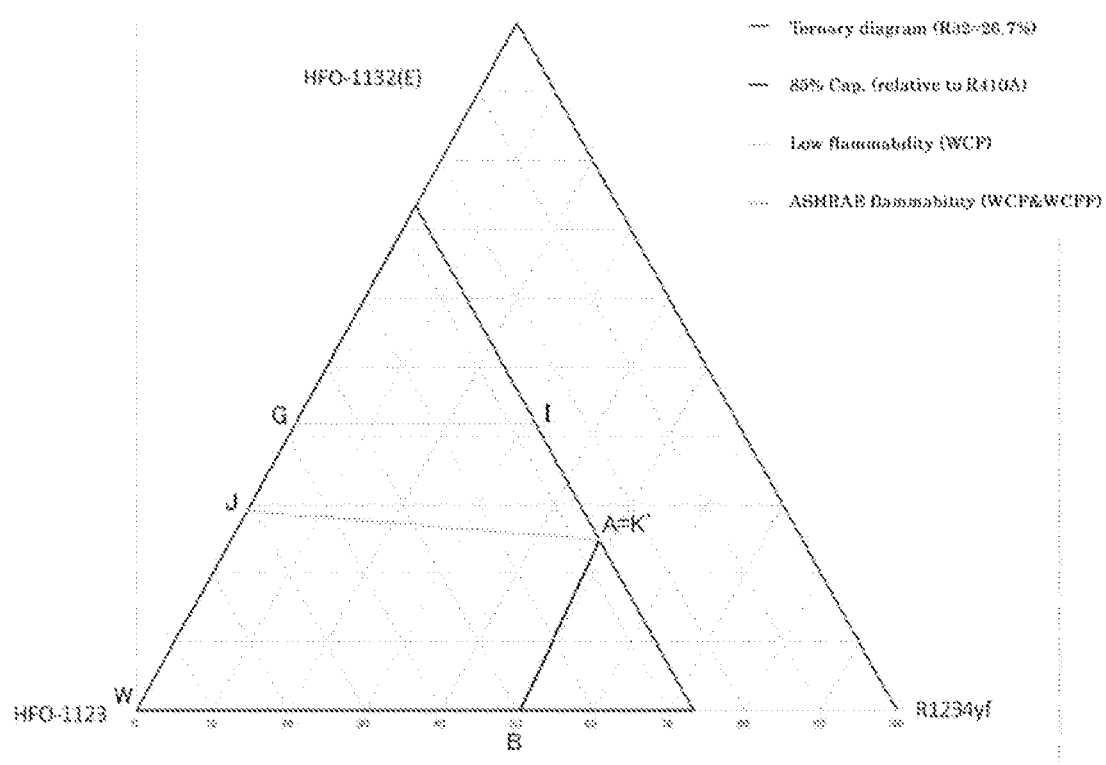
FIG. 9 is a diagram showing points A, B, G, I, J, K', and W, and line segments that connect these points to each other in a ternary composition diagram in which the sum of HFO-1132(E), HFO-1123, and R1234yf is 73.3 mass % (the content of R32 is 26.7 mass %).
Figure 10:
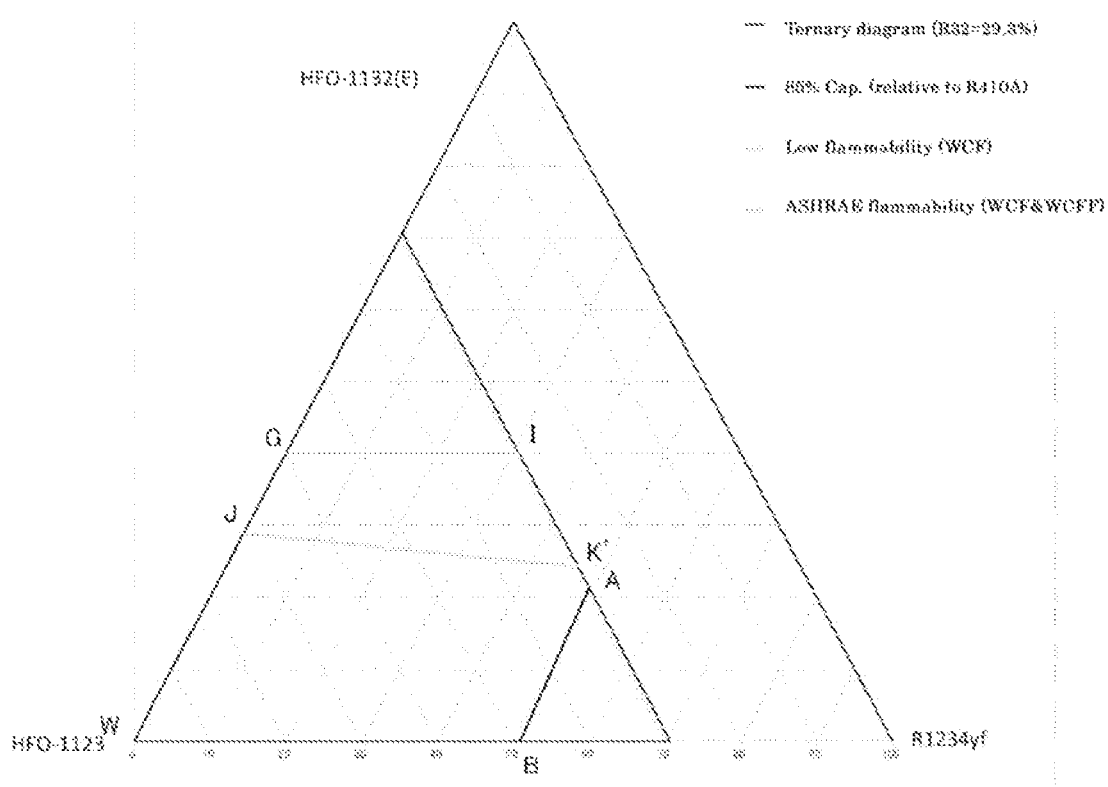
FIG. 10 is a diagram showing points A, B, G, I, J, K', and W, and line segments that connect these points to each other in a ternary composition diagram in which the sum of HFO-1132(E), HFO-1123, and R1234yf is 70.7 mass % (the content of R32 is 29.3 mass %).
Figure 11:
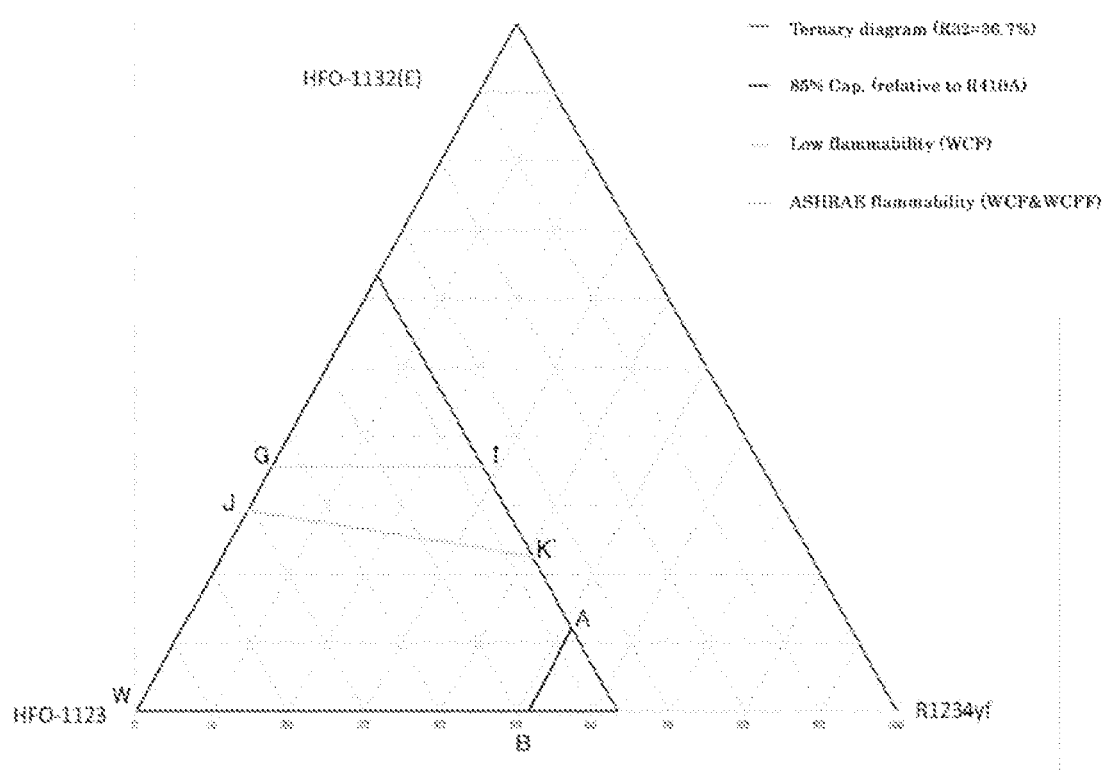
FIG. 11 is a diagram showing points A, B, G, I, J, K', and W, and line segments that connect these points to each other in a ternary composition diagram in which the sum of HFO-1132(E), HFO-1123, and R1234yf is 63.3 mass % (the content of R32 is 36.7 mass %).
Figure 12:
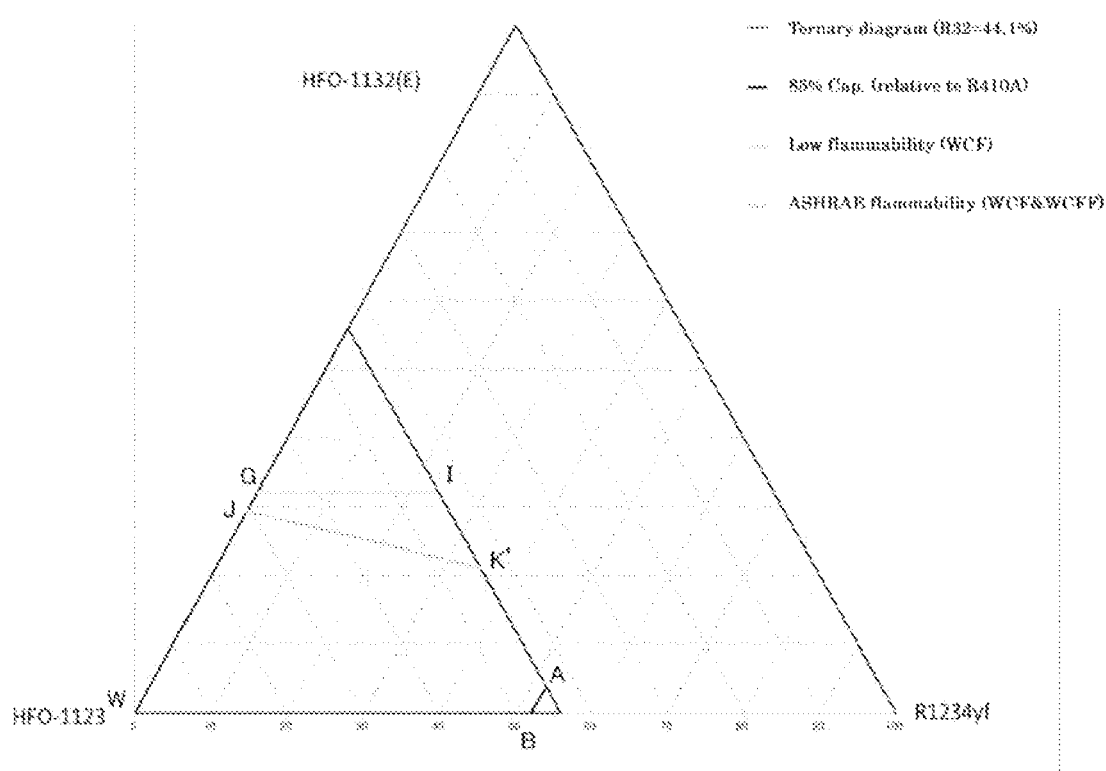
FIG. 12 is a diagram showing points A, B, G, I, J, K', and W, and line segments that connect these points to each other in a ternary composition diagram in which the sum of HFO-1132(E), HFO-1123, and R1234yf is 55.9 mass % (the content of R32 is 44.1 mass %).
Figure 13:
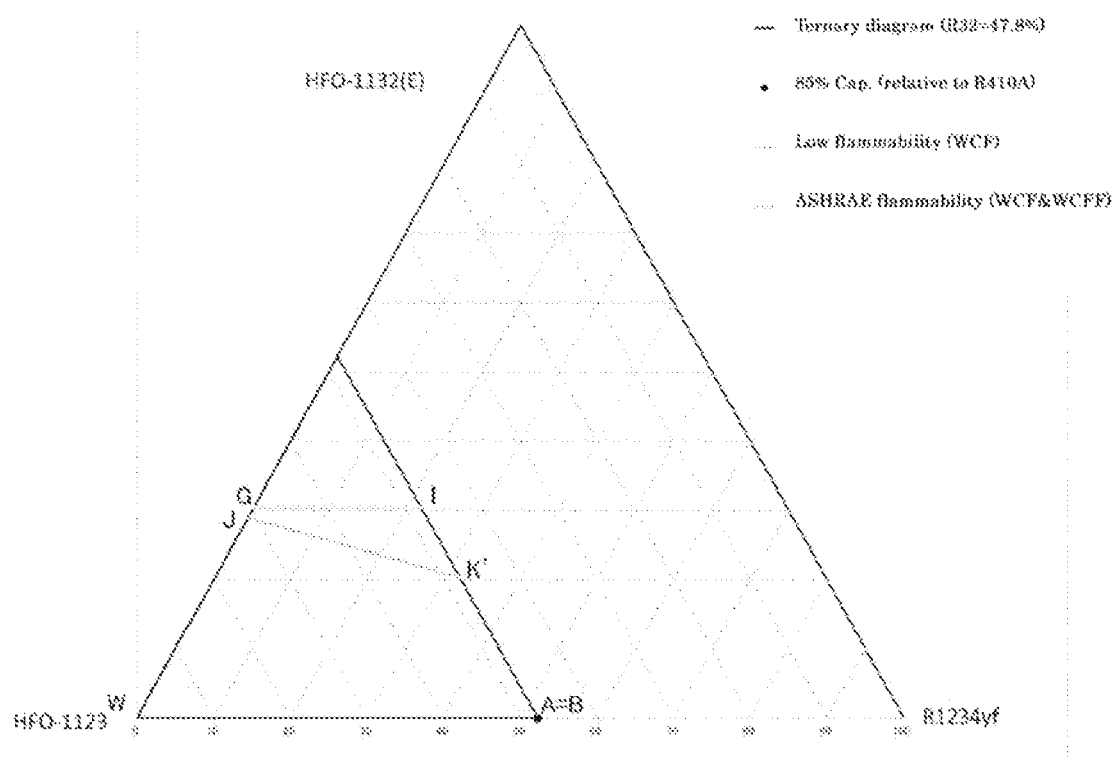
FIG. 13 is a diagram showing points A, B, G, I, J, K', and W, and line segments that connect these points to each other in a ternary composition diagram in which the sum of HFO-1132(E), HFO-1123, and R1234yf is 52.2 mass % (the content of R32 is 47.8 mass %).

In FIG. 3, the COP ratio of 92.5% or more forms a curved line CD. In FIG. 3, an approximate line formed by connecting three points: point C (32.9, 67.1, 0.0) and points (26.6, 68.4, 5) (19.5, 70.5, 10) where the COP ratio is 92.5% when the concentration of R1234yf is 5 mass % and 10 mass was obtained, and a straight line that connects point C and point D' (0, 75.4, 24.6), which is the intersection of the approximate line and a point where the concentration of HFO-1132 (E) is 0.0 mass % was defined as a line segment D'C. In FIG. 4, point D'(0, 83.4, 9.5) was similarly obtained from an approximate curve formed by connecting point C (18.4, 74.5, 0) and points (13.9, 76.5, 2.5) (8.7, 79.2, 5) where the COP ratio is 92.5%, and a straight line that connects point C and point D' was defined as the straight line D'C.

The composition of each mixture was defined as WCF. A leak simulation was performed using NIST Standard Reference Database REFLEAK Version 4.0 under the conditions of Equipment, Storage, Shipping, Leak, and Recharge according to the ASHRAE Standard 34-2013. The most flammable fraction was defined as WCFF.

For the flammability, the burning velocity was measured according to the ANSI/ASHRAE Standard 34-2013. Both WCF and WCFF having a burning velocity of 10 cm/s or less were determined to be classified as "Class 2L (lower flammability)."

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

The results are shown in Tables 97 to 104.

TABLE 97

| | Item | | Comp. Ex. 6 | Comp. Ex. 13 | Comp. Ex. 19 | Comp. Ex. 24 | Comp. Ex. 29 | Comp. Ex. 34 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 28.0 | 32.0 | 33.1 | 33.4 | 33.2 | 32.7 |
| | R1234yf | Mass % | 0.0 | 0.0 | 0.0 | 0 | 0 | 0 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 98

| | Item | | Comp. Ex. 39 | Comp. Ex. 45 | Comp. Ex. 51 | Comp. Ex. 57 | Comp. Ex. 62 |
|---|---|---|---|---|---|---|---|
| WCF | HFO-1132(E) | Mass % | 41.8 | 40 | 35.7 | 32 | 30.4 |
| | HFO-1123 | Mass % | 31.5 | 30.7 | 23.6 | 23.9 | 21.8 |
| | R1234yf | Mass % | 0 | 0 | 0 | 0 | 0 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 99

| | Item | | Comp. Ex. 7 | Comp. Ex. 14 | Comp. Ex. 20 | Comp. Ex. 25 | Comp. Ex. 30 | Comp. Ex. 35 |
|---|---|---|---|---|---|---|---|---|
| WCF | HFO-1132(E) | Mass % | 72.0 | 60.9 | 55.8 | 52.1 | 48.6 | 45.4 |
| | HFO-1123 | Mass % | 0.0 | 0.0 | 0.0 | 0 | 0 | 0 |
| | R1234yf | Mass % | 28.0 | 32.0 | 33.1 | 33.4 | 33.2 | 32.7 |
| | R32 | Mass % | 0.0 | 7.1 | 11.1 | 14.5 | 18.2 | 21.9 |
| Burning velocity (WCF) | | cm/s | 10 | 10 | 10 | 10 | 10 | 10 |

TABLE 100

| | Item | | Comp. Ex. 40 | Comp. Ex. 46 | Comp. Ex. 52 | Comp. Ex. 58 | Comp. Ex. 63 |
|---|---|---|---|---|---|---|---|
| WCF | HFO-1132(E) | Mass % | 41.8 | 40 | 35.7 | 32 | 30.4 |
| | HFO-1123 | Mass % | 0 | 0 | 0 | 0 | 0 |
| | R1234yf | Mass % | 31.5 | 30.7 | 23.6 | 23.9 | 21.8 |
| | R32 | Mass % | 26.7 | 29.3 | 36.7 | 44.1 | 47.8 |
| Burning velocity (WCF) | | cm/s | 10 | 10 | 10 | 10 | 10 |

TABLE 101

| | Item | | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCF | HFO-1132 (E) | Mass % | 47.1 | 40.5 | 37.0 | 34.3 | 32.0 | 30.3 |
| | HFO-1123 | Mass % | 52.9 | 52.4 | 51.9 | 51.2 | 49.8 | 47.8 |
| | R1234yf | Mass % | 0.0 | 0.0 | 0.0 | 0.0 | 0.0 | 0.0 |
| | R32 | Mass % | 0.0 | 7.1 | 11.1 | 14.5 | 18.2 | 21.9 |
| Leak condition that results in WCFF | | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 92% release, liquid phase side |

TABLE 101-continued

| Item | | | Comp. Ex. 8 | Comp. Ex. 15 | Comp. Ex. 21 | Comp. Ex. 26 | Comp. Ex. 31 | Comp. Ex. 36 |
|---|---|---|---|---|---|---|---|---|
| WCFF | HFO-1132 (E) | Mass % | 72.0 | 62.4 | 56.2 | 50.6 | 45.1 | 40.0 |
| | HFO-1123 | Mass % | 28.0 | 31.6 | 33.0 | 33.4 | 32.5 | 30.5 |
| | R1234yf | Mass % | 0.0 | 0.0 | 0.0 | 20.4 | 0.0 | 0.0 |
| | R32 | Mass % | 0.0 | 50.9 | 10.8 | 16.0 | 22.4 | 29.5 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 102

| Item | | | Comp. Ex. 41 | Comp. Ex. 47 | Comp. Ex. 53 | Comp. Ex. 59 | Comp. Ex. 64 |
|---|---|---|---|---|---|---|---|
| WCF | HFO-1132(E) | Mass % | 29.1 | 28.8 | 29.3 | 29.4 | 28.9 |
| | HFO-1123 | Mass % | 44.2 | 41.9 | 34.0 | 26.5 | 23.3 |
| | R1234yf | Mass % | 0.0 | 0.0 | 0.0 | 0.0 | 0.0 |
| | R32 | Mass % | 26.7 | 29.3 | 36.7 | 44.1 | 47.8 |
| Leak condition that results in WCFF | | | Storage/Shipping −40° C., 92% release, liquid phase side | Storage/Shipping −40° C., 92% release, liquid phase side | Storage/Shipping −40° C., 92% release, liquid phase side | Storage/Shipping −40° C., 90% release, gas phase side | Storage/Shipping −40° C., 86% release, gas phase side |
| WCFF | HFO-1132(E) | Mass % | 34.6 | 32.2 | 27.7 | 28.3 | 27.5 |
| | HFO-1123 | Mass % | 26.5 | 23.9 | 17.5 | 18.2 | 16.7 |
| | R1234yf | Mass % | 0.0 | 0.0 | 0.0 | 0.0 | 0.0 |
| | R32 | Mass % | 38.9 | 43.9 | 54.8 | 53.5 | 55.8 |
| Burning velocity (WCF) | | cm/s | 8 or less | 8 or less | 8.3 | 9.3 | 9.6 |
| Burning velocity (WCFF) | | cm/s | 10 | 10 | 10 | 10 | 10 |

TABLE 103

| Item | | | Comp. Ex. 9 | Comp. Ex. 16 | Comp. Ex. 22 | Comp. Ex. 27 | Comp. Ex. 32 | Comp. Ex. 37 |
|---|---|---|---|---|---|---|---|---|
| WCF | HFO-1132(E) | Mass % | 61.7 | 47.0 | 41.0 | 36.5 | 32.5 | 28.8 |
| | HFO-1123 | Mass % | 5.9 | 7.2 | 6.5 | 5.6 | 4.0 | 2.4 |
| | R1234yf | Mass % | 32.4 | 38.7 | 41.4 | 43.4 | 45.3 | 46.9 |
| | R32 | Mass % | 0.0 | 7.1 | 11.1 | 14.5 | 18.2 | 21.9 |
| Leak condition that results in WCFF | | | Storage/Shipping −40° C., 0% release, gas phase side | Storage/Shipping −40° C., 0% release, gas phase side | Storage/Shipping −40° C., 0% release, gas phase side | Storage/Shipping −40° C., 92% release, liquid phase side | Storage/Shipping −40° C., 0% release, gas phase side | Storage/Shipping −40° C., 0% release, gas phase side |
| WCFF | HFO-1132(E) | Mass % | 72.0 | 56.2 | 50.4 | 46.0 | 42.4 | 39.1 |
| | HFO-1123 | Mass % | 10.5 | 12.6 | 11.4 | 10.1 | 7.4 | 4.4 |
| | R1234yf | Mass % | 17.5 | 20.4 | 21.8 | 22.9 | 24.3 | 25.7 |
| | R32 | Mass % | 0.0 | 10.8 | 16.3 | 21.0 | 25.9 | 30.8 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

TABLE 104

| Item | | | Comp. Ex. 42 | Comp. Ex. 48 | Comp. Ex. 54 | Comp. Ex. 60 | Comp. Ex. 65 |
|---|---|---|---|---|---|---|---|
| WCF | HFO-1132(E) | Mass % | 24.8 | 24.3 | 22.5 | 21.1 | 20.4 |
| | HFO-1123 | Mass % | 0.0 | 0.0 | 0.0 | 0.0 | 0.0 |
| | R1234yf | Mass % | 48.5 | 46.4 | 40.8 | 34.8 | 31.8 |
| | R32 | Mass % | 26.7 | 29.3 | 36.7 | 44.1 | 47.8 |
| Leak conditions that results in WCFF | | | Storage/Shipping −40° C., 0% release, gas phase side | Storage/Shipping −40° C., 0% release, gas phase side | Storage/Shipping −40° C., 0% release, gas phase side | Storage/Shipping −40° C., 0% release, gas phase side | Storage/Shipping −40° C., 0% release, gas phase side |
| WCFF | HFO-1132(E) | Mass % | 35.3 | 34.3 | 31.3 | 29.1 | 28.1 |
| | HFO-1123 | Mass % | 0.0 | 0.0 | 0.0 | 0.0 | 0.0 |

TABLE 104-continued

| Item | | Comp. Ex. 42 | Comp. Ex. 48 | Comp. Ex. 54 | Comp. Ex. 60 | Comp. Ex. 65 |
|---|---|---|---|---|---|---|
| R1234yf | Mass % | 27.4 | 26.2 | 23.1 | 19.8 | 18.2 |
| R32 | Mass % | 37.3 | 39.6 | 45.6 | 51.1 | 53.7 |
| Burning velocity (WCF) | cm/s | 8 or less | 8 or less | 8 or less | 8 or less | 8 or less |
| Burning velocity (WCFF) | cm/s | 10 | 10 | 10 | 10 | 10 |

The results in Tables 97 to 100 indicate that the refrigerant has a WCF lower flammability in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, coordinates (x,y,z) in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line GI that connects point G ($0.026a^2$−1.7478a+72.0, −$0.026a^2$+0.7478a+28.0, 0.0) and point I ($0.026a^2$−1.7478a+72.0, 0.0, −$0.026a^2$+0.7478a+28.0);

if 11.1<a≤18.2, coordinates (x,y,z) in the ternary composition diagram are on or below a straight line GI that connects point G ($0.02a^2$−1.6013a+71.105, −$0.02a^2$+0.6013a+28.895, 0.0) and point I ($0.02a^2$−1.6013a+71.105, 0.0, −$0.02a^2$+0.6013a+28.895); if 18.2<a≤26.7, coordinates (x,y,z) in the ternary composition diagram are on or below a straight line GI that connects point G ($0.0135a^2$−1.4068a+69.727, −$0.0135a^2$+0.4068a+30.273, 0.0) and point I ($0.0135a^2$−1.4068a+69.727, 0.0, −$0.0135a^2$+0.4068a+30.273); if 26.7<a≤36.7, coordinates (x,y,z) in the ternary composition diagram are on or below a straight line GI that connects point G ($0.0111a^2$−1.3152a+68.986, −$0.0111a^2$+0.3152a+31.014, 0.0) and point I ($0.0111a^2$−1.3152a+68.986, 0.0, −$0.0111a^2$+0.3152a+31.014); and if 36.7<a≤46.7, coordinates (x,y,z) in the ternary composition diagram are on or below a straight line GI that connects point G ($0.0061a^2$−0.9918a+63.902, −$0.0061a^2$−0.0082a+36.098,0.0) and point I ($0.0061a^2$ 0.9918a+63.902, 0.0, −$0.0061a^2$−0.0082a+36.098).

Three points corresponding to point G (Table 105) and point I (Table 106) were individually obtained in each of the following five ranges by calculation, and their approximate expressions were obtained.

TABLE 105

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 28.0 | 32.0 | 33.1 | 33.1 | 33.4 | 33.2 | 33.2 | 32.7 | 31.5 |
| R1234yf | 0 | 0 | 0 | 0 | 0 | 0 | 0 | 0 | 0 |
| R32 | a | | | a | | | a | | |
| HFO-1132(E) Approximate expression | $0.026a^2$ − 1.7478a + 72.0 | | | $0.02a^2$ − 1.6013a + 71.105 | | | $0.0135a^2$ − 1.4068a + 69.727 | | |
| HFO-1123 Approximate expression | −$0.026a^2$ + 0.7478a + 28.0 | | | −$0.02a^2$ + 0.6013a + 28.895 | | | −$0.0135a^2$ + 0.4068a + 30.273 | | |
| R1234yf Approximate expression | 0 | | | 0 | | | 0 | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 31.5 | 30.7 | 27.6 | 27.6 | 23.9 | 21.8 |
| R1234yf | 0 | 0 | 0 | 0 | 0 | 0 |
| R32 | a | | | a | | |
| HFO-1132(E) Approximate expression | 0.0111a2 − 1.3152a + 68.986 | | | $0.0061a^2$ − 0.9918a + 63.902 | | |
| HFO-1123 Approximate expression | −0.0111a2 + 0.3152a + 31.014 | | | −$0.0061a^2$ − 0.0082a + 36.098 | | |
| R1234yf Approximate expression | 0 | | | 0 | | |

TABLE 106

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 72.0 | 60.9 | 55.8 | 55.8 | 52.1 | 48.6 | 48.6 | 45.4 | 41.8 |
| HFO-1123 | 0 | 0 | 0 | 0 | 0 | 0 | 0 | 0 | 0 |
| R1234yf | 28.0 | 32.0 | 33.1 | 33.1 | 33.4 | 33.2 | 33.2 | 32.7 | 31.5 |
| R32 | a | | | a | | | a | | |
| HFO-1132(E) Approximate expression | $0.026a^2 - 1.7478a + 72.0$ | | | $0.02a^2 - 1.6013a + 71.105$ | | | $0.0135a^2 - 1.4068a + 69.727$ | | |
| HFO-1123 Approximate expression | 0 | | | 0 | | | 0 | | |
| R1234yf Approximate expression | $-0.026a^2 + 0.7478a + 28.0$ | | | $-0.02a^2 + 0.6013a + 28.895$ | | | $-0.0135a^2 + 0.4068a + 30.273$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 41.8 | 40.0 | 35.7 | 35.7 | 32.0 | 30.4 |
| HFO-1123 | 0 | 0 | 0 | 0 | 0 | 0 |
| R1234yf | 31.5 | 30.7 | 23.6 | 23.6 | 23.5 | 21.8 |
| R32 | x | | | x | | |
| HFO-1132(E) Approximate expression | $0.0111a^2 - 1.3152a + 68.986$ | | | $0.0061a^2 - 0.9918a + 63.902$ | | |
| HFO-1123 Approximate expression | 0 | | | 0 | | |
| R1234yf Approximate expression | $-0.0111a^2 + 0.3152a + 31.014$ | | | $-0.0061a^2 - 0.0082a + 36.098$ | | |

The results in Tables 101 to 104 indicate that the refrigerant is determined to have a WCFF lower flammability, and the flammability classification according to the ASHRAE Standard is "2L (flammability)" in the following cases:

When the mass % of HFO-1132(E), HFO-1123, R1234yf, and R32 based on their sum in the mixed refrigerant of HFO-1132(E), HFO-1123, R1234yf, and R32 is respectively represented by x, y, z, and a, in a ternary composition diagram in which the sum of HFO-1132(E), HFO-1123, and R1234yf is (100−a) mass % and a straight line connecting a point (0.0, 100.0−a, 0.0) and a point (0.0, 0.0, 100.0−a) is the base, if 0<a≤11.1, coordinates (x,y,z) in the ternary composition diagram are on or below a straight line JK' that connects point J ($0.0049a^2-0.9645a+47.1$, $-0.0049a^2-0.0355a+52.9$, 0.0) and point K'($0.0514a^2-2.4353a+61.7$, $-0.0323a^2+0.4122a+5.9$, $-0.0191a^2+1.0231a+32.4$); if 11.1<a≤18.2, coordinates are on a straight line JK' that connects point J ($0.0243a^2-1.4161a+49.725$, $-0.0243a^2+0.4161a+50.275$, 0.0) and point K'($0.0341a^2-2.1977a+61.187$, $-0.0236a^2+0.34a+5.636$, $-0.0105a^2+0.8577a+33.177$); if 18.2<a≤26.7, coordinates are on or below a straight line JK' that connects point J ($0.0246a^2-1.4476a+50.184$, $-0.0246a^2+0.4476a+49.816$, 0.0) and point K' ($0.0196a^2-1.7863a+58.515$, $-0.0079a^2-0.1136a+8.702$, $-0.0117a^2+0.8999a+32.783$); if 26.7<a≤36.7, coordinates are on or below a straight line JK' that connects point J ($0.0183a^2-1.1399a+46.493$, $-0.0183a^2+0.1399a+53.507$, 0.0) and point K' ($-0.0051a^2+0.0929a+25.95$, 0.0, $0.0051a^2-1.0929a+74.05$); and if 36.7<a≤46.7, coordinates are on or below a straight line JK' that connects point J ($-0.0134a^2+1.0956a+7.13$, $0.0134a^2-2.0956a+92.87$, 0.0) and point K'($-1.892a+29.443$, 0.0, $0.892a+70.557$).

Actual points having a WCFF lower flammability form a curved line that connects point J and point K' (on the straight line AB) in FIG. 3 and extends toward the HFO-1132(E) side. Accordingly, when coordinates are on or below the straight line JK', WCFF lower flammability is achieved.

Three points corresponding to point J (Table 107) and point K' (Table 108) were individually obtained in each of the following five ranges by calculation, and their approximate expressions were obtained.

TABLE 107

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 47.1 | 40.5 | 37 | 37.0 | 34.3 | 32.0 | 32.0 | 30.3 | 29.1 |
| HFO-1123 | 52.9 | 52.4 | 51.9 | 51.9 | 51.2 | 49.8 | 49.8 | 47.8 | 44.2 |
| R1234yf | 0 | 0 | 0 | 0 | 0 | 0 | 0 | 0 | 0 |
| R32 | a | | | a | | | a | | |
| HFO-1132(E) Approximate expression | $0.0049a^2 - 0.9645a + 47.1$ | | | $0.0243a^2 - 1.4161a + 49.725$ | | | $0.0246a^2 - 1.4476a + 50.184$ | | |
| HFO-1123 Approximate expression | $-0.0049a^2 - 0.0355a + 52.9$ | | | $-0.0243a^2 + 0.4161a + 50.275$ | | | $-0.0246a^2 + 0.4476a + 49.816$ | | |
| R1234yf Approximate | 0 | | | 0 | | | 0 | | |

TABLE 107-continued expression

| Item | 36.7 ≥ R32 ≥ 26.7 | | | 47.8 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 29.1 | 28.8 | 29.3 | 29.3 | 29.4 | 28.9 |
| HFO-1123 | 44.2 | 41.9 | 34.0 | 34.0 | 26.5 | 23.3 |
| R1234yf | 0 | 0 | 0 | 0 | 0 | 0 |
| R32 | a | | | a | | |
| HFO-1132(E) Approximate expression | $0.0183a^2 - 1.1399a + 46.493$ | | | $-0.0134a^2 + 1.0956a + 7.13$ | | |
| HFO-1123 Approximate expression | $-0.0183a^2 + 0.1399a + 53.507$ | | | $0.0134a^2 - 2.0956a + 92.87$ | | |
| R1234yf Approximate expression | 0 | | | 0 | | |

TABLE 108

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 61.7 | 47.0 | 41.0 | 41.0 | 36.5 | 32.5 | 32.5 | 28.8 | 24.8 |
| HFO-1123 | 5.9 | 7.2 | 6.5 | 6.5 | 5.6 | 4.0 | 4.0 | 2.4 | 0 |
| R1234yf | 32.4 | 38.7 | 41.4 | 41.4 | 43.4 | 45.3 | 45.3 | 46.9 | 48.5 |
| R32 | x | | | x | | | x | | |
| HFO-1132(E) Approximate expression | $0.0514a^2 - 2.4353a + 61.7$ | | | $0.0341a^2 - 2.1977a + 61.187$ | | | $0.0196a^2 - 1.7863a + 58.515$ | | |
| HFO-1123 Approximate expression | $-0.0323a^2 + 0.4122a + 5.9$ | | | $-0.0236a^2 + 0.34a + 5.636$ | | | $-0.0079a^2 - 0.1136a + 8.702$ | | |
| R1234yf Approximate expression | $-0.0191a^2 + 1.0231a + 32.4$ | | | $-0.0105a^2 + 0.8577a + 33.177$ | | | $-0.0117a^2 + 0.8999a + 32.783$ | | |

| Item | 36.7 ≥ R32 ≥ 26.7 | | | 46.7 ≥ R32 ≥ 36.7 | | |
|---|---|---|---|---|---|---|
| R32 | 26.7 | 29.3 | 36.7 | 36.7 | 44.1 | 47.8 |
| HFO-1132(E) | 24.8 | 24.3 | 22.5 | 22.5 | 21.1 | 20.4 |
| HFO-1123 | 0 | 0 | 0 | 0 | 0 | 0 |
| R1234yf | 48.5 | 46.4 | 40.8 | 40.8 | 34.8 | 31.8 |
| R32 | x | | | x | | |
| HFO-1132(E) Approximate expression | $-0.0051a^2 + 0.0929a + 25.95$ | | | $-1.892a + 29.443$ | | |
| HFO-1123 Approximate expression | 0 | | | 0 | | |
| R1234yf Approximate expression | $0.0051a^2 - 1.0929a + 74.05$ | | | $0.892a + 70.557$ | | |

FIGS. 3 to 13 show compositions whose R32 content a (mass %) is 0 mass %, 7.1 mass %, 11.1 mass %, 14.5 mass %, 18.2 mass %, 21.9 mass %, 26.7 mass %, 29.3 mass %, 36.7 mass %, 44.1 mass %, and 47.8 mass %, respectively.

Points A, B, C, and D' were obtained in the following manner according to approximate calculation.

Point A is a point where the content of HFO-1123 is 0 mass %, and a refrigerating capacity ratio of 85% relative to that of R410A is achieved. Three points corresponding to point A were obtained in each of the following five ranges by calculation, and their approximate expressions were obtained (Table 109).

TABLE 109

| Item | 11.1 ≥ R32 > 0 | | | 18.2 ≥ R32 ≥ 11.1 | | | 26.7 ≥ R32 ≥ 18.2 | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 68.6 | 55.3 | 48.4 | 48.4 | 42.8 | 37 | 37 | 31.5 | 24.8 |
| HFO-1123 | 0 | 0 | 0 | 0 | 0 | 0 | 0 | 0 | 0 |
| R1234yf | 31.4 | 37.6 | 40.5 | 40.5 | 42.7 | 44.8 | 44.8 | 46.6 | 48.5 |
| R32 | a | | | a | | | a | | |
| HFO-1132(E) Approximate expression | $0.0134a^2 - 1.9681a + 68.6$ | | | $0.0112a^2 - 1.9337a + 68.484$ | | | $0.0107a^2 - 1.9142a + 68.305$ | | |

TABLE 109-continued

| | | | |
|---|---|---|---|
| HFO-1123 | 0 | 0 | 0 |
| Approximate expression | | | |
| R1234yf Approximate expression | $-0.0134a^2 + 0.9681a + 31.4$ | $-0.0112a^2 + 0.9337a + 31.516$ | $-0.0107a^2 + 0.9142a + 31.695$ |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 24.8 | 21.3 | 12.1 | 12.1 | 3.8 | 0 |
| HFO-1123 | 0 | 0 | 0 | 0 | 0 | 0 |
| R1234yf | 48.5 | 49.4 | 51.2 | 51.2 | 52.1 | 52.2 |
| R32 | | a | | | a | |
| HFO-1132(E) Approximate expression | $0.0103a^2 - 1.9225a + 68.793$ | | | $0.0085a^2 - 1.8102a + 67.1$ | | |
| HFO-1123 Approximate expression | 0 | | | 0 | | |
| R1234yf Approximate expression | $-0.0103a^2 + 0.9225a + 31.207$ | | | $-0.0085a^2 + 0.8102a + 32.9$ | | |

Point B is a point where the content of HFO-1132(E) is 0 mass %, and a refrigerating capacity ratio of 85% relative to that of R410A is achieved.

Three points corresponding to point B were obtained in each of the following five ranges by calculation, and their approximate expressions were obtained (Table 110).

TABLE 110

| Item | $11.1 \geq R32 > 0$ | | | $18.2 \geq R32 \geq 11.1$ | | | $26.7 \geq R32 \geq 18.2$ | | |
|---|---|---|---|---|---|---|---|---|---|
| R32 | 0 | 7.1 | 11.1 | 11.1 | 14.5 | 18.2 | 18.2 | 21.9 | 26.7 |
| HFO-1132(E) | 0 | 0 | 0 | 0 | 0 | 0 | 0 | 0 | 0 |
| HFO-1123 | 58.7 | 47.8 | 42.3 | 42.3 | 37.8 | 33.1 | 33.1 | 28.5 | 22.9 |
| R1234yf | 41.3 | 45.1 | 46.6 | 46.6 | 47.7 | 48.7 | 48.7 | 49.6 | 50.4 |
| R32 | | a | | | a | | | a | |
| HFO-1132(E) Approximate expression | | 0 | | | 0 | | | 0 | |
| HFO-1123 Approximate expression | $0.0144a^2 - 1.6377a + 58.7$ | | | $0.0075a^2 - 1.5156a + 58.199$ | | | $0.009a^2 - 1.6045a + 59.318$ | | |
| R1234yf Approximate expression | $-0.0144a^2 + 0.6377a + 41.3$ | | | $-0.0075a^2 + 0.5156a + 41.801$ | | | $-0.009a^2 + 0.6045a + 40.682$ | | |

| Item | $36.7 \geq R32 \geq 26.7$ | | | $46.7 \geq R32 \geq 36.7$ | | |
|---|---|---|---|---|---|---|
| R32 | 26.7 | 29.3 | 36.7 | 36.7 | 44.1 | 47.8 |
| HFO-1132(E) | 0 | 0 | 0 | 0 | 0 | 0 |
| HFO-1123 | 22.9 | 19.9 | 11.7 | 11.8 | 3.9 | 0 |
| R1234yf | 50.4 | 50.8 | 51.6 | 51.5 | 52.0 | 52.2 |
| R32 | | a | | | a | |
| HFO-1132(E) Approximate expression | | 0 | | | 0 | |
| HFO-1123 Approximate expression | $0.0046a^2 - 1.41a + 57.286$ | | | $0.0012a^2 - 1.1659a + 52.95$ | | |
| R1234yf Approximate expression | $-0.0046a^2 + 0.41a + 42.714$ | | | $-0.0012a^2 + 0.1659a + 47.05$ | | |

Point D' is a point where the content of HFO-1132(E) is 0 mass %, and a COP ratio of 95.5% relative to that of R410A is achieved.

Three points corresponding to point D' were obtained in each of the following by calculation, and their approximate expressions were obtained (Table 111).

TABLE 111

| Item | | $11.1 \geq R32 > 0$ | |
|---|---|---|---|
| R32 | 0 | 7.1 | 11.1 |
| HFO-1132(E) | 0 | 0 | 0 |
| HFO-1123 | 75.4 | 83.4 | 88.9 |
| R1234yf | 24.6 | 9.5 | 0 |
| R32 | | a | |
| HFO-1132(E) Approximate expression | | 0 | |
| HFO-1123 Approximate expression | | $0.0224a^2 + 0.968a + 75.4$ | |
| R1234yf Approximate expression | | $-0.0224a^2 - 1.968a + 24.6$ | |

Point C is a point where the content of R1234yf is 0 mass %, and a COP ratio of 95.5% relative to that of R410A is achieved.

Three points corresponding to point C were obtained in each of the following by calculation, and their approximate expressions were obtained (Table 112).

TABLE 112

| Item | | $11.1 \geq R32 > 0$ | |
|---|---|---|---|
| R32 | 0 | 7.1 | 11.1 |
| HFO-1132(E) | 32.9 | 18.4 | 0 |
| HFO-1123 | 67.1 | 74.5 | 88.9 |
| R1234yf | 0 | 0 | 0 |
| R32 | | a | |
| HFO-1132(E) Approximate expression | | $-0.2304a^2 - 0.4062a + 32.9$ | |
| HFO-1123 Approximate expression | | $0.2304a^2 - 0.5938a + 67.1$ | |
| R1234yf Approximate expression | | 0 | |

(5-4) Refrigerant D

The refrigerant D according to the present disclosure is a mixed refrigerant comprising trans-1,2-difluoroethylene (HFO-1132(E)), difluoromethane (R32), and 2,3,3,3-tetrafluoro-1-propene (R1234yf).

The refrigerant D according to the present disclosure has various properties that are desirable as an R410A-alternative refrigerant; i.e., a refrigerating capacity equivalent to that of R410A, a sufficiently low GWP, and a lower flammability (Class 2L) according to the ASHRAE standard.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments J, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI);

the line segment IJ is represented by coordinates $(0.0236y^2 - 1.7616y + 72.0, y, -0.0236y^2 + 0.7616y + 28.0)$;

the line segment NE is represented by coordinates $(0.012y^2 - 1.9003y + 58.3, y, -0.012y^2 + 0.9003y + 41.7)$; and the line segments JN and EI are straight lines. When the requirements above are satisfied, the refrigerant according to the present disclosure has a refrigerating capacity ratio of 80% or more relative to R410A, a GWP of 125 or less, and a WCF lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);

the line segment MM' is represented by coordinates $(0.132y^2 - 3.34y + 52.6, y, -0.132y^2 + 2.34y + 47.4)$;

the line segment M'N is represented by coordinates $(0.0596y^2\ 2.2541y + 48.98, y, -0.0596y^2 + 1.2541y + 51.02)$;

the line segment VG is represented by coordinates $(0.0123y^2 - 1.8033y + 39.6, y, -0.0123y^2 + 0.8033y + 60.4)$; and the line segments NV and GM are straight lines. When the requirements above are satisfied, the refrigerant according to the present disclosure has a refrigerating capacity ratio of 70% or more relative to R410A, a GWP of 125 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;

the line segment ON is represented by coordinates $(0.0072y^2 - 0.6701y + 37.512, y, -0.0072y^2 - 0.3299y + 62.488)$;

the line segment NU is represented by coordinates $(0.0083y^2 - 1.7403y + 56.635, y, -0.0083y^2 + 0.7403y + 43.365)$; and the line segment UO is a straight line. When the requirements above are satisfied, the refrigerant according to the present disclosure has a refrigerating capacity ratio of 80% or more relative to R410A, a GWP of 250 or less, and an ASHRAE lower flammability.

The refrigerant D according to the present disclosure is preferably a refrigerant wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line. When the requirements above are satisfied, the refrigerant according to the present disclosure has a refrigerating capacity ratio of 92.5% or more relative to R410A, a GWP of 350 or less, and a WCF lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line. When the requirements above are satisfied, the refrigerant according to the present disclosure has a refrigerating capacity ratio of 92.5% or more relative to R410A, a GWP of 350 or less, and an ASHRAE lower flammability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ac, cf, fd, and da that connect the following 4 points:
point a (71.1, 0.0, 28.9),
point c (36.5, 18.2, 45.3),
point f (47.6, 18.3, 34.1), and
point d (72.0, 0.0, 28.0),
or on these line segments;
the line segment ac is represented by coordinates $(0.0181y^2-2.2288y+71.096, y, -0.0181y^2+1.2288y+28.904)$;
the line segment fd is represented by coordinates $(0.02y^2-1.7y+72, y, -0.02y^2+0.7y+28)$; and the line segments cf and da are straight lines. When the requirements above are satisfied, the refrigerant according to the present disclosure has a refrigerating capacity ratio of 85% or more relative to R410A, a GWP of 125 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments ab, be, ed, and da that connect the following 4 points:
point a (71.1, 0.0, 28.9),
point b (42.6, 14.5, 42.9),
point e (51.4, 14.6, 34.0), and
point d (72.0, 0.0, 28.0),
or on these line segments;
the line segment ab is represented by coordinates $(0.0181y^2-2.2288y+71.096, y, -0.0181y^2+1.2288y+28.904)$;
the line segment ed is represented by coordinates $(0.02y^2-1.7y+72, y, -0.02y^2+0.7y+28)$; and
the line segments be and da are straight lines. When the requirements above are satisfied, the refrigerant according to the present disclosure has a refrigerating capacity ratio of 85% or more relative to R410A, a GWP of 100 or less, and a lower flammability (Class 2L) according to the ASHRAE standard.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gi, ij, and jg that connect the following 3 points:
point g (77.5, 6.9, 15.6),
point i (55.1, 18.3, 26.6), and
point j (77.5. 18.4, 4.1),
or on these line segments;
the line segment gi is represented by coordinates $(0.02y^2-2.4583y+93.396, y, -0.02y^2+1.4583y+6.604)$; and
the line segments ij and jg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure is preferably a refrigerant wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by line segments gh, hk, and kg that connect the following 3 points:
point g (77.5, 6.9, 15.6),
point h (61.8, 14.6, 23.6), and
point k (77.5, 14.6, 7.9),
or on these line segments;
the line segment gh is represented by coordinates $(0.02y^2-2.4583y+93.396, y, -0.02y^2+1.4583y+6.604)$; and
the line segments hk and kg are straight lines. When the requirements above are satisfied, the refrigerant according to the present disclosure has a refrigerating capacity ratio of 95% or more relative to R410A and a GWP of 100 or less, undergoes fewer or no changes such as polymerization or decomposition, and also has excellent stability.

The refrigerant D according to the present disclosure may further comprise other additional refrigerants in addition to HFO-1132(E), R32, and R1234yf, as long as the above properties and effects are not impaired. In this respect, the refrigerant according to the present disclosure preferably comprises HFO-1132(E), R32, and R1234yf in a total amount of 99.5 mass % or more, more preferably 99.75 mass % or more, and still more preferably 99.9 mass % or more based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant D)

The present disclosure is described in more detail below with reference to Examples of refrigerant D. However, the refrigerant D is not limited to the Examples.

The composition of each mixed refrigerant of HFO-1132 (E), R32, and R1234yf was defined as WCF. A leak simulation was performed using the NIST Standard Reference Database REFLEAK Version 4.0 under the conditions of Equipment, Storage, Shipping, Leak, and Recharge according to the ASHRAE Standard 34-2013. The most flammable fraction was defined as WCFF.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC. Tables 113 to 115 show the results.

TABLE 113

| Item | | Unit | Comparative Example 13 I | Example 11 | Example 12 J | Example 13 | Example 14 K | Example 15 | Example 16 L |
|---|---|---|---|---|---|---|---|---|---|
| WCF | HFO-1132 (E) | Mass % | 72 | 57.2 | 48.5 | 41.2 | 35.6 | 32 | 28.9 |
| | R32 | Mass % | 0 | 10 | 18.3 | 27.6 | 36.8 | 44.2 | 51.7 |
| | R1234yf | Mass % | 28 | 32.8 | 33.2 | 31.2 | 27.6 | 23.8 | 19.4 |
| Burning Velocity (WCF) | | cm/s | 10 | 10 | 10 | 10 | 10 | 10 | 10 |

TABLE 114

| Item | | Unit | Comparative Example 14 M | Example 18 | Example 19 W | Example 20 | Example 21 N | Example 22 |
|---|---|---|---|---|---|---|---|---|
| WCF | HFO-1132 (E) | Mass % | 52.6 | 39.2 | 32.4 | 29.3 | 27.7 | 24.6 |
| | R32 | Mass % | 0.0 | 5.0 | 10.0 | 14.5 | 18.2 | 27.6 |
| | R1234yf | Mass % | 47.4 | 55.8 | 57.6 | 56.2 | 54.1 | 47.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side | Storage, Shipping, −40° C., 0% release, on the gas phase side |
| WCF | HFO-1132 (E) | Mass % | 72.0 | 57.8 | 48.7 | 43.6 | 40.6 | 34.9 |
| | R32 | Mass % | 0.0 | 9.5 | 17.9 | 24.2 | 28.7 | 38.1 |
| | R1234yf | Mass % | 28.0 | 32.7 | 33.4 | 32.2 | 30.7 | 27.0 |
| Burning Velocity (WCF) | | cm/s | 8 or less | 8 or less | 8 or less | 8 or less | 8 or less | 8 or less |
| Burning Velocity (WCFF) | | cm/s | 10 | 10 | 10 | 10 | 10 | 10 |

TABLE 115

| Item | | Unit | Example 23 O | Example 24 | Example 25 P |
|---|---|---|---|---|---|
| WCF | HFO-1132 (E) | Mass % | 22.6 | 21.2 | 20.5 |
| | HFO-1123 | Mass % | 36.8 | 44.2 | 51.7 |
| | R1234yf | Mass % | 40.6 | 34.6 | 27.8 |
| Leak condition that results in WCFF | | | Storage, Shipping, −40° C., 0% release, on the gas phase side | Storage, Shipping, −40° C., 0% release, on the gas phase side | Storage, Shipping, −40° C., 0% release, on the gas phase side |
| WCFF | HFO-1132 (E) | Mass % | 31.4 | 29.2 | 27.1 |
| | HFO-1123 | Mass % | 45.7 | 51.1 | 56.4 |
| | R1234yf | Mass % | 23.0 | 19.7 | 16.5 |

TABLE 115-continued

| Item | Unit | Example 23 O | Example 24 | Example 25 P |
|---|---|---|---|---|
| Burning Velocity (WCF) | cm/s | 8 or less | 8 or less | 8 or less |
| Burning Velocity (WCFF) | cm/s | 10 | 10 | 10 |

The results indicate that under the condition that the mass % of HFO-1132(E), R32, and R1234yf based on their sum is respectively represented by x, y, and z, when coordinates (x,y,z) in the ternary composition diagram shown in FIG. 14 in which the sum of HFO-1132(E), R32, and R1234yf is 100 mass % are on the line segment that connects point I, point J, point K, and point L, or below these line segments, the refrigerant has a WCF lower flammability.

Figure 14:
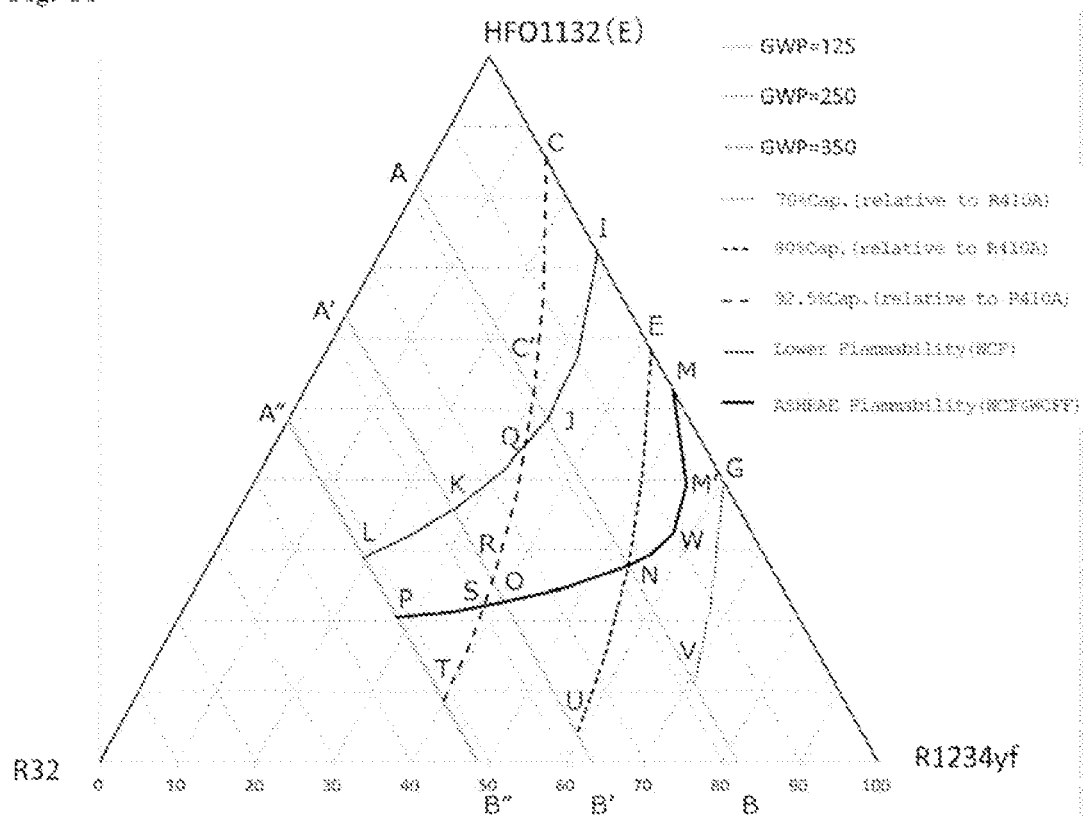
FIG. 14 is a view showing points A to C, E, G, and I to W; and line segments that connect points A to C, E, G, and I to W in a ternary composition diagram in which the sum of HFO-1132(E), R32, and R1234yf is 100 mass %.
Figure 15:
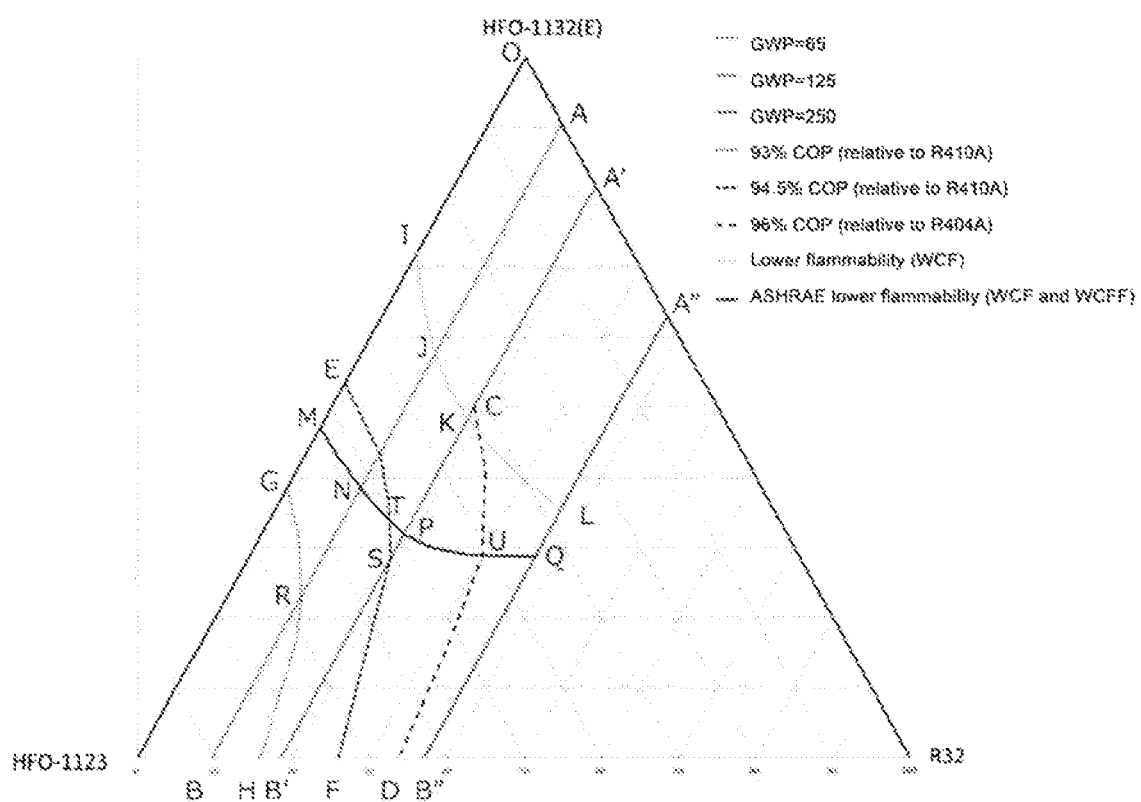
FIG. 15 is a view showing points A to U; and line segments that connect the points in a ternary composition diagram in which the sum of HFO-1132(E), HFO-1123, and R32 is 100 mass %.

The results also indicate that when coordinates (x,y,z) in the ternary composition diagram shown in FIG. 14 are on the line segments that connect point M, point M', point W, point J, point N, and point P, or below these line segments, the refrigerant has an ASHRAE lower flammability.

Mixed refrigerants were prepared by mixing HFO-1132 (E), R32, and R1234yf in amounts (mass %) shown in Tables 116 to 144 based on the sum of FO-1132(E), R32, and R1234yf. The coefficient of performance (COP) ratio and the refrigerating capacity ratio relative to R410 of the mixed refrigerants shown in Tables 116 to 144 were determined. The conditions for calculation were as described below.

Evaporating temperature: 5° C.
Condensation temperature: 45° C.
Degree of superheating: 5 K
Degree of subcooling: 5 K
Compressor efficiency: 70%

Tables 116 to 144 show these values together with the GWP of each mixed refrigerant.

TABLE 116

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | Mass % | R410A | 81.6 | 0.0 | 63.1 | 0.0 | 48.2 | 0.0 |
| R32 | Mass % |  | 18.4 | 18.1 | 36.9 | 36.7 | 51.8 | 51.5 |
| R1234yf | Mass % |  | 0.0 | 81.9 | 0.0 | 63.3 | 0.0 | 48.5 |
| GWP | — | 2088 | 125 | 125 | 250 | 250 | 350 | 350 |
| COP Ratio | % (relative to R410A) | 100 | 98.7 | 103.6 | 98.7 | 102.3 | 99.2 | 102.2 |
| Refrigerating Capacity Ratio | % (relative to R410A) | 100 | 105.3 | 62.5 | 109.9 | 77.5 | 112.1 | 87.3 |

TABLE 117

| Item | Unit | Comparative Example 8 C | Comparative Example 9 | Comparative Example 10 C' | Example 1 | Example 2 R | Example 3 | Example 4 T |
|---|---|---|---|---|---|---|---|---|
| HFO-1132(E) | Mass % | 85.5 | 66.1 | 52.1 | 37.8 | 25.5 | 16.6 | 8.6 |
| R32 | Mass % | 0.0 | 10.0 | 18.2 | 27.6 | 36.8 | 44.2 | 51.6 |
| R1234yf | Mass % | 14.5 | 23.9 | 29.7 | 34.6 | 37.7 | 39.2 | 39.8 |
| GWP | — | 1 | 69 | 125 | 188 | 250 | 300 | 350 |
| COP Ratio | % (relative to R410A) | 99.8 | 99.3 | 99.3 | 99.6 | 100.2 | 100.8 | 101.4 |
| Refrigerating Capacity Ratio | % (relative to R410A) | 92.5 | 92.5 | 92.5 | 92.5 | 92.5 | 92.5 | 92.5 |

TABLE 118

| Item | Unit | Comparative Example 11 E | Example 5 | Example 6 N | Example 7 | Example 8 U | Comparative Example 12 G | Example 9 | Example 10 V |
|---|---|---|---|---|---|---|---|---|---|
| HFO-1132(E) | Mass % | 58.3 | 40.5 | 27.7 | 14.9 | 3.9 | 39.6 | 22.8 | 11.0 |
| R32 | Mass % | 0.0 | 10.0 | 18.2 | 27.6 | 36.7 | 0.0 | 10.0 | 18.1 |
| R1234yf | Mass % | 41.7 | 49.5 | 54.1 | 57.5 | 59.4 | 60.4 | 67.2 | 70.9 |
| GWP | — | 2 | 70 | 125 | 189 | 250 | 3 | 70 | 125 |
| COP Ratio | % (relative to R410A) | 100.3 | 100.3 | 100.7 | 101.2 | 101.9 | 101.4 | 101.8 | 102.3 |
| Refrigerating Capacity Ratio | % (relative to R410A) | 80.0 | 80.0 | 80.0 | 80.0 | 80.0 | 70.0 | 70.0 | 70.0 |

TABLE 119

| Item | Unit | Comparative Example 13 I | Example 11 | Example 12 J | Example 13 | Example 14 K | Example 15 | Example 16 L | Example 17 Q |
|---|---|---|---|---|---|---|---|---|---|
| HFO-1132(E) | Mass % | 72.0 | 57.2 | 48.5 | 41.2 | 35.6 | 32.0 | 28.9 | 44.6 |
| R32 | Mass % | 0.0 | 10.0 | 18.3 | 27.6 | 36.8 | 44.2 | 51.7 | 23.0 |
| R1234yf | Mass % | 28.0 | 32.8 | 33.2 | 31.2 | 27.6 | 23.8 | 19.4 | 32.4 |
| GWP | — | 2 | 69 | 125 | 188 | 250 | 300 | 350 | 157 |
| COP Ratio | % (relative to R410A) | 99.9 | 99.5 | 99.4 | 99.5 | 99.6 | 99.8 | 100.1 | 99.4 |
| Refrigerating Capacity Ratio | % (relative to R410A) | 86.6 | 88.4 | 90.9 | 94.2 | 97.7 | 100.5 | 103.3 | 92.5 |

TABLE 120

| Item | Unit | Comparative Example 14 M | Example 18 | Example 19 W | Example 20 | Example 21 N | Example 22 |
|---|---|---|---|---|---|---|---|
| HFO-1132(E) | Mass % | 52.6 | 39.2 | 32.4 | 29.3 | 27.7 | 24.5 |
| R32 | Mass % | 0.0 | 5.0 | 10.0 | 14.5 | 18.2 | 27.6 |
| R1234yf | Mass % | 47.4 | 55.8 | 57.6 | 56.2 | 54.1 | 47.9 |
| GWP | — | 2 | 36 | 70 | 100 | 125 | 188 |
| COP Ratio | % (relative to R410A) | 100.5 | 100.9 | 100.9 | 100.8 | 100.7 | 100.4 |
| Refrigerating Capacity Ratio | % (relative to R410A) | 77.1 | 74.8 | 75.6 | 77.8 | 80.0 | 85.5 |

TABLE 121

| Item | Unit | Example 23 O | Example 24 | Example 25 P | Example 26 S |
|---|---|---|---|---|---|
| HFO-1132(E) | Mass % | 22.6 | 21.2 | 20.5 | 21.9 |
| R32 | Mass % | 36.8 | 44.2 | 51.7 | 39.7 |
| R1234yf | Mass % | 40.6 | 34.6 | 27.8 | 38.4 |
| GWP | — | 250 | 300 | 350 | 270 |
| COP Ratio | % (relative to R410A) | 100.4 | 100.5 | 100.6 | 100.4 |
| Refrigerating Capacity Ratio | % (relative to R410A) | 91.0 | 95.0 | 99.1 | 92.5 |

TABLE 122

| Item | Unit | Comparative Example 15 | Comparative Example 16 | Comparative Example 17 | Comparative Example 18 | Example 27 | Example 28 | Comparative Example 19 | Comparative Example 20 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 5.0 | 5.0 | 5.0 | 5.0 | 5.0 | 5.0 | 5.0 | 5.0 |
| R1234yf | Mass % | 85.0 | 75.0 | 65.0 | 55.0 | 45.0 | 35.0 | 25.0 | 15.0 |
| GWP | — | 37 | 37 | 37 | 36 | 36 | 36 | 35 | 35 |
| COP Ratio | % (relative to R410A) | 103.4 | 102.6 | 101.6 | 100.8 | 100.2 | 99.8 | 99.6 | 99.4 |
| Refrigerating Capacity Ratio | % (relative to R410A) | 56.4 | 63.3 | 69.5 | 75.2 | 80.5 | 85.4 | 90.1 | 94.4 |

TABLE 123

| Item | Unit | Comparative Example 21 | Comparative Example 22 | Example 29 | Comparative Example 23 | Example 30 | Comparative Example 24 | Comparative Example 25 | Comparative Example 26 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 10.0 | 10.0 | 10.0 | 10.0 | 10.0 | 10.0 | 10.0 | 10.0 |
| R1234yf | Mass % | 80.0 | 70.0 | 60.0 | 50.0 | 40.0 | 30.0 | 20.0 | 10.0 |
| GWP | — | 71 | 71 | 70 | 70 | 70 | 69 | 69 | 69 |
| COP Ratio | % (relative to R410A) | 103.1 | 102.1 | 101.1 | 100.4 | 99.8 | 99.5 | 99.2 | 99.1 |
| Refrigerating Capacity Ratio | % (relative to R410A) | 61.8 | 68.3 | 74.3 | 79.7 | 84.9 | 89.7 | 94.2 | 98.4 |

TABLE 124

| Item | Unit | Comparative Example 27 | Example 31 | Comparative Example 28 | Example 32 | Example 33 | Comparative Example 29 | Comparative Example 30 | Comparative Example 31 |
|---|---|---|---|---|---|---|---|---|---|
| HFO-1132(E) | Mass % | 10.0 | 20.0 | 30.0 | 40.0 | 50.0 | 60.0 | 70.0 | 80.0 |
| R32 | Mass % | 15.0 | 15.0 | 15.0 | 15.0 | 15.0 | 15.0 | 15.0 | 15.0 |
| R1234yf | Mass % | 75.0 | 65.0 | 55.0 | 45.0 | 35.0 | 25.0 | 15.0 | 5.0 |
| GWP | — | 104 | 104 | 104 | 103 | 103 | 103 | 103 | 102 |
| COP Ratio | % (relative to R410A) | 102.7 | 101.6 | 100.7 | 100.0 | 99.5 | 99.2 | 99.0 | 98.9 |
| Refrigerating Capacity Ratio | % (relative to R410A) | 66.6 | 72.9 | 78.6 | 84.0 | 89.0 | 93.7 | 98.1 | 102.2 |

TABLE 125

| Item | Unit | Comparative Example 32 | Comparative Example 33 | Comparative Example 34 | Comparative Example 35 | Comparative Example 36 | Comparative Example 37 | Comparative Example 38 | Comparative Example 39 |
|---|---|---|---|---|---|---|---|---|---|
| HFO-1132(E) | Mass % | 10.0 | 20.0 | 30.0 | 40.0 | 50.0 | 60.0 | 70.0 | 10.0 |
| R32 | Mass % | 20.0 | 20.0 | 20.0 | 20.0 | 20.0 | 20.0 | 20.0 | 25.0 |
| R1234yf | Mass % | 70.0 | 60.0 | 50.0 | 40.0 | 30.0 | 20.0 | 10.0 | 65.0 |
| GWP | — | 138 | 138 | 137 | 137 | 137 | 136 | 136 | 171 |
| COP Ratio | % (relative to R410A) | 102.3 | 101.2 | 100.4 | 99.7 | 99.3 | 99.0 | 98.8 | 101.9 |
| Refrigerating Capacity Ratio | % (relative to R410A) | 71.0 | 77.1 | 82.7 | 88.0 | 92.9 | 97.5 | 101.7 | 75.0 |

TABLE 126

| Item | Unit | Example 34 | Comparative Example 40 | Comparative Example 41 | Comparative Example 42 | Comparative Example 43 | Comparative Example 44 | Comparative Example 45 | Example 35 |
|---|---|---|---|---|---|---|---|---|---|
| HFO-1132(E) | Mass % | 20.0 | 30.0 | 40.0 | 50.0 | 60.0 | 70.0 | 10.0 | 20.0 |
| R32 | Mass % | 25.0 | 25.0 | 25.0 | 25.0 | 25.0 | 25.0 | 30.0 | 30.0 |
| R1234yf | Mass % | 55.0 | 45.0 | 35.0 | 25.0 | 15.0 | 5.0 | 60.0 | 50.0 |
| GWP | — | 171 | 171 | 171 | 170 | 170 | 170 | 205 | 205 |
| COP Ratio | % (relative to R410A) | 100.9 | 100.1 | 99.6 | 99.2 | 98.9 | 98.7 | 101.6 | 100.7 |
| Refrigerating Capacity Ratio | % (relative to R410A) | 81.0 | 86.6 | 91.7 | 96.5 | 101.0 | 105.2 | 78.9 | 84.8 |

TABLE 127

| Item | Unit | Comparative Example 46 | Comparative Example 47 | Comparative Example 48 | Comparative Example 49 | Example 36 | Example 37 | Example 38 | Comparative Example 50 |
|---|---|---|---|---|---|---|---|---|---|
| HFO-1132(E) | Mass % | 30.0 | 40.0 | 50.0 | 60.0 | 10.0 | 20.0 | 30.0 | 40.0 |
| R32 | Mass % | 30.0 | 30.0 | 30.0 | 30.0 | 35.0 | 35.0 | 35.0 | 35.0 |
| R1234yf | Mass % | 40.0 | 30.0 | 20.0 | 10.0 | 55.0 | 45.0 | 35.0 | 25.0 |
| GWP | — | 204 | 204 | 204 | 204 | 239 | 238 | 238 | 238 |
| COP Ratio | % (relative to R410A) | 100.0 | 99.5 | 99.1 | 98.8 | 101.4 | 100.6 | 99.9 | 99.4 |
| Refrigerating Capacity Ratio | % (relative to R410A) | 90.2 | 95.3 | 100.0 | 104.4 | 82.5 | 88.3 | 93.7 | 98.6 |

TABLE 128

| Item | Unit | Comparative Example 51 | Comparative Example 52 | Comparative Example 53 | Comparative Example 54 | Example 39 | Comparative Example 55 | Comparative Example 56 | Comparative Example 57 |
|---|---|---|---|---|---|---|---|---|---|
| HFO-1132(E) | Mass % | 50.0 | 60.0 | 10.0 | 20.0 | 30.0 | 40.0 | 50.0 | 10.0 |
| R32 | Mass % | 35.0 | 35.0 | 40.0 | 40.0 | 40.0 | 40.0 | 40.0 | 45.0 |
| R1234yf | Mass % | 15.0 | 5.0 | 50.0 | 40.0 | 30.0 | 20.0 | 10.0 | 45.0 |
| GWP | — | 237 | 237 | 272 | 272 | 272 | 271 | 271 | 306 |
| COP Ratio | % (relative to R410A) | 99.0 | 98.8 | 101.3 | 100.6 | 99.9 | 99.4 | 99.0 | 101.3 |
| Refrigerating Capacity Ratio | % (relative to R410A) | 103.2 | 107.5 | 86.0 | 91.7 | 96.9 | 101.8 | 106.3 | 89.3 |

TABLE 129

| Item | Unit | Example 40 | Example 41 | Comparative Example 58 | Comparative Example 59 | Comparative Example 60 | Example 42 | Comparative Example 61 | Comparative Example 62 |
|---|---|---|---|---|---|---|---|---|---|
| HFO-1132(E) | Mass % | 20.0 | 30.0 | 40.0 | 50.0 | 10.0 | 20.0 | 30.0 | 40.0 |
| R32 | Mass % | 45.0 | 45.0 | 45.0 | 45.0 | 50.0 | 50.0 | 50.0 | 50.0 |
| R1234yf | Mass % | 35.0 | 25.0 | 15.0 | 5.0 | 40.0 | 30.0 | 20.0 | 10.0 |
| GWP | — | 305 | 305 | 305 | 304 | 339 | 339 | 339 | 338 |
| COP Ratio | % (relative to R410A) | 100.6 | 100.0 | 99.5 | 99.1 | 101.3 | 100.6 | 100.0 | 99.5 |
| Refrigerating Capacity Ratio | % (relative to R410A) | 94.9 | 100.0 | 104.7 | 109.2 | 92.4 | 97.8 | 102.9 | 107.5 |

TABLE 130

| Item | Unit | Comparative Example 63 | Comparative Example 64 | Comparative Example 65 | Comparative Example 66 | Example 43 | Example 44 | Example 45 | Example 46 |
|---|---|---|---|---|---|---|---|---|---|
| HFO-1132(E) | Mass % | 10.0 | 20.0 | 30.0 | 40.0 | 56.0 | 59.0 | 62.0 | 65.0 |
| R32 | Mass % | 55.0 | 55.0 | 55.0 | 55.0 | 3.0 | 3.0 | 3.0 | 3.0 |
| R1234yf | Mass % | 35.0 | 25.0 | 15.0 | 5.0 | 41.0 | 38.0 | 35.0 | 32.0 |
| GWP | — | 373 | 372 | 372 | 372 | 22 | 22 | 22 | 22 |
| COP Ratio | % (relative to R410A) | 101.4 | 100.7 | 100.1 | 99.6 | 100.1 | 100.0 | 99.9 | 99.8 |
| Refrigerating Capacity Ratio | % (relative to R410A) | 95.3 | 100.6 | 105.6 | 110.2 | 81.7 | 83.2 | 84.6 | 86.0 |

TABLE 131

| Item | Unit | Example 47 | Example 48 | Example 49 | Example 50 | Example 51 | Example 52 | Example 53 | Example 54 |
|---|---|---|---|---|---|---|---|---|---|
| HFO-1132(E) | Mass % | 49.0 | 52.0 | 55.0 | 58.0 | 61.0 | 43.0 | 46.0 | 49.0 |
| R32 | Mass % | 6.0 | 6.0 | 6.0 | 6.0 | 6.0 | 9.0 | 9.0 | 9.0 |
| R1234yf | Mass % | 45.0 | 42.0 | 39.0 | 36.0 | 33.0 | 48.0 | 45.0 | 42.0 |
| GWP | — | 43 | 43 | 43 | 43 | 42 | 63 | 63 | 63 |
| COP Ratio | % (relative to R410A) | 100.2 | 100.0 | 99.9 | 99.8 | 99.7 | 100.3 | 100.1 | 99.9 |
| Refrigerating Capacity Ratio | % (relative to R410A) | 80.9 | 82.4 | 83.9 | 85.4 | 86.8 | 80.4 | 82.0 | 83.5 |

TABLE 132

| Item | Unit | Example 55 | Example 56 | Example 57 | Example 58 | Example 59 | Example 60 | Example 61 | Example 62 |
|---|---|---|---|---|---|---|---|---|---|
| HFO-1132(E) | Mass % | 52.0 | 55.0 | 58.0 | 38.0 | 41.0 | 44.0 | 47.0 | 50.0 |
| R32 | Mass % | 9.0 | 9.0 | 9.0 | 12.0 | 12.0 | 12.0 | 12.0 | 12.0 |
| R1234yf | Mass % | 39.0 | 36.0 | 33.0 | 50.0 | 47.0 | 44.0 | 41.0 | 38.0 |
| GWP | — | 63 | 63 | 63 | 83 | 83 | 83 | 83 | 83 |
| COP Ratio | % (relative to R410A) | 99.8 | 99.7 | 99.6 | 100.3 | 100.1 | 100.0 | 99.8 | 99.7 |
| Refrigerating Capacity Ratio | % (relative to R410A) | 85.0 | 86.5 | 87.9 | 80.4 | 82.0 | 83.5 | 85.1 | 86.6 |

TABLE 133

| Item | Unit | Example 63 | Example 64 | Example 65 | Example 66 | Example 67 | Example 68 | Example 69 | Example 70 |
|---|---|---|---|---|---|---|---|---|---|
| HFO-1132(E) | Mass % | 53.0 | 33.0 | 36.0 | 39.0 | 42.0 | 45.0 | 48.0 | 51.0 |
| R32 | Mass % | 12.0 | 15.0 | 15.0 | 15.0 | 15.0 | 15.0 | 15.0 | 15.0 |
| R1234yf | Mass % | 35.0 | 52.0 | 49.0 | 46.0 | 43.0 | 40.0 | 37.0 | 34.0 |
| GWP | — | 83 | 104 | 104 | 103 | 103 | 103 | 103 | 103 |
| COP Ratio | % (relative to R410A) | 99.6 | 100.5 | 100.3 | 100.1 | 99.9 | 99.7 | 99.6 | 99.5 |
| Refrigerating Capacity Ratio | % (relative to R410A) | 88.0 | 80.3 | 81.9 | 83.5 | 85.0 | 86.5 | 88.0 | 89.5 |

TABLE 134

| Item | Unit | Example 71 | Example 72 | Example 73 | Example 74 | Example 75 | Example 76 | Example 77 | Example 78 |
|---|---|---|---|---|---|---|---|---|---|
| HFO-1132(E) | Mass % | 29.0 | 32.0 | 35.0 | 38.0 | 41.0 | 44.0 | 47.0 | 36.0 |
| R32 | Mass % | 18.0 | 18.0 | 18.0 | 18.0 | 18.0 | 18.0 | 18.0 | 3.0 |
| R1234yf | Mass % | 53.0 | 50.0 | 47.0 | 44.0 | 41.0 | 38.0 | 35.0 | 61.0 |
| GWP | — | 124 | 124 | 124 | 124 | 124 | 123 | 123 | 23 |
| COP Ratio | % (relative to R410A) | 100.6 | 100.3 | 100.1 | 99.9 | 99.8 | 99.6 | 99.5 | 101.3 |
| Refrigerating Capacity Ratio | % (relative to R410A) | 80.6 | 82.2 | 83.8 | 85.4 | 86.9 | 88.4 | 89.9 | 71.0 |

TABLE 135

| Item | Unit | Example 79 | Example 80 | Example 81 | Example 82 | Example 83 | Example 84 | Example 85 | Example 86 |
|---|---|---|---|---|---|---|---|---|---|
| HFO-1132(E) | Mass % | 39.0 | 42.0 | 30.0 | 33.0 | 36.0 | 26.0 | 29.0 | 32.0 |
| R32 | Mass % | 3.0 | 3.0 | 6.0 | 6.0 | 6.0 | 9.0 | 9.0 | 9.0 |
| R1234yf | Mass % | 58.0 | 55.0 | 64.0 | 61.0 | 58.0 | 65.0 | 62.0 | 59.0 |
| GWP | — | 23 | 23 | 43 | 43 | 43 | 64 | 64 | 63 |
| COP Ratio | % (relative to R410A) | 101.1 | 100.9 | 101.5 | 101.3 | 101.0 | 101.6 | 101.3 | 101.1 |
| Refrigerating Capacity Ratio | % (relative to R410A) | 72.7 | 74.4 | 70.5 | 72.2 | 73.9 | 71.0 | 72.8 | 74.5 |

TABLE 136

| Item | Unit | Example 87 | Example 88 | Example 89 | Example 90 | Example 91 | Example 92 | Example 93 | Example 94 |
|---|---|---|---|---|---|---|---|---|---|
| HFO-1132(E) | Mass % | 21.0 | 24.0 | 27.0 | 30.0 | 16.0 | 19.0 | 22.0 | 25.0 |
| R32 | Mass % | 12.0 | 12.0 | 12.0 | 12.0 | 15.0 | 15.0 | 15.0 | 15.0 |
| R1234yf | Mass % | 67.0 | 64.0 | 61.0 | 58.0 | 69.0 | 66.0 | 63.0 | 60.0 |
| GWP | — | 84 | 84 | 84 | 84 | 104 | 104 | 104 | 104 |
| COP Ratio | % (relative to R410A) | 101.8 | 101.5 | 101.2 | 101.0 | 102.1 | 101.8 | 101.4 | 101.2 |
| Refrigerating Capacity Ratio | % (relative to R410A) | 70.8 | 72.6 | 74.3 | 76.0 | 70.4 | 72.3 | 74.0 | 75.8 |

TABLE 137

| Item | Unit | Example 95 | Example 96 | Example 97 | Example 98 | Example 99 | Example 100 | Example 101 | Example 102 |
|---|---|---|---|---|---|---|---|---|---|
| HFO-1132(E) | Mass % | 28.0 | 12.0 | 15.0 | 18.0 | 21.0 | 24.0 | 27.0 | 25.0 |
| R32 | Mass % | 15.0 | 18.0 | 18.0 | 18.0 | 18.0 | 18.0 | 18.0 | 21.0 |
| R1234yf | Mass % | 57.0 | 70.0 | 67.0 | 64.0 | 61.0 | 58.0 | 55.0 | 54.0 |
| GWP | — | 104 | 124 | 124 | 124 | 124 | 124 | 124 | 144 |
| COP Ratio | % (relative to R410A) | 100.9 | 102.2 | 101.9 | 101.6 | 101.3 | 101.0 | 100.7 | 100.7 |
| Refrigerating Capacity Ratio | % (relative to R410A) | 77.5 | 70.5 | 72.4 | 74.2 | 76.0 | 77.7 | 79.4 | 80.7 |

TABLE 138

| Item | Unit | Example 103 | Example 104 | Example 105 | Example 106 | Example 107 | Example 108 | Example 109 | Example 110 |
|---|---|---|---|---|---|---|---|---|---|
| HFO-1132(E) | Mass % | 21.0 | 24.0 | 17.0 | 20.0 | 23.0 | 13.0 | 16.0 | 19.0 |
| R32 | Mass % | 24.0 | 24.0 | 27.0 | 27.0 | 27.0 | 30.0 | 30.0 | 30.0 |
| R1234yf | Mass % | 55.0 | 52.0 | 56.0 | 53.0 | 50.0 | 57.0 | 54.0 | 51.0 |
| GWP | — | 164 | 164 | 185 | 185 | 184 | 205 | 205 | 205 |
| COP Ratio | % (relative to R410A) | 100.9 | 100.6 | 101.1 | 100.8 | 100.6 | 101.3 | 101.0 | 100.8 |
| Refrigerating Capacity Ratio | % (relative to R410A) | 80.8 | 82.5 | 80.8 | 82.5 | 84.2 | 80.7 | 82.5 | 84.2 |

TABLE 139

| Item | Unit | Example 111 | Example 112 | Example 113 | Example 114 | Example 115 | Example 116 | Example 117 | Example 118 |
|---|---|---|---|---|---|---|---|---|---|
| HFO-1132(E) | Mass % | 22.0 | 9.0 | 12.0 | 15.0 | 18.0 | 21.0 | 8.0 | 12.0 |
| R32 | Mass % | 30.0 | 33.0 | 33.0 | 33.0 | 33.0 | 33.0 | 36.0 | 36.0 |
| R1234yf | Mass % | 48.0 | 58.0 | 55.0 | 52.0 | 49.0 | 46.0 | 56.0 | 52.0 |
| GWP | — | 205 | 225 | 225 | 225 | 225 | 225 | 245 | 245 |
| COP Ratio | % (relative to R410A) | 100.5 | 101.6 | 101.3 | 101.0 | 100.8 | 100.5 | 101.6 | 101.2 |
| Refrigerating Capacity Ratio | % (relative to R410A) | 85.9 | 80.5 | 82.3 | 84.1 | 85.8 | 87.5 | 82.0 | 84.4 |

TABLE 140

| Item | Unit | Example 119 | Example 120 | Example 121 | Example 122 | Example 123 | Example 124 | Example 125 | Example 126 |
|---|---|---|---|---|---|---|---|---|---|
| HFO-1132(E) | Mass % | 15.0 | 18.0 | 21.0 | 42.0 | 39.0 | 34.0 | 37.0 | 30.0 |
| R32 | Mass % | 36.0 | 36.0 | 36.0 | 25.0 | 28.0 | 31.0 | 31.0 | 34.0 |
| R1234yf | Mass % | 49.0 | 46.0 | 43.0 | 33.0 | 33.0 | 35.0 | 32.0 | 36.0 |
| GWP | — | 245 | 245 | 245 | 170 | 191 | 211 | 211 | 231 |
| COP Ratio | % (relative to R410A) | 101.0 | 100.7 | 100.5 | 99.5 | 99.5 | 99.8 | 99.6 | 99.9 |
| Refrigerating Capacity Ratio | % (relative to R410A) | 86.2 | 87.9 | 89.6 | 92.7 | 93.4 | 93.0 | 94.5 | 93.0 |

TABLE 141

| Item | Unit | Example 127 | Example 128 | Example 129 | Example 130 | Example 131 | Example 132 | Example 133 | Example 134 |
|---|---|---|---|---|---|---|---|---|---|
| HFO-1132(E) | Mass % | 33.0 | 36.0 | 24.0 | 27.0 | 30.0 | 33.0 | 23.0 | 26.0 |
| R32 | Mass % | 34.0 | 34.0 | 37.0 | 37.0 | 37.0 | 37.0 | 40.0 | 40.0 |
| R1234yf | Mass % | 33.0 | 30.0 | 39.0 | 36.0 | 33.0 | 30.0 | 37.0 | 34.0 |
| GWP | — | 231 | 231 | 252 | 251 | 251 | 251 | 272 | 272 |
| COP Ratio | % (relative to R410A) | 99.8 | 99.6 | 100.3 | 100.1 | 99.9 | 99.8 | 100.4 | 100.2 |
| Refrigerating Capacity Ratio | % (relative to R410A) | 94.5 | 96.0 | 91.9 | 93.4 | 95.0 | 96.5 | 93.3 | 94.9 |

TABLE 142

| Item | Unit | Example 135 | Example 136 | Example 137 | Example 138 | Example 139 | Example 140 | Example 141 | Example 142 |
|---|---|---|---|---|---|---|---|---|---|
| HFO-1132(E) | Mass % | 29.0 | 32.0 | 19.0 | 22.0 | 25.0 | 28.0 | 31.0 | 18.0 |
| R32 | Mass % | 40.0 | 40.0 | 43.0 | 43.0 | 43.0 | 43.0 | 43.0 | 46.0 |
| R1234yf | Mass % | 31.0 | 28.0 | 38.0 | 35.0 | 32.0 | 29.0 | 26.0 | 36.0 |
| GWP | — | 272 | 271 | 292 | 292 | 292 | 292 | 292 | 312 |
| COP Ratio | % (relative to R410A) | 100.0 | 99.8 | 100.6 | 100.4 | 100.2 | 100.1 | 99.9 | 100.7 |
| Refrigerating Capacity Ratio | % (relative to R410A) | 96.4 | 97.9 | 93.1 | 94.7 | 96.2 | 97.8 | 99.3 | 94.4 |

TABLE 143

| Item | Unit | Example 143 | Example 144 | Example 145 | Example 146 | Example 147 | Example 148 | Example 149 | Example 150 |
|---|---|---|---|---|---|---|---|---|---|
| HFO-1132(E) | Mass % | 21.0 | 23.0 | 26.0 | 29.0 | 13.0 | 16.0 | 19.0 | 22.0 |
| R32 | Mass % | 46.0 | 46.0 | 46.0 | 46.0 | 49.0 | 49.0 | 49.0 | 49.0 |
| R1234yf | Mass % | 33.0 | 31.0 | 28.0 | 25.0 | 38.0 | 35.0 | 32.0 | 29.0 |
| GWP | — | 312 | 312 | 312 | 312 | 332 | 332 | 332 | 332 |
| COP Ratio | % (relative to R410A) | 100.5 | 100.4 | 100.2 | 100.0 | 101.1 | 100.9 | 100.7 | 100.5 |
| Refrigerating Capacity Ratio | % (relative to R410A) | 96.0 | 97.0 | 98.6 | 100.1 | 93.5 | 95.1 | 96.7 | 98.3 |

TABLE 144

| Item | Unit | Example 151 | Example 152 |
|---|---|---|---|
| HFO-1132(E) | Mass % | 25.0 | 28.0 |
| R32 | Mass % | 49.0 | 49.0 |
| R1234yf | Mass % | 26.0 | 23.0 |
| GWP | — | 332 | 332 |
| COP Ratio | % (relative to R410A) | 100.3 | 100.1 |
| Refrigerating Capacity Ratio | % (relative to R410A) | 99.8 | 101.3 |

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI),
the line segment IJ is represented by coordinates $(0.0236y^2-1.7616y+72.0, y, -0.0236y^2+0.7616y+28.0)$,
the line segment NE is represented by coordinates $(0.012y^2-1.9003y+58.3, y, -0.012y^2+0.9003y+41.7)$, and
the line segments JN and EI are straight lines, the refrigerant D has a refrigerating capacity ratio of 80% or more relative to R410A, a GWP of 125 or less, and a WCF lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments MM', M'N, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM),
the line segment MM' is represented by coordinates $(0.132y^2-3.34y+52.6, y, -0.132y^2+2.34y+47.4)$,
the line segment M'N is represented by coordinates $(0.0596y^2-2.2541y+48.98, y, -0.0596y^2+1.2541y+51.02)$,
the line segment VG is represented by coordinates $(0.0123y^2-1.8033y+39.6, y, -0.0123y^2+0.8033y+60.4)$, and
the line segments NV and GM are straight lines, the refrigerant D according to the present disclosure has a refrigerating capacity ratio of 70% or more relative to R410A, a GWP of 125 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments,
the line segment ON is represented by coordinates $(0.0072y^2-0.6701y+37.512, y, -0.0072y^2-0.3299y+62.488)$,
the line segment NU is represented by coordinates $(0.0083y^2-1.7403y+56.635, y, -0.0083y^2+0.7403y+43.365)$, and
the line segment UO is a straight line, the refrigerant D according to the present disclosure has a refrigerating capacity ratio of 80% or more relative to R410A, a GWP of 250 or less, and an ASHRAE lower flammability.

The results also indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments,
the line segment QR is represented by coordinates $(0.0099y^2-1.975y+84.765, y, -0.0099y^2+0.975y+15.235)$,
the line segment RT is represented by coordinates $(0.0082y^2-1.8683y+83.126, y, -0.0082y^2+0.8683y+16.874)$,
the line segment LK is represented by coordinates $(0.0049y^2-0.8842y+61.488, y, -0.0049y^2-0.1158y+38.512)$,
the line segment KQ is represented by coordinates $(0.0095y^2-1.2222y+67.676, y, -0.0095y^2+0.2222y+32.324)$, and
the line segment TL is a straight line, the refrigerant D according to the present disclosure has a refrigerating capacity ratio of 92.5% or more relative to R410A, a GWP of 350 or less, and a WCF lower flammability.

The results further indicate that under the condition that the mass % of HFO-1132(E), R32, and R1234yf based on their sum is respectively represented by x, y, and z, when coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments,
the line segment PS is represented by coordinates $(0.0064y^2-0.7103y+40.1, y, -0.0064y^2-0.2897y+59.9)$,
the line segment ST is represented by coordinates $(0.0082y^2-1.8683y+83.126, y, -0.0082y^2+0.8683y+16.874)$, and
the line segment TP is a straight line, the refrigerant D according to the present disclosure has a refrigerating capacity ratio of 92.5% or more relative to R410A, a GWP of 350 or less, and an ASHRAE lower flammability.

(5-5) Refrigerant E The refrigerant E according to the present disclosure is a mixed refrigerant comprising trans-1,2-difluoroethylene (HFO-1132(E)), trifluoroethylene (HFO-1123), and difluoromethane (R32).

The refrigerant E according to the present disclosure has various properties that are desirable as an R410A-alternative refrigerant, i.e., a coefficient of performance equivalent to that of R410A and a sufficiently low GWP.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments IK, KB', B'H, HR, RG, and GI that connect the following 6 points:
point I (72.0, 28.0, 0.0),
point K (48.4, 33.2, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GI);
the line segment IK is represented by coordinates $(0.025z^2-1.7429z+72.00, -0.025z^2+0.7429z+28.0, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments KB' and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments J, JR, RG, and GI that connect the following 4 points:
point I (72.0, 28.0, 0.0),
point J (57.7, 32.8, 9.5),
point R (23.1, 67.4, 9.5), and
point G (38.5, 61.5, 0.0),
or on these line segments (excluding the points on the line segment GI);
the line segment IJ is represented by coordinates $(0.025z^2-1.7429z+72.0, -0.025z^2+0.7429z+28.0, z)$,
the line segment RG is represented by coordinates $(-0.0491z^2-1.1544z+38.5, 0.0491z^2+0.1544z+61.5, z)$, and
the line segments JR and GI are straight lines. When the requirements above are satisfied, the refrigerant according to the present disclosure has WCF lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MP, PB', B'H, HR, RG, and GM that connect the following 6 points:
point M (47.1, 52.9, 0.0),
point P (31.8, 49.8, 18.4),
point B' (0.0, 81.6, 18.4),
point H (0.0, 84.2, 15.8),
point R (23.1, 67.4, 9.5), and
point G (38.5, 61.5, 0.0),
or on these line segments (excluding the points on the line segments B'H and GM);
the line segment MP is represented by coordinates $(0.0083z^2-0.984z+47.1, -0.0083z^2-0.016z+52.9, z)$,
the line segment HR is represented by coordinates $(-0.3123z^2+4.234z+11.06, 0.3123z^2-5.234z+88.94, z)$,
the line segment RG is represented by coordinates $(-0.0491z^2-1.1544z+38.5, 0.0491z^2+0.1544z+61.5, z)$, and
the line segments PB' and GM are straight lines. When the requirements above are satisfied, the refrigerant according to the present disclosure has ASHRAE lower flammability, a COP ratio of 93% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments MN, NR, RG, and GM that connect the following 4 points:
point M (47.1, 52.9, 0.0),
point N (38.5, 52.1, 9.5),
point R (23.1, 67.4, 9.5), and
point G (38.5, 61.5, 0.0),
or on these line segments (excluding the points on the line segment GM);
the line segment MN is represented by coordinates $(0.0083z^2-0.984z+47.1, -0.0083z^2-0.016z+52.9, z)$,
the line segment RG is represented by coordinates $(-0.0491z^2-1.1544z+38.5, 0.0491z^2+0.1544z+61.5, z)$,
the line segments NR and GM are straight lines. When the requirements above are satisfied, the refrigerant according to the present disclosure has ASHRAE lower flammability, a COP ratio of 93% or more relative to that of R410A, and a GWP of 65 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments PS, ST, and TP that connect the following 3 points:
point P (31.8, 49.8, 18.4),
point S (25.4, 56.2, 18.4), and
point T (34.8, 51.0, 14.2),
or on these line segments;
the line segment ST is represented by coordinates $(-0.0982z^2+0.9622z+40.931, 0.0982z^2-1.9622z+59.069, z)$,
the line segment TP is represented by coordinates $(0.0083z^2-0.984z+47.1, -0.0083z^2-0.016z+52.9, z)$, and
the line segment PS is a straight line. When the requirements above are satisfied, the refrigerant according to the present disclosure has ASHRAE lower flammability, a COP ratio of 94.5% or more relative to that of R410A, and a GWP of 125 or less.

The refrigerant E according to the present disclosure is preferably a refrigerant wherein when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments QB", B"D, DU, and UQ that connect the following 4 points:
point Q (28.6, 34.4, 37.0),
point B" (0.0, 63.0, 37.0),
point D (0.0, 67.0, 33.0), and
point U (28.7, 41.2, 30.1),
or on these line segments (excluding the points on the line segment B"D);
the line segment DU is represented by coordinates $(-3.4962z^2+210.71z-3146.1, 3.4962z^2-211.71z+3246.1, z)$,
the line segment UQ is represented by coordinates $(0.0135z^2-0.9181z+44.133, -0.0135z^2-0.0819z+55.867, z)$, and
the line segments QB" and B"D are straight lines. When the requirements above are satisfied, the refrigerant according to the present disclosure has ASHRAE lower flammability, a COP ratio of 96% or more relative to that of R410A, and a GWP of 250 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'e', e'a', and a'O that connect the following 5 points:
point O (100.0, 0.0, 0.0),
point c' (56.7, 43.3, 0.0),
point d' (52.2, 38.3, 9.5),
point e' (41.8, 39.8, 18.4), and
point a' (81.6, 0.0, 18.4),
or on the line segments c'd', d'e', and e'a' (excluding the points c' and a');
the line segment c'd' is represented by coordinates $(-0.0297z^2-0.1915z+56.7, 0.0297z^2+1.1915z+43.3, z)$,
the line segment d'e' is represented by coordinates $(-0.0535z^2+0.3229z+53.957, 0.0535z^2+0.6771z+46.043, z)$, and
the line segments Oc', e'a', and a'O are straight lines. When the requirements above are satisfied, the refrigerant according to the present disclosure has a COP ratio of 92.5% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, de, ea', and a'O that connect the following 5 points:
point O (100.0, 0.0, 0.0),
point c (77.7, 22.3, 0.0),
point d (76.3, 14.2, 9.5),
point e (72.2, 9.4, 18.4), and
point a' (81.6, 0.0, 18.4),
or on the line segments cd, de, and ea' (excluding the points c and a');
the line segment cde is represented by coordinates $(-0.017z^2+0.0148z+77.684, 0.017z^2+0.9852z+22.316, z)$, and
the line segments Oc, ea', and a'O are straight lines. When the requirements above are satisfied, the refrigerant according to the present disclosure has a COP ratio of 95% or more relative to that of R410A, and a GWP of 125 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc', c'd', d'a, and aO that connect the following 5 points:
point O (100.0, 0.0, 0.0),
point c' (56.7, 43.3, 0.0),
point d' (52.2, 38.3, 9.5), and
point a (90.5, 0.0, 9.5),
or on the line segments c'd' and d'a (excluding the points c' and a);
the line segment c'd' is represented by coordinates $(-0.0297z^2-0.1915z+56.7, 0.0297z^2+1.1915z+43.3, z)$, and
the line segments Oc', d'a, and aO are straight lines. When the requirements above are satisfied, the refrigerant according to the present disclosure has a COP ratio of 93.5% or more relative to that of R410A, and a GWP of 65 or less.

The refrigerant E according to the present disclosure is preferably a refrigerant wherein
when the mass % of HFO-1132(E), HFO-1123, and R32 based on their sum is respectively represented by x, y, and z, coordinates (x,y,z) in a ternary composition diagram in which the sum of HFO-1132(E), HFO-1123, and R32 is 100 mass % are within the range of a figure surrounded by line segments Oc, cd, da, and aO that connect the following 4 points:
point O (100.0, 0.0, 0.0),
point c (77.7, 22.3, 0.0),
point d (76.3, 14.2, 9.5), and
point a (90.5, 0.0, 9.5),
or on the line segments cd and da (excluding the points c and a);
the line segment cd is represented by coordinates $(-0.017z^2+0.0148z+77.684, 0.017z^2+0.9852z+22.316, z)$, and
the line segments Oc, da, and aO are straight lines. When the requirements above are satisfied, the refrigerant according to the present disclosure has a COP ratio of 95% or more relative to that of R410A, and a GWP of 65 or less.

The refrigerant E according to the present disclosure may further comprise other additional refrigerants in addition to HFO-1132(E), HFO-1123, and R32, as long as the above properties and effects are not impaired. In this respect, the refrigerant according to the present disclosure preferably comprises HFO-1132(E), HFO-1123, and R32 in a total amount of 99.5 mass % or more, more preferably 99.75 mass % or more, and even more preferably 99.9 mass % or more, based on the entire refrigerant.

Such additional refrigerants are not limited, and can be selected from a wide range of refrigerants. The mixed refrigerant may comprise a single additional refrigerant, or two or more additional refrigerants.

(Examples of Refrigerant E)

The present disclosure is described in more detail below with reference to Examples of refrigerant E. However, the refrigerant E is not limited to the Examples.

Mixed refrigerants were prepared by mixing HFO-1132 (E), HFO-1123, and R32 at mass % based on their sum shown in Tables 145 and 146.

The composition of each mixture was defined as WCF. A leak simulation was performed using National Institute of Science and Technology (NIST) Standard Reference Data Base Refleak Version 4.0 under the conditions for equipment, storage, shipping, leak, and recharge according to the ASHRAE Standard 34-2013. The most flammable fraction was defined as WCFF.

For each mixed refrigerant, the burning velocity was measured according to the ANSI/ASHRAE Standard 34-2013. When the burning velocities of the WCF composition and the WCFF composition are 10 cm/s or less, the flammability of such a refrigerant is classified as Class 2L (lower flammability) in the ASHRAE flammability classification.

A burning velocity test was performed using the apparatus shown in FIG. 1 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two light transmission acrylic windows was used as the sample cell, and a xenon lamp was used as the light source. Schlieren images of the flame were recorded by a high-speed digital video camera at a frame rate of 600 fps and stored on a PC.

Tables 145 and 146 show the results.

TABLE 145

| Item | | Unit | I | J | K | L |
|---|---|---|---|---|---|---|
| WCF | HFO-1132(E) | mass % | 72.0 | 57.7 | 48.4 | 35.5 |
|  | HFO-1123 | mass % | 28.0 | 32.8 | 33.2 | 27.5 |
|  | R32 | mass % | 0.0 | 9.5 | 18.4 | 37.0 |
| Burning velocity (WCF) | | cm/s | 10 | 10 | 10 | 10 | when coordinates (x,y,z) are on or below line segments IK and KL that connect the following 3 points:
point I (72.0, 28.0, 0.0),
point K (48.4, 33.2, 18.4), and
point L (35.5, 27.5, 37.0);
the line segment IK is represented by coordinates ($0.025z^2 - 1.7429z + 72.00$, $-0.025z^2 + 0.7429z + 28.00$, z), and
the line segment KL is represented by coordinates ($0.0098z^2 - 1.238z + 67.852$, $-0.0098z^2 + 0.238z + 32.148$, z), it can be determined that the refrigerant has WCF lower flammability.

For the points on the line segment IK, an approximate curve ($x = 0.025z^2 - 1.7429z + 72.00$) was obtained from three points, i.e., I (72.0, 28.0, 0.0), J (57.7, 32.8, 9.5), and K (48.4, 33.2, 18.4) by using the least-square method to determine coordinates ($x = 0.025z^2 - 1.7429z + 72.00$, $y = 100 - z - x = -0.00922z^2 + 0.2114z + 32.443$, z).

Likewise, for the points on the line segment KL, an approximate curve was determined from three points, i.e., K (48.4, 33.2, 18.4), Example 10 (41.1, 31.2, 27.7), and L (35.5, 27.5, 37.0) by using the least-square method to determine coordinates.

The results in Table 146 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, when coordinates (x,y,z) are on or below line segments MP and PQ that connect the following 3 points:
point M (47.1, 52.9, 0.0),
point P (31.8, 49.8, 18.4), and
point Q (28.6, 34.4, 37.0),
it can be determined that the refrigerant has ASHRAE lower flammability.

In the above, the line segment MP is represented by coordinates ($0.0083z^2 - 0.984z + 47.1$, $-0.0083z^2 - 0.016z + 52.9$, z), and the line segment PQ is represented by coordinates ($0.0135z^2 - 0.9181z + 44.133$, $-0.0135z^2 - 0.0819z + 55.867$, z).

TABLE 146

| Item | | Unit | M | N | T | P | U | Q |
|---|---|---|---|---|---|---|---|---|
| WCF | HFO-1132(E) | mass % | 47.1 | 38.5 | 34.8 | 31.8 | 28.7 | 28.6 |
|  | HFO-1123 | mass % | 52.9 | 52.1 | 51.0 | 49.8 | 41.2 | 34.4 |
|  | R32 | mass % | 0.0 | 9.5 | 14.2 | 18.4 | 30.1 | 37.0 |
| Leak condition that results in WCFF | | | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side | Storage, Shipping, −40° C., 92%, release, on the liquid phase side |
| WCFF | HFO-1132(E) | mass % | 72.0 | 58.9 | 51.5 | 44.6 | 31.4 | 27.1 |
|  | HFO-1123 | mass % | 28.0 | 32.4 | 33.1 | 32.6 | 23.2 | 18.3 |
|  | R32 | mass % | 0.0 | 8.7 | 15.4 | 22.8 | 45.4 | 54.6 |
| Burning velocity (WCF) | | cm/s | 8 or less | 8 or less | 8 or less | 8 or less | 8 or less | 8 or less |
| Burning velocity (WCFF) | | cm/s | 10 | 10 | 10 | 10 | 10 | 10 |

The results in Table 1 indicate that in a ternary composition diagram of a mixed refrigerant of HFO-1132(E), HFO-1123, and R32 in which their sum is 100 mass %, a line segment connecting a point (0.0, 100.0, 0.0) and a point (0.0, 0.0, 100.0) is the base, the point (0.0, 100.0, 0.0) is on the left side, and the point (0.0, 0.0, 100.0) is on the right side, For the points on the line segment MP, an approximate curve was obtained from three points, i.e., points M, N, and P, by using the least-square method to determine coordinates. For the points on the line segment PQ, an approximate curve was obtained from three points, i.e., points P, U, and Q, by using the least-square method to determine coordinates.

The GWP of compositions each comprising a mixture of R410A (R32=50%/R125=50%) was evaluated based on the values stated in the Intergovernmental Panel on Climate Change (IPCC), fourth report. The GWP of HFO-1132(E), which was not stated therein, was assumed to be 1 from HFO-1132a (GWP=1 or less) and HFO-1123 (GWP=0.3, described in Patent Literature 1). The refrigerating capacity of compositions each comprising R410A and a mixture of HFO-1132(E) and HFO-1123 was determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

The COP ratio and the refrigerating capacity (which may be referred to as "cooling capacity" or "capacity") ratio relative to those of R410 of the mixed refrigerants were determined. The conditions for calculation were as described below.

Evaporating temperature: 5° C.

Condensation temperature: 45° C.

Degree of superheating: 5K

Degree of subcooling: 5K

Compressor efficiency: 70%

Tables 147 to 166 show these values together with the GWP of each mixed refrigerant.

TABLE 147

| Item | Unit | Comparative Example 1 | Comparative Example 2 A | Comparative Example 3 B | Comparative Example 4 A' | Comparative Example 5 B' | Comparative Example 6 A" | Comparative Example 7 B" |
|---|---|---|---|---|---|---|---|---|
| HFO-1132(E) | mass % | R410A | 90.5 | 0.0 | 81.6 | 0.0 | 63.0 | 0.0 |
| HFO-1123 | mass % | | 0.0 | 90.5 | 0.0 | 81.6 | 0.0 | 63.0 |
| R32 | mass % | | 9.5 | 9.5 | 18.4 | 18.4 | 37.0 | 37.0 |
| GWP | — | 2088 | 65 | 65 | 125 | 125 | 250 | 250 |
| COP ratio | % (relative to R410A) | 100 | 99.1 | 92.0 | 98.7 | 93.4 | 98.7 | 96.1 |
| Refrigerating capacity ratio | % (relative to R410A) | 100 | 102.2 | 111.6 | 105.3 | 113.7 | 110.0 | 115.4 |

TABLE 148

| Item | Unit | Comparative Example 8 O | Comparative Example 9 C | Comparative Example 10 | Example 1 U | Example 2 | Comparative Example 11 D |
|---|---|---|---|---|---|---|---|
| HFO-1132(E) | mass % | 100.0 | 50.0 | 41.1 | 28.7 | 15.2 | 0.0 |
| HFO-1123 | mass % | 0.0 | 31.6 | 34.6 | 41.2 | 52.7 | 67.0 |
| R32 | mass % | 0.0 | 18.4 | 24.3 | 30.1 | 32.1 | 33.0 |
| GWP | — | 1 | 125 | 165 | 204 | 217 | 228 |
| COP ratio | % (relative to R410A) | 99.7 | 96.0 | 96.0 | 96.0 | 96.0 | 96.0 |
| Refrigerating capacity ratio | % (relative to R410A) | 98.3 | 109.9 | 111.7 | 113.5 | 114.8 | 115.4 |

TABLE 149

| Item | Unit | Comparative Example 12 E | Comparative Example 13 | Example 3 T | Example 4 S | Comparative Example 14 F |
|---|---|---|---|---|---|---|
| HFO-1132(E) | mass % | 53.4 | 43.4 | 34.8 | 25.4 | 0.0 |
| HFO-1123 | mass % | 46.6 | 47.1 | 51.0 | 56.2 | 74.1 |
| R32 | mass % | 0.0 | 9.5 | 14.2 | 18.4 | 25.9 |
| GWP | — | 1 | 65 | 97 | 125 | 176 |
| COP ratio | % (relative to R410A) | 94.5 | 94.5 | 94.5 | 94.5 | 94.5 |
| Refrigerating capacity ratio | % (relative to R410A) | 105.6 | 109.2 | 110.8 | 112.3 | 114.8 |

TABLE 150

| Item | Unit | Comparative Example 15 G | Example 5 | Example 6 R | Example 7 | Comparative Example 16 H |
|---|---|---|---|---|---|---|
| HFO-1132(E) | mass % | 38.5 | 31.5 | 23.1 | 16.9 | 0.0 |
| HFO-1123 | mass % | 61.5 | 63.5 | 67.4 | 71.1 | 84.2 |
| R32 | mass % | 0.0 | 5.0 | 9.5 | 12.0 | 15.8 |
| GWP | — | 1 | 35 | 65 | 82 | 107 |
| COP ratio | % (relative to R410A) | 93.0 | 93.0 | 93.0 | 93.0 | 93.0 |

TABLE 150-continued

| Item | Unit | Comparative Example 15 G | Example 5 | Example 6 R | Example 7 | Comparative Example 16 H |
|---|---|---|---|---|---|---|
| Refrigerating capacity ratio | % (relative to R410A) | 107.0 | 109.1 | 110.9 | 111.9 | 113.2 |

TABLE 151

| Item | Unit | Comparative Example 17 I | Example 8 J | Example 9 K | Comparative Example 18 | Comparative Example 19 L |
|---|---|---|---|---|---|---|
| HFO-1132(E) | mass % | 72.0 | 57.7 | 48.4 | 41.1 | 35.5 |
| HFO-1123 | mass % | 28.0 | 32.8 | 33.2 | 31.2 | 27.5 |
| R32 | mass % | 0.0 | 9.5 | 18.4 | 27.7 | 37.0 |
| GWP | — | 1 | 65 | 125 | 188 | 250 |
| COP ratio | % (relative to R410A) | 96.6 | 95.8 | 95.9 | 96.4 | 97.1 |
| Refrigerating capacity ratio | % (relative to R410A) | 103.1 | 107.4 | 110.1 | 112.1 | 113.2 |

TABLE 152

| Item | Unit | Comparative Example 20 M | Example 10 N | Example 11 P | Example 12 Q |
|---|---|---|---|---|---|
| HFO-1132(E) | mass % | 47.1 | 38.5 | 31.8 | 28.6 |
| HFO-1123 | mass % | 52.9 | 52.1 | 49.8 | 34.4 |
| R32 | mass % | 0.0 | 9.5 | 18.4 | 37.0 |
| GWP | — | 1 | 65 | 125 | 250 |
| COP ratio | % (relative to R410A) | 93.9 | 94.1 | 94.7 | 96.9 |
| Refrigerating capacity ratio | % (relative to R410A) | 106.2 | 109.7 | 112.0 | 114.1 |

TABLE 153

| Item | Unit | Comparative Example 22 | Comparative Example 23 | Comparative Example 24 | Example 14 | Example 15 | Example 16 | Comparative Example 25 | Comparative Example 26 |
|---|---|---|---|---|---|---|---|---|---|
| HFO-1132(E) | mass % | 10.0 | 20.0 | 30.0 | 40.0 | 50.0 | 60.0 | 70.0 | 80.0 |
| HFO-1123 | mass % | 85.0 | 75.0 | 65.0 | 55.0 | 45.0 | 35.0 | 25.0 | 15.0 |
| R32 | mass % | 5.0 | 5.0 | 5.0 | 5.0 | 5.0 | 5.0 | 5.0 | 5.0 |
| GWP | — | 35 | 35 | 35 | 35 | 35 | 35 | 35 | 35 |
| COP ratio | % (relative to R410A) | 91.7 | 92.2 | 92.9 | 93.7 | 94.6 | 95.6 | 96.7 | 97.7 |
| Refrigerating capacity ratio | % (relative to R410A) | 110.1 | 109.8 | 109.2 | 108.4 | 107.4 | 106.1 | 104.7 | 103.1 |

TABLE 154

| Item | Unit | Comparative Example 27 | Comparative Example 28 | Comparative Example 29 | Example 17 | Example 18 | Example 19 | Comparative Example 30 | Comparative Example 31 |
|---|---|---|---|---|---|---|---|---|---|
| HFO-1132(E) | mass % | 90.0 | 10.0 | 20.0 | 30.0 | 40.0 | 50.0 | 60.0 | 70.0 |
| HFO-1123 | mass % | 5.0 | 80.0 | 70.0 | 60.0 | 50.0 | 40.0 | 30.0 | 20.0 |
| R32 | mass % | 5.0 | 10.0 | 10.0 | 10.0 | 10.0 | 10.0 | 10.0 | 10.0 |
| GWP | — | 35 | 68 | 68 | 68 | 68 | 68 | 68 | 68 |
| COP ratio | % (relative to R410A) | 98.8 | 92.4 | 92.9 | 93.5 | 94.3 | 95.1 | 96.1 | 97.0 |
| Refrigerating capacity ratio | % (relative to R410A) | 101.4 | 111.7 | 111.3 | 110.6 | 109.6 | 108.5 | 107.2 | 105.7 |

TABLE 155

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 10.0 | 75.0 | 65.0 | 55.0 | 45.0 | 35.0 | 25.0 | 15.0 |

TABLE 155-continued

| Item | Unit | Comparative Example 32 | Example 20 | Example 21 | Example 22 | Example 23 | Example 24 | Comparative Example 33 | Comparative Example 34 |
|---|---|---|---|---|---|---|---|---|---|
| R32 | mass % | 10.0 | 15.0 | 15.0 | 15.0 | 15.0 | 15.0 | 15.0 | 15.0 |
| GWP | — | 68 | 102 | 102 | 102 | 102 | 102 | 102 | 102 |
| COP ratio | % (relative to R410A) | 98.0 | 93.1 | 93.6 | 94.2 | 94.9 | 95.6 | 96.5 | 97.4 |
| Refrigerating capacity ratio | % (relative to R410A) | 104.1 | 112.9 | 112.4 | 111.6 | 110.6 | 109.4 | 108.1 | 106.6 |

TABLE 156

| Item | Unit | Comparative Example 35 | Comparative Example 36 | Comparative Example 37 | Comparative Example 38 | Comparative Example 39 | Comparative Example 40 | Comparative Example 41 | Comparative Example 42 |
|---|---|---|---|---|---|---|---|---|---|
| HFO-1132(E) | mass % | 80.0 | 10.0 | 20.0 | 30.0 | 40.0 | 50.0 | 60.0 | 70.0 |
| HFO-1123 | mass % | 5.0 | 70.0 | 60.0 | 50.0 | 40.0 | 30.0 | 20.0 | 10.0 |
| R32 | mass % | 15.0 | 20.0 | 20.0 | 20.0 | 20.0 | 20.0 | 20.0 | 20.0 |
| GWP | — | 102 | 136 | 136 | 136 | 136 | 136 | 136 | 136 |
| COP ratio | % (relative to R410A) | 98.3 | 93.9 | 94.3 | 94.8 | 95.4 | 96.2 | 97.0 | 97.8 |
| Refrigerating capacity ratio | % (relative to R410A) | 105.0 | 113.8 | 113.2 | 112.4 | 111.4 | 110.2 | 108.8 | 107.3 |

TABLE 157

| Item | Unit | Comparative Example 43 | Comparative Example 44 | Comparative Example 45 | Comparative Example 46 | Comparative Example 47 | Comparative Example 48 | Comparative Example 49 | Comparative Example 50 |
|---|---|---|---|---|---|---|---|---|---|
| HFO-1132(E) | mass % | 10.0 | 20.0 | 30.0 | 40.0 | 50.0 | 60.0 | 70.0 | 10.0 |
| HFO-1123 | mass % | 65.0 | 55.0 | 45.0 | 35.0 | 25.0 | 15.0 | 5.0 | 60.0 |
| R32 | mass % | 25.0 | 25.0 | 25.0 | 25.0 | 25.0 | 25.0 | 25.0 | 30.0 |
| GWP | — | 170 | 170 | 170 | 170 | 170 | 170 | 170 | 203 |
| COP ratio | % (relative to R410A) | 94.6 | 94.9 | 95.4 | 96.0 | 96.7 | 97.4 | 98.2 | 95.3 |
| Refrigerating capacity ratio | % (relative to R410A) | 114.4 | 113.8 | 113.0 | 111.9 | 110.7 | 109.4 | 107.9 | 114.8 |

TABLE 158

| Item | Unit | Comparative Example 51 | Comparative Example 52 | Comparative Example 53 | Comparative Example 54 | Comparative Example 55 | Example 25 | Example 26 | Comparative Example 56 |
|---|---|---|---|---|---|---|---|---|---|
| HFO-1132(E) | mass % | 20.0 | 30.0 | 40.0 | 50.0 | 60.0 | 10.0 | 20.0 | 30.0 |
| HFO-1123 | mass % | 50.0 | 40.0 | 30.0 | 20.0 | 10.0 | 55.0 | 45.0 | 35.0 |
| R32 | mass % | 30.0 | 30.0 | 30.0 | 30.0 | 30.0 | 35.0 | 35.0 | 35.0 |
| GWP | — | 203 | 203 | 203 | 203 | 203 | 237 | 237 | 237 |
| COP ratio | % (relative to R410A) | 95.6 | 96.0 | 96.6 | 97.2 | 97.9 | 96.0 | 96.3 | 96.6 |
| Refrigerating capacity ratio | % (relative to R410A) | 114.2 | 113.4 | 112.4 | 111.2 | 109.8 | 115.1 | 114.5 | 113.6 |

TABLE 159

| Item | Unit | Comparative Example 57 | Comparative Example 58 | Comparative Example 59 | Comparative Example 60 | Comparative Example 61 | Comparative Example 62 | Comparative Example 63 | Comparative Example 64 |
|---|---|---|---|---|---|---|---|---|---|
| HFO-1132(E) | mass % | 40.0 | 50.0 | 60.0 | 10.0 | 20.0 | 30.0 | 40.0 | 50.0 |
| HFO-1123 | mass % | 25.0 | 15.0 | 5.0 | 50.0 | 40.0 | 30.0 | 20.0 | 10.0 |
| R32 | mass % | 35.0 | 35.0 | 35.0 | 40.0 | 40.0 | 40.0 | 40.0 | 40.0 |
| GWP | — | 237 | 237 | 237 | 271 | 271 | 271 | 271 | 271 |
| COP ratio | % (relative to R410A) | 97.1 | 97.7 | 98.3 | 96.6 | 96.9 | 97.2 | 97.7 | 98.2 |
| Refrigerating capacity ratio | % (relative to R410A) | 112.6 | 111.5 | 110.2 | 115.1 | 114.6 | 113.8 | 112.8 | 111.7 |

TABLE 160

| Item | Unit | Example 27 | Example 28 | Example 29 | Example 30 | Example 31 | Example 32 | Example 33 | Example 34 |
|---|---|---|---|---|---|---|---|---|---|
| HFO-1132(E) | mass % | 38.0 | 40.0 | 42.0 | 44.0 | 35.0 | 37.0 | 39.0 | 41.0 |
| HFO-1123 | mass % | 60.0 | 58.0 | 56.0 | 54.0 | 61.0 | 59.0 | 57.0 | 55.0 |
| R32 | mass % | 2.0 | 2.0 | 2.0 | 2.0 | 4.0 | 4.0 | 4.0 | 4.0 |
| GWP | — | 14 | 14 | 14 | 14 | 28 | 28 | 28 | 28 |
| COP ratio | % (relative to R410A) | 93.2 | 93.4 | 93.6 | 93.7 | 93.2 | 93.3 | 93.5 | 93.7 |
| Refrigerating capacity ratio | % (relative to R410A) | 107.7 | 107.5 | 107.3 | 107.2 | 108.6 | 108.4 | 108.2 | 108.0 |

TABLE 161

| Item | Unit | Example 35 | Example 36 | Example 37 | Example 38 | Example 39 | Example 40 | Example 41 | Example 42 |
|---|---|---|---|---|---|---|---|---|---|
| HFO-1132(E) | mass % | 43.0 | 31.0 | 33.0 | 35.0 | 37.0 | 39.0 | 41.0 | 27.0 |
| HFO-1123 | mass % | 53.0 | 63.0 | 61.0 | 59.0 | 57.0 | 55.0 | 53.0 | 65.0 |
| R32 | mass % | 4.0 | 6.0 | 6.0 | 6.0 | 6.0 | 6.0 | 6.0 | 8.0 |
| GWP | — | 28 | 41 | 41 | 41 | 41 | 41 | 41 | 55 |
| COP ratio | % (relative to R410A) | 93.9 | 93.1 | 93.2 | 93.4 | 93.6 | 93.7 | 93.9 | 93.0 |
| Refrigerating capacity ratio | % (relative to R410A) | 107.8 | 109.5 | 109.3 | 109.1 | 109.0 | 108.8 | 108.6 | 110.3 |

TABLE 162

| Item | Unit | Example 43 | Example 44 | Example 45 | Example 46 | Example 47 | Example 48 | Example 49 | Example 50 |
|---|---|---|---|---|---|---|---|---|---|
| HFO-1132(E) | mass % | 29.0 | 31.0 | 33.0 | 35.0 | 37.0 | 39.0 | 32.0 | 32.0 |
| HFO-1123 | mass % | 63.0 | 61.0 | 59.0 | 57.0 | 55.0 | 53.0 | 51.0 | 50.0 |
| R32 | mass % | 8.0 | 8.0 | 8.0 | 8.0 | 8.0 | 8.0 | 17.0 | 18.0 |
| GWP | — | 55 | 55 | 55 | 55 | 55 | 55 | 116 | 122 |
| COP ratio | % (relative to R410A) | 93.2 | 93.3 | 93.5 | 93.6 | 93.8 | 94.0 | 94.5 | 94.7 |
| Refrigerating capacity ratio | % (relative to R410A) | 110.1 | 110.0 | 109.8 | 109.6 | 109.5 | 109.3 | 111.8 | 111.9 |

TABLE 163

| Item | Unit | Example 51 | Example 52 | Example 53 | Example 54 | Example 55 | Example 56 | Example 57 | Example 58 |
|---|---|---|---|---|---|---|---|---|---|
| HFO-1132(E) | mass % | 30.0 | 27.0 | 21.0 | 23.0 | 25.0 | 27.0 | 11.0 | 13.0 |
| HFO-1123 | mass % | 52.0 | 42.0 | 46.0 | 44.0 | 42.0 | 40.0 | 54.0 | 52.0 |
| R32 | mass % | 18.0 | 31.0 | 33.0 | 33.0 | 33.0 | 33.0 | 35.0 | 35.0 |
| GWP | — | 122 | 210 | 223 | 223 | 223 | 223 | 237 | 237 |
| COP ratio | % (relative to R410A) | 94.5 | 96.0 | 96.0 | 96.1 | 96.2 | 96.3 | 96.0 | 96.0 |
| Refrigerating capacity ratio | % (relative to R410A) | 112.1 | 113.7 | 114.3 | 114.2 | 114.0 | 113.8 | 115.0 | 114.9 |

TABLE 164

| Item | Unit | Example 59 | Example 60 | Example 61 | Example 62 | Example 63 | Example 64 | Example 65 | Example 66 |
|---|---|---|---|---|---|---|---|---|---|
| HFO-1132(E) | mass % | 15.0 | 17.0 | 19.0 | 21.0 | 23.0 | 25.0 | 27.0 | 11.0 |
| HFO-1123 | mass % | 50.0 | 48.0 | 46.0 | 44.0 | 42.0 | 40.0 | 38.0 | 52.0 |
| R32 | mass % | 35.0 | 35.0 | 35.0 | 35.0 | 35.0 | 35.0 | 35.0 | 37.0 |
| GWP | — | 237 | 237 | 237 | 237 | 237 | 237 | 237 | 250 |
| COP ratio | % (relative to R410A) | 96.1 | 96.2 | 96.2 | 96.3 | 96.4 | 96.4 | 96.5 | 96.2 |
| Refrigerating capacity ratio | % (relative to R410A) | 114.8 | 114.7 | 114.5 | 114.4 | 114.2 | 114.1 | 113.9 | 115.1 |

TABLE 165

| Item | Unit | Example 67 | Example 68 | Example 69 | Example 70 | Example 71 | Example 72 | Example 73 | Example 74 |
|---|---|---|---|---|---|---|---|---|---|
| HFO-1132(E) | mass % | 13.0 | 15.0 | 17.0 | 15.0 | 17.0 | 19.0 | 21.0 | 23.0 |
| HFO-1123 | mass % | 50.0 | 48.0 | 46.0 | 50.0 | 48.0 | 46.0 | 44.0 | 42.0 |
| R32 | mass % | 37.0 | 37.0 | 37.0 | 0.0 | 0.0 | 0.0 | 0.0 | 0.0 |
| GWP | — | 250 | 250 | 250 | 237 | 237 | 237 | 237 | 237 |
| COP ratio | % (relative to R410A) | 96.3 | 96.4 | 96.4 | 96.1 | 96.2 | 96.2 | 96.3 | 96.4 |
| Refrigerating capacity ratio | % (relative to R410A) | 115.0 | 114.9 | 114.7 | 114.8 | 114.7 | 114.5 | 114.4 | 114.2 |

TABLE 166

| Item | Unit | Example 75 | Example 76 | Example 77 | Example 78 | Example 79 | Example 80 | Example 81 | Example 82 |
|---|---|---|---|---|---|---|---|---|---|
| HFO-1132(E) | mass % | 25.0 | 27.0 | 11.0 | 19.0 | 21.0 | 23.0 | 25.0 | 27.0 |
| HFO-1123 | mass % | 40.0 | 38.0 | 52.0 | 44.0 | 42.0 | 40.0 | 38.0 | 36.0 |
| R32 | mass % | 0.0 | 0.0 | 0.0 | 37.0 | 37.0 | 37.0 | 37.0 | 37.0 |
| GWP | — | 237 | 237 | 250 | 250 | 250 | 250 | 250 | 250 |
| COP ratio | % (relative to R410A) | 96.4 | 96.5 | 96.2 | 96.5 | 96.5 | 96.6 | 96.7 | 96.8 |
| Refrigerating capacity ratio | % (relative to R410A) | 114.1 | 113.9 | 115.1 | 114.6 | 114.5 | 114.3 | 114.1 | 114.0 |

The above results indicate that under the condition that the mass % of FO-1132(E), HFO-1123, and R32 based on their sum is respectively represented by x, y, and z, when coordinates (x,y,z) in a ternary composition diagram in which the sum of HFO-1132(E), HFO-1123, and R32 is 100 mass %, a line segment connecting a point (0.0, 100.0, 0.0) and a point (0.0, 0.0, 100.0) is the base, and the point (0.0, 100.0, 0.0) is on the left side are within the range of a figure surrounded by line segments that connect the following 4 points:
point O (100.0, 0.0, 0.0),
point A" (63.0, 0.0, 37.0),
point B" (0.0, 63.0, 37.0), and
point (0.0, 100.0, 0.0),
or on these line segments,
the refrigerant has a GWP of 250 or less.

The results also indicate that when coordinates (x,y,z) are within the range of a figure surrounded by line segments that connect the following 4 points:
point O (100.0, 0.0, 0.0),
point A' (81.6, 0.0, 18.4),
point B' (0.0, 81.6, 18.4), and
point (0.0, 100.0, 0.0),
or on these line segments,
the refrigerant has a GWP of 125 or less.

The results also indicate that when coordinates (x,y,z) are within the range of a figure surrounded by line segments that connect the following 4 points:
point O (100.0, 0.0, 0.0),
point A (90.5, 0.0, 9.5),
point B (0.0, 90.5, 9.5), and
point (0.0, 100.0, 0.0),
or on these line segments,
the refrigerant has a GWP of 65 or less.

The results also indicate that when coordinates (x,y,z) are on the left side of line segments that connect the following 3 points:
point C (50.0, 31.6, 18.4),
point U (28.7, 41.2, 30.1), and
point D (52.2, 38.3, 9.5),
or on these line segments,
the refrigerant has a COP ratio of 96% or more relative to that of R410A.

In the above, the line segment CU is represented by coordinates $(-0.0538z^2+0.7888z+53.701, 0.0538z^2-1.7888z+46.299, z)$, and the line segment UD is represented by coordinates $(-3.4962z^2+210.71z-3146.1, 3.4962z^2-211.71z+3246.1, z)$.

The points on the line segment CU are determined from three points, i.e., point C, Comparative Example 10, and point U, by using the least-square method.

The points on the line segment UD are determined from three points, i.e., point U, Example 2, and point D, by using the least-square method.

The results also indicate that when coordinates (x,y,z) are on the left side of line segments that connect the following 3 points:
point E (55.2, 44.8, 0.0),
point T (34.8, 51.0, 14.2), and
point F (0.0, 76.7, 23.3),
or on these line segments,
the refrigerant has a COP ratio of 94.5% or more relative to that of R410A.

In the above, the line segment ET is represented by coordinates $(-0.0547z^2\ 0.5327z+53.4, 0.0547z^2-0.4673z+46.6, z)$, and the line segment TF is represented by coordinates $(-0.0982z^2+0.9622z+40.931, 0.0982z^2-1.9622z+59.069, z)$.

The points on the line segment ET are determined from three points, i.e., point E, Example 2, and point T, by using the least-square method.

The points on the line segment TF are determined from three points, i.e., points T, S, and F, by using the least-square method.

The results also indicate that when coordinates (x,y,z) are on the left side of line segments that connect the following 3 points:
point G (0.0, 76.7, 23.3),
point R (21.0, 69.5, 9.5), and
point H (0.0, 85.9, 14.1),
or on these line segments, the refrigerant has a COP ratio of 93% or more relative to that of R410A.

In the above, the line segment GR is represented by coordinates $(-0.0491z^2-1.1544z+38.5, 0.0491z^2+0.1544z+61.5, z)$, and the line segment RH is represented by coordinates $(-0.3123z^2+4.234z+11.06, 0.3123z^2-5.234z+88.94, z)$.

The points on the line segment GR are determined from three points, i.e., point G, Example 5, and point R, by using the least-square method.

The points on the line segment RH are determined from three points, i.e., point R, Example 7, and point H, by using the least-square method.

In contrast, as shown in, for example, Comparative Examples 8, 9, 13, 15, 17, and 18, when R32 is not contained, the concentrations of HFO-1132(E) and HFO-1123, which have a double bond, become relatively high; this undesirably leads to deterioration, such as decomposition, or polymerization in the refrigerant compound.

(6) First Embodiment

Figure 16:
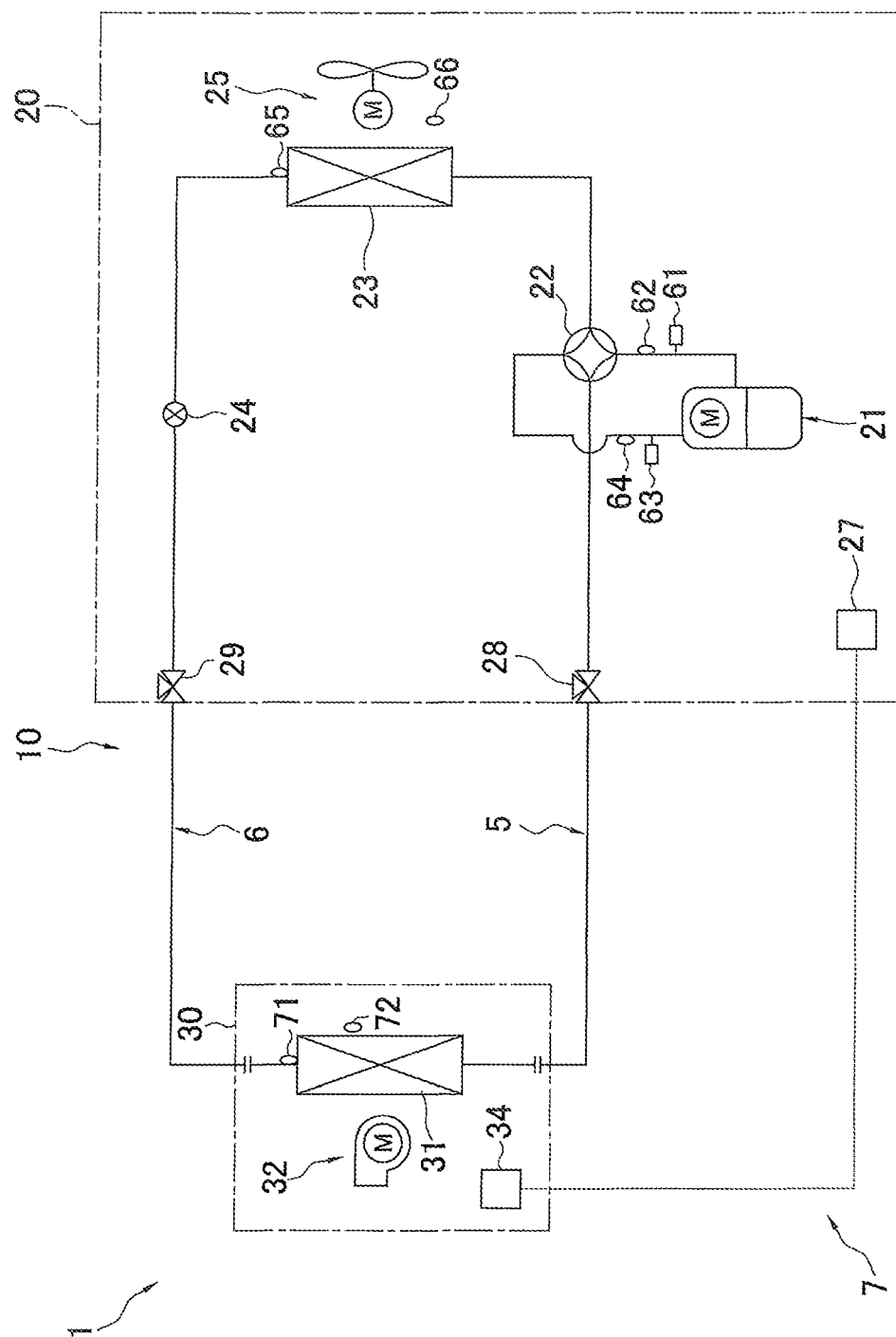
FIG. 16 is a schematic configuration diagram of a refrigerant circuit according to a first embodiment.
Figure 17:
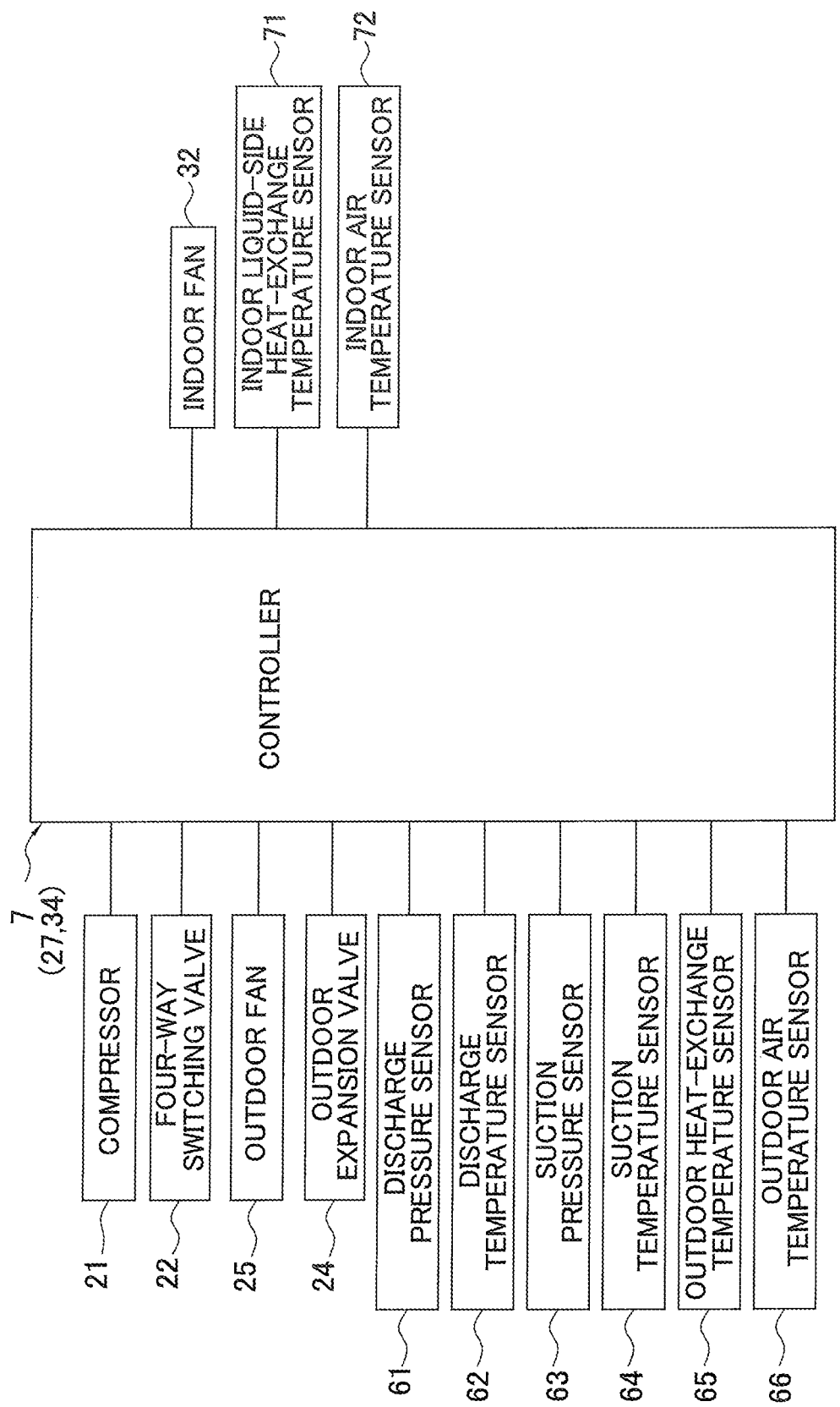
FIG. 17 is a schematic control block configuration diagram of a refrigeration cycle apparatus according to the first embodiment.

An air conditioning apparatus 1 serving as a refrigeration cycle apparatus according to a first embodiment is described below with reference to FIG. 16 which is a schematic configuration diagram of a refrigerant circuit and FIG. 17 which is a schematic control block configuration diagram.

The air conditioning apparatus 1 is an apparatus that controls the condition of air in a subject space by performing a vapor compression refrigeration cycle.

The air conditioning apparatus 1 mainly includes an outdoor unit 20, an indoor unit 30, a liquid-side connection pipe 6 and a gas-side connection pipe 5 that connect the outdoor unit 20 and the indoor unit 30 to each other, a remote controller (not illustrated) serving as an input device and an output device, and a controller 7 that controls operations of the air conditioning apparatus 1.

The air conditioning apparatus 1 performs a refrigeration cycle in which a refrigerant enclosed in a refrigerant circuit 10 is compressed, cooled or condensed, decompressed, heated or evaporated, and then compressed again. In the present embodiment, the refrigerant circuit 10 is filled with a refrigerant for performing a vapor compression refrigeration cycle. The refrigerant is a mixed refrigerant containing 1,2-difluoroethylene, and can use any one of the above-described refrigerants A to E. Moreover, the refrigerant circuit 10 is filled with a refrigerator oil together with the mixed refrigerant.

(6-1) Outdoor Unit 20

The outdoor unit 20 is connected to the indoor unit 30 via the liquid-side connection pipe 6 and the gas-side connection pipe 5, and constitutes a part of the refrigerant circuit 10. The outdoor unit 20 mainly includes a compressor 21, a four-way switching valve 22, an outdoor heat exchanger 23, an outdoor expansion valve 24, an outdoor fan 25, a liquid-side shutoff valve 29, and a gas-side shutoff valve 28.

The compressor 21 is a device that compresses the refrigerant with a low pressure in the refrigeration cycle until the refrigerant becomes a high-pressure refrigerant. In this case, a compressor having a hermetically sealed structure in which a compression element (not illustrated) of positive-displacement type, such as rotary type or scroll type, is rotationally driven by a compressor motor is used as the compressor 21. The compressor motor is for changing the capacity, and has an operational frequency that can be controlled by an inverter. The compressor 21 is provided with an additional accumulator (not illustrated) on the suction side (note that the inner capacity of the additional accumulator is smaller than each of the inner capacities of a low-pressure receiver, an intermediate-pressure receiver, and a high-pressure receiver which are described later, and is preferably less than or equal to a half of each of the inner capacities).

The four-way switching valve 22, by switching the connection state, can switch the state between a cooling operation connection state in which the discharge side of the compressor 21 is connected to the outdoor heat exchanger 23 and the suction side of the compressor 21 is connected to the gas-side shutoff valve 28, and a heating operation connection state in which the discharge side of the compressor 21 is connected to the gas-side shutoff valve 28 and the suction side of the compressor 21 is connected to the outdoor heat exchanger 23.

The outdoor heat exchanger 23 is a heat exchanger that functions as a condenser for the high-pressure refrigerant in the refrigeration cycle during cooling operation and that functions as an evaporator for the low-pressure refrigerant in the refrigeration cycle during heating operation.

The outdoor fan 25 sucks outdoor air into the outdoor unit 20, causes the outdoor air to exchange heat with the refrigerant in the outdoor heat exchanger 23, and then generates an air flow to be discharged to the outside. The outdoor fan 25 is rotationally driven by an outdoor fan motor.

The outdoor expansion valve 24 is provided between a liquid-side end portion of the outdoor heat exchanger 23 and the liquid-side shutoff valve 29. The outdoor expansion valve 24 may be, for example, a capillary tube or a mechanical expansion valve that is used together with a temperature-sensitive tube. Preferably, the outdoor expansion valve 24 is an electric expansion valve that can control the valve opening degree through control.

The liquid-side shutoff valve 29 is a manual valve disposed in a connection portion of the outdoor unit 20 with respect to the liquid-side connection pipe 6.

The gas-side shutoff valve 28 is a manual valve disposed in a connection portion of the outdoor unit 20 with respect to the gas-side connection pipe 5.

The outdoor unit 20 includes an outdoor-unit control unit 27 that controls operations of respective sections constituting the outdoor unit 20. The outdoor-unit control unit 27 includes a microcomputer including a CPU, a memory, and so forth. The outdoor-unit control unit 27 is connected to an indoor-unit control unit 34 of each indoor unit 30 via a communication line, and transmits and receives a control signal and so forth.

The outdoor unit 20 includes, for example, a discharge pressure sensor 61, a discharge temperature sensor 62, a suction pressure sensor 63, a suction temperature sensor 64, an outdoor heat-exchange temperature sensor 65, and an outdoor air temperature sensor 66. Each of the sensors is electrically connected to the outdoor-unit control unit 27, and transmits a detection signal to the outdoor-unit control unit 27. The discharge pressure sensor 61 detects the pressure of the refrigerant flowing through a discharge pipe that connects the discharge side of the compressor 21 to one of connecting ports of the four-way switching valve 22. The discharge temperature sensor 62 detects the temperature of the refrigerant flowing through the discharge pipe. The suction pressure sensor 63 detects the pressure of the refrigerant flowing through a suction pipe that connects the suction side of the compressor 21 to one of the connecting ports of the four-way switching valve 22. The suction temperature sensor 64 detects the temperature of the refrigerant flowing through the suction pipe. The outdoor heat-exchange temperature sensor 65 detects the temperature of the refrigerant flowing through the outlet on the liquid side of the outdoor heat exchanger 23 opposite to the side connected to the four-way switching valve 22. The outdoor air temperature sensor 66 detects the outdoor air temperature before passing through the outdoor heat exchanger 23.

(6-2) Indoor Unit 30

The indoor unit 30 is installed on a wall surface or a ceiling in a room that is a subject space. The indoor unit 30 is connected to the outdoor unit 20 via the liquid-side connection pipe 6 and the gas-side connection pipe 5, and constitutes a part of the refrigerant circuit 10.

The indoor unit 30 includes an indoor heat exchanger 31 and an indoor fan 32.

The liquid side of the indoor heat exchanger 31 is connected to the liquid-side connection pipe 6, and the gas-side end thereof is connected to the gas-side connection pipe 5. The indoor heat exchanger 31 is a heat exchanger that functions as an evaporator for the low-pressure refrigerant in the refrigeration cycle during cooling operation and that functions as a condenser for the high-pressure refrigerant in the refrigeration cycle during heating operation.

The indoor fan 32 sucks indoor air into the indoor unit 30, causes the indoor air to exchange heat with the refrigerant in the indoor heat exchanger 31, and then generates an air flow to be discharged to the outside. The indoor fan 32 is rotationally driven by an indoor fan motor.

The indoor unit 30 includes an indoor-unit control unit 34 that controls operations of respective sections constituting the indoor unit 30. The indoor-unit control unit 34 includes a microcomputer including a CPU, a memory, and so forth. The indoor-unit control unit 34 is connected to the outdoor-unit control unit 27 via a communication line, and transmits and receives a control signal and so forth.

The indoor unit 30 includes, for example, an indoor liquid-side heat-exchange temperature sensor 71 and an indoor air temperature sensor 72. Each of the sensors is electrically connected to the indoor-unit control unit 34, and transmits a detection signal to the indoor-unit control unit 34. The indoor liquid-side heat-exchange temperature sensor 71 detects the temperature of the refrigerant flowing through the outlet on the liquid side of the indoor heat exchanger 31 opposite to the side connected to the four-way switching valve 22. The indoor air temperature sensor 72 detects the indoor air temperature before passing through the indoor heat exchanger 31.

(6-3) Details of Controller 7

In the air conditioning apparatus 1, the outdoor-unit control unit 27 is connected to the indoor-unit control unit 34 via the communication line, thereby constituting the controller 7 that controls operations of the air conditioning apparatus 1.

The controller 7 mainly includes a CPU (central processing unit) and a memory, such as a ROM or a RAM. Various processing and control by the controller 7 are provided when respective sections included in the outdoor-unit control unit 27 and/or the indoor-unit control unit 34 function together.

(6-4) Operating Modes

Operating modes are described below.

The operating modes include a cooling operating mode and a heating operating mode.

The controller 7 determines whether the operating mode is the cooling operating mode or the heating operating mode and executes the determined mode based on an instruction received from the remote controller or the like.

(6-4-1) Cooling Operating Mode

In the air conditioning apparatus 1, in the cooling operating mode, the connection state of the four-way switching valve 22 is in the cooling operation connection state in which the discharge side of the compressor 21 is connected to the outdoor heat exchanger 23 and the suction side of the compressor 21 is connected to the gas-side shutoff valve 28, and the refrigerant filled in the refrigerant circuit 10 is circulated mainly sequentially in the compressor 21, the outdoor heat exchanger 23, the outdoor expansion valve 24, and the indoor heat exchanger 31.

More specifically, in the refrigerant circuit 10, when the cooling operating mode is started, the refrigerant is sucked into the compressor 21, compressed, and then discharged.

The compressor 21 performs capacity control in accordance with a cooling load required for the indoor unit 30. The capacity control is not limited, and, for example, controls the operating frequency of the compressor 21 such that, when the air conditioning apparatus 1 is controlled to cause the indoor air temperature to attain a set temperature, the discharge temperature (the detected temperature of the discharge temperature sensor 62) becomes a value corresponding to the difference between the set temperature and the indoor temperature (the detected temperature of the indoor air temperature sensor 72).

The gas refrigerant discharged from the compressor 21 passes through the four-way switching valve 22 and flows into the gas-side end of the outdoor heat exchanger 23.

The gas refrigerant which has flowed into the gas-side end of the outdoor heat exchanger 23 exchanges heat with outdoor-side air supplied by the outdoor fan 25, hence is condensed and turns into a liquid refrigerant in the outdoor heat exchanger 23, and flows out from the liquid-side end of the outdoor heat exchanger 23.

The refrigerant which has flowed out from the liquid-side end of the outdoor heat exchanger 23 is decompressed when passing through the outdoor expansion valve 24. The outdoor expansion valve 24 is controlled, for example, such that the degree of superheating of the refrigerant to be sucked into the compressor 21 becomes a target value of a predetermined degree of superheating. In this case, the degree of superheating of the sucked refrigerant of the compressor 21 can be obtained, for example, by subtracting a saturation temperature corresponding to a suction pressure (the detected pressure of the suction pressure sensor 63) from a suction temperature (the detected temperature of the suction temperature sensor 64). Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through the liquid-side shutoff valve 29 and the liquid-side connection pipe 6, and flows into the indoor unit 30.

The refrigerant which has flowed into the indoor unit 30 flows into the indoor heat exchanger 31; exchanges heat with the indoor air supplied by the indoor fan 32, hence is evaporated, and turns into a gas refrigerant in the indoor heat exchanger 30; and flows out from the gas-side end of the indoor heat exchanger 31. The gas refrigerant which has flowed out from the gas-side end of the indoor heat exchanger 31 flows to the gas-side connection pipe 5.

The refrigerant which has flowed through the gas-side connection pipe 5 passes through the gas-side shutoff valve 28 and the four-way switching valve 22, and is sucked into the compressor 21 again.

(6-4-2) Heating Operating Mode

In the air conditioning apparatus 1, in the heating operating mode, the connection state of the four-way switching valve 22 is in the heating operation connection state in which the discharge side of the compressor 21 is connected to the gas-side shutoff valve 28 and the suction side of the compressor 21 is connected to the outdoor heat exchanger 23, and the refrigerant filled in the refrigerant circuit 10 is circulated mainly sequentially in the compressor 21, the indoor heat exchanger 31, the outdoor expansion valve 24, and the outdoor heat exchanger 23.

More specifically, in the refrigerant circuit 10, when the heating operating mode is started, the refrigerant is sucked into the compressor 21, compressed, and then discharged.

The compressor 21 performs capacity control in accordance with a heating load required for the indoor unit 30. The capacity control is not limited, and, for example, controls the operating frequency of the compressor 21 such that, when the air conditioning apparatus 1 is controlled to cause the indoor air temperature to attain a set temperature, the discharge temperature (the detected temperature of the discharge temperature sensor 62) becomes a value corresponding to the difference between the set temperature and the indoor temperature (the detected temperature of the indoor air temperature sensor 72).

The gas refrigerant discharged from the compressor 21 flows through the four-way switching valve 22 and the gas-side connection pipe 5, and then flows into the indoor unit 30.

The refrigerant which has flowed into the indoor unit 30 flows into the gas-side end of the indoor heat exchanger 31; exchanges heat with the indoor air supplied by the indoor fan 32, hence is condensed, and turns into a refrigerant in a gas-liquid two-phase state or a liquid refrigerant in the indoor heat exchanger 31; and flows out from the liquid-side end of the indoor heat exchanger 31. The refrigerant which has flowed out from the liquid-side end of the indoor heat exchanger 31 flows to the liquid-side connection pipe 6.

The refrigerant which has flowed through the liquid-side connection pipe 6 flows into the outdoor unit 20, passes through the liquid-side shutoff valve 29, and is decompressed to a low pressure in the refrigeration cycle at the outdoor expansion valve 24. The outdoor expansion valve 24 is controlled, for example, such that the degree of superheating of the refrigerant to be sucked into the compressor 21 becomes a target value of a predetermined degree of superheating. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows into the liquid-side end of the outdoor heat exchanger 23.

The refrigerant which has flowed in from the liquid-side end of the outdoor heat exchanger 23 exchanges heat with the outdoor air supplied by the outdoor fan 25, hence is evaporated and turns into a gas refrigerant in the outdoor heat exchanger 23, and flows out from the gas-side end of the outdoor heat exchanger 23.

The refrigerant which has flowed out from the gas-side end of the outdoor heat exchanger 23 passes through the four-way switching valve 22 and is sucked into the compressor 21 again.

(6-5) Characteristics of First Embodiment

Since the air conditioning apparatus 1 can perform the refrigeration cycle using the refrigerant containing 1,2-difluoroethylene, the air conditioning apparatus 1 can perform a refrigeration cycle using a small-GWP refrigerant.

(7) Second Embodiment

Figure 18:
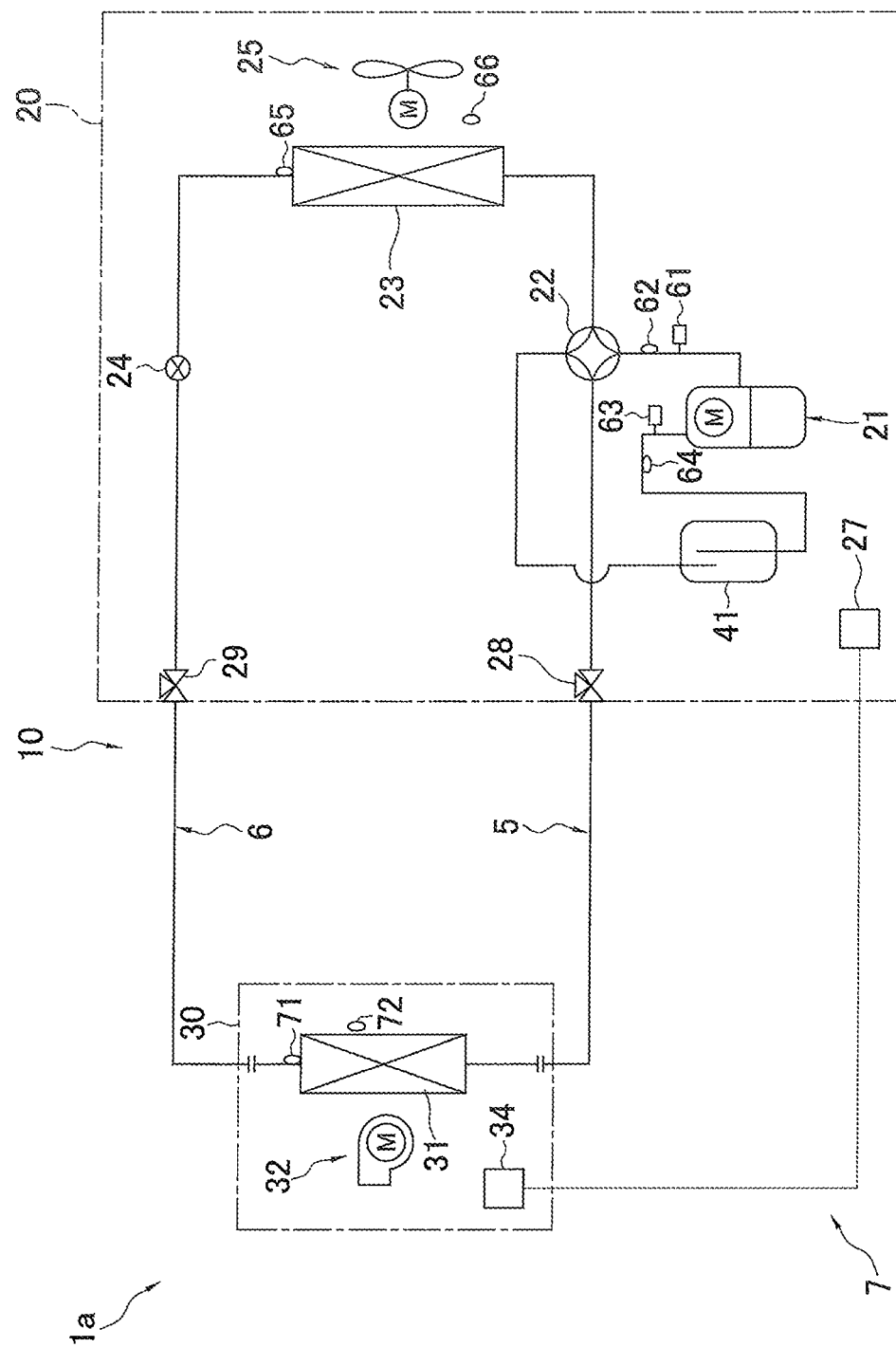
FIG. 18 is a schematic configuration diagram of a refrigerant circuit according to a second embodiment.
Figure 19:
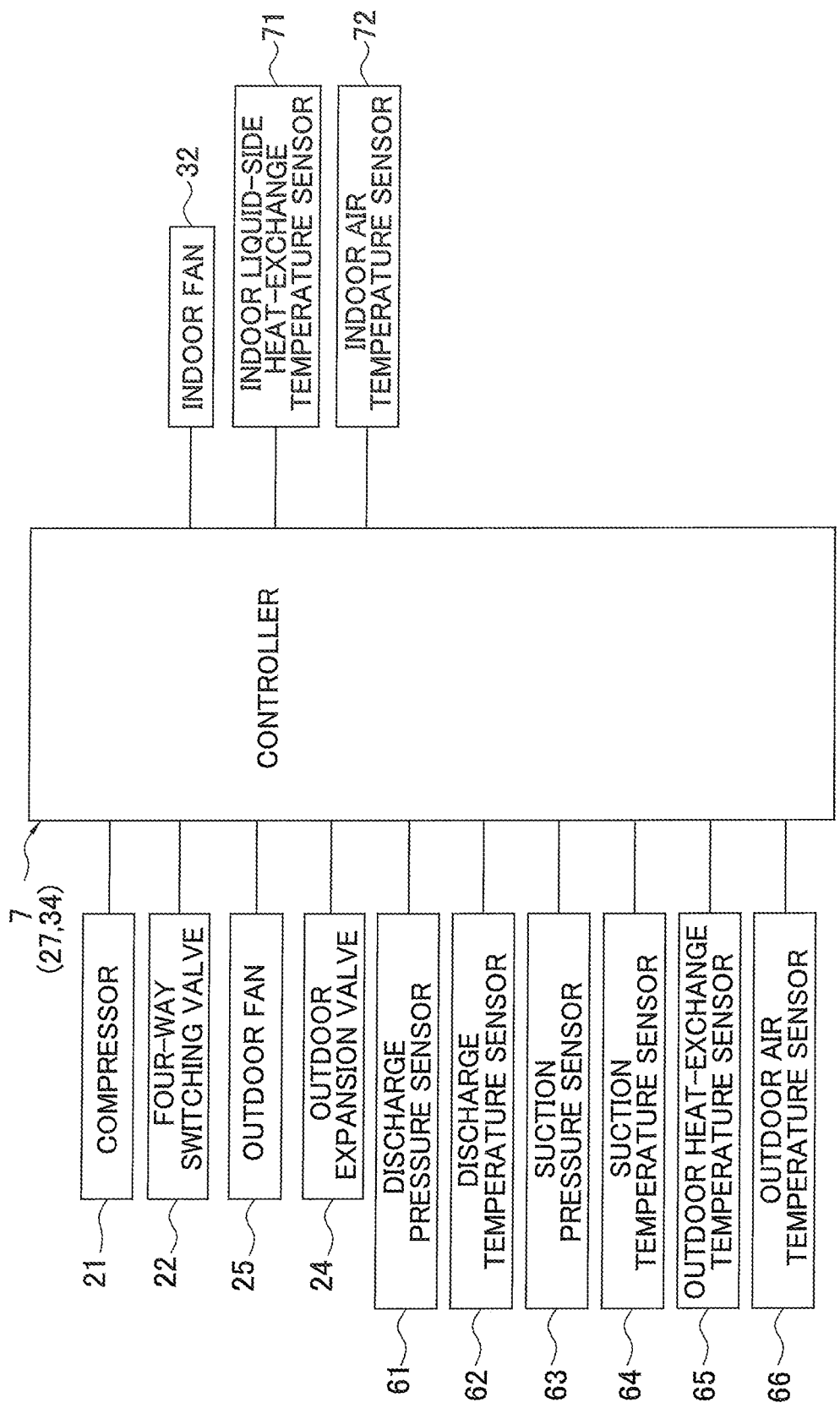
FIG. 19 is a schematic control block configuration diagram of a refrigeration cycle apparatus according to the second embodiment.

An air conditioning apparatus 1a serving as a refrigeration cycle apparatus according to a second embodiment is described below with reference to FIG. 18 which is a schematic configuration diagram of a refrigerant circuit and FIG. 19 which is a schematic control block configuration diagram. Differences from the air conditioning apparatus 1 according to the first embodiment are mainly described below.

(7-1) Schematic Configuration of Air Conditioning Apparatus 1a

The air conditioning apparatus 1a differs from the air conditioning apparatus 1 according to the first embodiment in that the outdoor unit 20 includes a low-pressure receiver 41.

The low-pressure receiver 41 is a refrigerant container that is provided between the suction side of the compressor 21 and one of the connecting ports of the four-way switching valve 22 and that can store an excessive refrigerant in the refrigerant circuit 10 as a liquid refrigerant. Note that, in the present embodiment, the suction pressure sensor 63 and the suction temperature sensor 64 are provided to detect, as a subject, the refrigerant flowing between the low-pressure receiver 41 and the suction side of the compressor 21. Moreover, the compressor 21 is provided with an additional accumulator (not illustrated). The low-pressure receiver 41 is connected to the downstream side of the additional accumulator.

(7-2) Cooling Operating Mode

In the air conditioning apparatus 1a, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72). The evaporation temperature is not limited; however, may be recognized as, for example, the saturation temperature of the refrigerant corresponding to the detected pressure of the suction pressure sensor 63.

The gas refrigerant discharged from the compressor 21 flows through the four-way switching valve 22, the outdoor heat exchanger 23, and the outdoor expansion valve 24 in that order.

In this case, the valve opening degree of the outdoor expansion valve 24 is controlled to satisfy a predetermined condition, for example, such that the degree of subcooling of the refrigerant flowing through the liquid-side outlet of the outdoor heat exchanger 23 becomes a target value. The degree of subcooling of the refrigerant flowing through the liquid-side outlet of the outdoor heat exchanger 23 is not limited; however, for example, can be obtained by subtracting the saturation temperature of the refrigerant corresponding to a high pressure of the refrigerant circuit 10 (the detected pressure of the discharge pressure sensor 61) from the detected temperature of the outdoor heat-exchange temperature sensor 65. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through the liquid-side shutoff valve 29 and the liquid-side connection pipe 6, flows into the indoor unit 30, is evaporated in the indoor heat exchanger 31, and flows into the gas-side connection pipe 5. The refrigerant which has flowed through the gas-side connection pipe 5 passes through the gas-side shutoff valve 28, the four-way switching valve 22, and the low-pressure receiver 41, and is sucked into the compressor 21 again. Note that the low-pressure receiver 41 stores, as an excessive refrigerant, the liquid refrigerant which has not been completely evaporated in the indoor heat exchanger 31.

(7-3) Heating Operating Mode

In the air conditioning apparatus 1*a*, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to a low pressure in the refrigeration cycle at the outdoor expansion valve 24. Note that the valve opening degree of the outdoor expansion valve 24 is controlled to satisfy a predetermined condition, for example, such that the degree of subcooling of the refrigerant flowing through the liquid-side outlet of the indoor heat exchanger 31 becomes a target value. The degree of subcooling of the refrigerant flowing through the liquid-side outlet of the indoor heat exchanger 31 is not limited; however, for example, can be obtained by subtracting the saturation temperature of the refrigerant corresponding to a high pressure of the refrigerant circuit 10 (the detected pressure of the discharge pressure sensor 61) from the detected temperature of the indoor liquid-side heat-exchange temperature sensor 71. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22 and the low-pressure receiver 41, and is sucked into the compressor 21 again. Note that the low-pressure receiver 41 stores, as an excessive refrigerant, the liquid refrigerant which has not been completely evaporated in the outdoor heat exchanger 23.

(7-4) Characteristics of Second Embodiment

Since the air conditioning apparatus 1*a* can perform the refrigeration cycle using the refrigerant containing 1,2-difluoroethylene, the air conditioning apparatus 1*a* can perform a refrigeration cycle using a small-GWP refrigerant.

Moreover, since the air conditioning apparatus 1*a* is provided with the low-pressure receiver 41, occurrence of liquid compression is prevented without execution of control (control of the outdoor expansion valve 24) to ensure that the degree of superheating of the refrigerant to be sucked into the compressor 21 is a predetermined value or more. Owing to this, the control of the outdoor expansion valve 24 can be control to sufficiently ensure the degree of subcooling of the refrigerant flowing through the outlet for the outdoor heat exchanger 23 when functioning as the condenser (which is similarly applied to the indoor heat exchanger 31 when functioning as the condenser).

(8) Third Embodiment

Figure 20:
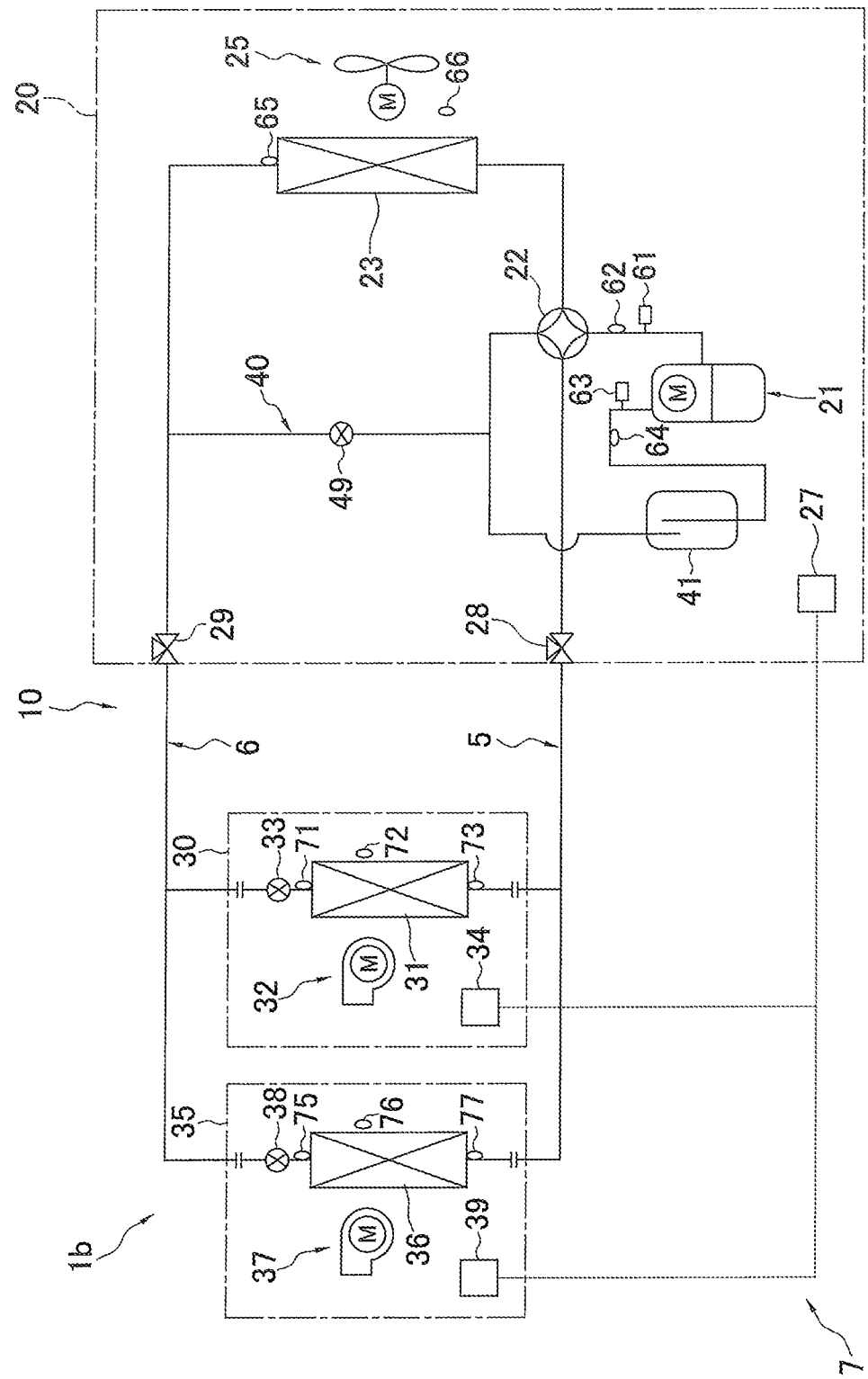
FIG. 20 is a schematic configuration diagram of a refrigerant circuit according to a third embodiment.
Figure 21:
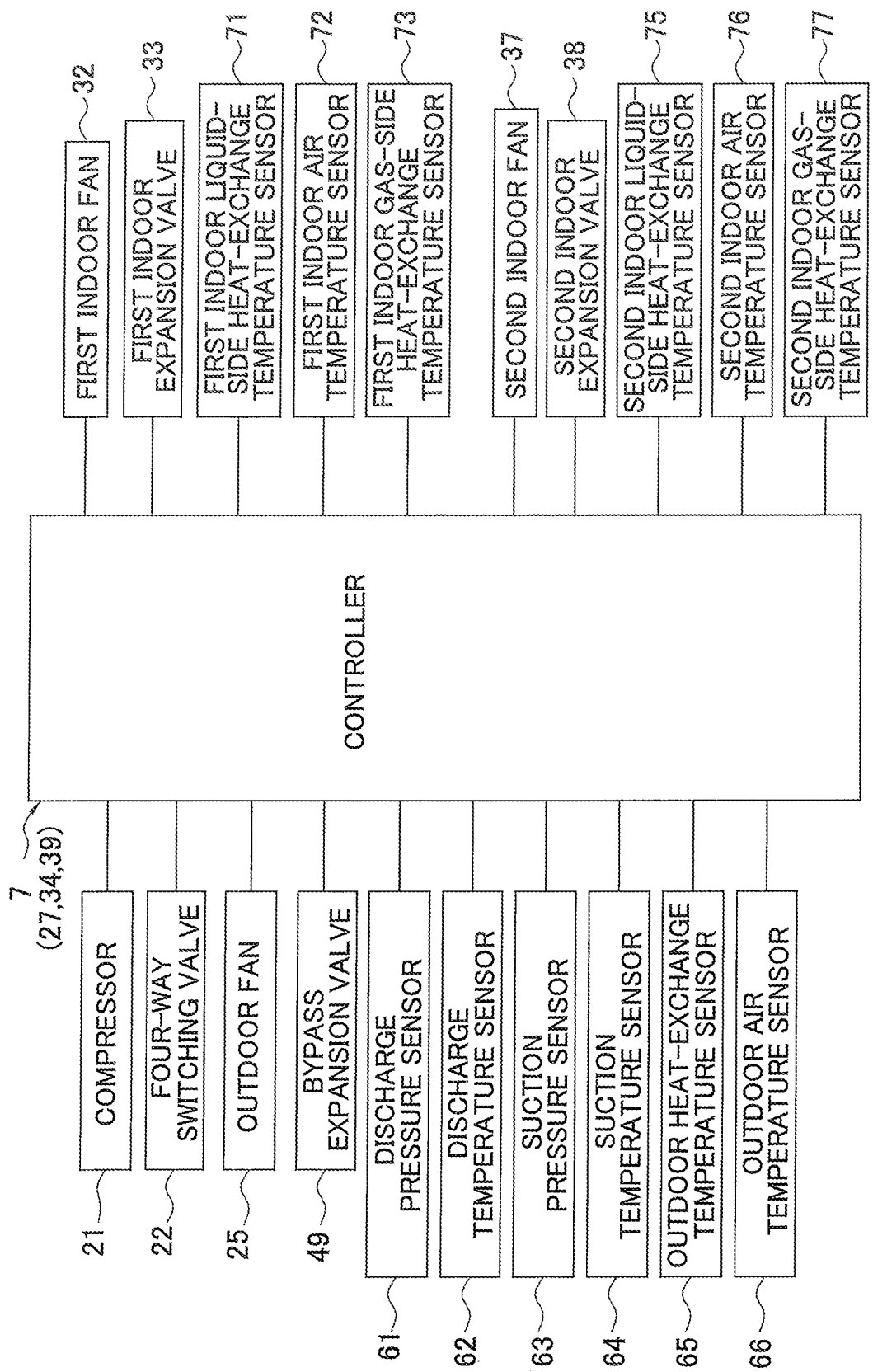
FIG. 21 is a schematic control block configuration diagram of a refrigeration cycle apparatus according to the third embodiment.

An air conditioning apparatus 1*b* serving as a refrigeration cycle apparatus according to a third embodiment is described below with reference to FIG. 20 which is a schematic configuration diagram of a refrigerant circuit and FIG. 21 which is a schematic control block configuration diagram. Differences from the air conditioning apparatus 1*a* according to the second embodiment are mainly described below.

(8-1) Schematic Configuration of Air Conditioning Apparatus 1*b*

The air conditioning apparatus 1*b* differs from the air conditioning apparatus 1*a* according to the second embodiment in that a plurality of indoor units are provided in parallel and an indoor expansion valve is provided on the liquid-refrigerant side of an indoor heat exchanger in each indoor unit.

The air conditioning apparatus 1*b* includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

The air conditioning apparatus 1b differs from the air conditioning apparatus 1a according to the second embodiment in that, in an outdoor unit, the outdoor expansion valve 24 is not provided and a bypass pipe 40 having a bypass expansion valve 49 is provided.

The bypass pipe 40 is a refrigerant pipe that connects a refrigerant pipe extending from the outlet on the liquid-refrigerant side of the outdoor heat exchanger 23 to the liquid-side shutoff valve 29 and a refrigerant pipe extending from one of the connecting ports of the four-way switching valve 22 to the low-pressure receiver 41 to each other. The bypass expansion valve 49 is preferably an electric expansion valve of which the valve opening degree is adjustable. The bypass pipe 40 is not limited to one provided with the electric expansion valve of which the opening degree is adjustable, and may be, for example, one having a capillary tube and an openable and closable electromagnetic valve.

(8-2) Cooling Operating Mode

In the air conditioning apparatus 1b, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load). The evaporation temperature is not limited; however, can be recognized as, for example, the saturation temperature of the refrigerant corresponding to the detected pressure of the suction pressure sensor 63.

The gas refrigerant discharged from the compressor 21 passes through the four-way switching valve 22 and is condensed in the outdoor heat exchanger 23. The refrigerant which has flowed through the outdoor heat exchanger 23 passes through the liquid-side shutoff valve 29 and the liquid-side connection pipe 6, and is sent to the first indoor unit 30 and the second indoor unit 35.

In this case, in the first indoor unit 30, the valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. The degree of superheating of the refrigerant flowing through the gas-side outlet of the first indoor heat exchanger 31 is not limited; however, for example, can be obtained by subtracting the saturation temperature of the refrigerant corresponding to a low pressure of the refrigerant circuit 10 (the detected pressure of the suction pressure sensor 63) from the detected temperature of the first indoor gas-side heat-exchange temperature sensor 73. Moreover, also for the second indoor expansion valve 38 of the second indoor unit 35, similarly to the first indoor expansion valve 33, the valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. The degree of superheating of the refrigerant flowing through the gas-side outlet of the second indoor heat exchanger 36 is not limited, however, for example, can be obtained by subtracting the saturation temperature of the refrigerant corresponding to a low pressure of the refrigerant circuit 10 (the detected pressure of the suction pressure sensor 63) from the detected temperature of the second indoor gas-side heat-exchange temperature sensor 77. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows to the gas-side connection pipe 5. The refrigerant which has flowed through the gas-side connection pipe 5 passes through the gas-side shutoff valve 28, the four-way switching valve 22, and the low-pressure receiver 41, and is sucked into the compressor 21 again. Note that the low-pressure receiver 41 stores, as an excessive refrigerant, the liquid refrigerants which have not been completely evaporated in the first indoor heat exchanger 31 and the second indoor heat exchanger 36. Note that the bypass expansion valve 49 of the bypass pipe 40 is controlled to be opened or controlled such that the valve opening degree thereof is increased when the predetermined condition relating to that the refrigerant amount in the outdoor heat exchanger 23 serving as the condenser is excessive. The control on the opening degree of the bypass expansion valve 49 is not limited; however, for example, when the condensation pressure (for example, the detected pressure of the discharge pressure sensor 61) is a predetermined value or more, the control may be of opening the bypass expansion valve 49 or increasing the opening degree of the bypass expansion valve 49. Alternatively, the control may be of switching the bypass expansion valve 49 between an open state and a closed state at a predetermined time interval to increase the passing flow rate.

(8-3) Heating Operating Mode

In the air conditioning apparatus 1b, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5; then a portion of the refrigerant flows into the gas-side end of the first indoor heat exchanger 31 of the first indoor unit 30 and is condensed in the first indoor heat exchanger 31; and another portion of the refrigerant flows into the gas-side end of the second indoor heat exchanger 36 of the second indoor unit 35 and is condensed in the second indoor heat exchanger 36.

Note that, the valve opening degree of the first indoor expansion valve 33 of the first indoor unit 30 is controlled to satisfy a predetermined condition, for example, such that the degree of subcooling of the refrigerant flowing through the liquid side of the first indoor heat exchanger 31 becomes a predetermined target value. Also for the second indoor expansion valve 38 of the second indoor unit 35, the valve opening degree of the second indoor expansion valve 38 is controlled likewise to satisfy a predetermined condition, for example, such that the degree of subcooling of the refrigerant flowing through the liquid side of the second indoor heat exchanger 36 becomes a predetermined target value. The degree of subcooling of the refrigerant flowing through the liquid side of the first indoor heat exchanger 31 can be obtained by subtracting the saturation temperature of the refrigerant corresponding to a high pressure of the refrigerant circuit 10 (the detected pressure of the discharge pressure sensor 61) from the detected temperature of the first indoor liquid-side heat-exchange temperature sensor 71. Also, the degree of subcooling of the refrigerant flowing through the liquid side of the second indoor heat exchanger 36 may be similarly obtained by subtracting the saturation temperature of the refrigerant corresponding to a high pressure of the refrigerant circuit 10 (the detected pressure of the discharge pressure sensor 61) from the detected temperature of the second indoor liquid-side heat-exchange temperature sensor 75.

The refrigerant decompressed at the first indoor expansion valve 33 and the refrigerant decompressed at the second indoor expansion valve 38 are joined. The joined refrigerant passes through the liquid-side connection pipe 6 and the liquid-side shutoff valve 29, then is evaporated in the outdoor heat exchanger 23, passes through the four-way switching valve 22 and the low-pressure receiver 41, and is sucked into the compressor 21 again. Note that the low-pressure receiver 41 stores, as an excessive refrigerant, the liquid refrigerant which has not been completely evaporated in the outdoor heat exchanger 23. In heating operation, although not limited, the bypass expansion valve 49 of the bypass pipe 40 may be maintained in, for example, a full-close state.

(8-4) Characteristics of Third Embodiment

Since the air conditioning apparatus 1b can perform the refrigeration cycle using the refrigerant containing 1,2-difluoroethylene, the air conditioning apparatus 1b can perform a refrigeration cycle using a small-GWP refrigerant.

Moreover, since the air conditioning apparatus 1b is provided with the low-pressure receiver 41, liquid compression in the compressor 21 can be suppressed. Furthermore, since superheating control is performed on the first indoor expansion valve 33 and the second indoor expansion valve 38 during cooling operation and subcooling control is performed on the first indoor expansion valve 33 and the second indoor expansion valve 38 during heating operation, the capacities of the first indoor heat exchanger 31 and the second indoor heat exchanger 36 are likely sufficiently provided.

(9) Fourth Embodiment

Figure 22:
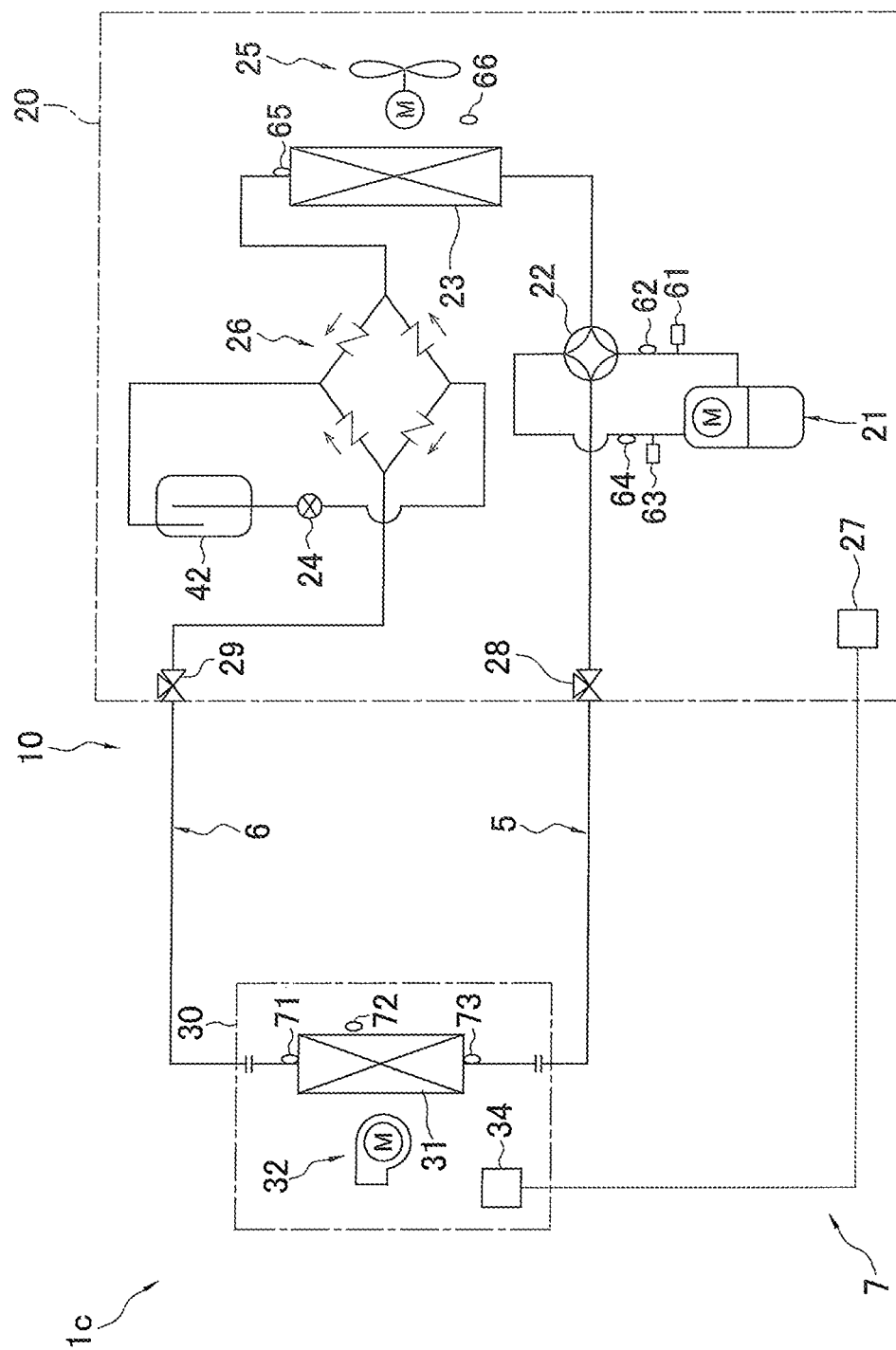
FIG. 22 is a schematic configuration diagram of a refrigerant circuit according to a fourth embodiment.
Figure 23:
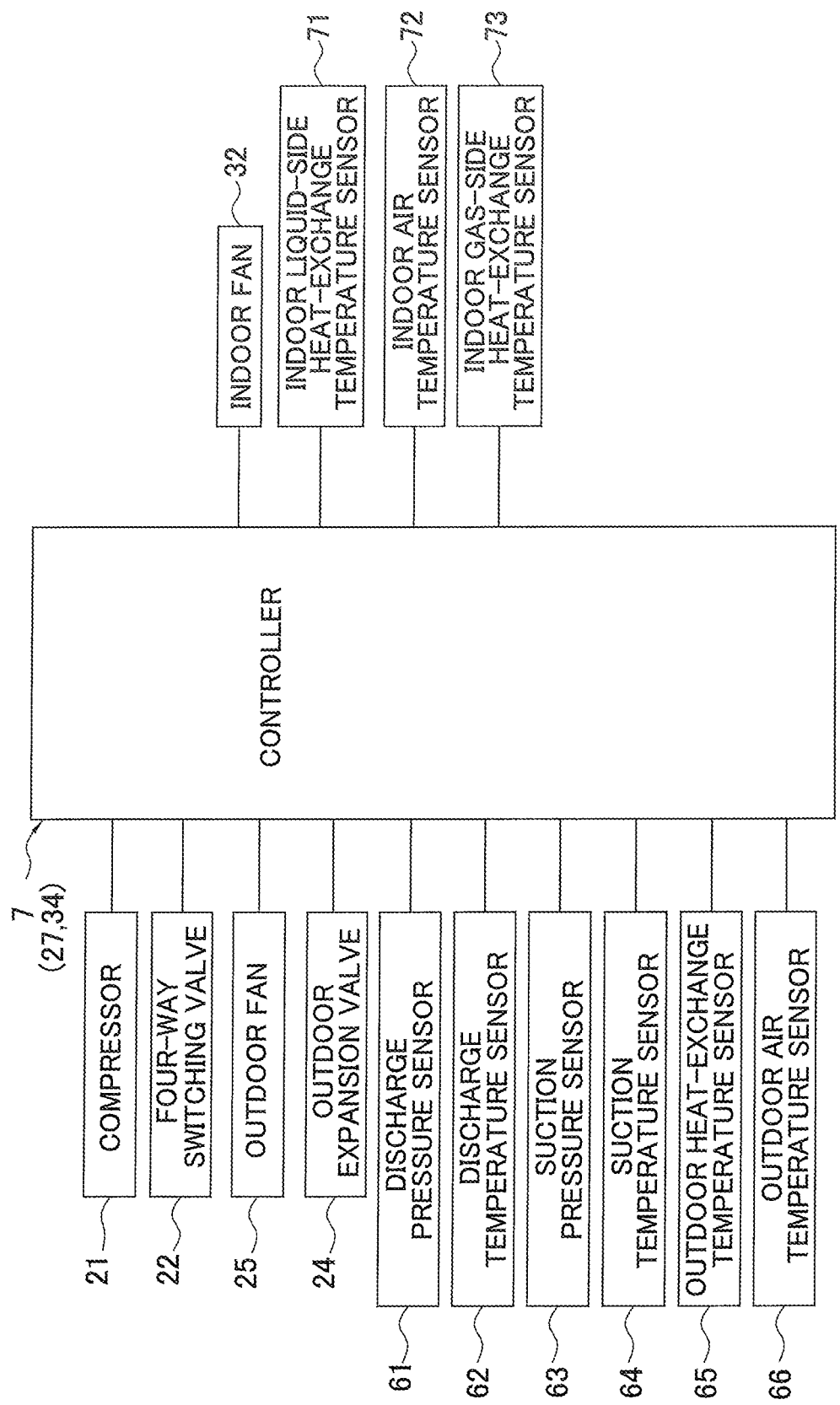
FIG. 23 is a schematic control block configuration diagram of a refrigeration cycle apparatus according to the fourth embodiment.

An air conditioning apparatus 1c serving as a refrigeration cycle apparatus according to a fourth embodiment is described below with reference to FIG. 22 which is a schematic configuration diagram of a refrigerant circuit and FIG. 23 which is a schematic control block configuration diagram. Differences from the air conditioning apparatus 1a according to the second embodiment are mainly described below.

(9-1) Schematic Configuration of Air Conditioning Apparatus 1c

The air conditioning apparatus 1c differs from the air conditioning apparatus 1a according to the second embodiment in that the outdoor unit 20 does not include the low-pressure receiver 41, but includes a high-pressure receiver 42 and an outdoor bridge circuit 26.

Moreover, the indoor unit 30 includes an indoor liquid-side heat-exchange temperature sensor 71 that detects the temperature of the refrigerant flowing through the liquid side of the indoor heat exchanger 31, an indoor air temperature sensor 72 that detects the temperature of indoor air, and an indoor gas-side heat-exchange temperature sensor 73 that detects the temperature of the refrigerant flowing through the gas side of the indoor heat exchanger 31.

The outdoor bridge circuit 26 is provided between the liquid side of the outdoor heat exchanger 23 and the liquid-side shutoff valve 29, and has four connection portions and check valves provided between the connection portions. Refrigerant pipes extending to the high-pressure receiver 42 are connected to two portions that are included in the four connection portions of the outdoor bridge circuit 26 and that are other than a portion connected to the liquid side of the outdoor heat exchanger 23 and a portion connected to the liquid-side shutoff valve 29. The outdoor expansion valve 24 is provided midway in a refrigerant pipe that is included in the aforementioned refrigerant pipes and that extends from a gas region of the inner space of the high-pressure receiver 42.

(9-2) Cooling Operating Mode

In the air conditioning apparatus 1c, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72). The evaporation temperature is not limited; however, may be recognized as, for example, the detected temperature of the indoor liquid-side heat-exchange temperature sensor 71, or the saturation temperature of the refrigerant corresponding to the detected pressure of the suction pressure sensor 63.

The gas refrigerant discharged from the compressor 21 passes through the four-way switching valve 22 and is condensed in the outdoor heat exchanger 23. The refrigerant which has flowed through the outdoor heat exchanger 23 flows into the high-pressure receiver 42 via a portion of the outdoor bridge circuit 26. Note that the high-pressure receiver 42 stores, as the liquid refrigerant, an excessive refrigerant in the refrigerant circuit 10. The gas refrigerant which has flowed out from the gas region of the high-pressure receiver 42 is decompressed in the outdoor expansion valve 24.

In this case, the valve opening degree of the outdoor expansion valve 24 is controlled to satisfy a predetermined condition, for example, such that the degree of superheating of the refrigerant flowing through the gas-side outlet of the indoor heat exchanger 31 or the degree of superheating of the refrigerant flowing through the suction side of the compressor 21 becomes a target value. Although not limited, the degree of superheating of the refrigerant flowing through the gas-side outlet of the indoor heat exchanger 31 may be obtained by subtracting the saturation temperature of the refrigerant corresponding to a low pressure of the refrigerant circuit 10 (the detected pressure of the suction pressure sensor 63) from the detected temperature of the indoor gas-side heat-exchange temperature sensor 73. Alternatively, the degree of superheating of the refrigerant flowing through the suction side of the compressor 21 may be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 passes through anther portion of the outdoor bridge circuit 26, passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 passes through the gas-side connection pipe 5, the gas-side shutoff valve 28, and the four-way switching valve 22, and is sucked into the compressor 21 again.

(9-3) Heating Operating Mode

In the air conditioning apparatus 1c, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, flows through a portion of the outdoor bridge circuit 26, and flows into the high-pressure receiver 42. Note that the high-pressure receiver 42 stores, as the liquid refrigerant, an excessive refrigerant in the refrigerant circuit 10. The gas refrigerant which has flowed out from the gas region of the high-pressure receiver 42 is decompressed to a low pressure in the refrigeration cycle at the outdoor expansion valve 24.

Note that the valve opening degree of the outdoor expansion valve 24 is controlled to satisfy a predetermined condition, for example, such that the degree of superheating of the refrigerant to be sucked by the compressor 21 becomes a target value. The degree of superheating of the refrigerant flowing through the suction side of the compressor 21 is not limited; however, for example, can be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows through another portion of the outdoor bridge circuit 26, is evaporated in the outdoor heat exchanger 23, passes through the four-way switching valve 22, and is sucked into the compressor 21 again.

(9-4) Characteristics of Fourth Embodiment

Since the air conditioning apparatus 1c can perform the refrigeration cycle using the refrigerant containing 1,2-difluoroethylene, the air conditioning apparatus 1c can perform a refrigeration cycle using a small-GWP refrigerant.

Moreover, since the air conditioning apparatus 1c is provided with the high-pressure receiver 42, an excessive refrigerant in the refrigerant circuit 10 can be stored.

(10) Fifth Embodiment

Figure 24:
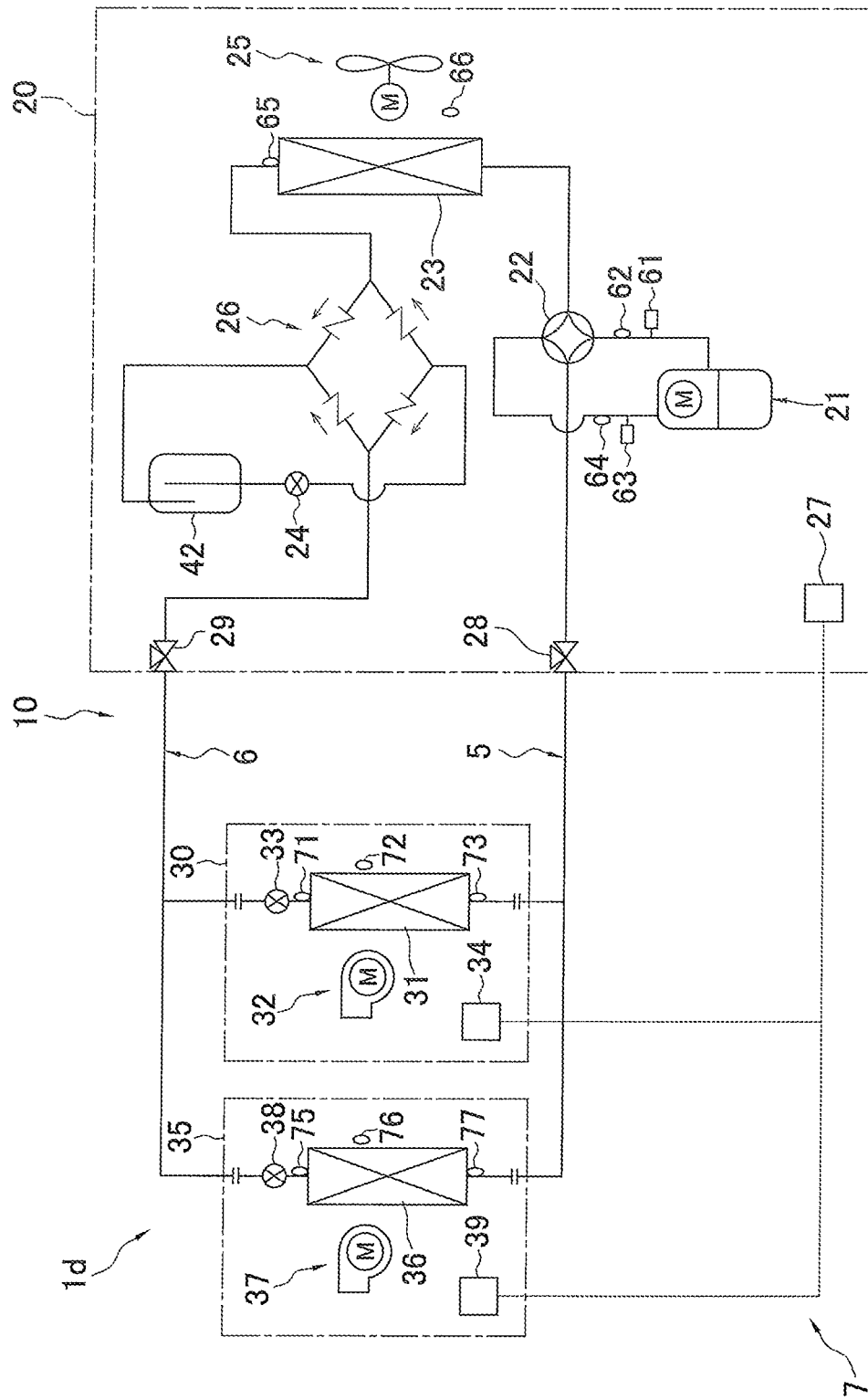
FIG. 24 is a schematic configuration diagram of a refrigerant circuit according to a fifth embodiment.
Figure 25:
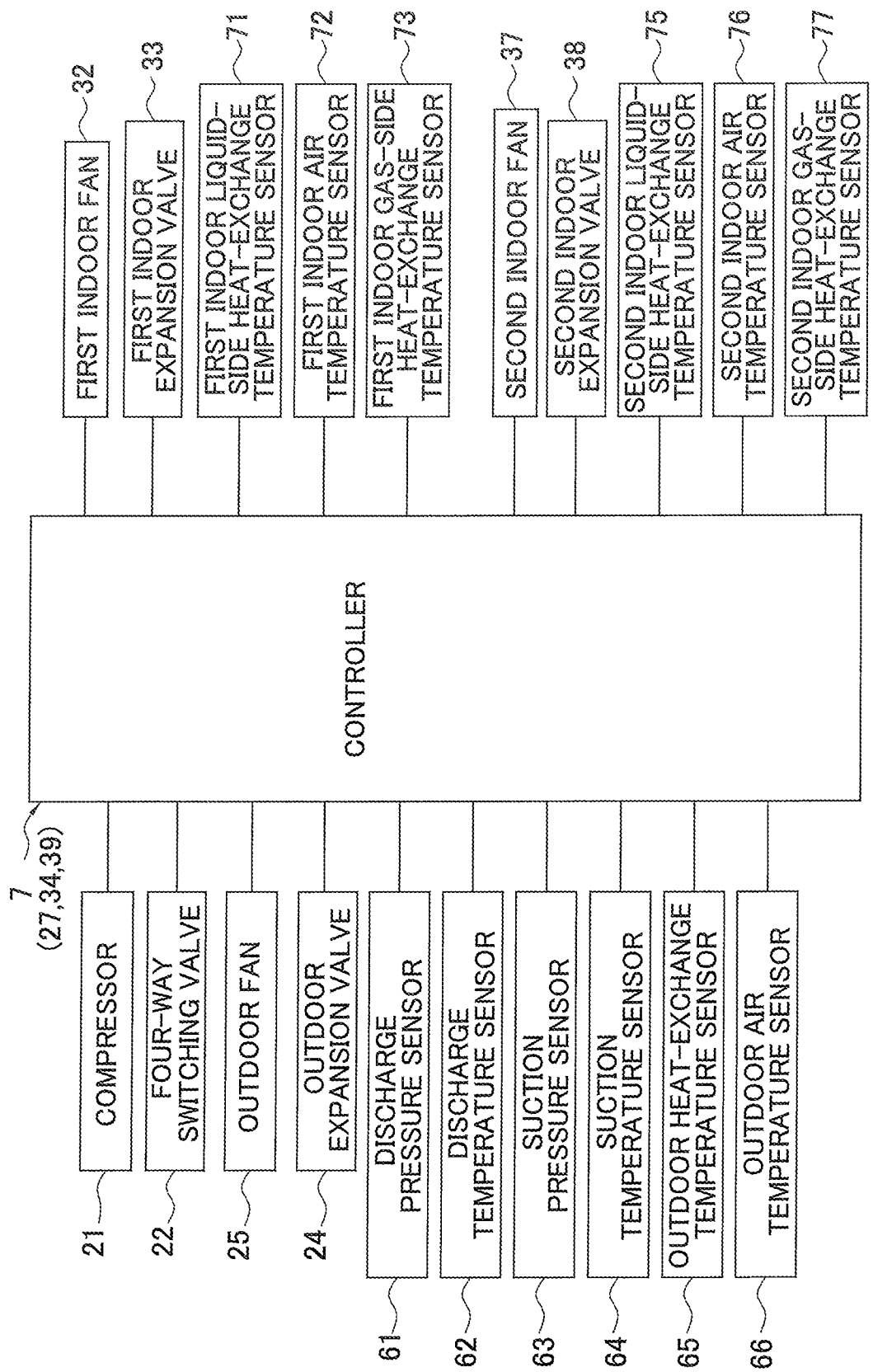
FIG. 25 is a schematic control block configuration diagram of a refrigeration cycle apparatus according to the fifth embodiment.

An air conditioning apparatus 1d serving as a refrigeration cycle apparatus according to a fifth embodiment is described below with reference to FIG. 24 which is a schematic configuration diagram of a refrigerant circuit and FIG. 25 which is a schematic control block configuration diagram. Differences from the air conditioning apparatus 1c according to the fourth embodiment are mainly described below.

(10-1) Schematic Configuration of Air Conditioning Apparatus 1d

The air conditioning apparatus 1d differs from the air conditioning apparatus 1c according to the fourth embodiment in that a plurality of indoor units are provided in parallel and an indoor expansion valve is provided on the liquid-refrigerant side of an indoor heat exchanger in each indoor unit.

The air conditioning apparatus 1d includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(10-2) Cooling Operating Mode

In the air conditioning apparatus 1c, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and is condensed in the outdoor heat exchanger 23. The refrigerant which has flowed through the outdoor heat exchanger 23 flows into the high-pressure receiver 42 via a portion of the outdoor bridge circuit 26. Note that the high-pressure receiver 42 stores, as the liquid refrigerant, an excessive refrigerant in the refrigerant circuit 10. The gas refrigerant which has flowed out from the gas region of the high-pressure receiver 42 is decompressed in the outdoor expansion valve 24. In this case, during cooling operation, the outdoor expansion valve 24 is controlled such that, for example, the valve opening degree becomes a full-open state.

The refrigerant which has passed through the outdoor expansion valve 24 passes through anther portion of the outdoor bridge circuit 26, passes through the liquid-side shutoff valve 29 and the liquid-side connection pipe 6, and flows into the first indoor unit 30 and the second indoor unit 35.

The refrigerant which has flowed into the first indoor unit 30 is decompressed at the first indoor expansion valve 33. The valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. Although not limited, the degree of superheating of the refrigerant flowing through the gas-side outlet of the first indoor heat exchanger 31 may be obtained by subtracting the saturation temperature of the refrigerant corresponding to a low pressure of the refrigerant circuit 10 (the detected pressure of the suction pressure sensor 63) from the detected temperature of the first indoor gas-side heat-exchange temperature sensor 73. Likewise, the refrigerant which has flowed into the second indoor unit 35 is decompressed at the second indoor expansion valve 38. The valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. Although not limited, for example, the degree of superheating of the refrigerant flowing through the gas-side outlet of the second indoor heat exchanger 36 may be obtained by subtracting the saturation temperature of the refrigerant corresponding to a low pressure of the refrigerant circuit 10 (the detected pressure of the suction pressure sensor 63) from the detected temperature of the second indoor gas-side heat-exchange temperature sensor 77. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant evaporated in the first indoor heat exchanger 31 and the refrigerant evaporated in the second indoor heat exchanger 36 are joined. Then, the joined refrigerant passes through the gas-side connection pipe 5, the gas-side shutoff valve 28, and the four-way switching valve 22, and is sucked into the compressor 21 again.

(10-3) Heating Operating Mode

In the air conditioning apparatus 1c, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load). The condensation temperature is not limited; however, may be recognized as, for example, the saturation temperature of the refrigerant corresponding to the detected pressure of the discharge pressure sensor 61.

The gas refrigerant discharged from the compressor 21 flows through the four-way switching valve 22 and the gas-side connection pipe 5, and then flows into each of the first indoor unit 30 and the second indoor unit 35.

The gas refrigerant which has flowed into the first indoor heat exchanger 31 of the first indoor unit 30 is condensed in the first indoor heat exchanger 31. The refrigerant which has flowed through the first indoor heat exchanger 31 is decompressed at the first indoor expansion valve 33. The valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. The degree of subcooling of the refrigerant flowing through the liquid-side outlet of the first indoor heat exchanger 31 can be obtained, for example, by subtracting the saturation temperature of the refrigerant corresponding to the detected pressure of the discharge pressure sensor 61 from the detected temperature of the first indoor liquid-side heat-exchange temperature sensor 71.

The gas refrigerant which has flowed into the second indoor heat exchanger 36 of the second indoor unit 35 is condensed in the second indoor heat exchanger 36 likewise. The refrigerant which has flowed through the second indoor heat exchanger 36 is decompressed at the second indoor expansion valve 38. The valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value. The degree of subcooling of the refrigerant flowing through the liquid-side outlet of the second indoor heat exchanger 36 can be obtained, for example, by subtracting the saturation temperature of the refrigerant corresponding to the detected pressure of the discharge pressure sensor 61 from the detected temperature of the second indoor liquid-side heat-exchange temperature sensor 75.

The refrigerant which has flowed out from the liquid-side end of the first indoor heat exchanger 31 and the refrigerant which has flowed out from the liquid-side end of the second indoor heat exchanger 36 are joined. Then, the joined refrigerant passes through the liquid-side connection pipe 6 and flows into the outdoor unit 20.

The refrigerant which has flowed into the outdoor unit 20 passes through the liquid-side shutoff valve 29, flows through a portion of the outdoor bridge circuit 26, and flows into the high-pressure receiver 42. Note that the high-pressure receiver 42 stores, as the liquid refrigerant, an excessive refrigerant in the refrigerant circuit 10. The gas refrigerant which has flowed out from the gas region of the high-pressure receiver 42 is decompressed to a low pressure in the refrigeration cycle at the outdoor expansion valve 24. That is, during heating operation, the high-pressure receiver 42 stores a pseudo-intermediate-pressure refrigerant.

Note that the valve opening degree of the outdoor expansion valve 24 is controlled to satisfy a predetermined condition, for example, such that the degree of superheating of the refrigerant to be sucked by the compressor 21 becomes a target value. The degree of superheating of the refrigerant to be sucked by the compressor 21 is not limited however, for example, can be obtained by subtracting the saturation temperature of the refrigerant corresponding to the detected pressure of the suction pressure sensor 63 from the detected temperature of the suction temperature sensor 64. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 flows through another portion of the outdoor bridge circuit 26, is evaporated in the outdoor heat exchanger 23, passes through the four-way switching valve 22, and is sucked into the compressor 21 again.

(10-4) Characteristics of Fifth Embodiment

Since the air conditioning apparatus 1d can perform the refrigeration cycle using the refrigerant containing 1,2-difluoroethylene, the air conditioning apparatus 1d can perform a refrigeration cycle using a small-GWP refrigerant.

Moreover, since the air conditioning apparatus 1d is provided with the high-pressure receiver 42, an excessive refrigerant in the refrigerant circuit 10 can be stored.

During heating operation, since superheating control is performed on the valve opening degree of the outdoor expansion valve 24 to ensure reliability of the compressor 21. Thus, subcooling control can be performed on the first indoor expansion valve 33 and the second indoor expansion valve 38 to sufficiently provide the capacities of the first indoor heat exchanger 31 and the second indoor heat exchanger 36.

(11) Sixth Embodiment

Figure 26:
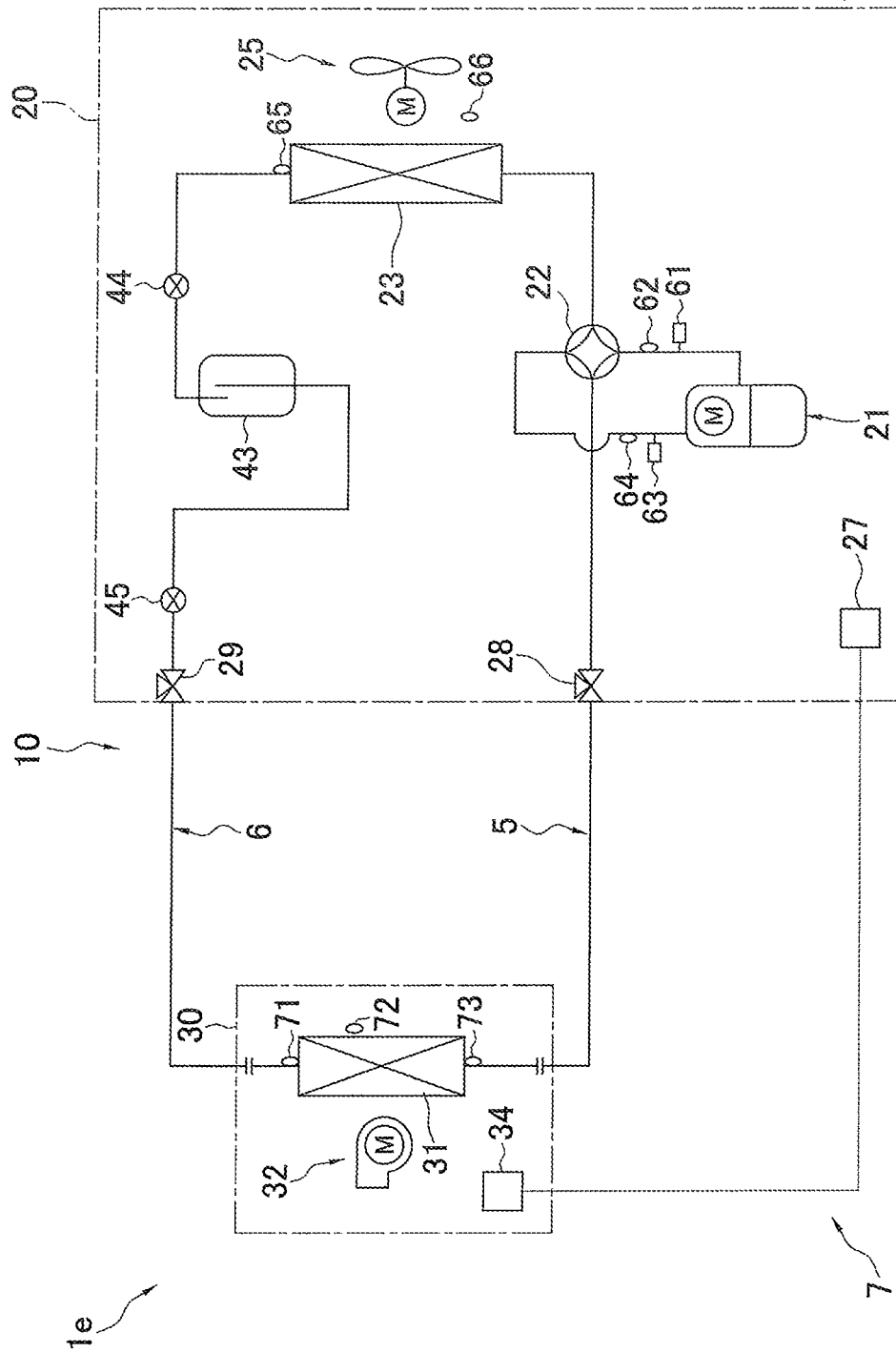
FIG. 26 is a schematic configuration diagram of a refrigerant circuit according to a sixth embodiment.
Figure 27:
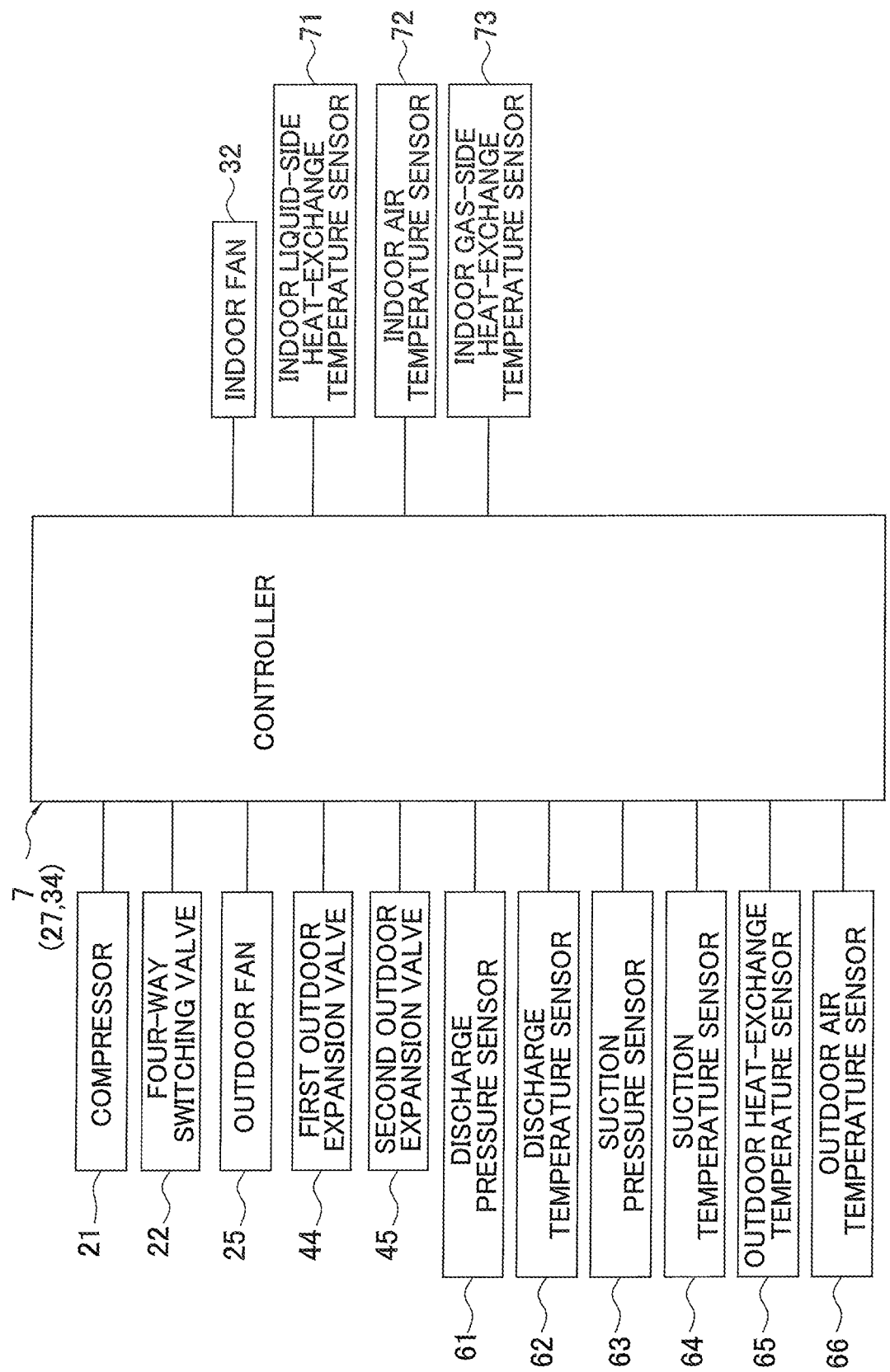
FIG. 27 is a schematic control block configuration diagram of a refrigeration cycle apparatus according to the sixth embodiment.

An air conditioning apparatus 1e serving as a refrigeration cycle apparatus according to a sixth embodiment is described below with reference to FIG. 26 which is a schematic configuration diagram of a refrigerant circuit and FIG. 27 which is a schematic control block configuration diagram. Differences from the air conditioning apparatus 1a according to the second embodiment are mainly described below.

(11-1) Schematic Configuration of Air Conditioning Apparatus 1e

The air conditioning apparatus 1e differs from the air conditioning apparatus 1a according to the second embodiment in that the outdoor unit 20 does not include the low-pressure receiver 41, but includes an intermediate-pressure receiver 43 and does not include the outdoor expansion valve 24, but includes a first outdoor expansion valve 44 and a second outdoor expansion valve 45.

The intermediate-pressure receiver 43 is a refrigerant container that is provided between the liquid side of the outdoor heat exchanger 23 and the liquid-side shutoff valve 29 in the refrigerant circuit 10 and that can store, as the liquid refrigerant, an excessive refrigerant in the refrigerant circuit 10.

The first outdoor expansion valve 44 is provided midway in a refrigerant pipe extending from the liquid side of the outdoor heat exchanger 23 to the intermediate-pressure receiver 43. The second outdoor expansion valve 45 is provided midway in a refrigerant pipe extending from the intermediate-pressure receiver 43 to the liquid-side shutoff valve 29. The first outdoor expansion valve 44 and the second outdoor expansion valve 45 are each preferably an electric expansion valve of which the valve opening degree is adjustable.

(11-2) Cooling Operating Mode

In the air conditioning apparatus 1e, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 is decompressed at the first outdoor expansion valve 44 to an intermediate pressure in the refrigeration cycle.

In this case, the valve opening degree of the first outdoor expansion valve 44 is controlled to satisfy a predetermined condition, for example, such that the degree of subcooling of the refrigerant flowing through the liquid-side outlet of the outdoor heat exchanger 23 becomes a target value.

The refrigerant decompressed at the first outdoor expansion valve 44 flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 is decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, and is sucked into the compressor 21 again.

(11-3) Heating Operating Mode

In the air conditioning apparatus 1e, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to an intermediate pressure in the refrigeration cycle at the second outdoor expansion valve 45.

In this case, the valve opening degree of the second outdoor expansion valve 45 is controlled to satisfy a predetermined condition, for example, such that the degree of subcooling of the refrigerant flowing through the liquid-side outlet of the indoor heat exchanger 31 becomes a target value.

The refrigerant decompressed at the second outdoor expansion valve 45 flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 is decompressed to a low pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, and is sucked into the compressor 21 again.

(11-4) Characteristics of Sixth Embodiment

Since the air conditioning apparatus 1e can perform the refrigeration cycle using the refrigerant containing 1,2-difluoroethylene, the air conditioning apparatus 1e can perform a refrigeration cycle using a small-GWP refrigerant.

Moreover, since the air conditioning apparatus 1e is provided with the intermediate-pressure receiver 43, an excessive refrigerant in the refrigerant circuit 10 can be stored. During cooling operation, since subcooling control is performed on the first outdoor expansion valve 44, the capacity of the outdoor heat exchanger 23 can be likely sufficiently provided. During heating operation, since subcooling control is performed on the second outdoor expansion valve 45, the capacity of the indoor heat exchanger 31 can be likely sufficiently provided.

(12) Seventh Embodiment

Figure 28:
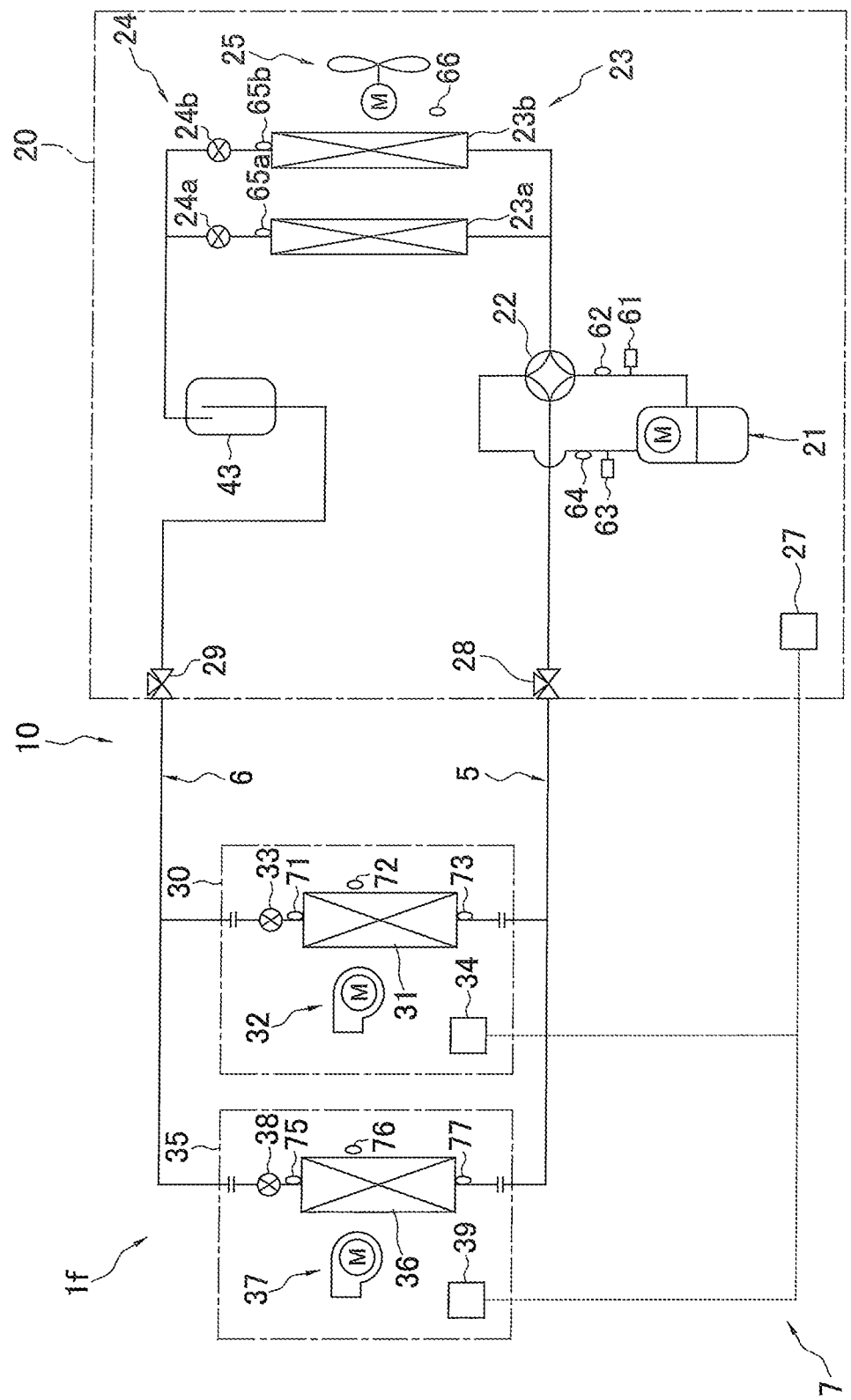
FIG. 28 is a schematic configuration diagram of a refrigerant circuit according to a seventh embodiment.
Figure 29:
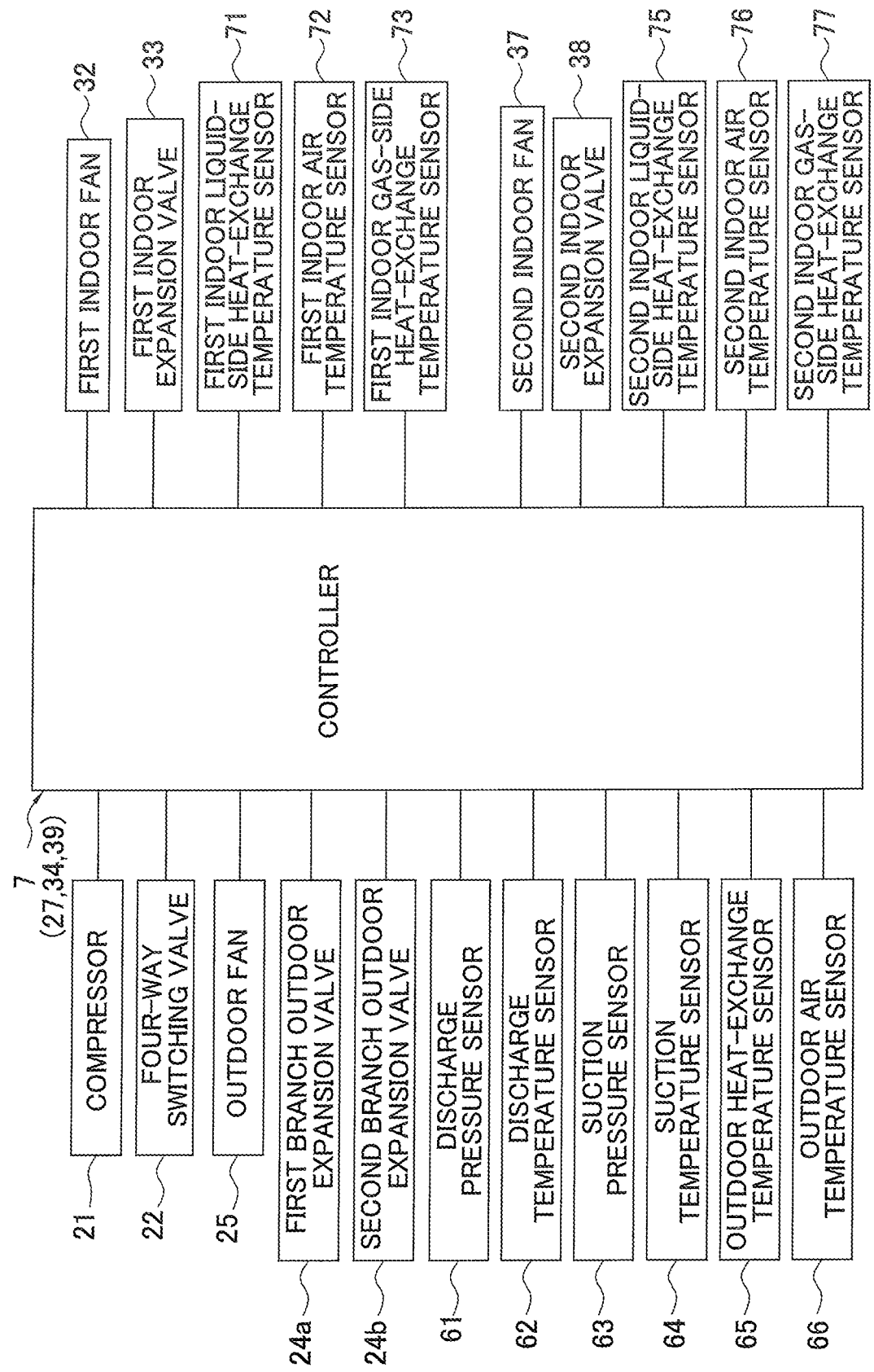
FIG. 29 is a schematic control block configuration diagram of a refrigeration cycle apparatus according to the seventh embodiment.

An air conditioning apparatus 1f serving as a refrigeration cycle apparatus according to a seventh embodiment is described below with reference to FIG. 28 which is a schematic configuration diagram of a refrigerant circuit and FIG. 29 which is a schematic control block configuration diagram. Differences from the air conditioning apparatus 1e according to the sixth embodiment are mainly described below.

(12-1) Schematic Configuration of Air Conditioning Apparatus 1f

The air conditioning apparatus 1f differs from the air conditioning apparatus 1e according to the sixth embodiment in that the outdoor unit 20 includes a first outdoor heat exchanger 23a and a second outdoor heat exchanger 23b disposed in parallel to each other, includes a first branch outdoor expansion valve 24a on the liquid-refrigerant side of the first outdoor heat exchanger 23a, and includes a second branch outdoor expansion valve 24b on the liquid-refrigerant side of the second outdoor heat exchanger 23b. The first branch outdoor expansion valve 24a and the second branch outdoor expansion valve 24b are each preferably an electric expansion valve of which the valve opening degree is adjustable.

Moreover, the air conditioning apparatus 1f differs from the air conditioning apparatus 1e according to the sixth embodiment in that a plurality of indoor units are provided in parallel and an indoor expansion valve is provided on the liquid-refrigerant side of an indoor heat exchanger in each indoor unit.

The air conditioning apparatus 1f includes a first indoor unit 30 and a second indoor unit 35 connected in parallel to each other. Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34, and a first indoor liquid-side heat-exchange temperature sensor 71, a first indoor air temperature sensor 72, and a first indoor gas-side heat-exchange temperature sensor 73 that are electrically connected to the first indoor-unit control unit 34. The first indoor liquid-side heat-exchange temperature sensor 71 detects the temperature of the refrigerant flowing through the outlet on the liquid-refrigerant side of the first indoor heat exchanger 31. The first indoor gas-side heat-exchange temperature sensor 73 detects the temperature of the refrigerant flowing through the outlet on the gas-refrigerant side of the first indoor heat exchanger 31. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(12-2) Cooling Operating Mode

In the air conditioning apparatus 1*f*, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22, then is branched and flows to the first outdoor heat exchanger 23*a* and the second outdoor heat exchanger 23*b*, and the respective branched refrigerants are condensed in the first outdoor heat exchanger 23*a* and the second outdoor heat exchanger 23*b*. The refrigerant which has flowed through the first outdoor heat exchanger 23*a* is decompressed at the first branch outdoor expansion valve 24*a* to an intermediate pressure in the refrigeration cycle. The refrigerant which has flowed through the second outdoor heat exchanger 23*b* is decompressed at the second branch outdoor expansion valve 24*b* to an intermediate pressure in the refrigeration cycle.

In this case, each of the first branch outdoor expansion valve 24*a* and the second branch outdoor expansion valve 24*b* may be controlled, for example, to be in a full-open state.

Moreover, when the first outdoor heat exchanger 23*a* and the second outdoor heat exchanger 23*b* have a difference in easiness of flowing of the refrigerant due to the structure thereof or the connection of refrigerant pipes, the valve opening degree of the first branch outdoor expansion valve 24*a* may be controlled to satisfy a predetermined condition, for example, such that the degree of subcooling of the refrigerant flowing through the liquid-side outlet of the first outdoor heat exchanger 23*a* becomes a common target value, and the valve opening degree of the second branch outdoor expansion valve 24*b* may be controlled to satisfy a predetermined condition, for example, such that the degree of subcooling of the refrigerant flowing through the liquid-side outlet of the second outdoor heat exchanger 23*b* becomes a common target value. With the control, an uneven flow of the refrigerant between the first outdoor heat exchanger 23*a* and the second outdoor heat exchanger 23*b* can be minimized.

The refrigerant which has passed through the first branch outdoor expansion valve 24*a* and the refrigerant which has passed through the second branch outdoor expansion valve 24*b* are joined. Then, the joined refrigerant flows into the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 flows through the liquid-side shutoff valve 29 and the liquid-side connection pipe 6, and flows into each of the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, likewise, the valve opening degree of the second indoor expansion valve 38 is also controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value. Note that the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant passes through the gas-side connection pipe 5, the gas-side shutoff valve 28, and the four-way switching valve 22, and is sucked by the compressor 21 again.

(12-3) Heating Operating Mode

In the air conditioning apparatus 1*f*, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the second indoor heat exchanger 36 is decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled likewise to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29, and is sent to the intermediate-pressure receiver 43. The intermediate-pressure receiver 43 stores, as the liquid refrigerant, an excessive refrigerant in the refrigerant circuit 10. The refrigerant which has passed through the intermediate-pressure receiver 43 flows in a separated manner to the first branch outdoor expansion valve 24a and the second branch outdoor expansion valve 24b.

The first branch outdoor expansion valve 24a decompresses the passing refrigerant to a low pressure in the refrigeration cycle. The second branch outdoor expansion valve 24b similarly decompresses the passing refrigerant to a low pressure in the refrigeration cycle.

In this case, each of the valve opening degrees of the first branch outdoor expansion valve 24a and the second branch outdoor expansion valve 24b is controlled to satisfy a predetermined condition, for example, such that the degree of superheating of the refrigerant to be sucked by the compressor 21 becomes a target value. Note that the method of controlling each of the valve opening degrees of the first branch outdoor expansion valve 24a and the second branch outdoor expansion valve 24b is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first branch outdoor expansion valve 24a is evaporated in the first outdoor heat exchanger 23a, the refrigerant decompressed at the second branch outdoor expansion valve 24b is evaporated in the second outdoor heat exchanger 23b, and the evaporated refrigerants are joined. Then, the joined refrigerant passes through the four-way switching valve 22 and is sucked by the compressor 21 again.

(12-4) Characteristics of Seventh Embodiment

Since the air conditioning apparatus 1f can perform the refrigeration cycle using the refrigerant containing 1,2-difluoroethylene, the air conditioning apparatus 1f can perform a refrigeration cycle using a small-GWP refrigerant.

Moreover, since the air conditioning apparatus f is provided with the intermediate-pressure receiver 43, an excessive refrigerant in the refrigerant circuit 10 can be stored. During heating operation, since subcooling control is performed on the first indoor expansion valve 33 and the second indoor expansion valve 38, the capacity of the indoor heat exchanger 31 can be likely sufficiently provided.

(13) Eighth Embodiment

Figure 30:
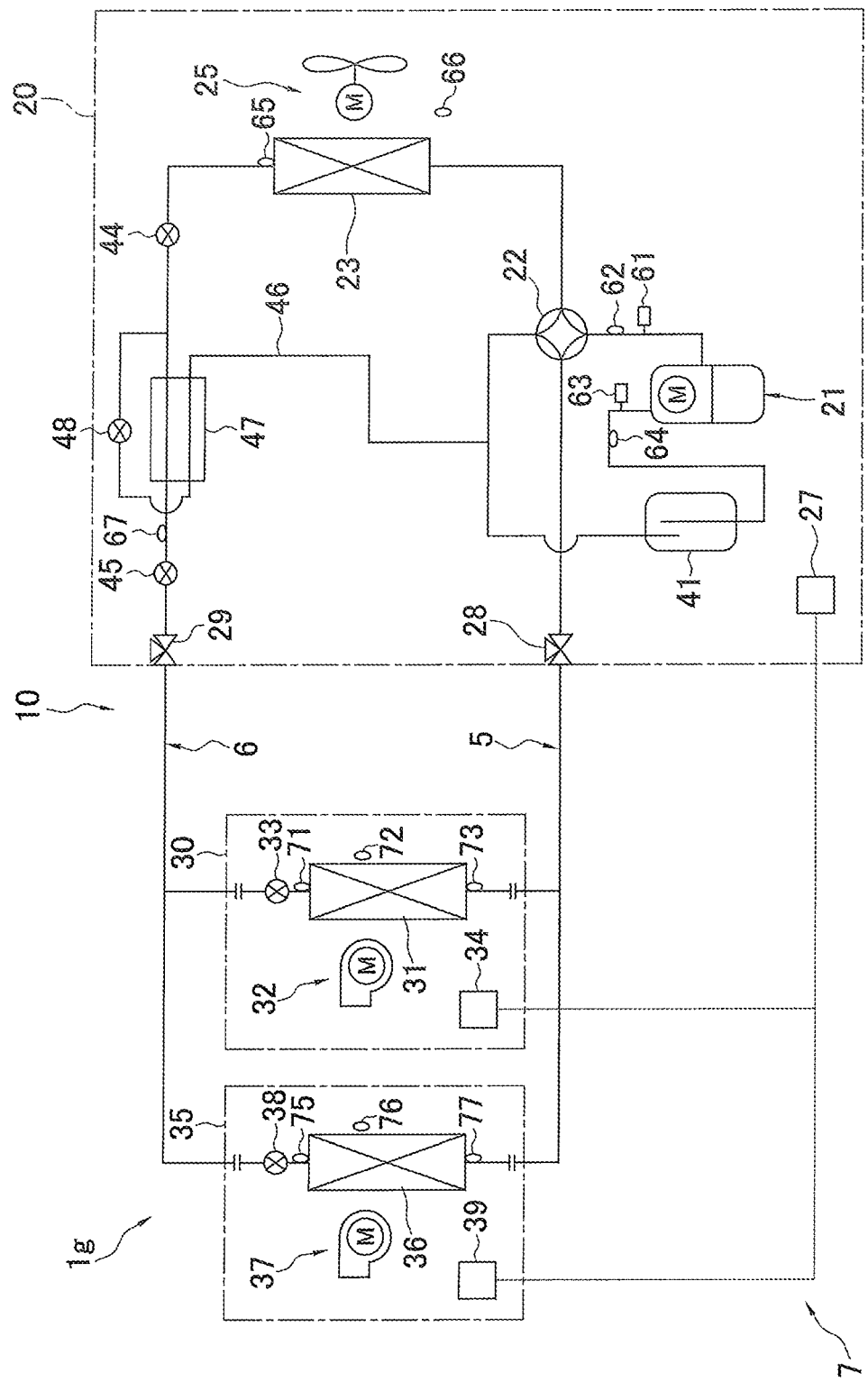
FIG. 30 is a schematic configuration diagram of a refrigerant circuit according to an eighth embodiment.
Figure 31:
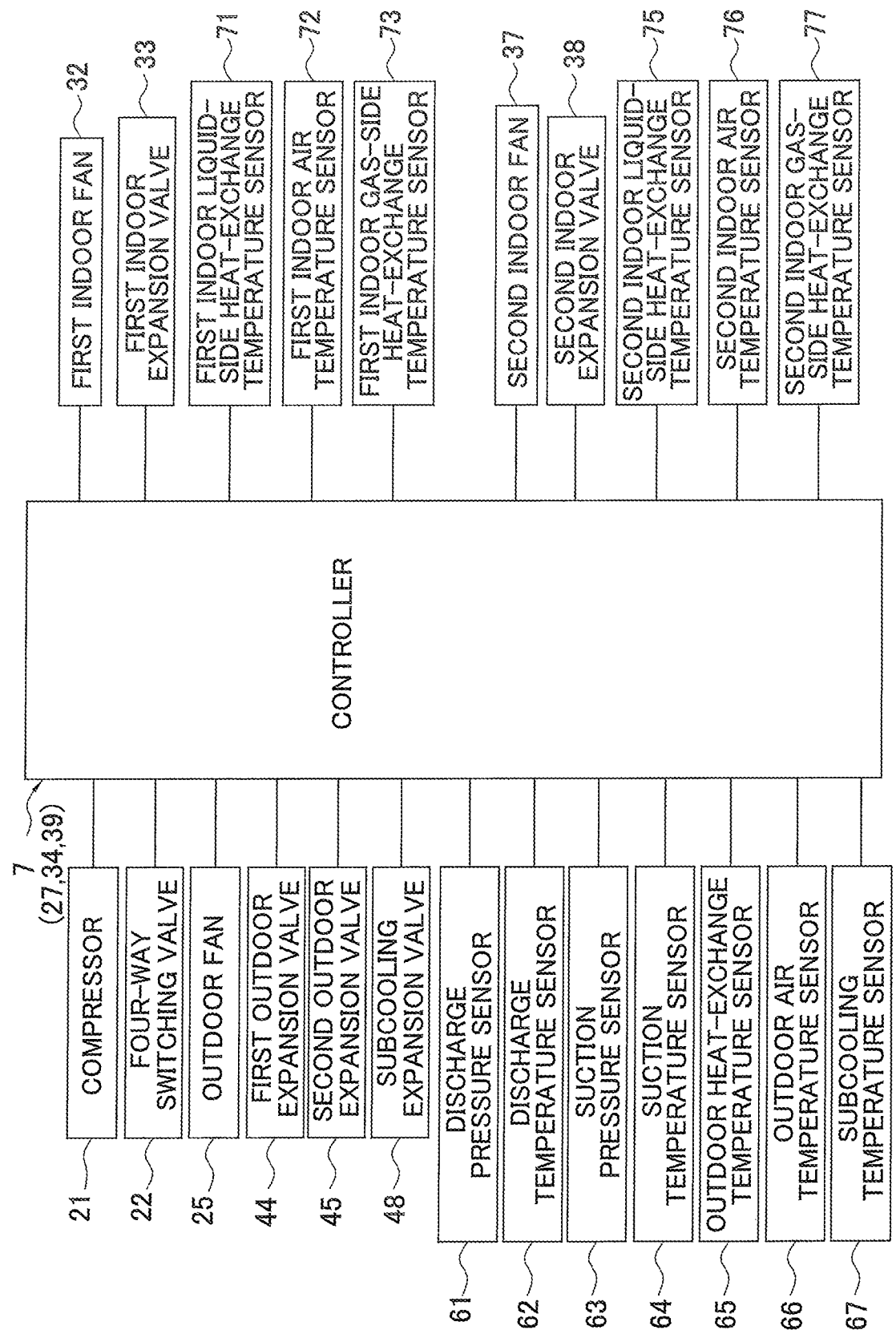
FIG. 31 is a schematic control block configuration diagram of a refrigeration cycle apparatus according to the eighth embodiment.

An air conditioning apparatus 1g serving as a refrigeration cycle apparatus according to an eighth embodiment is described below with reference to FIG. 30 which is a schematic configuration diagram of a refrigerant circuit and FIG. 31 which is a schematic control block configuration diagram. Differences from the air conditioning apparatus 1b according to the third embodiment are mainly described below.

(13-1) Schematic Configuration of Air Conditioning Apparatus 1g

The air conditioning apparatus 1g differs from the air conditioning apparatus 1b according to the third embodiment in that the bypass pipe 40 having the bypass expansion valve 49 is not provided, a subcooling heat exchanger 47 is provided, a subcooling pipe 46 is provided, a first outdoor expansion valve 44 and a second outdoor expansion valve 45 are provided, and a subcooling temperature sensor 67 is provided.

The first outdoor expansion valve 44 is provided between the liquid-side outlet of the outdoor heat exchanger 23 and the liquid-side shutoff valve 29 in the refrigerant circuit 10. The second outdoor expansion valve 45 is provided between the first outdoor expansion valve 44 and the liquid-side shutoff valve 29 in the refrigerant circuit 10. The first outdoor expansion valve 44 and the second outdoor expansion valve 45 are each preferably an electric expansion valve of which the valve opening degree is adjustable.

The subcooling pipe 46 is, in the refrigerant circuit 10, branched from a branch portion between the first outdoor expansion valve 44 and the second outdoor expansion valve 45, and is joined to a joint portion between one of the connecting ports of the four-way switching valve 22 and the low-pressure receiver 41. The subcooling pipe 46 is provided with a subcooling expansion valve 48. The subcooling expansion valve 48 is preferably an electric expansion valve of which the valve opening degree is adjustable.

The subcooling heat exchanger 47 is, in the refrigerant circuit 10, a heat exchanger that causes the refrigerant flowing through the portion between the first outdoor expansion valve 44 and the second outdoor expansion valve 45 and the refrigerant flowing through a portion on the joint portion side of the subcooling expansion valve 48 in the subcooling pipe 46 to exchange heat with each other. In the present embodiment, the subcooling heat exchanger 47 is provided in a portion that is between the first outdoor expansion valve 44 and the second outdoor expansion valve 45 and that is on the side closer than the branch portion of the subcooling pipe 46 to the second outdoor expansion valve 45.

The subcooling temperature sensor 67 is a temperature sensor that detects the temperature of the refrigerant flowing through a portion closer than the subcooling heat exchanger 47 to the second outdoor expansion valve 45 in a portion between the first outdoor expansion valve 44 and the second outdoor expansion valve 45 in the refrigerant circuit 10.

(13-2) Cooling Operating Mode

In the air conditioning apparatus 1g, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and is condensed in the outdoor heat exchanger 23. The refrigerant which has flowed through the outdoor heat exchanger 23 passes through the first outdoor expansion valve 44. Note that, in this case, the first outdoor expansion valve 44 is controlled to be in a full-open state.

A portion of the refrigerant which has passed through the first outdoor expansion valve 44 flows toward the second outdoor expansion valve 45 and another portion of the refrigerant is branched and flows to the subcooling pipe 46. The refrigerant which has been branched and flowed to the subcooling pipe 46 is decompressed at the subcooling expansion valve 48. The subcooling heat exchanger 47 causes the refrigerant flowing from the first outdoor expansion valve 44 toward the second outdoor expansion valve 45, and the refrigerant decompressed at the subcooling expansion valve 48 and flowing through the subcooling pipe 46 to exchange heat with each other. The refrigerant flowing through the subcooling pipe 46 exchanges heat in the subcooling heat exchanger 47, and then flows to join to a joint portion extending from one of the connecting ports of the four-way switching valve 22 to the low-pressure receiver 41. After the heat exchange in the subcooling heat exchanger 47, the refrigerant flowing from the first outdoor expansion valve 44 toward the second outdoor expansion valve 45 is decompressed at the second outdoor expansion valve 45.

As described above, the second outdoor expansion valve 45 is controlled to satisfy a predetermined condition, for example, such that the degree of subcooling of the refrigerant flowing through the liquid-side outlet of the outdoor heat exchanger 23 becomes a target value.

Moreover, the valve opening degree of the subcooling expansion valve 48 is controlled such that at least the refrigerant which reaches the first indoor expansion valve 33 and the second indoor expansion valve 38 is in a gas-liquid two-phase state to prevent occurrence of a situation in which all portions extending from the second outdoor expansion valve 45 via the liquid-side connection pipe 6 to the first indoor expansion valve 33 and the second indoor expansion valve 38 are filled with the refrigerant in a liquid state in the refrigerant circuit 10. For example, the valve opening degree of the subcooling expansion valve 48 is preferably controlled such that the specific enthalpy of the refrigerant which flows from the first outdoor expansion valve 44 toward the second outdoor expansion valve 45 and which has passed through the subcooling heat exchanger 47 is larger than the specific enthalpy of a portion in which the low pressure in the refrigeration cycle intersects with the saturated liquid line in the Mollier diagram. In this case, the controller 7 previously stores data in the Mollier diagram corresponding to the refrigerant, and may control the valve opening degree of the subcooling expansion valve 48 based of the specific enthalpy of the refrigerant which has passed through the subcooling heat exchanger 47 acquired from the detected pressure of the discharge pressure sensor 61, the detected temperature of the subcooling temperature sensor 67, and the data of the Mollier diagram corresponding to the refrigerant. The valve opening degree of the subcooling expansion valve 48 is preferably controlled to satisfy a predetermined condition, for example, such that the temperature of the refrigerant which flows from the first outdoor expansion valve 44 toward the second outdoor expansion valve 45 and which has passed through the subcooling heat exchanger 47 (the detected temperature of the subcooling temperature sensor 67) becomes a target value.

The refrigerant decompressed at the second outdoor expansion valve 45 passes through the liquid-side shutoff valve 29 and the liquid-side connection pipe 6, and is sent to the first indoor unit 30 and the second indoor unit 35.

In this case, in the first indoor unit 30, the valve opening degree of the first indoor expansion valve 33 is controlled to satisfy a predetermined condition, for example, such that the degree of superheating of the refrigerant flowing through the gas-side outlet of the first indoor heat exchanger 31 becomes a target value. Moreover, also for the second indoor expansion valve 38 of the second indoor unit 35, similarly to the first indoor expansion valve 33, the valve opening degree of the second indoor expansion valve 38 is controlled to satisfy a predetermined condition, for example, such that the degree of superheating of the refrigerant flowing through the gas-side outlet of the second indoor heat exchanger 36 becomes a target value. Each of the valve opening degrees of the first indoor expansion valve 33 and the second indoor expansion valve 38 may be controlled to satisfy a predetermined condition, for example, such that the degree of superheating of the refrigerant obtained by subtracting the saturation temperature of the refrigerant corresponding to the detected pressure of the suction pressure sensor 63 from the detected temperature of the suction temperature sensor 64. Furthermore, the method of controlling each of the valve opening degrees of the first indoor expansion valve 33 and the second indoor expansion valve 38 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows to the gas-side connection pipe 5. The refrigerant which has flowed through the gas-side connection pipe 5 passes through the gas-side shutoff valve 28 and the four-way switching valve 22, and is joined to the refrigerant which has flowed through the subcooling pipe 46. The joined refrigerant passes through the low-pressure receiver 41 and is sucked into the compressor 21 again. Note that the low-pressure receiver 41 stores, as an excessive refrigerant, the liquid refrigerants which have not been completely evaporated in the first indoor heat exchanger 31, the second indoor heat exchanger 36, and the subcooling heat exchanger 47.

(13-3) Heating Operating Mode

In the air conditioning apparatus 1g, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5 then a portion of the refrigerant flows into the gas-side end of the first indoor heat exchanger 31 of the first indoor unit 30 and is condensed in the first indoor heat exchanger 31, and another portion of the refrigerant flows into the gas-side end of the second indoor heat exchanger 36 of the second indoor unit 35 and is condensed in the second indoor heat exchanger 36.

Note that, the valve opening degree of the first indoor expansion valve 33 of the first indoor unit 30 is controlled to satisfy a predetermined condition, for example, such that the degree of subcooling of the refrigerant flowing through the liquid side of the first indoor heat exchanger 31 becomes a predetermined target value. Also for the second indoor expansion valve 38 of the second indoor unit 35, the valve opening degree of the second indoor expansion valve 38 is controlled likewise to satisfy a predetermined condition, for example, such that the degree of subcooling of the refrigerant flowing through the liquid side of the second indoor heat exchanger 36 becomes a predetermined target value.

The refrigerant decompressed at the first indoor expansion valve 33 and the refrigerant decompressed at the second indoor expansion valve 38 are joined. The joined refrigerant flows through the liquid-side connection pipe 6 and flows into the outdoor unit 20.

The refrigerant which has passed through the liquid-side shutoff valve 29 of the outdoor unit 20 passes through the second outdoor expansion valve 45 controlled to be in a full-open state, and exchanges heat with the refrigerant flowing through the subcooling pipe 46 in the subcooling heat exchanger 47. A portion of the refrigerant which has passed through the second outdoor expansion valve 45 and the subcooling heat exchanger 47 is branched to the subcooling pipe 46, and another portion of the refrigerant is sent to the first outdoor expansion valve 44. The refrigerant which has been branched and flowed to the subcooling pipe 46 is decompressed at the subcooling expansion valve 48, and then is joined to the refrigerant which has flowed from the indoor unit 30 or 35, in a joint portion between one of the connecting ports of the four-way switching valve 22 and the low-pressure receiver 41. The refrigerant which has flowed from the subcooling heat exchanger 47 toward the first outdoor expansion valve 44 is decompressed at the first outdoor expansion valve 44, and flows into the outdoor heat exchanger 23.

In this case, the valve opening degree of the first outdoor expansion valve 44 is controlled to satisfy a predetermined condition, for example, such that the degree of superheating of the refrigerant flowing through the suction side of the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

Moreover, the valve opening degree of the subcooling expansion valve 48 is controlled to satisfy a predetermined condition, for example, such that the degree of superheating of the refrigerant flowing through the suction side of the compressor 21 becomes a target value. Note that the method of controlling the valve opening degree of the subcooling expansion valve 48 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition. During heating operation, the subcooling expansion valve 48 may be controlled to be in a full-close state to prevent the refrigerant from flowing to the subcooling pipe 46.

The refrigerant decompressed at the first outdoor expansion valve 44 is evaporated in the outdoor heat exchanger 23, passes through the four-way switching valve 22, and is joined to the refrigerant which has flowed through the subcooling pipe 46. The joined refrigerant passes through the low-pressure receiver 41 and is sucked into the compressor 21 again. Note that the low-pressure receiver 41 stores, as an excessive refrigerant, the liquid refrigerant which has not been completely evaporated in the outdoor heat exchanger 23 and the subcooling heat exchanger 47.

(13-4) Characteristics of Eighth Embodiment

Since the air conditioning apparatus 1g can perform the refrigeration cycle using the refrigerant containing 1,2-difluoroethylene, the air conditioning apparatus 1g can perform a refrigeration cycle using a small-GWP refrigerant.

Moreover, since the air conditioning apparatus 1g is provided with the low-pressure receiver 41, liquid compression in the compressor 21 can be suppressed. Furthermore, since superheating control is performed on the first indoor expansion valve 33 and the second indoor expansion valve 38 during cooling operation and subcooling control is performed on the first indoor expansion valve 33 and the second indoor expansion valve 38 during heating operation, the capacities of the first indoor heat exchanger 31 and the second indoor heat exchanger 36 are likely sufficiently provided.

Furthermore, with the air conditioning apparatus 1g, during cooling operation, the space in the pipes from when the refrigerant passes through the second outdoor expansion valve 45 to when the refrigerant reaches the first indoor expansion valve 33 and the second indoor expansion valve 38 via the liquid-side connection pipe 6 is not filled with the liquid-state refrigerant, and control is performed so that a refrigerant in a gas-liquid two-phase state is in at least a portion of the space. As compared with the case where all the space in the pipes extending from the second outdoor expansion valve 45 to the first indoor expansion valve 33 and the second indoor expansion valve 38 is filled with the liquid refrigerant, refrigerant concentration can be decreased in the portion. The refrigeration cycle can be performed while the amount of refrigerant enclosed in the refrigerant circuit 10 is decreased. Thus, even if the refrigerant leaks from the refrigerant circuit 10, the leakage amount of refrigerant can be decreased.

(14) Ninth Embodiment

Figure 32:
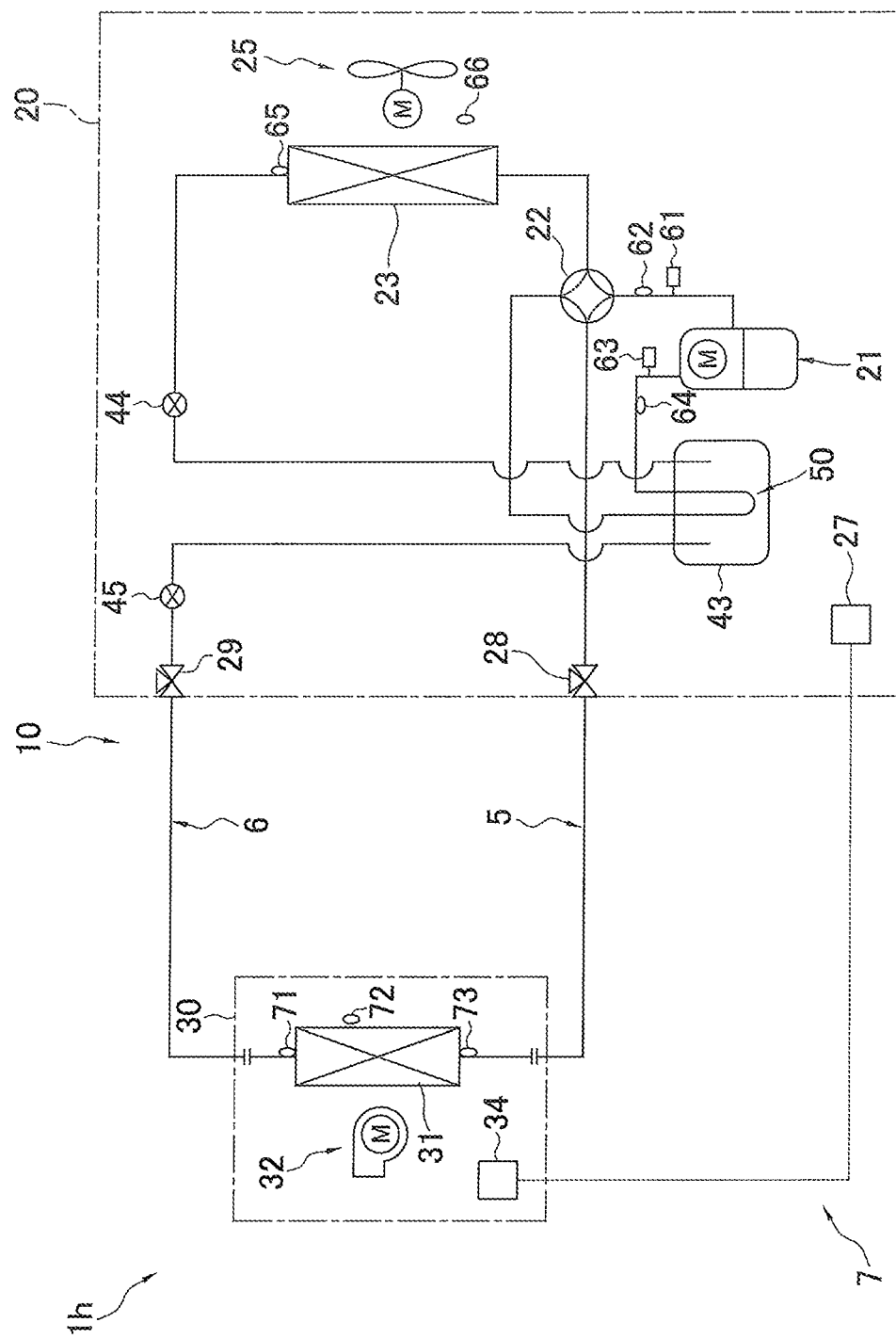
FIG. 32 is a schematic configuration diagram of a refrigerant circuit according to a ninth embodiment.
Figure 33:
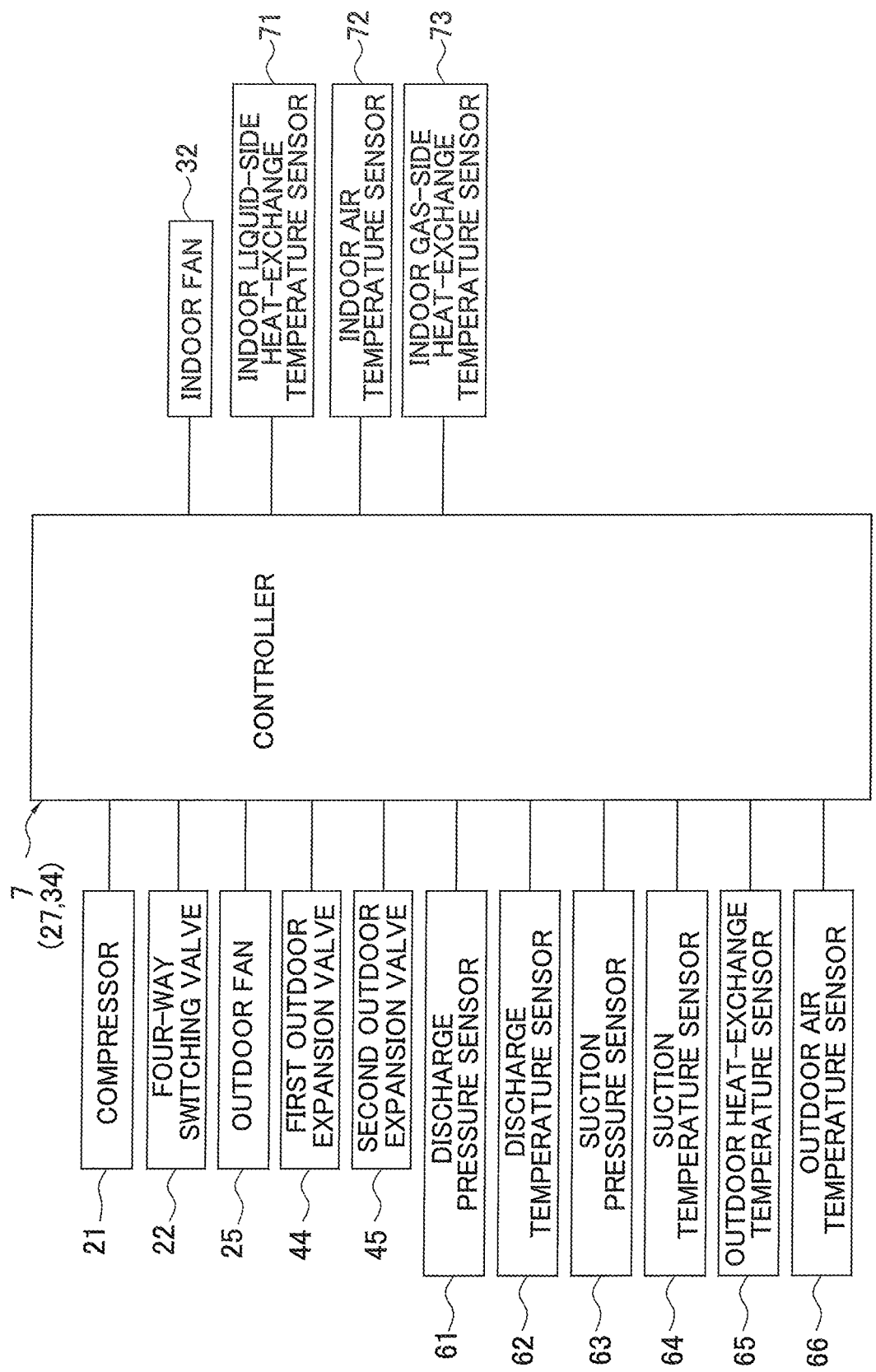
FIG. 33 is a schematic control block configuration diagram of a refrigeration cycle apparatus according to the ninth embodiment.

An air conditioning apparatus 1h serving as a refrigeration cycle apparatus according to a ninth embodiment is described below with reference to FIG. 32 which is a schematic configuration diagram of a refrigerant circuit and FIG. 33 which is a schematic control block configuration diagram. Differences from the air conditioning apparatus 1e according to the sixth embodiment are mainly described below.

(14-1) Schematic Configuration of Air Conditioning Apparatus 1h

The air conditioning apparatus 1h differs from the air conditioning apparatus 1e according to the sixth embodiment in that a suction refrigerant heating section 50 is included.

The suction refrigerant heating section 50 is constituted of a portion of the refrigerant pipe that extends from one of the connecting ports of the four-way switching valve 22 toward the suction side of the compressor 21 and that is located in the intermediate-pressure receiver 43. In the suction refrigerant heating section 50, the refrigerant flowing through the refrigerant pipe that extends from one of the connecting ports of the four-way switching valve 22 toward the suction side of the compressor 21 and the refrigerant in the intermediate-pressure receiver 43 exchange heat with each other without mixed with each other.

(14-2) Cooling Operating Mode

In the air conditioning apparatus 1h, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 is decompressed at the first outdoor expansion valve 44 to an intermediate pressure in the refrigeration cycle.

In this case, the valve opening degree of the first outdoor expansion valve 44 is controlled to satisfy a predetermined condition, for example, such that the degree of subcooling of the refrigerant flowing through the liquid-side outlet of the outdoor heat exchanger 23 becomes a target value.

The refrigerant decompressed at the first outdoor expansion valve 44 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(14-3) Heating Operating Mode

In the air conditioning apparatus 1h, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and is decompressed to an intermediate pressure in the refrigeration cycle at the second outdoor expansion valve 45.

In this case, the valve opening degree of the second outdoor expansion valve 45 is controlled to satisfy a predetermined condition, for example, such that the degree of subcooling of the refrigerant flowing through the liquid-side outlet of the indoor heat exchanger 31 becomes a target value.

The refrigerant decompressed at the second outdoor expansion valve 45 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(14-4) Characteristics of Ninth Embodiment

Since the air conditioning apparatus 1h can perform the refrigeration cycle using the refrigerant containing 1,2-difluoroethylene, the air conditioning apparatus 1h can perform a refrigeration cycle using a small-GWP refrigerant.

Moreover, since the air conditioning apparatus 1h is provided with the intermediate-pressure receiver 43, an excessive refrigerant in the refrigerant circuit 10 can be stored. During cooling operation, since subcooling control is performed on the first outdoor expansion valve 44, the capacity of the outdoor heat exchanger 23 can be likely sufficiently provided. During heating operation, since subcooling control is performed on the second outdoor expansion valve 45, the capacity of the indoor heat exchanger 31 can be likely sufficiently provided.

Furthermore, since the suction refrigerant heating section 50 is provided, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(15) Tenth Embodiment

Figure 34:
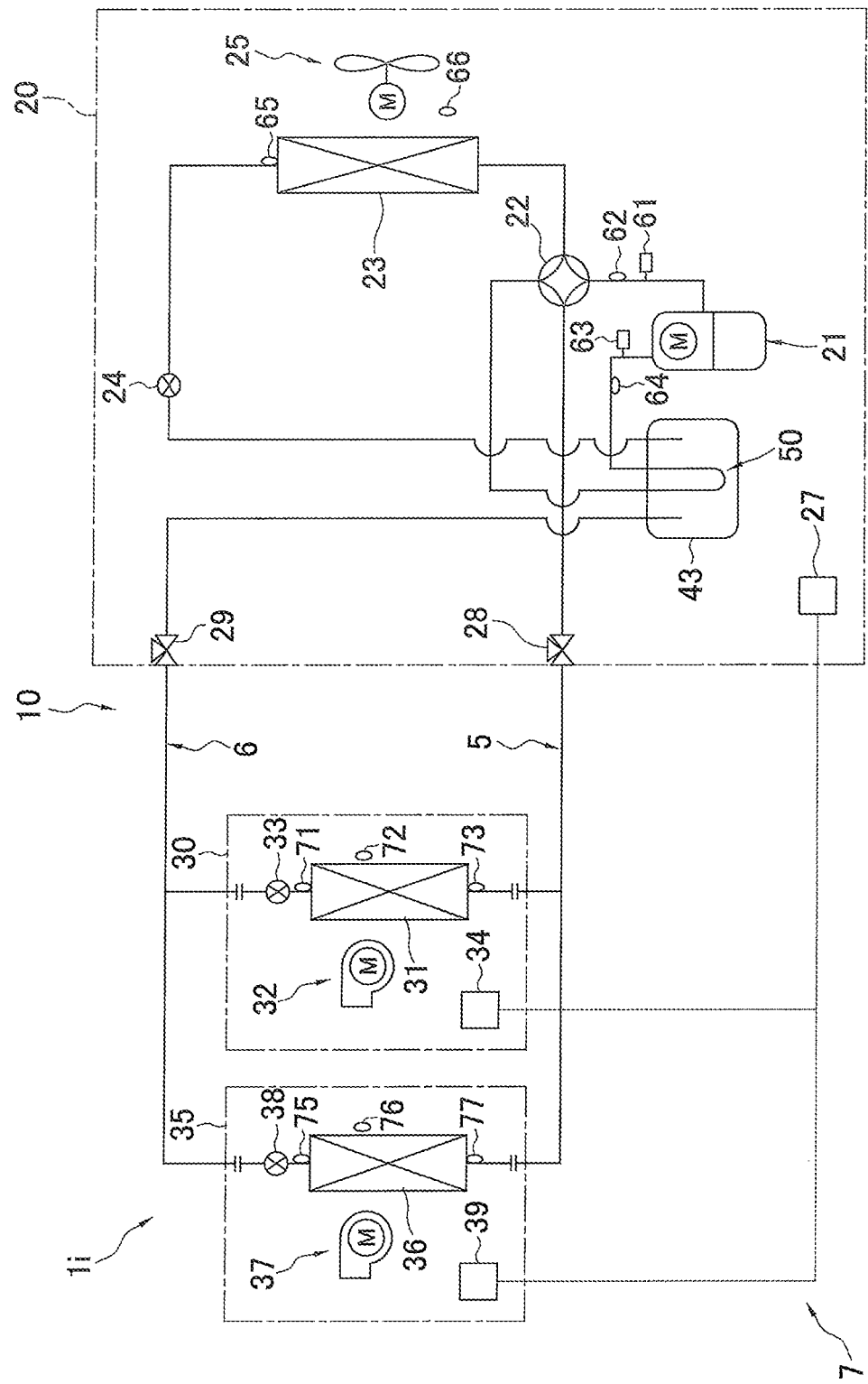
FIG. 34 is a schematic configuration diagram of a refrigerant circuit according to a tenth embodiment.
Figure 35:
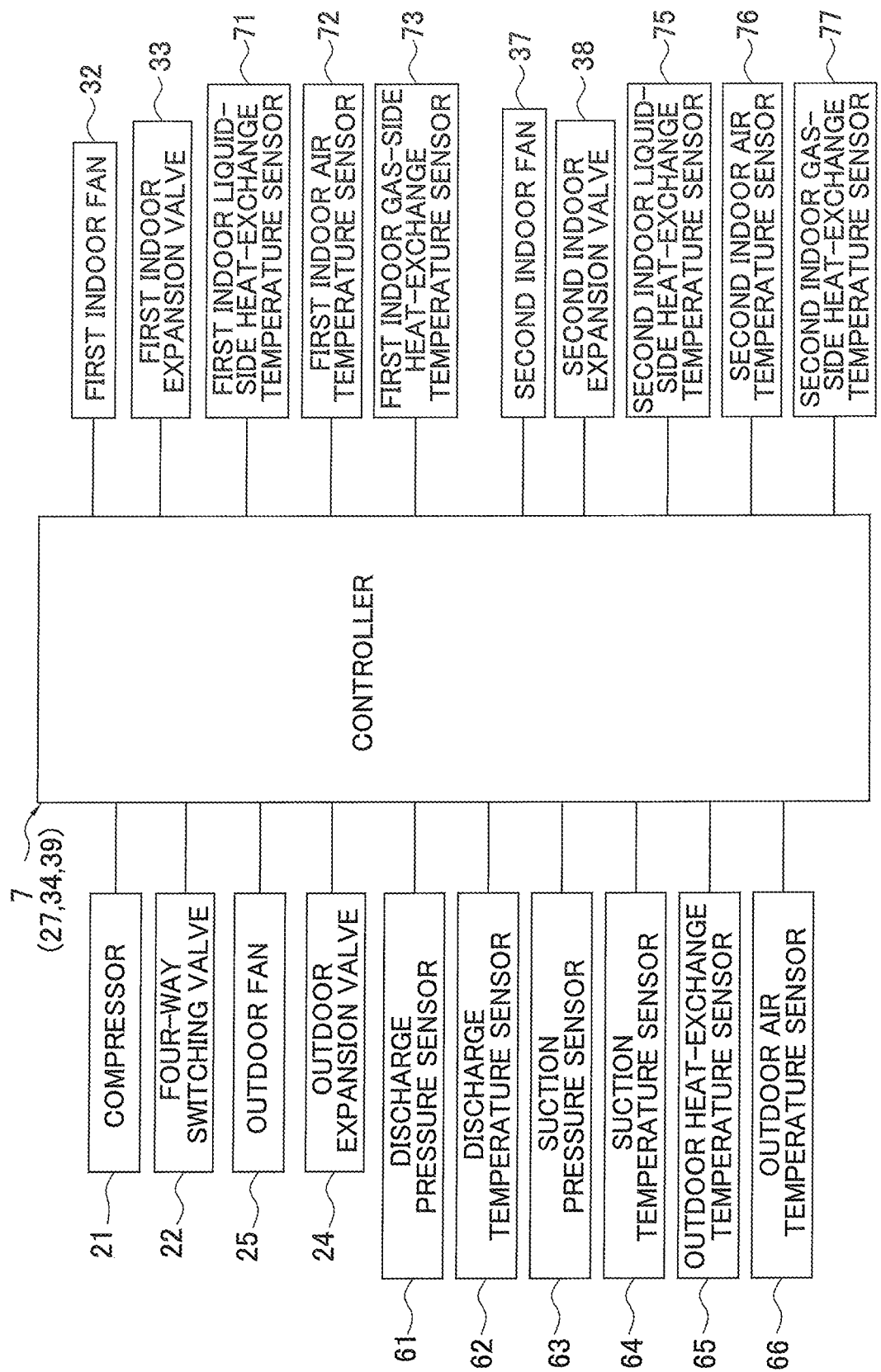
FIG. 35 is a schematic control block configuration diagram of a refrigeration cycle apparatus according to the tenth embodiment.

An air conditioning apparatus 1i serving as a refrigeration cycle apparatus according to a tenth embodiment is described below with reference to FIG. 34 which is a schematic configuration diagram of a refrigerant circuit and FIG. 35 which is a schematic control block configuration diagram. Differences from the air conditioning apparatus 1h according to the ninth embodiment are mainly described below.

(15-1) Schematic Configuration of Air Conditioning Apparatus 1i

The air conditioning apparatus 1i differs from the air conditioning apparatus 1h according to the ninth embodiment in that the first outdoor expansion valve 44 and the second outdoor expansion valve 45 are not provided, the outdoor expansion valve 24 is provided, a plurality of indoor units (a first indoor unit 30 and a second indoor unit 35) are provided in parallel, and an indoor expansion valve is provided on the liquid-refrigerant side of an indoor heat exchanger in each indoor unit.

The outdoor expansion valve 24 is provided midway in a refrigerant pipe extending from the liquid-side outlet of the outdoor heat exchanger 23 to the intermediate-pressure receiver 43. The outdoor expansion valve 24 is preferably an electric expansion valve of which the valve opening degree is adjustable.

Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34; and a first indoor liquid-side heat-exchange temperature sensor 71, a first indoor air temperature sensor 72, and a first indoor gas-side heat-exchange temperature sensor 73 that are electrically connected to the first indoor-unit control unit 34. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39; and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(15-2) Cooling Operating Mode

In the air conditioning apparatus 1i, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and then is condensed in the outdoor heat exchanger 23. The refrigerant which has flowed through the outdoor heat exchanger 23 passes through the outdoor expansion valve 24 controlled to be in a full-open state.

The refrigerant which has passed through the outdoor expansion valve 24 flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 passes through the liquid-side shutoff valve 29 and the liquid-side connection pipe 6, and flows into the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, the valve opening degree of the second indoor expansion valve 38 is controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows through the gas-side connection pipe 5, the gas-side shutoff valve 28, and the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(15-3) Heating Operating Mode

In the air conditioning apparatus 1i, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the liquid-side end of the second indoor heat exchanger 36 is decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29, and flows into the intermediate-pressure receiver 43. The intermediate-pressure receiver 43 stores, as the liquid refrigerant, an excessive refrigerant in the refrigerant circuit 10. In this case, the refrigerant which has flowed into the intermediate-pressure receiver 43 is cooled through heat exchange with the refrigerant flowing through a portion of the suction refrigerant heating section 50 on the suction side of the compressor 21. The refrigerant which has cooled in the suction refrigerant heating section 50 in the intermediate-pressure receiver 43 is decompressed to a low pressure in the refrigeration cycle at the outdoor expansion valve 24.

In this case, the valve opening degree of the outdoor expansion valve 24 is controlled to satisfy a predetermined condition, for example, such that the degree of superheating of the refrigerant to be sucked by the compressor 21 becomes a target value. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22, and flows inside the refrigerant pipe that passes through the inside of the intermediate-pressure receiver 43. The refrigerant flowing inside the refrigerant pipe that passes through the inside of the intermediate-pressure receiver 43 is heated through heat exchange with the refrigerant stored in the intermediate-pressure receiver 43, in the suction refrigerant heating section 50 in the intermediate-pressure receiver 43, and is sucked into the compressor 21 again.

(15-4) Characteristics of Tenth Embodiment

Since the air conditioning apparatus 1i can perform the refrigeration cycle using the refrigerant containing 1,2-difluoroethylene, the air conditioning apparatus 1i can perform a refrigeration cycle using a small-GWP refrigerant.

Moreover, since the air conditioning apparatus 1i is provided with the intermediate-pressure receiver 43, an excessive refrigerant in the refrigerant circuit 10 can be stored. During heating operation, since subcooling control is performed on the second outdoor expansion valve 45, the capacity of the indoor heat exchanger 31 can be likely sufficiently provided.

Furthermore, since the suction refrigerant heating section 50 is provided, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(16) Eleventh Embodiment

Figure 36:
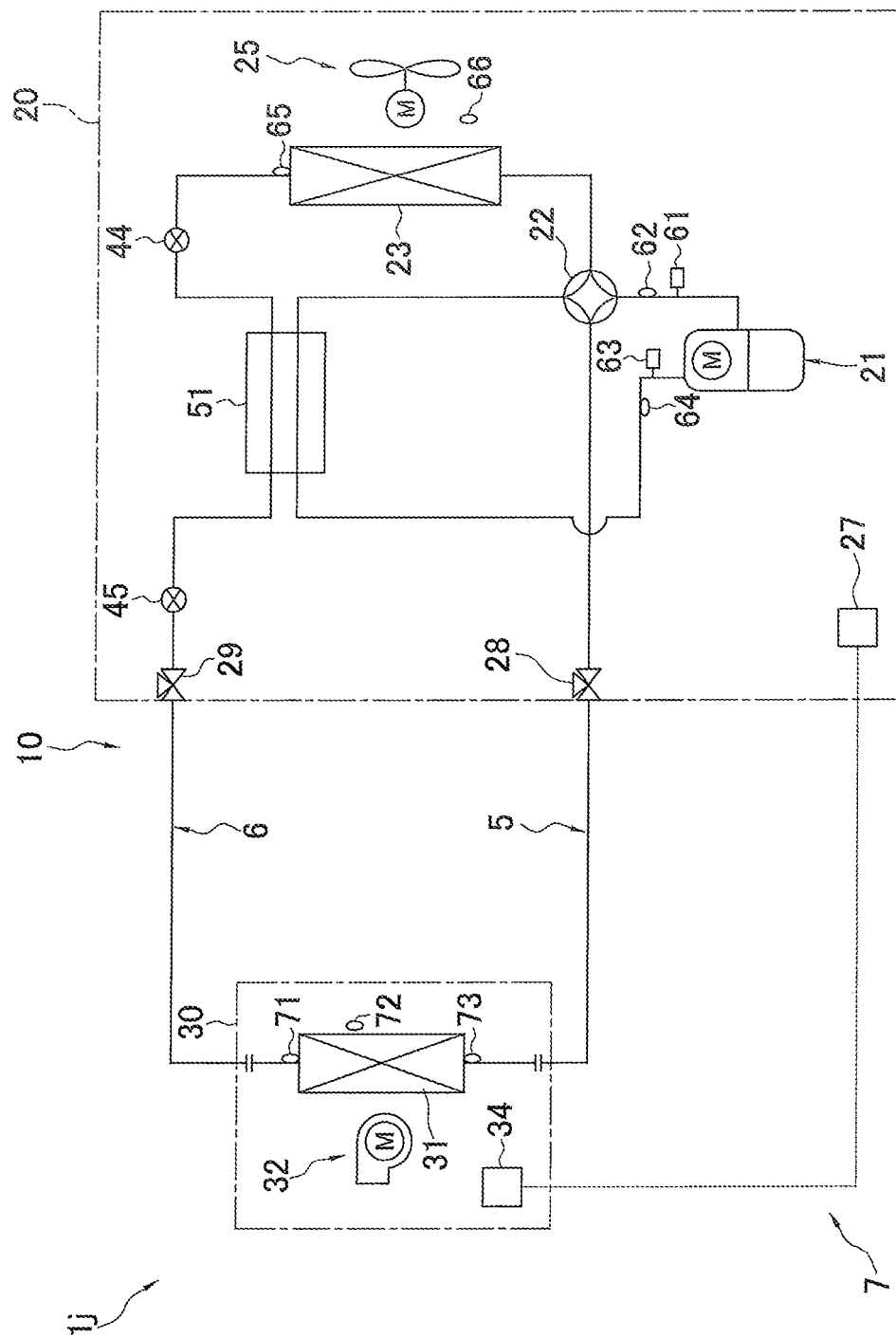
FIG. 36 is a schematic configuration diagram of a refrigerant circuit according to an eleventh embodiment.
Figure 37:
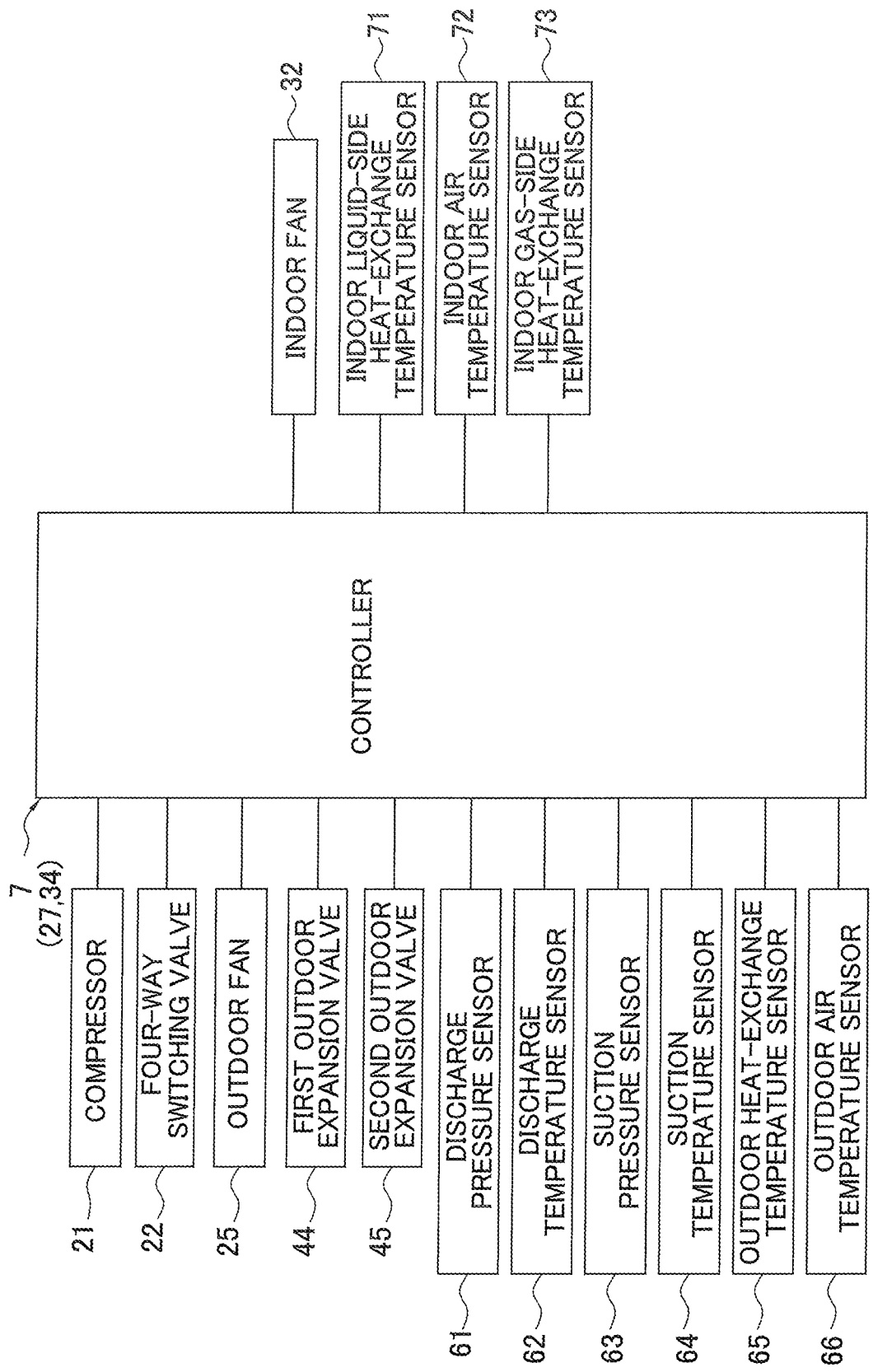
FIG. 37 is a schematic control block configuration diagram of a refrigeration cycle apparatus according to the eleventh embodiment.

An air conditioning apparatus 1j serving as a refrigeration cycle apparatus according to an eleventh embodiment is described below with reference to FIG. 36 which is a schematic configuration diagram of a refrigerant circuit and FIG. 37 which is a schematic control block configuration diagram. Differences from the air conditioning apparatus 1h according to the ninth embodiment are mainly described below.

(16-1) Schematic Configuration of Air Conditioning Apparatus 1j

The air conditioning apparatus 1j differs from the air conditioning apparatus 1h according to the ninth embodiment in that the suction refrigerant heating section 50 is not provided and an internal heat exchanger 51 is provided.

The internal heat exchanger 51 is a heat exchanger that exchanges heat between the refrigerant flowing between the first outdoor expansion valve 44 and the second outdoor expansion valve 45 and the refrigerant flowing through the refrigerant pipe extending from one of the connecting ports of the four-way switching valve 22 toward the suction side of the compressor 21.

(16-2) Cooling Operating Mode

In the air conditioning apparatus 1j, in the cooling operating mode, capacity control is performed on the operating frequency of the compressor 21, for example, such that the evaporation temperature of the refrigerant in the refrigerant circuit 10 becomes a target evaporation temperature that is determined in accordance with the difference between the set temperature and the indoor temperature (the detected temperature of the indoor air temperature sensor 72).

The gas refrigerant discharged from the compressor 21 passes through the four-way switching valve 22 and then is condensed in the outdoor heat exchanger 23. The refrigerant which has flowed through the outdoor heat exchanger 23 passes through the first outdoor expansion valve 44 controlled to be in a full-open state. The refrigerant which has passed through the first outdoor expansion valve 44 is cooled in the internal heat exchanger 51 and decompressed to a low pressure in the refrigeration cycle at the second outdoor expansion valve 45.

In this case, the valve opening degree of the second outdoor expansion valve 45 is controlled to satisfy a predetermined condition, for example, such that the degree of superheating of the refrigerant flowing through the gas side of the indoor heat exchanger 31 or the degree of superheating of the refrigerant to be sucked by the compressor 21 becomes a target value. Note that the method of controlling the valve opening degree of the second outdoor expansion valve 45 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the second outdoor expansion valve 45 to the low pressure in the refrigeration cycle passes through the liquid-side shutoff valve 29 and the liquid-side connection pipe 6, flows into the indoor unit 30, and is evaporated in the indoor heat exchanger 31. The refrigerant which has flowed through the indoor heat exchanger 31 flows through the gas-side connection pipe 5, then passes through the gas-side shutoff valve 28 and the four-way switching valve 22, is heated in the internal heat exchanger 51, and is sucked into the compressor 21 again.

(16-3) Heating Operating Mode

In the air conditioning apparatus 1j, in the heating operating mode, capacity control is performed on the operating frequency of the compressor 21, for example, such that the condensation temperature of the refrigerant in the refrigerant circuit 10 becomes a target condensation temperature that is determined in accordance with the difference between the set temperature and the indoor temperature (the detected temperature of the indoor air temperature sensor 72).

The gas refrigerant discharged from the compressor 21 flows through the four-way switching valve 22 and the gas-side connection pipe 5, then flows into the gas-side end of the indoor heat exchanger 31 of the indoor unit 30, and is condensed in the indoor heat exchanger 31. The refrigerant which has flowed out from the liquid-side end of the indoor heat exchanger 31 flows through the liquid-side connection pipe 6, flows into the outdoor unit 20, passes through the liquid-side shutoff valve 29, and passes through the second outdoor expansion valve 45 controlled to be in a full-open state. The refrigerant which has passed through the second outdoor expansion valve 45 is cooled in the internal heat exchanger 51 and decompressed to an intermediate pressure in the refrigeration cycle at the first outdoor expansion valve 44.

In this case, the valve opening degree of the first outdoor expansion valve 44 is controlled to satisfy a predetermined condition, for example, such that the degree of superheating of the refrigerant to be sucked by the compressor 21 becomes a target value. Note that the method of controlling the valve opening degree of the first outdoor expansion valve 44 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the first outdoor expansion valve 44 is evaporated in the outdoor heat exchanger 23, passes through the four-way switching valve 22, is heated in the internal heat exchanger 51, and is sucked into the compressor 21 again.

(16-4) Characteristics of Eleventh Embodiment

Since the air conditioning apparatus 1j can perform the refrigeration cycle using the refrigerant containing 1,2-difluoroethylene, the air conditioning apparatus 1j can perform a refrigeration cycle using a small-GWP refrigerant.

Furthermore, since the air conditioning apparatus 1j is provided with the internal heat exchanger 51, the refrigerant to be sucked into the compressor 21 is heated and liquid compression in the compressor 21 is suppressed. Control can be provided to cause the degree of superheating of the refrigerant flowing through the outlet of the indoor heat exchanger 31 that functions as the evaporator of the refrigerant during cooling operation to be a small value. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

(17) Twelfth Embodiment

Figure 38:
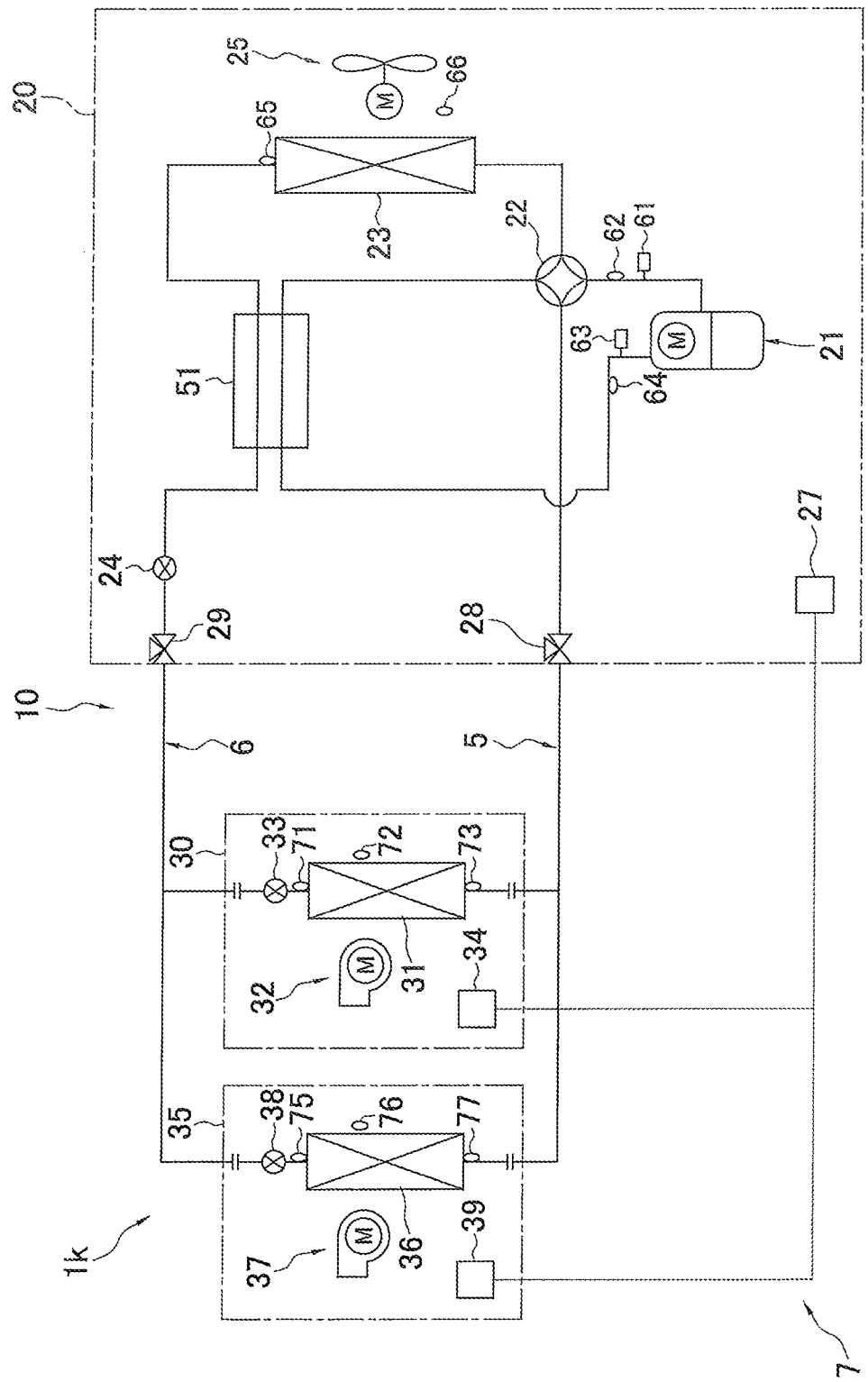
FIG. 38 is a schematic configuration diagram of a refrigerant circuit according to a twelfth embodiment.
Figure 39:
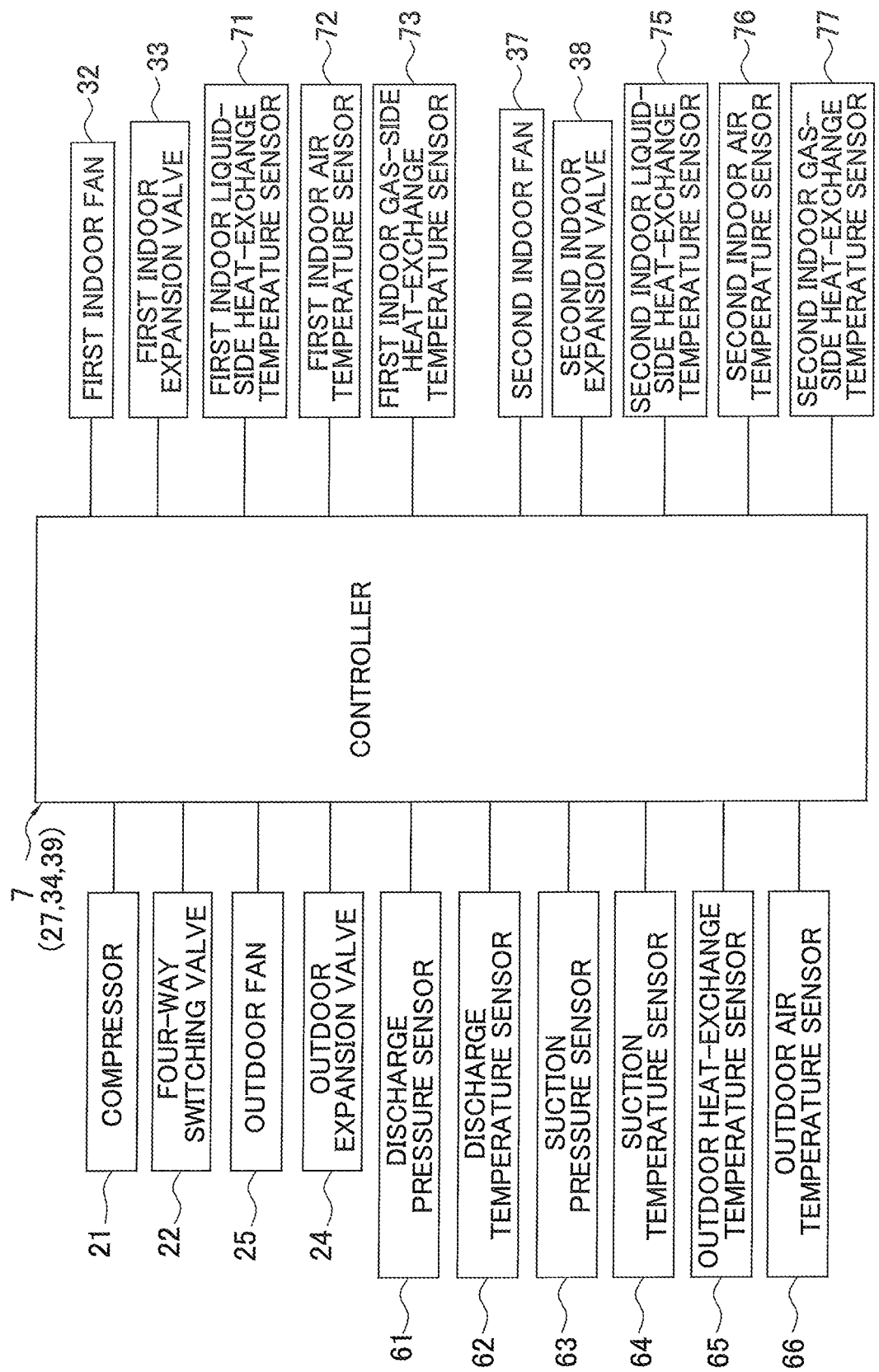
FIG. 39 is a schematic control block configuration diagram of a refrigeration cycle apparatus according to the twelfth embodiment.

An air conditioning apparatus 1k serving as a refrigeration cycle apparatus according to a twelfth embodiment is described below with reference to FIG. 38 which is a schematic configuration diagram of a refrigerant circuit and FIG. 39 which is a schematic control block configuration diagram. Differences from the air conditioning apparatus 1j according to the tenth embodiment are mainly described below.

(17-1) Schematic Configuration of Air Conditioning Apparatus 1k

The air conditioning apparatus 1k differs from the air conditioning apparatus 1j according to the tenth embodiment in that the first outdoor expansion valve 44 and the second outdoor expansion valve 45 are not provided, but an outdoor expansion valve 24 is provided; a plurality of indoor units (a first indoor unit 30 and a second indoor unit 35) are provided in parallel; and an indoor expansion valve is provided on the liquid-refrigerant side of an indoor heat exchanger in each indoor unit.

The outdoor expansion valve 24 is provided midway in the refrigerant pipe extending from the internal heat exchanger 51 to the liquid-side shutoff valve 29. The outdoor expansion valve 24 is preferably an electric expansion valve of which the valve opening degree is adjustable.

Similarly to the above-described embodiment, the first indoor unit 30 includes a first indoor heat exchanger 31 and a first indoor fan 32, and a first indoor expansion valve 33 is provided on the liquid-refrigerant side of the first indoor heat exchanger 31. The first indoor expansion valve 33 is preferably an electric expansion valve of which the valve opening degree is adjustable. Similarly to the above-described embodiment, the first indoor unit 30 includes a first indoor-unit control unit 34, and a first indoor liquid-side heat-exchange temperature sensor 71, a first indoor air temperature sensor 72, and a first indoor gas-side heat-exchange temperature sensor 73 that are electrically connected to the first indoor-unit control unit 34. Similarly to the first indoor unit 30, the second indoor unit 35 includes a second indoor heat exchanger 36 and a second indoor fan 37, and a second indoor expansion valve 38 is provided on the liquid-refrigerant side of the second indoor heat exchanger 36. The second indoor expansion valve 38 is preferably an electric expansion valve of which the valve opening degree is adjustable. Similarly to the first indoor unit 30, the second indoor unit 35 includes a second indoor-unit control unit 39, and a second indoor liquid-side heat-exchange temperature sensor 75, a second indoor air temperature sensor 76, and a second indoor gas-side heat-exchange temperature sensor 77 that are electrically connected to the second indoor-unit control unit 39.

(17-2) Cooling Operating Mode

In the air conditioning apparatus 1k, in the cooling operating mode, capacity control is performed on the operating frequency of the compressor 21, for example, such that the evaporation temperature of the refrigerant in the refrigerant circuit 10 becomes a target evaporation temperature. In this case, the target evaporation temperature is preferably determined in accordance with one of the indoor units 30 and 35 having the largest difference between the set temperature and the indoor temperature (an indoor unit having the largest load).

The gas refrigerant discharged from the compressor 21 passes through the four-way switching valve 22 and then is condensed in the outdoor heat exchanger 23. The refrigerant which has flowed through the outdoor heat exchanger 23 is cooled in the internal heat exchanger 51, passes through the outdoor expansion valve 24 controlled to be in a full-open state, passes through the liquid-side shutoff valve 29, and the liquid-side connection pipe 6, and flows into each of the first indoor unit 30 and the second indoor unit 35.

The refrigerant which has flowed into the first indoor unit 30 is decompressed at the first indoor expansion valve 33 to a low pressure in the refrigeration cycle. The refrigerant which has flowed into the second indoor unit 35 is decompressed at the second indoor expansion valve 38 to a low pressure in the refrigeration cycle.

In this case, the valve opening degree of the first indoor expansion valve 33 is controlled to satisfy a predetermined condition, for example, such that the degree of superheating of the refrigerant flowing through the gas side of the first indoor heat exchanger 31 or the degree of superheating of the refrigerant to be sucked by the compressor 21 becomes a target value. Moreover, likewise, the valve opening degree of the second indoor expansion valve 38 is also controlled to satisfy a predetermined condition, for example, such that the degree of superheating of the refrigerant flowing through the gas side of the second indoor heat exchanger 36 or the degree of superheating of the refrigerant to be sucked by the compressor 21 becomes a target value.

The refrigerant decompressed at the first indoor expansion valve 33 is evaporated in the first indoor heat exchanger 31, the refrigerant decompressed at the second indoor expansion valve 38 is evaporated in the second indoor heat exchanger 36, and the evaporated refrigerants are joined. Then, the joined refrigerant flows through the gas-side connection pipe 5, passes through the gas-side shutoff valve 28 and the four-way switching valve 22, is heated in the internal heat exchanger 51, and is sucked by the compressor 21 again.

(17-3) Heating Operating Mode

In the air conditioning apparatus 1k, in the heating operating mode, capacity control is performed on the operating frequency of the compressor 21, for example, such that the condensation temperature of the refrigerant in the refrigerant circuit 10 becomes a target condensation temperature. In this case, the target condensation temperature is preferably determined in accordance with one of the indoor units 30 and 35 having the largest difference between the set temperature and the indoor temperature (an indoor unit having the largest load).

The gas refrigerant discharged from the compressor 21 flows through the four-way switching valve 22 and the gas-side connection pipe 5, and then flows into each of the first indoor unit 30 and the second indoor unit 35.

The refrigerant which has flowed into the first indoor unit 30 is condensed in the first indoor heat exchanger 31. The refrigerant which has flowed into the second indoor unit 35 is condensed in the second indoor heat exchanger 36.

The refrigerant which has flowed out from the liquid-side end of the first indoor heat exchanger 31 is decompressed at the first indoor expansion valve 33 to an intermediate pressure in the refrigeration cycle. The refrigerant which has flowed out from the liquid-side end of the second indoor heat exchanger 36 is also likewise decompressed at the second indoor expansion valve 38 to an intermediate pressure in the refrigeration cycle.

In this case, the valve opening degree of the first indoor expansion valve 33 is controlled to satisfy a predetermined condition, for example, such that the degree of subcooling of the refrigerant flowing through the liquid-side outlet of the first indoor heat exchanger 31 becomes a target value. Also, the valve opening degree of the second indoor expansion valve 38 is controlled to satisfy a predetermined condition, for example, such that the degree of subcooling of the refrigerant flowing through the liquid-side outlet of the second indoor heat exchanger 36 becomes a target value.

The refrigerant which has passed through the first indoor expansion valve 33 and the refrigerant which has passed through the second indoor expansion valve 38 are joined. Then, the joined refrigerant passes through the liquid-side connection pipe 6 and flows into the outdoor unit 20.

The refrigerant which has flowed into the outdoor unit 20 passes through the liquid-side shutoff valve 29 and is decompressed at the outdoor expansion valve 24 to a low pressure in the refrigeration cycle.

In this case, the valve opening degree of the outdoor expansion valve 24 is controlled to satisfy a predetermined condition, for example, such that the degree of superheating of the refrigerant to be sucked by the compressor 21 becomes a target value. Note that the method of controlling the valve opening degree of the outdoor expansion valve 24 is not limited, and, for example, control may be performed such that the discharge temperature of the refrigerant discharged from the compressor 21 becomes a predetermined temperature, or the degree of superheating of the refrigerant discharged from the compressor 21 satisfies a predetermined condition.

The refrigerant decompressed at the outdoor expansion valve 24 is evaporated in the outdoor heat exchanger 23, passes through the four-way switching valve 22, is heated in the internal heat exchanger 51, and is sucked into the compressor 21 again.

(17-4) Characteristics of Twelfth Embodiment

Since the air conditioning apparatus 1k can perform the refrigeration cycle using the refrigerant containing 1,2-difluoroethylene, the air conditioning apparatus 1k can perform a refrigeration cycle using a small-GWP refrigerant.

In the air conditioning apparatus 1k, during heating operation, since subcooling control is performed on the first indoor expansion valve 33 and the second indoor expansion valve 38, the capacities of the first indoor heat exchanger 31 and the second indoor heat exchanger 36 can be likely sufficiently provided.

Furthermore, since the air conditioning apparatus 1k is provided with the internal heat exchanger 51, the refrigerant to be sucked into the compressor 21 is heated and liquid compression in the compressor 21 is suppressed. Control can be provided to cause the degrees of superheating of the refrigerant flowing through the outlets of the first indoor heat exchanger 31 and the second indoor heat exchanger 36 that function as the evaporators of the refrigerant during cooling operation to be small values. Also, similarly in heating operation, control can be provided to cause the degree of superheating of the refrigerant flowing through the outlet of the outdoor heat exchanger 23 that functions as the evaporator of the refrigerant to be a small value. Thus, in either of cooling operation and heating operation, even when use of a nonazeotropic mixed refrigerant as the refrigerant causes a temperature glide in the evaporator, the capacity of the heat exchanger that functions as the evaporator can be sufficiently provided.

The embodiments of the present disclosure have been described above, and it is understood that the embodiments and details can be modified in various ways without departing from the idea and scope of the present disclosure described in the claims.

REFERENCE SIGNS LIST 1, 1a to 1m air conditioning apparatus (refrigeration cycle apparatus)
7 controller (control unit)
10 refrigerant circuit
20 outdoor unit
21 compressor
23 outdoor heat exchanger (condenser, evaporator)
24 outdoor expansion valve (decompressing section)
25 outdoor fan
26 indoor bridge circuit
27 outdoor-unit control unit (control unit)
30 indoor unit, first indoor unit
31 indoor heat exchanger, first indoor heat exchanger (evaporator, condenser)
32 indoor fan, first indoor fan
33 indoor expansion valve, first indoor expansion valve (decompressing section)
34 indoor-unit control unit, first indoor-unit control unit (control unit)
35 second indoor unit
36 second indoor heat exchanger (evaporator, condenser)
37 second indoor fan
38 second indoor expansion valve (decompressing section)
39 second indoor-unit control unit (control unit)
40 bypass pipe
41 low-pressure receiver
42 high-pressure receiver
43 intermediate-pressure receiver
44 first outdoor expansion valve (decompressing section, first decompressing section)
45 second outdoor expansion valve (decompressing section, second decompressing section)
46 subcooling pipe
47 subcooling heat exchanger
48 subcooling expansion valve
49 bypass expansion valve
50 suction refrigerant heating section (refrigerant heat exchanging section)
51 internal heat exchanger (refrigerant heat exchanging section)
53 outdoor bridge circuit
54 indoor bridge circuit, first indoor bridge circuit
55 second indoor bridge circuit
61 discharge pressure sensor
62 discharge temperature sensor
63 suction pressure sensor
64 suction temperature sensor
65 outdoor heat-exchange temperature sensor
66 outdoor air temperature sensor
67 subcooling temperature sensor
71 indoor liquid-side heat-exchange temperature sensor, first indoor liquid-side heat-exchange temperature sensor
72 indoor air temperature sensor, first indoor air temperature sensor
73 indoor gas-side heat-exchange temperature sensor, first indoor gas-side heat-exchange temperature sensor
75 second indoor liquid-side heat-exchange temperature sensor
76 second indoor air temperature sensor
77 second indoor gas-side heat-exchange temperature sensor
81 indoor inflow-side heat-exchange temperature sensor, first indoor inflow-side heat-exchange temperature sensor
83 indoor outflow-side heat-exchange temperature sensor, first indoor outflow-side heat-exchange temperature sensor
85 second indoor inflow-side heat-exchange temperature sensor
87 second indoor outflow-side heat-exchange temperature sensor

CITATION LIST

Patent Literature

PTL 1: International Publication No. 2015/141678

The invention claimed is:
1. A refrigeration cycle apparatus comprising:
a refrigerant circuit including a compressor, a condenser, a decompressing section, and an evaporator; and
a refrigerant enclosed in the refrigerant circuit,
wherein
the refrigerant comprises trans-1,2-difluoroethylene (HFO-1132(E)), difluoromethane(R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments IJ, JN, NE, and EI that connect the following 4 points:
point I (72.0, 0.0, 28.0),
point J (48.5, 18.3, 33.2),
point N (27.7, 18.2, 54.1), and
point E (58.3, 0.0, 41.7),
or on these line segments (excluding the points on the line segment EI,
the line segment IJ is represented by coordinates $(0.0236y^2-1.7616y+72.0, y, -0.0236y^2+0.7616y+28.0)$;
the line segment NE is represented by coordinates $(0.012y^2-1.9003y+58.3, y, -0.012y^2+0.9003y+41.7)$; and
the line segments JN and EI are straight lines.
2. The refrigeration cycle apparatus according to claim 1, wherein
the refrigerant circuit further includes a low-pressure receiver provided midway in a refrigerant flow path extending from the evaporator toward a suction side of the compressor.
3. The refrigeration cycle apparatus according to claim 1, wherein
the refrigerant circuit further includes a high-pressure receiver provided midway in a refrigerant flow path extending from the condenser toward the evaporator.
4. The refrigeration cycle apparatus according to claim 1, wherein
the decompressing section comprises a first decompressing section and a second decompressing section,
the refrigerant circuit further includes the first decompressing section, the second decompressing section, and an intermediate-pressure receiver provided midway in a refrigerant flow path extending from the condenser toward the evaporator, and
the intermediate-pressure receiver is provided between the first decompressing section and the second decompressing section in the refrigerant flow path extending from the condenser toward the evaporator.
5. The refrigeration cycle apparatus according to claim 1, wherein
the decompressing section comprises a first decompressing section and a second decompressing section,
the refrigerant circuit further includes the first decompressing section and the second decompressing section provided midway in a refrigerant flow path extending from the condenser toward the evaporator, and
the refrigeration cycle apparatus further comprises a control unit that adjusts both a degree of decompression of a refrigerant passing through the first decompressing section and a degree of decompression of a refrigerant passing through the second decompressing section.
6. The refrigeration cycle apparatus according to claim 1, wherein
the refrigerant circuit further includes a refrigerant heat exchanging section that causes a refrigerant flowing from the condenser toward the evaporator and a refrigerant flowing from the evaporator toward the compressor to exchange heat with each other.
7. A refrigeration cycle apparatus comprising:
a refrigerant circuit including a compressor, a condenser, a decompressing section, and an evaporator; and
a refrigerant enclosed in the refrigerant circuit,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments MM', MN, NV, VG, and GM that connect the following 5 points:
point M (52.6, 0.0, 47.4),
point M' (39.2, 5.0, 55.8),
point N (27.7, 18.2, 54.1),
point V (11.0, 18.1, 70.9), and
point G (39.6, 0.0, 60.4),
or on these line segments (excluding the points on the line segment GM);
the line segment MM' is represented by coordinates $(0.132y^2-3.34y+52.6, y, -0.132y^2+2.34y+47.4)$;
the line segment M'N is represented by coordinates $(0.0596y^2-2.2541y+48.98, y, -0.0596y^2+1.2541y+51.02)$;
the line segment VG is represented by coordinates $(0.0123y^2-1.8033y+39.6, y, -0.0123y^2+0.8033y+60.4)$; and
the line segments NV and GM are straight lines.
8. The refrigeration cycle apparatus according to claim 7, wherein
the refrigerant circuit further includes a low-pressure receiver provided midway in a refrigerant flow path extending from the evaporator toward a suction side of the compressor.
9. The refrigeration cycle apparatus according to claim 7, wherein
the refrigerant circuit further includes a high-pressure receiver provided midway in a refrigerant flow path extending from the condenser toward the evaporator.
10. The refrigeration cycle apparatus according to claim 7, wherein
the decompressing section comprises a first decompressing section and a second decompressing section,
the refrigerant circuit further includes the first decompressing section, the second decompressing section, and an intermediate-pressure receiver provided midway in a refrigerant flow path extending from the condenser toward the evaporator, and the intermediate-pressure receiver is provided between the first decompressing section and the second decompressing section in the refrigerant flow path extending from the condenser toward the evaporator.

11. The refrigeration cycle apparatus according to claim 7, wherein
the decompressing section comprises a first decompressing section and a second decompressing section,
the refrigerant circuit further includes the first decompressing section and the second decompressing section provided midway in a refrigerant flow path extending from the condenser toward the evaporator, and
the refrigeration cycle apparatus further comprises a control unit that adjusts both a degree of decompression of a refrigerant passing through the first decompressing section and a degree of decompression of a refrigerant passing through the second decompressing section.

12. The refrigeration cycle apparatus according to claim 7, wherein
the refrigerant circuit further includes a refrigerant heat exchanging section that causes a refrigerant flowing from the condenser toward the evaporator and a refrigerant flowing from the evaporator toward the compressor to exchange heat with each other.

13. A refrigeration cycle apparatus comprising:
a refrigerant circuit including a compressor, a condenser, a decompressing section, and an evaporator; and
a refrigerant enclosed in the refrigerant circuit,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y and z, coordinates (x,y,z) in a ternary composition diagram in which the sum of HFO-1132(E), R32, and R1234yf is 100 mass % are within the range of a figure surrounded by line segments ON, NU, and UO that connect the following 3 points:
point O (22.6, 36.8, 40.6),
point N (27.7, 18.2, 54.1), and
point U (3.9, 36.7, 59.4),
or on these line segments;
the line segment ON is represented by coordinates $(0.0072y^2-0.6701y+37.512, y, -0.0072y^2-0.3299y+62.488)$;
the line segment NU is represented by coordinates $(0.0083y^2-1.7403y+56.635, y, -0.0083y^2+0.7403y+43.365)$; and
the line segment UO is a straight line.

14. The refrigeration cycle apparatus according to claim 13, wherein
the refrigerant circuit further includes a low-pressure receiver provided midway in a refrigerant flow path extending from the evaporator toward a suction side of the compressor.

15. The refrigeration cycle apparatus according to claim 13, wherein
the refrigerant circuit further includes a high-pressure receiver provided midway in a refrigerant flow path extending from the condenser toward the evaporator.

16. The refrigeration cycle apparatus according to claim 13, wherein
the decompressing section comprises a first decompressing section and a second decompressing section,
the refrigerant circuit further includes the first decompressing section, the second decompressing section, and an intermediate-pressure receiver provided midway in a refrigerant flow path extending from the condenser toward the evaporator, and
the intermediate-pressure receiver is provided between the first decompressing section and the second decompressing section in the refrigerant flow path extending from the condenser toward the evaporator.

17. The refrigeration cycle apparatus according to claim 13, wherein
the decompressing section comprises a first decompressing section and a second decompressing section,
the refrigerant circuit further includes the first decompressing section and the second decompressing section provided midway in a refrigerant flow path extending from the condenser toward the evaporator, and
the refrigeration cycle apparatus further comprises a control unit that adjusts both a degree of decompression of a refrigerant passing through the first decompressing section and a degree of decompression of a refrigerant passing through the second decompressing section.

18. The refrigeration cycle apparatus according to claim 13, wherein
the refrigerant circuit further includes a refrigerant heat exchanging section that causes a refrigerant flowing from the condenser toward the evaporator and a refrigerant flowing from the evaporator toward the compressor to exchange heat with each other.

19. A refrigeration cycle apparatus comprising:
a refrigerant circuit including a compressor, a condenser, a decompressing section, and an evaporator; and
a refrigerant enclosed in the refrigerant circuit,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments QR, RT, TL, LK, and KQ that connect the following 5 points:
point Q (44.6, 23.0, 32.4),
point R (25.5, 36.8, 37.7),
point T (8.6, 51.6, 39.8),
point L (28.9, 51.7, 19.4), and
point K (35.6, 36.8, 27.6),
or on these line segments;
the line segment QR is represented by coordinates $(0.0099y^2-1.975y+84.765, y, -0.0099y^2+0.975y+15.235)$;
the line segment RT is represented by coordinates $(0.0082y^2-1.8683y+83.126, y, -0.0082y^2+0.8683y+16.874)$;
the line segment LK is represented by coordinates $(0.0049y^2-0.8842y+61.488, y, -0.0049y^2-0.1158y+38.512)$;
the line segment KQ is represented by coordinates $(0.0095y^2-1.2222y+67.676, y, -0.0095y^2+0.2222y+32.324)$; and
the line segment TL is a straight line.

20. The refrigeration cycle apparatus according to claim 19, wherein
the refrigerant circuit further includes a low-pressure receiver provided midway in a refrigerant flow path extending from the evaporator toward a suction side of the compressor.

21. The refrigeration cycle apparatus according to claim 19, wherein
the refrigerant circuit further includes a high-pressure receiver provided midway in a refrigerant flow path extending from the condenser toward the evaporator.

22. The refrigeration cycle apparatus according to claim 19, wherein
the decompressing section comprises a first decompressing section and a second decompressing section,
the refrigerant circuit further includes the first decompressing section, the second decompressing section, and an intermediate-pressure receiver provided midway in a refrigerant flow path extending from the condenser toward the evaporator, and
the intermediate-pressure receiver is provided between the first decompressing section and the second decompressing section in the refrigerant flow path extending from the condenser toward the evaporator.

23. The refrigeration cycle apparatus according to claim 19, wherein
the decompressing section comprises a first decompressing section and a second decompressing section,
the refrigerant circuit further includes the first decompressing section and the second decompressing section provided midway in a refrigerant flow path extending from the condenser toward the evaporator, and
the refrigeration cycle apparatus further comprises a control unit that adjusts both a degree of decompression of a refrigerant passing through the first decompressing section and a degree of decompression of a refrigerant passing through the second decompressing section.

24. The refrigeration cycle apparatus according to claim 19, wherein
the refrigerant circuit further includes a refrigerant heat exchanging section that causes a refrigerant flowing from the condenser toward the evaporator and a refrigerant flowing from the evaporator toward the compressor to exchange heat with each other.

25. A refrigeration cycle apparatus comprising:
a refrigerant circuit including a compressor, a condenser, a decompressing section, and an evaporator; and
a refrigerant enclosed in the refrigerant circuit,
wherein
the refrigerant comprises trans-1,2-difluoroethylene (HFO-1132(E)), difluoromethane (R32), and 2,3,3,3-tetrafluoro-1-propene (R1234yf),
wherein
when the mass % of HFO-1132(E), R32, and R1234yf based on their sum in the refrigerant is respectively represented by x, y, and z, coordinates (x,y,z) in a ternary composition diagram in which the sum of HFO-1132(E), R32, and R1234yf is 100 mass % are within the range of a figure surrounded by line segments PS, ST, and TP that connect the following 3 points:
point P (20.5, 51.7, 27.8),
point S (21.9, 39.7, 38.4), and
point T (8.6, 51.6, 39.8),
or on these line segments;
the line segment PS is represented by coordinates $(0.0064y^2-0.7103y+40.1, y, -0.0064y^2-0.2897y+59.9)$;
the line segment ST is represented by coordinates $(0.0082y^2-1.8683y+83.126, y, -0.0082y^2+0.8683y+16.874)$; and
the line segment TP is a straight line.

26. The refrigeration cycle apparatus according to claim 25, wherein
the refrigerant circuit further includes a low-pressure receiver provided midway in a refrigerant flow path extending from the evaporator toward a suction side of the compressor.

27. The refrigeration cycle apparatus according to claim 25, wherein
the refrigerant circuit further includes a high-pressure receiver provided midway in a refrigerant flow path extending from the condenser toward the evaporator.

28. The refrigeration cycle apparatus according to claim 25, wherein
the decompressing section comprises a first decompressing section and a second decompressing section,
the refrigerant circuit further includes the first decompressing section, the second decompressing section, and an intermediate-pressure receiver provided midway in a refrigerant flow path extending from the condenser toward the evaporator, and
the intermediate-pressure receiver is provided between the first decompressing section and the second decompressing section in the refrigerant flow path extending from the condenser toward the evaporator.

29. The refrigeration cycle apparatus according to claim 25, wherein
the decompressing section comprises a first decompressing section and a second decompressing section,
the refrigerant circuit further includes the first decompressing section and the second decompressing section provided midway in a refrigerant flow path extending from the condenser toward the evaporator, and
the refrigeration cycle apparatus further comprises a control unit that adjusts both a degree of decompression of a refrigerant passing through the first decompressing section and a degree of decompression of a refrigerant passing through the second decompressing section.

30. The refrigeration cycle apparatus according to claim 25, wherein
the refrigerant circuit further includes a refrigerant heat exchanging section that causes a refrigerant flowing from the condenser toward the evaporator and a refrigerant flowing from the evaporator toward the compressor to exchange heat with each other.

\* \* \* \* \*